(12) United States Patent
Sakuma et al.

(10) Patent No.: US 10,749,387 B2
(45) Date of Patent: Aug. 18, 2020

(54) ROTARY ELECTRIC APPARATUS

(71) Applicant: AISIN SEIKI KABUSHIKI KAISHA, Kariya-shi, Aichi-ken (JP)

(72) Inventors: Masafumi Sakuma, Chiryu (JP); Teppei Tsuda, Nagoya (JP)

(73) Assignee: AISIN SEIKI KABUSHIKI KAISHA, Kariya, Aichi-Ken (JP)

( * ) Notice: Subject to any disclaimer, the term of this patent is extended or adjusted under 35 U.S.C. 154(b) by 139 days.

(21) Appl. No.: 16/157,748

(22) Filed: Oct. 11, 2018

(65) Prior Publication Data

US 2019/0115795 A1 Apr. 18, 2019

(30) Foreign Application Priority Data

Oct. 13, 2017 (JP) .................. 2017-199879

(51) Int. Cl.
*H02K 3/28* (2006.01)
*H02K 29/03* (2006.01)
*H02K 1/16* (2006.01)
*H02K 3/16* (2006.01)
*H02K 1/27* (2006.01)
*H02K 1/24* (2006.01)

(52) U.S. Cl.
CPC .............. *H02K 1/165* (2013.01); *H02K 1/16* (2013.01); *H02K 1/2706* (2013.01); *H02K 1/278* (2013.01); *H02K 3/16* (2013.01); *H02K 3/28* (2013.01); *H02K 29/03* (2013.01); *H02K 1/24* (2013.01); *H02K 2201/06* (2013.01)

(58) Field of Classification Search
CPC ....... H02K 3/28; H02K 29/03; H02K 2213/03
See application file for complete search history.

(56) References Cited

U.S. PATENT DOCUMENTS

| 9,923,426 B2 | 3/2018 | Ito |
| 2010/0244611 A1 | 9/2010 | Akutsu et al. |
| 2014/0361646 A1 | 12/2014 | Saito et al. |
| 2016/0285336 A1 | 9/2016 | Sakuma et al. |
| 2018/0358857 A1 | 12/2018 | Sakuma |

FOREIGN PATENT DOCUMENTS

| JP | 5948061 B2 | 6/2016 |
| JP | 2016140202 A | 8/2016 |
| JP | 2018074663 A | 5/2018 |
| WO | 2017/014062 A1 | 1/2017 |

OTHER PUBLICATIONS

Moriyasu Shoji, "Practical Electric Apparatus Study", (published by Morikita Co., Ltd., Jul. 25, 2000 (First edition, First printing), pp. 70-73.
Extended European Search Report issued by the European Patent Office dated Jan. 23, 2019 in corresponding European Patent Application No. 18199501.0 (10 pages).

*Primary Examiner* — Ramon M Barrera
(74) *Attorney, Agent, or Firm* — Buchanan Ingersoll & Rooney PC

(57) ABSTRACT

A rotary electric apparatus having a fractional slot configuration in which a number of slots per every pole and per every phase is not an integer includes: a stator which includes a stator core formed with a plurality of slots, and a stator winding having a plurality of coil sides accommodated in the plurality of slots and a plurality of coil ends connecting each of same side end portions of the plurality of coil sides; and a mover which is movably supported with respect to the stator, and includes a mover core and a plurality of mover magnetic poles installed in the mover core.

9 Claims, 42 Drawing Sheets

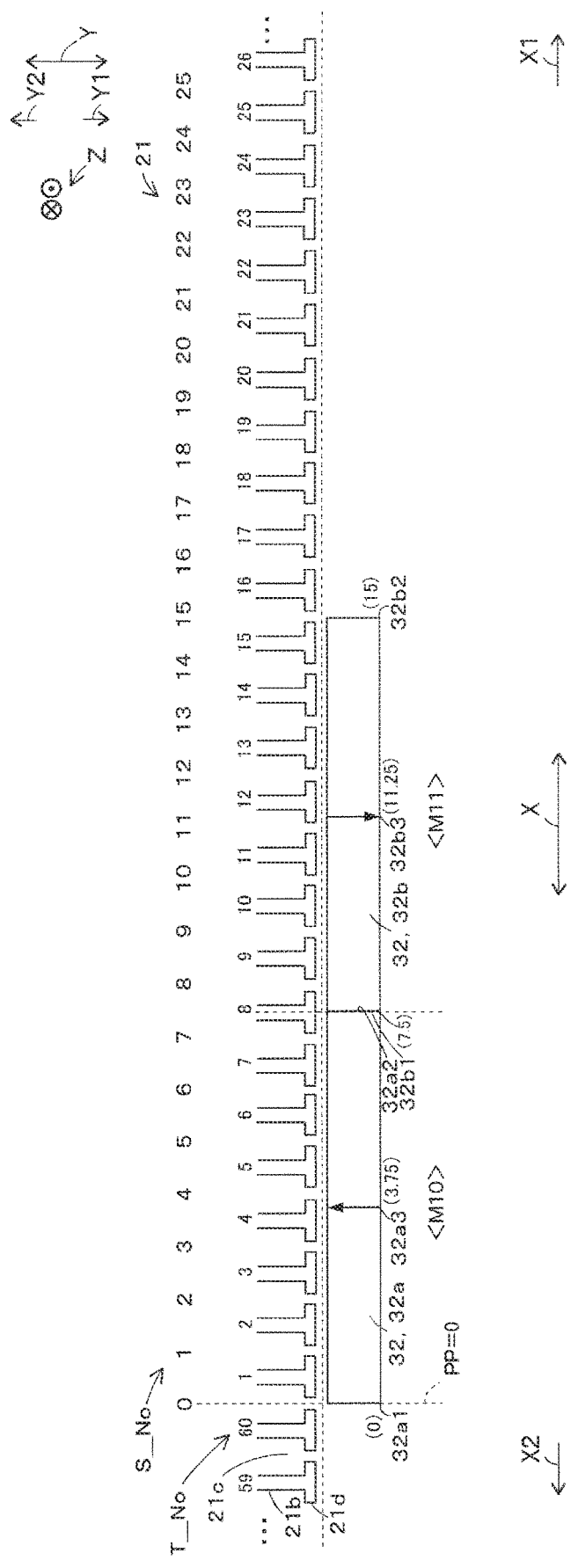

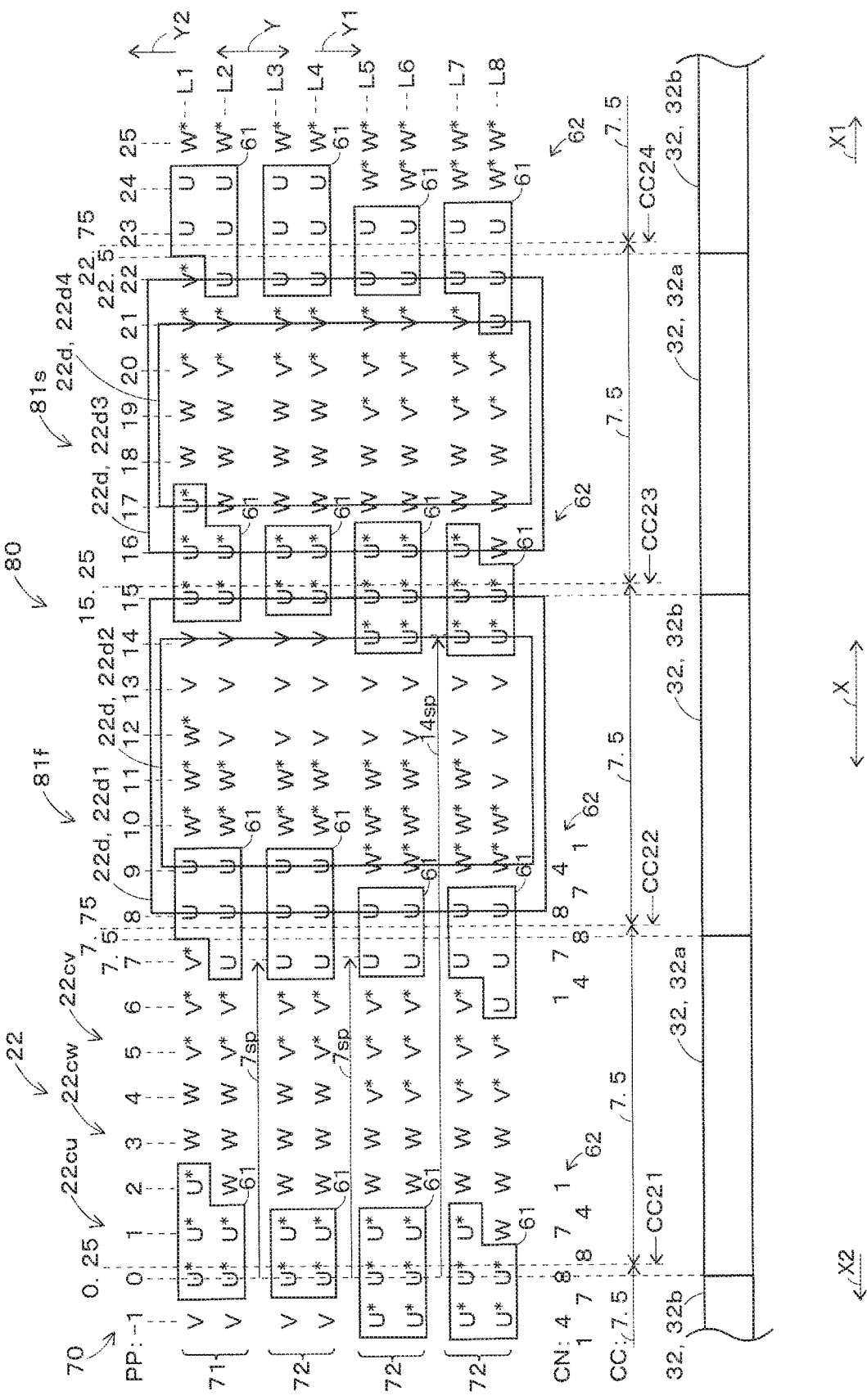

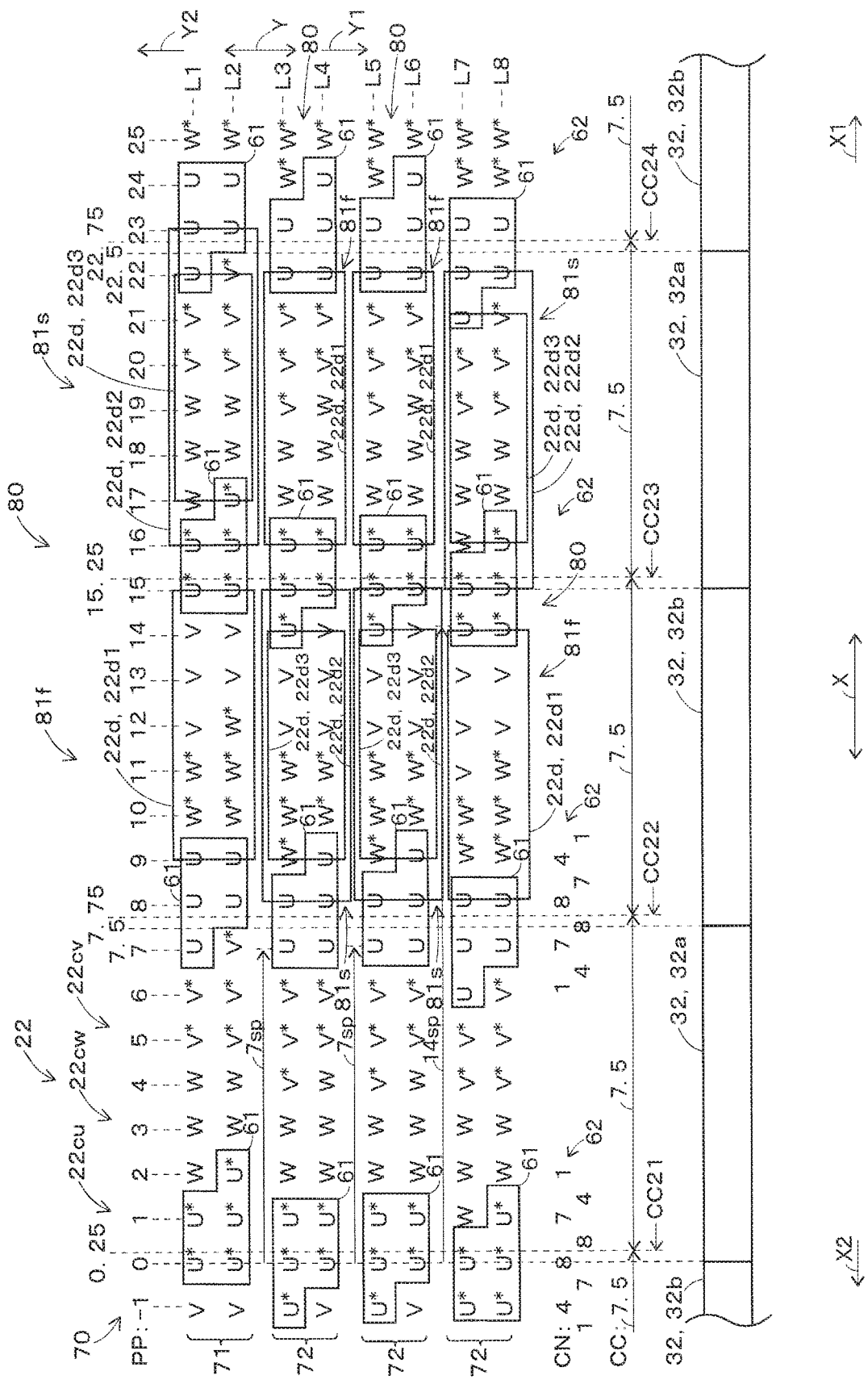

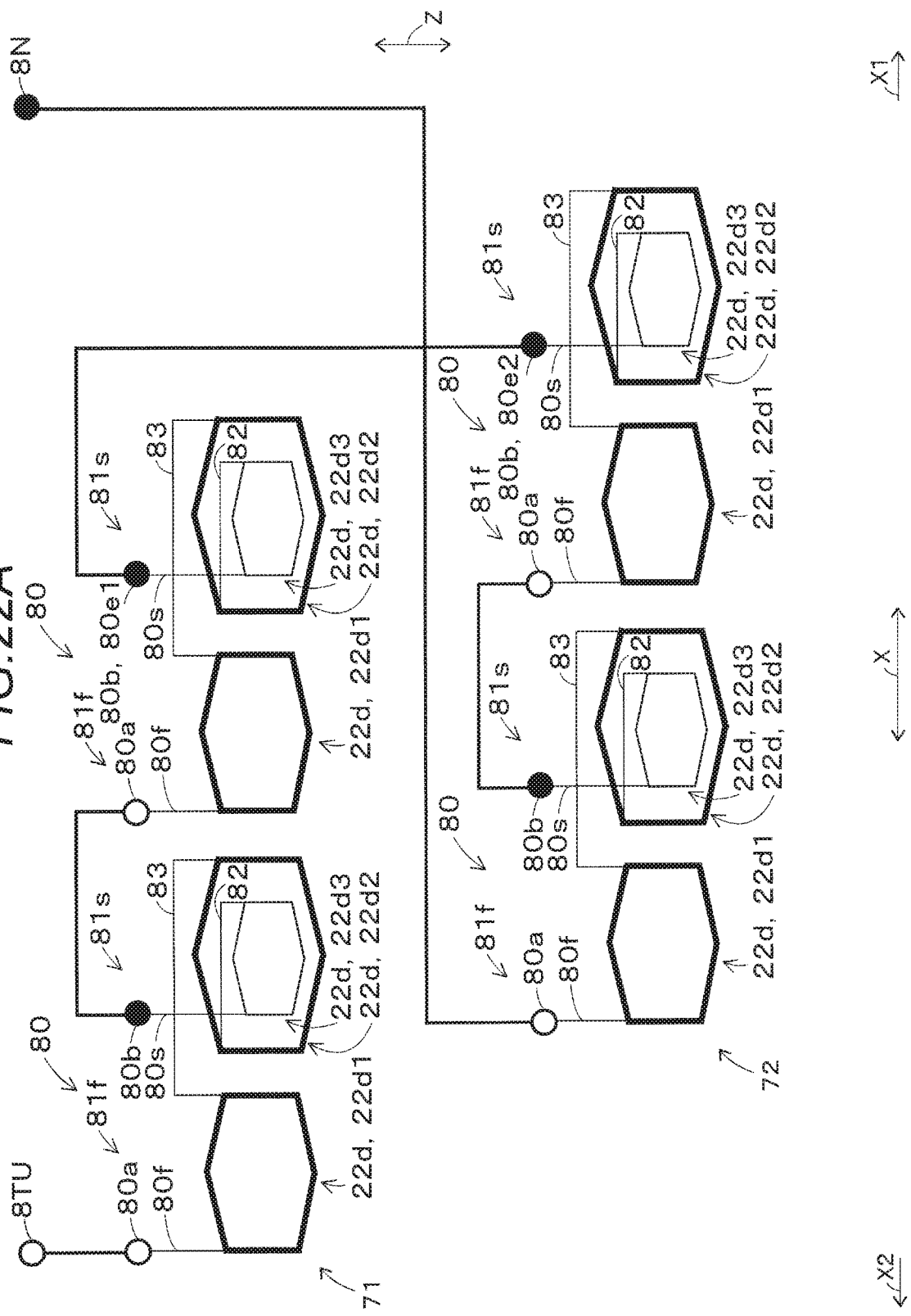

FIG. 24

| NUMBER Np OF POLES, NUMBER Ns OF SLOTS, AND NUMBER Nspp OF SLOTS PER EVERY POLE AND PER EVERY PHASE | | HIGH ORDER SIDE (BASIC MODE) | | INTERMEDIATE (INTERMEDIATE MODE) | | | | LOW ORDER SIDE (BASIC MODE) | |
|---|---|---|---|---|---|---|---|---|---|
| | NORMAL ROTATION | REVERSE ROTATION | | | | | | | |
| 2 POLES AND 21 SLOTS (8 POLES AND 84 SLOTS), 3.5 | NORMAL ROTATION | 88$^{th}$ (=4×22) | +0.5×2 ↑ 0.5×2 ↓ −0.5×2 | | | | | 16$^{th}$ (=4×4) | +0.5×2 ↑ 1.5×2 ↓ −0.5×2 |
| | REVERSE ROTATION | 80$^{th}$ (=4×20) | +0.5×2 ↑ 0.5×2 ↓ −0.5×2 h=0 | | | | | 8$^{th}$ (=4×2) | +0.5×2 ↑ 1.5×2 ↓ −0.5×2 |
| 2 POLES AND 15 SLOTS (8 POLES AND 60 SLOTS), 2.5 | NORMAL ROTATION | 64$^{th}$ (=4×16) | +0.5×2 ↑ 7.5×2 ↓ −0.5×2 | 64$^{th}$ (=4×16) | +0.5×2 ↑ 7.5×2 ↓ −0.5×2 h=1 | 40$^{th}$ (=4×10) | +0.5×2 ↑ 4.5×2 ↓ −0.5×2 | 16$^{th}$ (=4×4) −12(=−3×2×2) | +0.5×2 ↑ 1.5×2 ↓ −0.5×2 h=3 |
| | REVERSE ROTATION | 56$^{th}$ (=4×14) | +0.5×2 ↑ 0.5×2 ↓ −0.5×2 h=0 | 56$^{th}$ (=4×14) | | 32$^{nd}$ (=4×8) −6(=−3×1×2) | +0.5×2 ↑ 4.5×2 ↓ −0.5×2 h=1 | 8$^{th}$ (=4×2) | h=2 |
| 2 POLES AND NINE SLOTS (8 POLES AND 36 SLOTS), 1.5 | NORMAL ROTATION | 40$^{th}$ (=4×10) | +0.5×2 ↑ 4.5×2 ↓ −0.5×2 | | | | | 16$^{th}$ (=4×4) | +0.5×2 ↑ 1.5×2 ↓ −0.5×2 |
| | REVERSE ROTATION | 32$^{nd}$ (=4×8) | +0.5×2 ↑ 0.5×2 ↓ −0.5×2 h=0 | | | | | 8$^{th}$ (=4×2) | h=1 |
| 2 POLES AND 3 SLOTS (8 POLES AND 12 SLOTS), 0.5 | NORMAL ROTATION | 16$^{th}$ (=4×4) | +0.5×2 ↑ 1.5×2 ↓ −0.5×2 | | | | | 16$^{th}$ (=4×4) | +0.5×2 ↑ 1.5×2 ↓ −0.5×2 |
| | REVERSE ROTATION | 8$^{th}$ (=4×2) | h=0 | | | | | 8$^{th}$ (=4×2) | h=0 |

| REQUIREMENT FOR ESTABLISHING MOVEMENT OF ATTRACTIVE FORCE EQUIVALENT POINT | | REQUIREMENT OF LOCATION COORDINATE |
|---|---|---|
| BM1 | EXISTS ON TOOTH PORTION 21b | x0 : 0 ~ 0.5 |
| BM2 | EXISTS ON SLOT 21c | x0 + Nspp x 3 : INTEGER + ( 0.5 ~ 1 ) |
| CM1 | EXISTS ON SLOT 21c | x0 + Nspp / h1 : INTEGER + ( 0.5 ~ 1 ) |
| CMF1 | EXISTS ON TOOTH PORTION 21b | x0 + Nspp x 3 + Nspp / h1 : INTEGER + ( 0 ~ 0.5 ) |
| CMB1 | | x0 - ( Nspp x 3 - Nspp / h1 ) : INTEGER + ( 0 ~ 0.5 ) |

FIG.29B

| REQUIREMENT FOR ESTABLISHING MOVEMENT OF ATTRACTIVE FORCE EQUIVALENT POINT | | REQUIREMENT OF LOCATION COORDINATE |
|---|---|---|
| BM1 | EXISTS ON TOOTH PORTION 21b | x0 : 0~0.5 |
| BM2 | EXISTS ON SLOT 21c | x0+7.5 : 7.5~8 = 7+(0.5~1) |
| CM1 | EXISTS ON SLOT 21c | x0 + 2.5/h1 : INTEGER + (0.5~1) |
| CMF1 | EXISTS ON TOOTH PORTION 21b | x0 + 2.5/h1 +7.5 : INTEGER + (0~0.5)<br>x0 + 2.5/h1 : INTEGER + (0.5~1) |
| CMB1 | | x0+2.5/h1−7.5<br>= x0 + 2.5/h1 - 8 + 0.5 : INTEGER + (0~0.5)<br>x0 + 2.5/h1 : INTEGER + (0.5~1) |

FIG.30

| h1 | 3 | 2 | 4 | 5 | 1 |
|---|---|---|---|---|---|
| BASE POINT MOVEMENT AMOUNT 2.5/h1 | 0.833 | 1.25 | 0.625 | 0.5 | 2.5 |
| x0 (NORMAL ROTATION AND REVERSE ROTATION IN COMMON) | 0~0.167 (EXIST IN PARTIAL RANGE) | 0.25~0.5 (EXIST IN PARTIAL RANGE) | 0~0.375 (EXIST IN PARTIAL RANGE) | 0~0.5 (EXIST IN ENTIRE RANGE) | 0~0.5 (EXIST IN ENTIRE RANGE) |
| h1 IS ODD NUMBER | SUITABLE | UNSUITABLE | UNSUITABLE | SUITABLE | SUITABLE |
| WHETHER h1 EXISTS — ELECTRICAL CONDUCTION | ○ | × | × | ○ | ○ |
| WHETHER h1 EXISTS — NON-ELECTRICAL CONDUCTION | × | × | × | ○ | × |

FIG.32A

| h1 | 3 | 5 | 7 | 1 |
|---|---|---|---|---|
| BASE POINT MOVEMENT AMOUNT 3.5/h1 | 1.166 | 0.7 | 0.5 | 3.5 |
| x0 (NORMAL ROTATION AND REVERSE ROTATION IN COMMON) | 0.334~0.5 (EXIST IN PARTIAL RANGE) | 0~0.3 (EXIST IN PARTIAL RANGE) | 0~0.5 (EXIST IN ENTIRE RANGE) | 0~0.5 (EXIST IN ENTIRE RANGE) |
| h1 IS ODD NUMBER | SUITABLE | SUITABLE | SUITABLE | SUITABLE |
| WHETHER h1 EXISTS — ELECTRICAL CONDUCTION | ○ | ○ | ○ | ○ |
| WHETHER h1 EXISTS — NON-ELECTRICAL CONDUCTION | × | × | ○ | × |

| h1 | 2 | 4 | 6 |
|---|---|---|---|
| BASE POINT MOVEMENT AMOUNT 3.5/h1 | 1.75 | 0.875 | 0.583 |
| x0 (NORMAL ROTATION AND REVERSE ROTATION IN COMMON) | 0~0.25 (EXIST IN PARTIAL RANGE) | 0~0.125 (EXIST IN PARTIAL RANGE) | 0~0.417 (EXIST IN PARTIAL RANGE) |
| h1 IS ODD NUMBER | UNSUITABLE | UNSUITABLE | UNSUITABLE |
| WHETHER h1 EXISTS — ELECTRICAL CONDUCTION | × | × | × |
| WHETHER h1 EXISTS — NON-ELECTRICAL CONDUCTION | × | × | × |

FIG.34

| h1 | 3 | 2 | 1 |
|---|---|---|---|
| BASE POINT MOVEMENT AMOUNT 1.5/h1 | 0.5 | 0.75 | 1.5 |
| x0 (NORMAL ROTATION AND REVERSE ROTATION IN COMMON) | 0~0.5 (EXIST IN ENTIRE RANGE) | 0~0.25 (EXIST IN PARTIAL RANGE) | 0~0.5 (EXIST IN ENTIRE RANGE) |
| h1 IS ODD NUMBER | SUITABLE | UNSUITABLE | SUITABLE |
| WHETHER h1 EXISTS — ELECTRICAL CONDUCTION | ○ | × | ○ |
| WHETHER h1 EXISTS — NON-ELECTRICAL CONDUCTION | ○ | × | × |

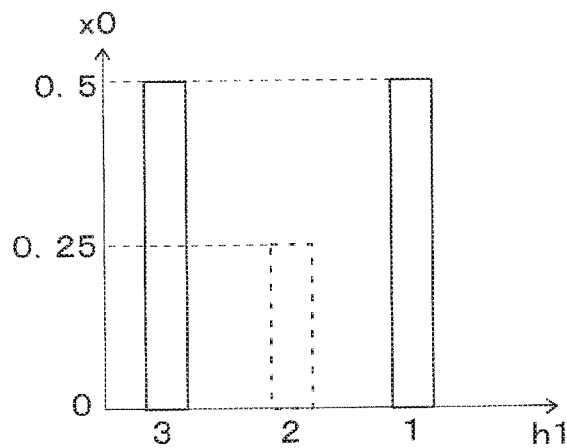

| h1 | 1 |
|---|---|
| BASE POINT MOVEMENT AMOUNT 0.5/h1 | 0.5 |
| x0 (NORMAL ROTATION AND REVERSE ROTATION IN COMMON) | 0~0.5 (EXIST IN ENTIRE RANGE) |
| h1 IS ODD NUMBER | SUITABLE |
| WHETHER h1 EXISTS — ELECTRICAL CONDUCTION | ○ |
| WHETHER h1 EXISTS — NON-ELECTRICAL CONDUCTION | ○ |

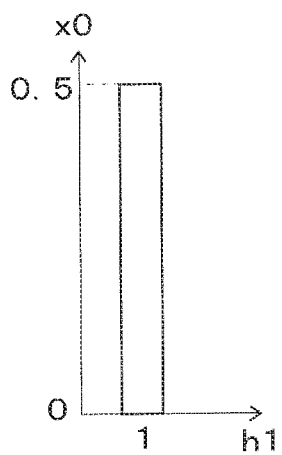

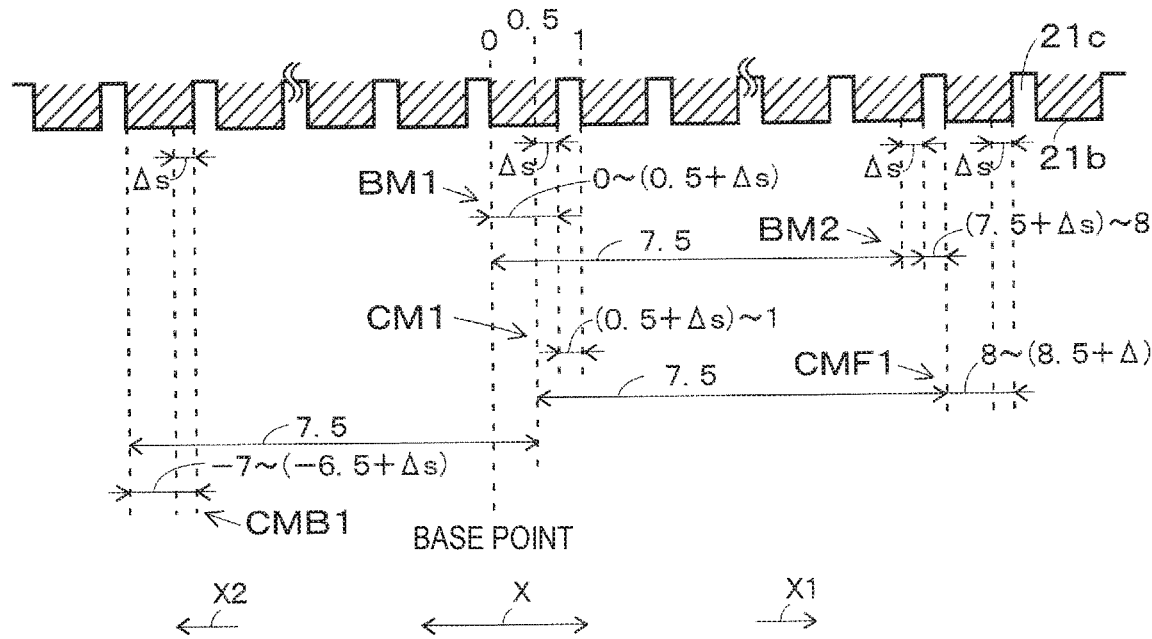

FIG.39A

| REQUIREMENT FOR ESTABLISHING MOVEMENT OF ATTRACTIVE FORCE EQUIVALENT POINT | | REQUIREMENT OF LOCATION COORDINATE |
|---|---|---|
| BM1 | EXISTS ON TOOTH PORTION 21b | $x0 : 0 \sim 0.5 + \Delta s$ <br> < RANGE IS EXPANDED > |
| BM2 | EXISTS ON SLOT 21c | $x0 + Nspp \times 3 :$ INTEGER $+ (0.5 + \Delta s \sim 1)$ <br> < RANGE IS REDUCED > |
| CM1 | EXISTS ON SLOT 21c | $x0 + Nspp / h1 :$ INTEGER $+ (0.5 + \Delta s \sim 1)$ <br> < RANGE IS REDUCED > |
| CMF1 | EXISTS ON TOOTH PORTION 21b | $x0 + Nspp \times 3 + Nspp / h1 :$ <br> INTEGER $+ (0 \sim 0.5 + \Delta s)$ <br> < RANGE IS EXPANDED > |
| CMB1 | | $x0 - (Nspp \times 3 - Nspp / h1) :$ <br> INTEGER $+ (0 \sim 0.5 + \Delta s)$ <br> < RANGE IS EXPANDED > |

FIG.39B

| REQUIREMENT FOR ESTABLISHING MOVEMENT OF ATTRACTIVE FORCE EQUIVALENT POINT | | REQUIREMENT OF LOCATION COORDINATE |
|---|---|---|
| BM1 | EXISTS ON TOOTH PORTION 21b | $x0 : 0 \sim 0.5 + \Delta s$ <br> < RANGE IS EXPANDED > |
| BM2 | EXISTS ON SLOT 21c | $x0 + 7.5 : 7.5 + \Delta s \sim 8 = 7 + (0.5 + \Delta s \sim 1)$ <br> $x0 : \Delta s \sim 0.5$ <br> < RANGE IS REDUCED > |
| CM1 | EXISTS ON SLOT 21c | $x0 + 2.5/h1 : \text{INTEGER} + (0.5 + \Delta s \sim 1)$ <br> < RANGE IS REDUCED > |
| CMF1 | EXISTS ON TOOTH PORTION 21b | $x0 + 2.5/h1 + 7.5 : \text{INTEGER} + (0 \sim 0.5 + \Delta s)$ <br> < RANGE IS EXPANDED > |
| CMB1 | | $x0 + 2.5/h1 - 7.5 (= -8 + 0.5) :$ <br> $\text{INTEGER} + (0 \sim 0.5 + \Delta s)$ <br> < RANGE IS EXPANDED > |

FIG.40

| h1 | 3 | 2 | 4 | 5 | 1 |
|---|---|---|---|---|---|
| BASE POINT MOVEMENT AMOUNT 2.5/h1 | 0.833 | 1.25 | 0.625 | 0.5 | 2.5 |
| ×0 (NORMAL ROTATION AND REVERSE ROTATION IN COMMON) | Δs~0.167 (EXIST IN PARTIAL RANGE) | 0.25+Δs ~0.5 (EXIST IN PARTIAL RANGE) | Δs~0.375 (EXIST IN PARTIAL RANGE) | Δs~0.5 (EXIST IN PARTIAL RANGE) | Δs~0.5 (EXIST IN PARTIAL RANGE) |
| h1 IS ODD NUMBER | SUITABLE | UNSUITABLE | UNSUITABLE | SUITABLE | SUITABLE |
| WHETHER h1 EXISTS — ELECTRICAL CONDUCTION | ○ | × | × | ○ | ○ |
| WHETHER h1 EXISTS — NON-ELECTRICAL CONDUCTION | × | × | × | ○ | × |

FIG.43

| h1 | 3 | 2 | 4 | 5 | 1 |
|---|---|---|---|---|---|
| BASE POINT MOVEMENT AMOUNT 2.5/h1 | 0.833 | 1.25 | 0.625 | 0.5 | 2.5 |
| ×0 (NORMAL ROTATION AND REVERSE ROTATION IN COMMON) | 0~0.167+Δs (EXIST IN PARTIAL RANGE) | 0.25~0.5+Δs (EXIST IN PARTIAL RANGE) | 0~0.375+Δs (EXIST IN PARTIAL RANGE) | 0~0.5+Δs (EXIST IN PARTIAL RANGE) | 0~0.5+Δs (EXIST IN PARTIAL RANGE) |
| h1 IS ODD NUMBER | SUITABLE | UNSUITABLE | UNSUITABLE | SUITABLE | SUITABLE |
| WHETHER h1 EXISTS — ELECTRICAL CONDUCTION | ○ | × | × | ○ | ○ |
| WHETHER h1 EXISTS — NON-ELECTRICAL CONDUCTION | × | × | × | ○ | × |

ROTARY ELECTRIC APPARATUS

CROSS REFERENCE TO RELATED APPLICATIONS

This application is based on and claims priority under 35 U.S.C. § 119 to Japanese Patent Application 2017-199879, filed on Oct. 13, 2017, the entire contents of which are incorporated herein by reference.

TECHNICAL FIELD

The present specification discloses a technology relating to a rotary electric apparatus having a fractional slot configuration.

BACKGROUND DISCUSSION

A rotary electric apparatus described in JP 5948061 B (Reference 1) is a rotary electric apparatus having an integral slot configuration in which the number of slots per every pole and per every phase is an integer. Further, the rotary electric apparatus described in Reference 1 includes a stator winding having a plurality of slot conductor groups, each of which is constituted by a plurality of slot conductors in the same phase. Further, the plurality of slot conductors of the slot conductor group are inserted into and pass through a predetermined number Ns of slots arranged continuously in a circumferential direction of a stator core so that the slots and the layers are adjacent to each other. Further, the predetermined number Ns is set to Ns=NSPP+NL when the number of slots per every pole and per every phase is NSPP and the number of layers is 2×NL. Accordingly, the invention described in Reference 1 tries to reduce noise of the rotary electric apparatus.

A three-phase alternating-current motor described in JP 2016-140202 A (Reference 2) is a three-phase alternating-current motor having a fractional slot configuration in which the number of slots per every pole and per every phase is not an integer. Further, in the three-phase alternating-current motor described in Reference 2, windings overlap and are disposed in three layers per slot. Further, the winding of the first layer is disposed so that the disposition of each winding of three phases of U phase, V phase, and W phase has rotational symmetry of ±120 degrees in terms of a mechanical angle. The winding of the second layer is disposed to be misaligned by L slots with respect to the disposition of the winding of the first layer. The winding of the third layer is disposed to be misaligned by L slots with respect to the disposition of the winding of the first layer in a reverse direction of the direction of the misalignment of the winding of the second layer. Accordingly, the invention described in Reference 2 aims to reduce torque ripple of the three-phase alternating-current motor.

"Practical Electric Apparatus Study", Moriyasu Shoji (published by Morikita Co., Ltd., Jul. 25, 2000 (First edition, First printing), p. 72) (Non-Patent Reference 1) describes that an armature winding is normally made to be an oblique slot by one slot pitch when it is necessary to remove a slot harmonic voltage, and the same effect is achieved even in the case where the armature winding is made to be an oblique slot by 1/c of the slot pitch in the case of a fractional slot configuration in which the number of slots per every pole and per every phase is not an integer. Herein, c refers to a denominator portion when the number of slots per every pole and per every phase is expressed as a mixed fraction and a proper fraction portion of the mixed fraction is expressed by an irreducible fraction.

However, the invention described in Reference 1 may not be applied to a rotary electric apparatus having a fractional slot configuration in which the number of slots per every pole and per every phase is not an integer. Specifically, in the rotary electric apparatus having the fractional slot configuration, the predetermined number Ns is not an integer, so that it is impossible to regulate the disposition of the plurality of slot conductors.

The invention described in Reference 2 tries to reduce torque ripple and it is difficult to reduce noise and vibration of the three-phase alternating-current motor. Specifically, in the three-phase alternating-current motor described in Reference 2, a magnitude of magnetomotive force generated by the windings in which the directions of the currents in the same phase accommodated in two slots adjacent to each other in a rotation direction of a rotor are the same changes at a ratio of 4:3:3:4 in the direction of the rotation of the rotor, and this is repeated. Because of this, even when the winding of the third layer is misaligned by a predetermined slot in the direction of the rotation of the rotor, the magnetomotive force generated when the winding is electrically conducted becomes uneven at every pole of the magnetic poles of the rotor. As a result, vibromotive force of a lower-order spatial deformation mode is more likely to be generated as compared to the number of magnetic poles of the rotor. The stator has a unique number of vibrations corresponding to the spatial deformation mode, and as the spatial deformation mode has a lower order, the three-phase alternating-current motor has a resonance point of noise and vibration in which the unique number of vibrations corresponding to the spatial deformation mode of the stator coincides with the frequency of the vibromotive force of the spatial deformation mode of the corresponding low order in the lower number of rotation, so that countermeasures are necessary.

As described in Non-Patent Reference 1, in the rotary electric apparatus having the fractional slot configuration, torque ripple (including cogging torque) may be reduced by a skew amount of 1/c of the slot pitch, but it is difficult to reduce noise and vibration of the rotary electric apparatus. Specifically, in the rotary electric apparatus having the fractional slot configuration, equivalence of each pole collapses in the electromagnetic attractive force distribution generated between the stator and a mover, so that vibromotive force of a spatial deformation mode of an order obtained by dividing the number of magnetic poles of the mover by c is generated. That is, in the rotary electric apparatus having the fractional slot configuration, vibromotive force of the spatial deformation mode of a lower order is more likely to be generated as compared to the rotary electric apparatus having the integer slot configuration (c=1) in the case where the number of magnetic poles of the mover is the same. As described above, the stator has the unique number of vibrations corresponding to the spatial deformation mode. As the spatial deformation mode has the lower order, the rotary electric apparatus has a resonance point of noise and vibration in which the unique number of vibrations corresponding to the spatial deformation mode of the stator coincides with the frequency of the vibromotive force of the spatial deformation mode of the corresponding low order in the lower number of rotation, so that countermeasures are necessary.

Thus, a need exists for a rotary electric apparatus which is not susceptible to the drawback mentioned above.

SUMMARY

This disclosure discloses a rotary electric apparatus having a fractional slot configuration in which the number of slots per every pole and per every phase is not an integer, the rotary electric apparatus including: a stator including a stator core formed with a plurality of slots, and a stator winding having a plurality of coil sides accommodated in the plurality of slots and a plurality of coil ends connecting the same side end portions of the plurality of coil sides; and a mover, which is movably supported with respect to the stator, and includes a mover core and a plurality of mover magnetic poles installed in the mover core. It is assumed that a movement direction of the mover with respect to the stator is a first direction, a facing direction of the stator and the mover is a second direction, and a direction orthogonal to any one of the first direction and the second direction is a third direction. In this case, at least one of the stator and the mover has a reference region serving as a reference of skew and a skew region, which is misaligned in the first direction with respect to the reference region and is arranged in the third direction. In the skew region, a maximum value of a skew amount for the reference region is set so that a maximum value of a relative skew amount between the stator and the mover is one slot pitch of the plurality of slots. A set of the plurality of coil sides having the same in-phase current direction accommodated in the plurality of slots continuously adjacent in the first direction is set to a one phase band. In this case, the stator winding includes a plurality of basic coils in which a magnitude of magnetomotive force generated by the plurality of coil sides that configure the one phase band is equal at every pole of the plurality of mover magnetic poles. The plurality of basic coils include a first basic coil serving as a reference for a disposition of the one phase band at every pole in the first direction, and at least one second basic coil in which a disposition of the one phase band at every pole in the first direction is different with respect to the first basic coil. The one phase band newly formed by mixing the plurality of coil sides that configure the one phase band of the one first basic coil and the plurality of coil sides that configure the single one phase band of each of at least one second basic coil is set to a mixed one phase band. In the stator winding, the plurality of basic coils are mixed so that the magnitude of magnetomotive force generated by the plurality of coil sides that configure the mixed one phase band is equal at every pole of the plurality of mover magnetic poles.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a schematic diagram illustrating an example of a magnetic pole facing state between a plurality of tooth portions 21b and a pair of mover magnetic poles 32a and 32b according to a reference embodiment;

FIG. 16C is a schematic diagram illustrating an example of a phase disposition of the stator winding 22 in which the coil sides 22a having the same phase accommodated in the same slot 21c are concentrated within the corresponding slot 21c in FIG. 16B;

FIG. 16D is a schematic diagram illustrating a layout of a pole pair coil 80 in FIG. 16B according to a modified embodiment;

FIG. 22A is a connection diagram illustrating an example of a connection of each pole pair coil 80 of a U phase coil 22cu according to the fifth modified embodiment;

FIG. 24 is a diagram illustrating an example of a main rotation order of noise and vibration obtained from an analysis result;

FIG. 29B is a diagram illustrating an example of requirements for establishing a movement of an attractive force equivalent point of the magnetic pole center when the number Nspp of slots per every pole and per every phase is 2.5;

FIG. 30 is a diagram illustrating an existence range of a base point location coordinate x0 and whether an integer h1 exists when the number Nspp of slots per every pole and per every phase is 2.5;

FIG. 32A is a diagram illustrating an existence range of a base point location coordinate x0 and whether an integer h1 exists when the number Nspp of slots per every pole and per every phase is 3.5;

FIG. 34 is a diagram illustrating an existence range of a base point location coordinate x0 and whether an integer h1 exists when the number Nspp of slots per every pole and per every phase is 1.5;

FIG. 35 is a diagram illustrating an existence range of a base point location coordinate x0 when the number Nspp of slots per every pole and per every phase is 1.5;

FIG. 36 is a diagram illustrating an existence range of a base point location coordinate x0 and whether an integer h1 exists when the number Nspp of slots per every pole and per every phase is 0.5;

FIG. 37 is a diagram illustrating an existence range of a base point location coordinate x0 when the number Nspp of slots per every pole and per every phase is 0.5;

FIG. 38 is a diagram illustrating an example of an existence range of a magnetic pole center when a tooth width is larger than a slot width;

FIG. 39A is a diagram illustrating an example of requirements for establishing a movement of an attractive force equivalent point of a magnetic pole center when a tooth width is larger than a slot width;

FIG. 39B is a diagram illustrating an example of requirements for establishing a movement of an attractive force equivalent point of the magnetic pole center when a tooth width is larger than a slot width and the number Nspp of slots per every pole and per every phase is 2.5;

FIG. 40 is a diagram illustrating an existence range of a base point location coordinate x0 and whether an integer h1 exists when a tooth width is larger than a slot width and the number Nspp of slots per every pole and per every phase is 2.5;

FIG. 43 is a diagram illustrating an existence range of a base point location coordinate x0 and whether an integer h1 exists when a tooth width is smaller than a slot width and the number Nspp of slots per every pole and per every phase is 2.5.

DETAILED DESCRIPTION

Figure 1:
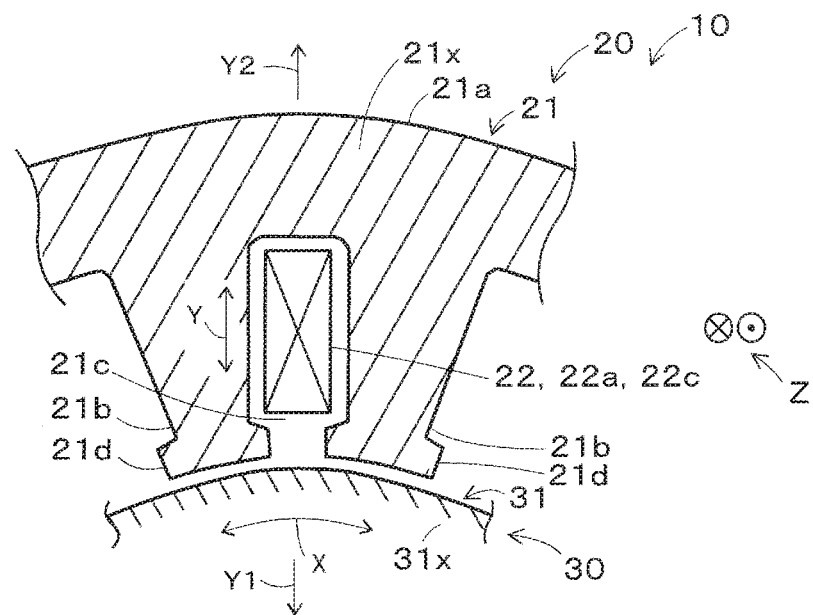
FIG. 1 is a cross-sectional view of a portion of an end surface of a rotary electric apparatus 10 cut in a plane that is vertical to a third direction (a direction of arrow Z) according to an embodiment.

In this specification, embodiments and modified embodiments are described based on the drawings. Further, in the drawings, common reference numerals are given to common portions in each embodiment, and redundant explanations are omitted in this specification. Further, what is described in one embodiment may also be appropriately applied to other embodiments. Further, the drawings are conceptual diagrams, and do not limit a dimension of a detailed structure.

<Schematic Configuration of Rotary Electric Apparatus 10>

As illustrated in FIG. 1, the rotary electric apparatus 10 of this embodiment includes a stator 20 as an armature and a mover (e.g. rotor) 30 as a magnetic field system. The stator 20 includes a stator core 21 and a stator winding 22. A plurality of slots 21c (60 slots in this embodiment) is formed in the stator core 21, and the stator winding 22 is wound around the plurality of (60) slots 21c. Further, in this embodiment, the stator winding 22 includes a plurality of phase coils 22c (three coils in this embodiment) having different phases. That is, the rotary electric apparatus 10 in this embodiment is the three-phase apparatus.

The mover 30 is movably supported with respect to the stator 20, and includes a mover core (e.g. rotor core) 31 and a plurality of mover magnetic poles (e.g. rotor magnetic core) 32 (eight poles in this embodiment) provided in the mover core 31 (four sets of the pair of mover magnetic poles (e.g. rotor magnetic poles) 32a and 32b). As described above, the rotary electric apparatus 10 in this embodiment is the rotary electric apparatus having a configuration of eight (8) poles and 60 slots (the rotary electric apparatus having a basic configuration in which the number of magnetic poles of the mover 30 is two (2) and the number of slots of the stator 20 is 15), and the number Nspp of slots per every pole and per every phase is 2.5. That is, the rotary electric apparatus 10 in this embodiment is the rotary electric apparatus having a fractional slot configuration in which the number Nspp of slots per every pole and per every phase is not an integer.

Here, it is assumed that an integer portion when the number Nspp of slots per every pole and per every phase is represented by a mixed fraction is an integer portion a. Further, it is assumed that when a proper fraction portion of the mixed fraction is represented by an irreducible fraction, a numerator portion is a numerator portion b, and a denominator portion is a denominator portion c. Further, it is assumed that the integer portion a is zero (0) or a positive integer, and both the numerator portion b and the denominator portion c are positive integers. Further, in the rotary electric apparatus 10 of the three phases, it is assumed that the denominator portion c is an integer which is two or more and is not a multiple of 3. In this embodiment, the number Nspp of slots per every pole and per every phase is 2.5, the integer portion a is 2, the numerator portion b is 1, and the denominator portion c is 2. Further, in this specification, the rotary electric apparatus 10 is indicated as the b/c series rotary electric apparatus 10 using the numerator portion b and the denominator portion c of the number Nspp of slots per every pole and per every phase. That is, the rotary electric apparatus 10 of this embodiment is the ½ series rotary electric apparatus 10.

A direction of a movement of the mover 30 with respect to the stator 20 is defined as a first direction (a direction of arrow X). Further, a facing direction of the stator 20 and the mover 30 is defined as a second direction (a direction of arrow Y). Further, a direction from the stator 20 side to the mover 30 side in the second direction (the direction of arrow Y) is defined as a second directional mover side (a direction of arrow Y1). Further, a direction from the mover 30 side to the stator 20 side in the second direction (the direction of arrow Y) is defined as a second directional stator side (a direction of arrow Y2). Further, a direction orthogonal to any one of the first direction (the direction of arrow X) and the second direction (the direction of arrow Y) is defined as a third direction (a direction of arrow Z).

As illustrated in FIG. 1, the rotary electric apparatus 10 of this embodiment is a cylindrical rotary electric apparatus of a radial gap type in which the stator 20 and the mover 30 are coaxially disposed. Accordingly, the first direction (the direction of arrow X) corresponds to a direction of a circumference of the rotary electric apparatus 10 and corresponds to a rotation direction of the mover 30 with respect to the stator 20. Further, the second direction (the direction of arrow Y) corresponds to a direction of a diameter of the rotary electric apparatus 10, and corresponds to a direction of a depth of the slot 21c. Further, the third direction (the direction of arrow Z) corresponds to an axial direction of the rotary electric apparatus 10.

In the stator core 21, for example, a plurality of electromagnetic steel plates 21x are stacked in the third direction (the direction of arrow Z). For example, a silicon steel plate may be used as the plurality of electromagnetic steel plates 21x, and each of the plurality of electromagnetic steel plates 21x is formed in a thin plate shape. The stator core 21 includes a yoke portion 21a and a plurality of (60 in this embodiment) tooth portions 21b integrally formed with the yoke portion 21a.

The yoke portion 21a is formed along the first direction (the direction of arrow X). The plurality (60) of tooth portions 21b protrudes from the yoke portion 21a in the second direction (the direction of arrow Y) (the second directional mover side (the direction of arrow Y1) in this embodiment). Further, the slot 21c is formed by the tooth portions 21b and 21b adjacent to each other in the first direction (the direction of arrow X), and the stator winding 22 is inserted through the plurality (60) of the slots 21c. Further, each of the plurality (60) of tooth portions 21b is provided with a tooth tip portion 21d. The tooth tip portion 21d refers to a tip portion of the second directional mover side (the direction of arrow Y1) of the tooth portion 21b, and is widely formed in the first direction (the direction of arrow X).

In the stator winding 22, for example, a surface of a conductor such as copper is covered with an insulating layer such as enamel. A shape of a cross section of the stator winding 22 is not particularly limited, and may be a predetermined cross-sectional shape. For example, the winding having various cross-sectional shapes, such as a round line having a circular cross-sectional shape and a quadrangle line having a polygonal cross-sectional shape may be used. Further, a parallel fine wire in which a plurality of thinner wound wires are combined may also be used. When the parallel fine wire is used, the eddy current loss generated in the stator winding 22 may be reduced as compared with the case of a single wire, so that efficiency of the rotary electric apparatus 10 is improved. Further, it is possible to decrease force required for forming the winding, so that formability is improved to easily manufacture the rotary electric apparatus 10.

The stator winding 22 may be wound around the stator 20 having the fractional slot configuration, and the winding method of the stator winding 22 is not limited. The stator winding 22 may be wound by, for example, double layer winding, concentric winding, and wave winding. In any case, the stator winding 22 has a plurality of coil sides 22a and a plurality of coil ends 22b. The plurality of coil sides 22a refer to a portion accommodated in the plurality of slots 21c. The plurality of coil ends 22b refer to portions connecting the same side end portions of the plurality of coil sides 22a, respectively.

Figure 2A:
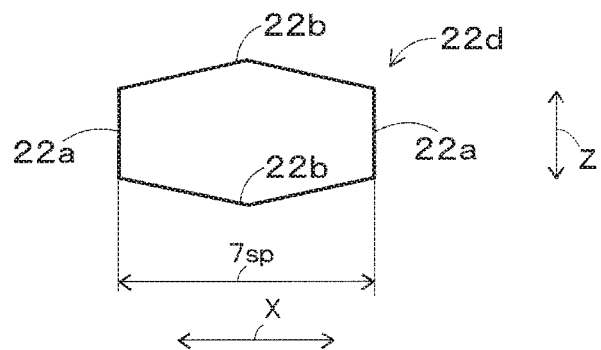
FIG. 2A is a schematic diagram illustrating a configuration example of a unit coil 22d included in a stator winding 22.

Each of the plurality of (three) phase coils 22c of the stator winding 22 includes a plurality of unit coils 22d. As illustrated in FIG. 2A, in the case of the double layer winding, each of the plurality of unit coils 22d has a pair of coil sides 22a and 22a, and a pair of coil ends 22b and 22b. In the case of the double layer winding, winding directions and winding pitches of the plurality of unit coils 22d are all the same, and for example, the winding pitch may be set to seven slot pitch (7 sp). The seven slot pitch (7 sp) is the nearest integer smaller than the number of slots per every pole (7.5 in this embodiment). In the case of the concentric winding, the plurality of unit coils 22d include a plurality of kinds of unit coils 22d having different winding pitches. The stator winding 22 of this embodiment is concentrically wound as described below.

Figure 2B:
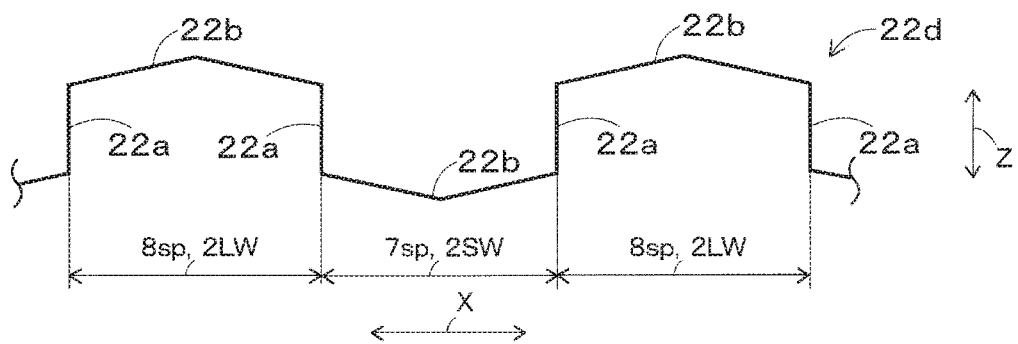
FIG. 2B is a schematic diagram illustrating another configuration example of the unit coil 22d included in the stator winding 22.

As illustrated in FIG. 2B, in the case of the wave winding, each of the plurality of unit coils 22d has a plurality of coil sides 22a and a plurality of coil ends 22b. The plurality of coil ends 22b are alternately connected so that end portions of one end sides of the plurality of coil sides 22a in the third direction (the direction of arrow Z) and end portions of the other end sides of the plurality of coil sides 22a in the third direction (the direction of arrow Z) have the wave winding configurations.

In the case of the wave winding, the winding pitch of each of the plurality of unit coils 22d is alternately repeated, for example, seven slot pitch (7 sp) and eight slot pitch (8 sp). The seven slot pitch (7 sp) is the nearest integer smaller than the number of slots per every pole (7.5 in this embodiment), and a short winding portion 2SW is formed. The eight slot pitch (8 sp) is the nearest integer larger than the number of slots per every pole (7.5 in this embodiment), and a long winding portion 2LW is formed. That is, in the case of the wave winding, in each of the plurality of unit coils 22d, the short winding portion 2SW and the long winding portion 2LW are alternately repeated in the first direction (the direction of arrow X). The stator winding 22 may form a basic coil 70 (to be described below) in any case of the double layer winding, the concentric winding, and the wave winding.

As described above, the stator winding 22 of this embodiment is wound in distributed winding. In the distributed winding, the winding pitch of the stator winding 22 is set to be larger than one slot pitch, and is wound with approximately one magnetic pole width of the plurality of (eight poles) mover magnetic poles 32. In the distributed winding, the integer portion a of the number Nspp of slots per every pole and per every phase is a positive integer equal to or larger than 1 (2 in this embodiment). Further, in this embodiment, the three-phase stator winding 22 is electrically connected by a Y connection. The three-phase stator winding 22 may also be electrically connected by a Δ connection. Further, a constant of the stator winding 22 is not limited.

The mover core 31 is formed, for example, by laminating the plurality of electromagnetic steel plates 31x in the third direction (the direction of arrow Z). For example, a silicon steel plate may be used as the plurality of electromagnetic steel plates 31x, and each of the electromagnetic steel plates 31X is formed in a thin plate shape. The rotary electric apparatus 10 of this embodiment is the cylindrical rotary electric apparatus, and the mover core 31 is formed in a cylindrical shape. Further, a plurality of magnet accommodating portions (not illustrated) is provided in the mover core 31 in the first direction (the direction of arrow X).

Permanent magnets of the predetermined number of (eight poles in this embodiment) magnetic poles (which are the mover magnetic poles 32 and four sets of the pair of mover magnetic poles 32*a* and 32*b*) are buried in the plurality of magnet accommodating portions, and the mover 30 is movable (rotatable) by the permanent magnet and the rotating magnetic field generated in the stator 20 in accordance with electrical conduction. In this specification, the mover magnetic pole 32 having polarity of one of the pair of mover magnetic poles 32*a* and 32*b* (e.g., N pole) is indicated by a mover magnetic pole 32*a*. The mover magnetic pole 32 having polarity of the other of the pair of mover magnetic poles 32*a* and 32*b* (e.g., S pole) is indicated by a mover magnetic pole 32*b*.

As for the permanent magnet, for example, a publicly known ferritic magnet or rare earth-based magnet may be used. Further, a manufacturing method of the permanent magnet is not limited. As for the permanent magnet, for example, a resin bond magnet or a sintered magnet may be used. The resin bond magnet may be formed by, for example, mixing ferritic raw material magnet powder, resin, and the like and inserting the mixture to the mover core 31 by injection molding and the like. The sintered magnet may be formed, for example, by press-molding rare earth-based raw material magnet powder in a magnetic field and hardening the molded magnet powder at a high temperature. Further, the mover 30 may also be formed in a form of a surface magnet. In the mover 30 in the form of the surface magnet, a permanent magnet is installed on a surface (an external surface) of the mover core 31 facing each tooth tip end portion 21*d* of the stator core 21.

In this embodiment, the mover 30 is installed at an inner side of the stator 20 (the axis center side of the rotary electric apparatus 10) and is supported so as to be movable (rotatable) with respect to the stator 20. Specifically, a shaft (not illustrated) is installed in the mover core 31, and the shaft passes through the axis center of the mover core 31 in the third direction (the direction of arrow Z). Both end portions of the shaft in the third direction (the direction of arrow Z) are supported so as to be rotatable by a bearing member (not illustrated). Accordingly, the mover 30 is movable (rotatable) with respect to the stator 20.

<Noise and Vibration of the Rotary Electric Apparatus 10 Caused by Magnetic Configuration of the Stator 20 and the Mover 30>

FIG. 3 illustrates an example of a magnetic pole facing state between the plurality of tooth portions 21*b* and the pair of mover magnetic poles 32*a* and 32*b* according to a reference embodiment. In FIG. 3, the annular stator core 21 is illustrated as being straightly developed, and the stator core 21 as viewed in the third direction (the direction of arrow Z) is illustrated. Further, in FIG. 3, the yoke portion 21*a* and the stator winding 22 are not illustrated, and each tooth portion 21*b* is provided with an identification number of the stator magnetic pole formed in the stator core 21 (hereinafter, referred to as the "stator magnetic pole number T_No"). In this specification, for convenience of the description, a center position of the slot 21*c* between the stator magnetic pole number T_No of 60 and the stator magnetic pole number T_No of 1 (a slot number S_No is 0) is set to a position reference of the pair of mover magnetic poles 32*a* and 32*b* (the location coordinate PP is 0).

In FIG. 3, one pair of mover magnetic poles 32*a* and 32*b* disposed in a circular arc shape is illustrated as being straightly developed, and one pair of mover magnetic poles 32*a* and 32*b* as viewed in the third direction (the direction of arrow Z) is illustrated. In FIG. 3, one set of one pair of mover magnetic poles 32*a* and 32*b* is illustrated, and another three sets of the pair of mover magnetic poles 32*a* and 32*b* are not illustrated. Further, arrows within the pair of mover magnetic poles 32*a* and 32*b* indicate difference between polarities (N pole and S pole) of the pair of mover magnetic poles 32*a* and 32*b* as described above. The method illustrated in FIG. 3 is applicable to FIG. 6A (to be described below) in the same manner. However, in FIG. 6A, center positions of the magnetic poles of the pair of mover magnetic poles 32*a* and 32*b* and the position of each of both end portions are indicated only by numerical values in parentheses for convenience of a description space.

As illustrated in FIG. 3, one end portion 32*a*1 between both end portions 32*a*1 and 32*a*2 of the mover magnetic pole 32*a* in the first direction (the direction of arrow X) (a location coordinate PP is 0) faces a center position of the slot 21*c*. In contrast, the other end portion 32*a*2 between both end portions 32*a*1 and 32*a*2 of the mover magnetic pole 32*a* in the first direction (the direction of arrow X) (a location coordinate PP is 7.5) faces a center position of the tooth portion 21*b*. Accordingly, the magnetic pole center position 32*a*3 of the mover magnetic pole 32*a* (a location coordinate PP is 3.75) is misaligned in one direction (a direction of arrow X1) in the first direction (the direction of arrow X) with respect to the magnetic pole center position of the tooth portion 21*b* (the tooth portion 21*b* in which the stator magnetic pole number T_No is 4).

Figure 4:
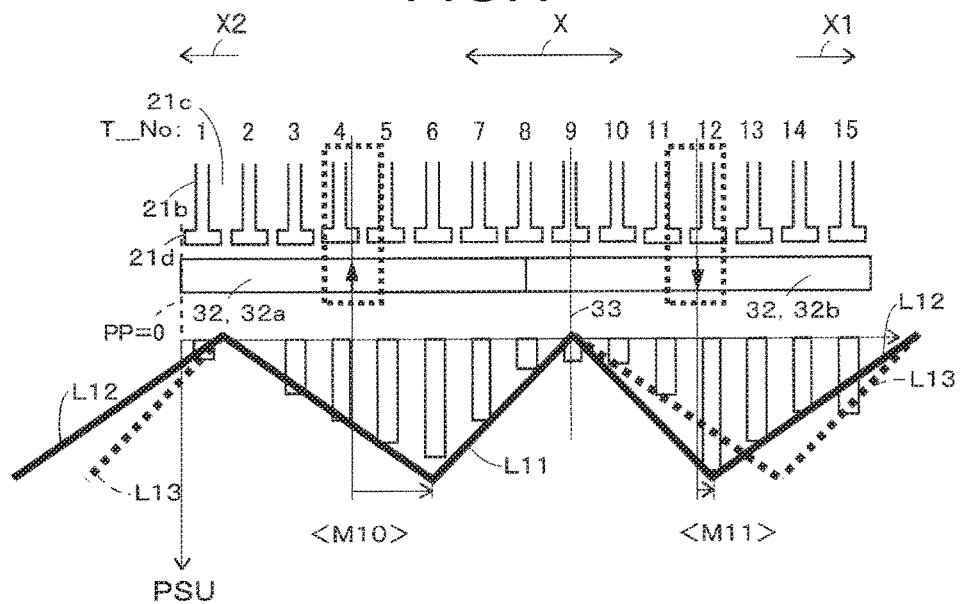
FIG. 4 is a schematic diagram illustrating an example of an electromagnetic attractive force distribution in a second direction applied to the plurality of tooth portions 21b (a direction of arrow Y) according to a reference embodiment.

As a result, an electromagnetic attractive force distribution in the second direction (the direction of arrow Y) applied to the plurality of tooth portions 21*b* (hereinafter, referred to as the "attractive force distribution applied to the plurality of tooth portions 21*b*" and also simply referred to as the "attractive force distribution") is the distribution represented by a bar graph of FIG. 4. FIG. 4 illustrates an example of an electromagnetic attractive force distribution in the second direction (the direction of arrow Y) applied to the plurality of tooth portions 21*b* according to the reference embodiment. A vertical axis indicates a magnitude PSU of attractive force and a horizontal axis indicates the first direction (the direction of arrow X). The rotary electric apparatus of the reference embodiment is different from the rotary electric apparatus 10 of this embodiment in that the mover 30 does not include the continuous skew region 42 (to be described below).

The attractive force distribution applied to the plurality of tooth portions 21*b* may be obtained, for example, by a magnetic field analysis. This may be applied to the attractive force distribution of the embodiment (to be described below) in the same manner. Solid line L11 indicates an approximate straight line obtained by approximating the attractive force distribution for each stator magnetic pole represented by a bar graph by a straight line. As illustrated in FIG. 4, a peak value of the attractive force distribution of the mover magnetic pole 32*a* is misaligned in the one direction (the direction of arrow X1) in the first direction (the direction of arrow X) with respect to the magnetic pole center position of the stator magnetic pole (the tooth portion 21*b* in which the stator magnetic pole number T_No is 4). A magnetic pole facing state in which such an attractive force distribution is generated is defined as a magnetic pole facing state M10.

In the meantime, one end portion 32*b*1 of both end portions 32*b*1 and 32*b*2 of the mover magnetic pole 32*b* in the first direction (the direction of arrow X) illustrated in FIG. 3 (a location coordinate PP is 7.5) faces a center position of the tooth portion 21*b*. In contrast, the other end portion 32*b*2 of both end portions 32*b*1 and 32*b*2 of the mover magnetic pole 32*b* in the first direction (the direction of arrow X) (a location coordinate PP is 15) faces a center position of the slot 21*c*. Accordingly, the magnetic pole center position 32*b*3 of the mover magnetic pole 32*b* (a location coordinate PP is 11.25) is misaligned in another direction (the direction of arrow X2) in the first direction (the direction of arrow X) with respect to the magnetic pole center position of the tooth portion 21b (the tooth portion 21b in which the stator magnetic pole number T_No is 12).

As a result, the attractive force distribution applied to the plurality of tooth portions 21b is the distribution represented by the bar graph of FIG. 4. A solid line L12 indicates an approximate straight line obtained by approximating the attractive force distribution for each stator magnetic pole represented by the bar graph by a straight line. As illustrated in FIG. 4, a peak value of the attractive force distribution of the mover magnetic pole 32b is approximately in the magnetic pole center position of the stator magnetic pole (the tooth portion 21b in which the stator magnetic pole number T_No is 12). A magnetic pole facing state in which such an attractive force distribution is generated is defined as a magnetic pole facing state M11.

As described above, the ½ series rotary electric apparatus 10 has two kinds of magnetic pole facing states M10 and M11, so that the ½ series rotary electric apparatus 10 has two kinds of attractive force distributions. Accordingly, the pair of mover magnetic poles 32a and 32b adjacent in the first direction (the direction of arrow X) has different attractive force distributions. As a result, the attractive force distribution applied to the plurality of tooth portions 21b is not equivalent for each magnetic pole, but is equivalent at every other pole for every magnetic pole pair (every two magnetic poles). This may also be applied to another pair of mover magnetic poles 32a and 32b (not illustrated) in the same manner. In the ½ series rotary electric apparatus 10, the pair of mover magnetic poles 32a and 32b adjacent in the first direction (the direction of arrow X) having the different attractive force distributions is moved in parallel in the first direction (the direction of arrow X) and is multipolarized as a unit (eight poles in this embodiment).

As illustrated in FIG. 4, the two kinds of attractive force distributions (the two kinds of magnetic pole facing states M10 and M11) are approximately symmetric (mirror-surface symmetric) to each other with respect to a mirror surface 33. The mirror surface 33 refers to a virtual reference surface formed by the second direction (the direction of arrow Y) and the third direction (the direction of arrow Z). For example, the mirror surface 33 formed at the center position of the tooth portion 21b in which the stator magnetic pole number T_No is 9 is considered. In this case, the attractive force distributions of the pair of mover magnetic poles 32a and 32b (the magnetic pole facing states M10 and M11) are approximately symmetric (mirror symmetric) to each other with respect to the mirror surface 33. Accordingly, when solid line L11 is folded back with respect to the mirror surface 33, solid line L11 substantially coincides with solid line L12. This may also be applied to another pair of mover magnetic poles 32a and 32b in the same manner. Further, a broken line L13 of FIG. 4 indicates a state where solid line L11 is moved in parallel by one magnetic pole of the mover 30 in the first direction (the direction of arrow X). Further, a region surrounded by the broken line illustrated in FIG. 4 indicates a difference in the magnetic pole facing state between the tooth portion 21b (the stator magnetic pole) and the pair of mover magnetic poles 32a and 32b.

Figure 5A:
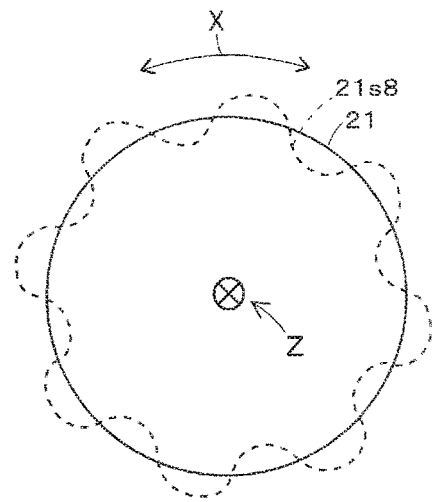
FIG. 5A is a schematic diagram illustrating an example of a shape of an outer circumference of a stator core 21.
Figure 5B:
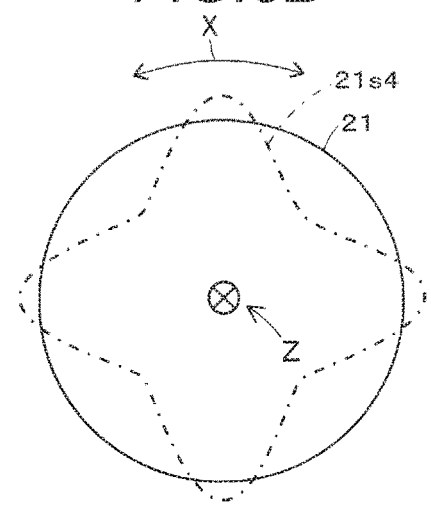
FIG. 5B is a schematic diagram illustrating another example of a shape of an outer circumference of a stator core 21.
Figure 5C:
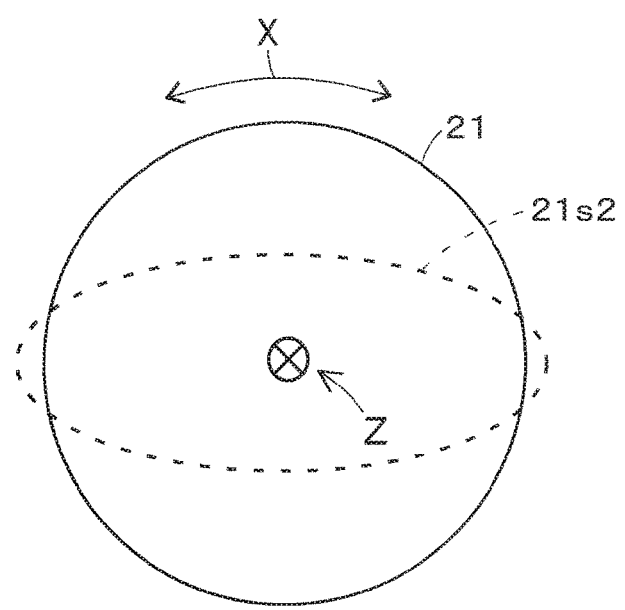
FIG. 5C is a schematic diagram illustrating another example of a shape of an outer circumference of a stator core 21.

The two kinds of attractive force distribution (the two kinds of magnetic pole facing states M10 and M11) has the component of vibromotive force of the lower-order (in this embodiment, the fourth-order spatial deformation mode) than the order of the vibromotive force (in this embodiment, the eighth-order spatial deformation mode) based on the number of magnetic poles of the mover 30 (in this embodiment, eight) with respect to the stator core 21. As illustrated in FIGS. 5A to 5C, when the vibromotive force is applied to the stator core 21, an outer circumference of the stator core 21 is easily deformed in a shape indicated by a broken line. FIGS. 5A to 5C illustrate examples of shapes of the outer circumference of the stator core 21 as viewed in the third direction (the direction of arrow Z). The shape of the outer circumference of the stator core 21 before the deformation is indicated by a solid line, and the shape of the outer circumference of the stator core 21 after the deformation is indicated by a broken line (curved lines 21s8, 21s4, and 21s2).

When the peak value of the attractive force is equal at every pole in the rotary electric apparatus 10 (eight poles) in which the number of magnetic poles of the mover 30 is eight (e.g., the rotary electric apparatus having the configuration of eight poles and 24 slots, the configuration of eight poles and 48 slots, and the like), strength and weakness of the vibromotive force is repeated eight times per one turn of the stator core 21. As a result, the outer circumference of the stator core 21 is easily deformed in a shape indicated by the curved line 21s8 of FIG. 5A. As described above, the eight-pole rotary electric apparatus 10 having the integer slot configuration has the component of vibromotive force of the eighth-order spatial deformation mode. The vibromotive force of the eighth-order spatial deformation mode is repeated in the unit of one magnetic pole based on the number of magnetic poles of the mover 30 (in this case, eight poles).

In the meantime, in the case where the peak value of the attractive force is not equivalent for every magnetic pole, but is equivalent in every other pole for every one magnetic pole pair (every two magnetic poles) (e.g., the rotary electric apparatus having the configuration of eight poles and 36 slots, the configuration of eight poles and 60 slots, and the like), strength and weakness of the vibromotive force is repeated four times per one turn of the stator core 21. As a result, the outer circumference of the stator core 21 is easily deformed in a shape indicated by the curved line 21s4 of FIG. 5B. As described above, the eight-pole rotary electric apparatus 10 having the fractional slot configuration (½ series) has the component of vibromotive force of the fourth-order spatial deformation mode.

In the case where the peak value of the attractive force is not equivalent for each magnetic pole and for every one magnetic pole pair, but is equivalent for every two magnetic pole pairs (every four magnetic poles) (e.g., the rotary electric apparatus having the configuration of eight poles and 30 slots, the configuration of eight poles and 54 slots, and the like), strength and weakness of the vibromotive force is repeated two times per one turn of the stator core 21. As a result, the outer circumference of the stator core 21 is easily deformed in a shape indicated by the curved line 21s2 of FIG. 5C. As described above, the eight-pole rotary electric apparatus 10 having the fractional slot configuration (¼ series) has the component of vibromotive force of the second-order spatial deformation mode.

As described above, the rotary electric apparatus 10 having the fractional slot configuration has the component of vibromotive force of the lower-order (in this embodiment, the fourth-order spatial deformation mode) than the order of the vibromotive force (in this embodiment, the eighth-order spatial deformation mode) based on the number of magnetic poles of the mover 30 (in this embodiment, eight). Accordingly, in the rotary electric apparatus 10 with a wide range of the number of driving rotation, the number of rotation that coincides with the unique number of vibrations of the stator core 21 is likely to occur within the range of the number of driving rotation. As a result, resonance of the stator 20 is generated, so that there is a probability in that noise and vibration of the rotary electric apparatus 10 are increased. Accordingly, the rotary electric apparatus 10 of this embodiment makes the attractive force distribution be high ordered to the same extent (in this embodiment, the eighth-order spatial deformation mode) as that of the rotary electric apparatus having the integer slot configuration.

(Configuration of the Mover 30 of this Embodiment)

Figure 6A:
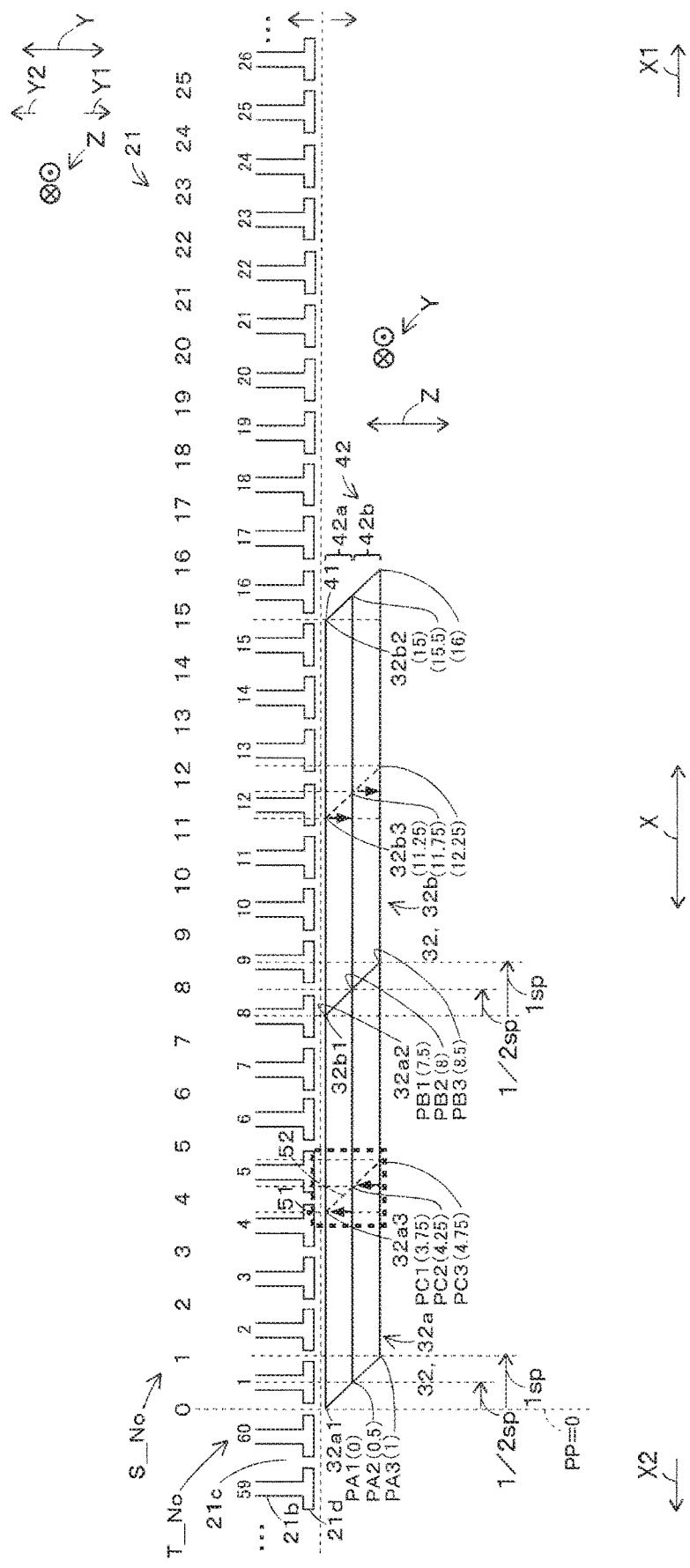
FIG. 6A is a schematic diagram illustrating an example of a magnetic pole facing state between a plurality of tooth portions 21b and a pair of mover magnetic poles 32a and 32b according to the embodiment.

FIG. 6A illustrates an example of a magnetic pole facing state between the plurality of tooth portions 21b and the pair of mover magnetic poles 32a and 32b according to the embodiment. The method of FIG. 6A is partially different from the method illustrated in FIG. 3 for convenience of the description. Specifically, since the plurality of tooth portions 21b (the plurality of stator magnetic poles) and the plurality of slots 21c as viewed in the third direction (the direction of arrow Z) are illustrated, the stator 20 is the same as the stator 20 of FIG. 3. In the meantime, the mover 30 is illustrated such that the second direction (the direction of arrow Y) of the stator 20 and the third direction (the direction of arrow Z) of the mover 30 coincide on the same paper surface, and the method of the illustration is switched based on a gap between the stator 20 and the mover 30 as a boundary. As described above, in FIG. 6A, the stator 20 as viewed in the third direction (the direction of arrow Z) and the mover 30 as viewed in the second direction (the direction of arrow Y) are illustrated together. This is illustrated for convenience in order to clearly specify a positional relationship between the continuous skew applied to the mover 30 and the first direction (the direction of arrow X) of the stator 20, and the method is different from the method illustrated in FIG. 3.

As illustrated in FIG. 6A, in this embodiment, the mover 30 has a first reference region 41 and a continuous skew region 42. The first reference region 41 refers to a reference region and a region serving as a reference of skew. The continuous skew region 42 refers to a skew region, and refers to a region, which is gradually misaligned in the first direction (the direction of arrow X) with respect to the first reference region 41 and is arranged in the third direction (the direction of arrow Z). In this embodiment, the continuous skew region 42 is gradually misaligned in one direction (the direction of arrow X1) of the first direction (the direction of arrow X) with respect to the first reference region 41 and is arranged in the third direction (the direction of arrow Z).

In FIG. 6A, the first reference region 41 and the continuous skew region 42 are illustrated with one pair of mover magnetic poles 32a and 32b as an example, but the same is also formed for the mover core 31. That is, the plurality of electronic steel plates 31x (the continuous skew region 42) that form the mover core 31 are gradually misaligned in one direction (the direction of arrow X1) of the first direction (the direction of arrow X) with respect to one electronic steel plate 31x (the first reference region 41) that forms the mover core 31 and is arranged (staked) in the third direction (the direction of arrow Z).

The respective regions formed when the continuous skew region 42 is bisectioned along the first direction (the direction of arrow X) by a plane perpendicular to the third direction (the direction of arrow Z) are referred to as a first continuous skew region 42a and a second continuous skew region 42b in order from a region on the first reference portion 41 side. As described above, in FIG. 6A, for convenience of the description, the continuous skew region 42 is illustrated as being divided into the first continuous skew region 42a and the second continuous skew region 42b, but the continuous skew region 42 is integrally formed. Further, in FIG. 6A, the first reference region 41 is an end portion surface of one end side of the pair of mover magnetic poles 32a and 32b in the third direction (the direction of arrow Z). Further, an end portion surface at a side different from a boundary surface of the first continuous skew region 42a and the second continuous skew region 42b between both end surfaces of the second continuous skew region 42b in the third direction (the direction of arrow Z) is an end portion surface of the other end side of the pair of mover magnetic poles 32a and 32b in the third direction (the direction of arrow Z).

In the continuous skew region 42, the maximum value of the skew amount for the first reference region 41 is set in such a manner that the maximum value of a relative skew amount between the stator 20 and the mover 30 is equal to one slot pitch (1 sp) of the plurality of (60 in this embodiment) slots 21c. In this embodiment, the mover 30 includes the first reference region 41 and the continuous skew region 42, and the stator 20 does not include the first reference region 41 and the continuous skew region 42. Accordingly, the skew amount of the stator 20 is 0, and in the continuous skew region 42 of the mover 30, the maximum value of the skew amount for the first reference region 41 is set to one slot pitch (1 sp) of the plurality (60) of slots 21c.

Specifically, as illustrated in FIG. 6A, the pair of mover magnetic poles 32a and 32b of the boundary surface of the first continuous skew region 42a and the second continuous skew region 42b is arranged while being misaligned by ½ slot pitch (½ sp) in one direction (the direction of arrow X1) of the first direction (the direction of arrow X) with respect to the first reference region 41. Further, the end portion surface of the other end side of the pair of mover magnetic poles 32a and 32b in the third direction (the direction of arrow Z) is arranged while being misaligned by one slot pitch (1 sp) in one direction (the direction of arrow X1) of the first direction (the direction of arrow X) with respect to the first reference region 41. Further, the rotary electric apparatus 10 in this embodiment is the rotary electric apparatus (the rotary electric apparatus having a basic configuration in which the number of magnetic poles of the mover 30 is two and the number of slots of the stator 20 is 15) having a configuration of eight poles and 60 slots, and the one slot pitch (1 sp) corresponds to an electrical angle of 24° (=360°/15 slots).

One end portion 32a1 of both end portions 32a1 and 32a2 of the mover magnetic pole 32a of the first reference region 41 in the first direction (the direction of arrow X) (which has a location coordinate PP of 0, and is indicated by position PA1) faces a center position of the slot 21c. Another end portion 32a2 of both end portions 32a1 and 32a2 of the mover magnetic pole 32a of the first reference region 41 in the first direction (the direction of arrow X) (which has a location coordinate PP of 7.5, and is indicated by position PB1) faces a center position of the tooth portion 21b. In this case, the magnetic pole center position 32a3 of the mover magnetic pole 32a of the first reference region 41 (which has a location coordinate PP of 3.75 and is indicated by position PC1) is arranged while being misaligned in the one direction (the direction of arrow X1) of the first direction (the direction of arrow X) with respect to the magnetic pole center position of the tooth portion 21b (the tooth portion 21b in which the stator magnetic pole number T_No is 4).

One end portion 32a1 of both end portions 32a1 and 32a2 of the mover magnetic pole 32a of the boundary surface of the first continuous skew region 42a and the second continuous skew region 42b in the first direction (the direction of arrow X) (which has a location coordinate PP of 0.5, and is indicated by position PA2) faces a center position of the tooth portion 21b. The other end portion 32a2 of both end portions 32a1 and 32a2 of the corresponding mover magnetic pole 32a in the first direction (the direction of arrow X) (which has a location coordinate PP of 8 and is indicated by position PB2) faces a center position of the slot 21c. In this case, the magnetic pole center position 32a3 of the corresponding mover magnetic pole 32a (which has a location coordinate PP of 4.25 and is indicated by position PC2) is arranged while being misaligned in another direction (the direction of arrow X2) of the first direction (the direction of arrow X) with respect to the magnetic pole center position of the tooth portion 21b (the tooth portion 21b in which the stator magnetic pole number T_No is 5).

An attractive force distribution formed in position PC1 (which has the location coordinate PP of 3.75) is mixed with an attractive force distribution formed in position PC2 (which has the location coordinate PP of 4.25), so that the attractive force distributions are averaged. As a result, it is possible to facilitate equalization of the corresponding attractive force distribution at every pole and the component of the vibromotive force of the eighth-order spatial deformation mode is increased. That is, compared to the order (in this embodiment, the eighth-order spatial deformation mode) based on the number of magnetic poles of the mover 30 (in this embodiment, eight poles), the component of vibromotive force of the lower order (in this embodiment, the fourth-order spatial deformation mode) overlaps while being spatially misaligned by a half wavelength, and the attractive force distributions thereof become high-ordered to the same extent as that of the rotary electric apparatus having the integer slot configuration (in this embodiment, the eighth-order spatial deformation mode).

In this specification, a region spaced by 1/c slot pitch (in this embodiment, ½ slot pitch (½ sp)) in the first direction (the direction of arrow X) that is indicated using a denominator portion c of the number Nspp of slots per every pole and per every phase is referred to as a spaced region. The region indicated by position PC1 (which has the location coordinate PP of 3.75) and the region indicated by position PC2 (which has the location coordinate PP of 4.25) are the spaced regions. The description of the spacing between the spaced regions indicated by position PC1 (which has the location coordinate PP of 3.75) and position PC2 (which has the location coordinate PP of 4.25) is applied to spacing between other spaced regions in the third direction (the direction of arrow Z) in the same manner.

Figure 6B:
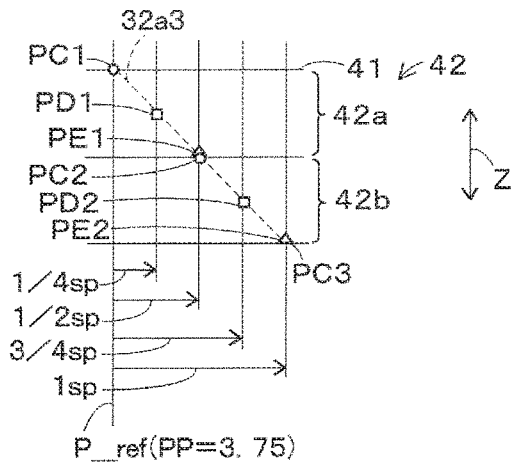
FIG. 6B is a schematic diagram for explaining a magnetic pole facing state of a region surrounded by a broken line of FIG. 6A.

FIG. 6B is a schematic diagram for explaining a magnetic pole facing state of a region surrounded by a broken line of FIG. 6A. Circle marks in FIG. 6B represent spaced regions indicated by position PC1 (which has the location coordinate PP of 3.75) and position PC2 (which has the location coordinate PP of 4.25). Square marks represent spaced regions indicated by position PD1 (which has the location coordinate PP of 4) and position PD2 (which has the location coordinate PP of 4.5). Triangle marks represent spaced regions indicated by position PE1 (which has the location coordinate PP of 4.25) and position PE2 (which has the location coordinate PP of 4.75). As illustrated in FIG. 6B, the spaced regions are located on a broken line that represents the magnetic pole center position 32a3 of the mover magnetic pole 32a. The description about the spaced regions indicated by position PC1 (which has the location coordinate PP of 3.75) and position PC2 (which has the location coordinate PP of 4.25) may be applied to any spacing between the spaced regions in the same manner.

The same description may be applied to spacing between the spaced regions other than the illustrated spaced regions (the spacing between the spaced regions located on the broken line that represents the magnetic pole center position 32a3). That is, throughout the third direction (the direction of arrow Z) of the mover 30, the same relationship as the foregoing relationship (the relationship between the spaced regions that are spaced by ½ slot pitch (½ sp) in the first direction (the direction of arrow X)) is established. Further, the magnetic pole facing state illustrated in FIG. 6B is repeated in the first direction (the direction of arrow X) in the unit of one slot pitch (1 sp) of the plurality of (60) slots 21c that accompany the movement of the mover 30 (the magnetic pole center position 32a3 of the mover magnetic pole 32a is moved by one slot pitch (1 sp) of the plurality of (60) slots 21c).

As described above, the maximum value of the skew amount for the first reference region 41 is set to one slot pitch (1 sp) of the plurality of (60) slots 21c, so that the attractive force distributions are mixed throughout the entirety of the third direction (the direction of arrow Z) of the mover 30, and the attractive force distributions are averaged. As a result, it is possible to facilitate equalization of the corresponding attractive force distribution at every pole and the component of the vibromotive force of the eighth-order spatial deformation mode is increased. Specifically, in the spacing of the spaced regions (in the example of FIG. 6B, for example, the space between the regions indicated by the circle marks, the space between the regions indicated by the square marks, and the space between the regions indicated by the triangle marks), compared to the order (in this embodiment, the fourth-order spatial deformation mode) based on the number of magnetic poles of the mover 30 (eight poles in this embodiment), the component of vibromotive force of the lower order (in this embodiment, the eighth-order spatial deformation mode) overlaps while being spatially misaligned by a half wavelength, and the attractive force distributions thereof become a high-ordered to the same extent as that of the rotary electric apparatus having the integer slot configuration (the eighth-order spatial deformation mode in this embodiment).

When the maximum value of the skew amount for the first reference region 41 is not set to one slot pitch (1 sp) of the plurality of (60) slots 21c, an area is generated in which the foregoing relationship (the relationship between the spaced regions that are spaced by ½ slot pitch (½ sp) in the first direction (the direction of arrow X)) is not established. As a result, the component of the vibromotive force of the low order (in this embodiment, the fourth-order spatial deformation mode) remains in the corresponding region, so that it becomes difficult to facilitate mixing, averaging, and equalization of the attractive force distributions throughout the entirety of the third direction (the direction of arrow Z) of the mover 30.

Figure 6C:
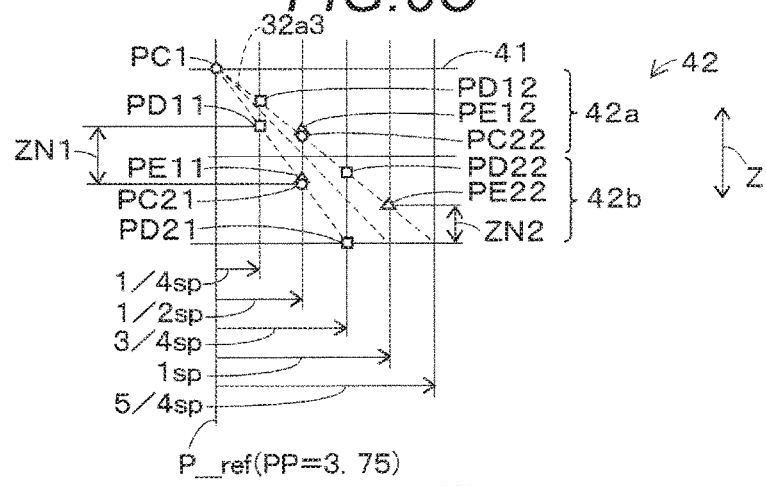
FIG. 6C is a schematic diagram for explaining a magnetic pole facing state in the case where a maximum value of a skew amount for a first reference region 41 is not set to one slot pitch (1 sp) of a plurality of slots 21c (60 slots) according to the reference embodiment.

FIG. 6C is a schematic diagram for explaining a magnetic pole facing state in the case where a maximum value of the skew amount for the first reference region 41 is not set to one slot pitch (1 sp) of the plurality of (60) of slots 21c according to the reference embodiment. FIG. 6C is a diagram in which the arrangement of the respective spaced regions illustrated in FIG. 6B is attempted to be reproduced for a first case and a second case. In the first case, the maximum value of the skew amount for the first reference region 41 is set to ¾ slot pitch (¾ sp) of the plurality of (60) slots 21c. In the second case, the maximum value of the skew amount for the first reference region 41 is set to 5/4 slot pitch (5/4 sp) of the plurality of (60) slots 21c.

The spaced regions indicated by position PC1 (which has the location coordinate PP of 3.75) and position PC2 (which has the location coordinate PP of 4.25) of FIG. 6B correspond to the spaced regions indicated by position PC1 (which has the location coordinate PP of 3.75) and position PC21 (which has the location coordinate PP of 4.25) in the first case of FIG. 6C. The spaced regions are indicated by the circle marks similarly to FIG. 6B. Further, the spaced regions indicated by position PD1 (which has the location coordinate PP of 4) and position PD2 (which has the location coordinate PP of 4.5) of FIG. 6B correspond to the spaced regions indicated by position PD11 (which has the location coordinate PP of 4) and position PD21 (which has the location coordinate PP of 4.5) in the first case of FIG. 6C. The spaced regions are indicated by the square marks similarly to FIG. 6B. The foregoing relationship (the relationship between the spaced regions that are spaced by ½ slot pitch (½ sp) in the first direction (the direction of arrow X)) is established in the spacing between any spaced regions.

In the meantime, the relationship (the relationship between the spaced regions spaced by ½ slot pitch (½ sp) in the first direction (the direction of arrow X)) between the spaced regions indicated by position PE1 (which has the location coordinate PP of 4.25) and position PE2 (which has the location coordinate PP of 4.75) of FIG. 6B is not established in the first case of FIG. 6C. Specifically, in the first case of FIG. 6C, there is the region indicated by position PE11 (which has the location coordinate PP of 4.25) corresponding to position PE1 (which has the location coordinate PP of 4.25) of FIG. 6B. However, there is no region corresponding to the region indicated by position PE2 (which has the location coordinate PP of 4.75) of FIG. 6B. As described above, in the first case, there is generated an area ZN1 in which the foregoing relationship (the relationship between the spaced regions spaced by ½ slot pitch (½ sp) in the first direction (the direction of arrow X)) is established. In this case, the area ZN1 is an area from the region in which the skew amount for the first reference region 41 in the continuous skew region 42 is set to ¼ slot pitch (¼ sp) of the plurality of (60) slots 21c to the region in which the skew amount for the first reference region 41 in the continuous skew region 42 is set to ½ slot pitch (½ sp) of the plurality of (60) slots 21c.

The spaced regions indicated by position PC1 (which has the location coordinate PP of 3.75) and position PC2 (which has the location coordinate PP of 4.25) of FIG. 6B correspond to the spaced regions indicated by position PC1 (which has the location coordinate PP of 3.75) and position PC22 (which has the location coordinate PP of 4.25) in the second case of FIG. 6C. The spaced regions are indicated by the circle marks similarly to FIG. 6B. Further, the spaced regions indicated by position PD1 (which has the location coordinate PP of 4) and position PD2 (which has the location coordinate PP of 4.5) of FIG. 6B correspond to the spaced regions indicated by position PD12 (which has the location coordinate PP of 4) and position PD22 (which has the location coordinate PP of 4.5) in the second case of FIG. 6C. The spaced regions are indicated by the square marks similarly to FIG. 6B. Further, the spaced regions indicated by position PE1 (which has the location coordinate PP of 4.25) and position PE2 (which has the location coordinate PP of 4.75) of FIG. 6B correspond to the spaced regions indicated by position PE12 (which has the location coordinate PP of 4.25) and position PE22 (which has the location coordinate PP of 4.75) in the second case of FIG. 6C. The spaced regions are indicated by the triangle marks similarly to FIG. 6B. The foregoing relationship (the relationship between the spaced regions spaced by ½ slot pitch (½ sp) in the first direction (the direction of arrow X)) is established in the spacing between any spaced regions.

However, in the second case of FIG. 6C as well, there is generated an area ZN2 in which the foregoing relationship (the relationship between the spaced regions spaced by ½ slot pitch (½ sp) in the first direction (the direction of arrow X)) is established. In this case, the area ZN2 is an area from the region in which the skew amount for the first reference region 41 in the continuous skew region 42 is set to one slot pitch (1 sp) of the plurality of (60) slots 21c to the region in which the skew amount for the first reference region 41 in the continuous skew region 42 is set to 5/4 slot pitch (5/4 sp) of the plurality of (60) slots 21c. Further, the area ZN2 and an area from position PC22 to position PD22 externally appear as a relationship between the spaced regions. However, the area from position PC22 to position PD22 already has a relationship of the spaced regions with the area from position PC1 to position PD12. Accordingly, in the viewpoint of the mixing, the averaging, and the equalization of the attractive force distribution, there is no area in which the relationship between the area ZN2 and the spaced region is established.

As described above, when the maximum value of the skew amount for the first reference region 41 is not set to one slot pitch (1 sp) of the plurality of (60) slots 21c, it becomes difficult to facilitate mixing, averaging, and equalization of the attractive force distributions throughout the entirety of the third direction (the direction of arrow Z) of the mover 30. Accordingly, in this embodiment, the maximum value of the skew amount for the first reference region 41 is set to one slot pitch (1 sp) of the plurality of (60) slots 21c.

Figure 7A:
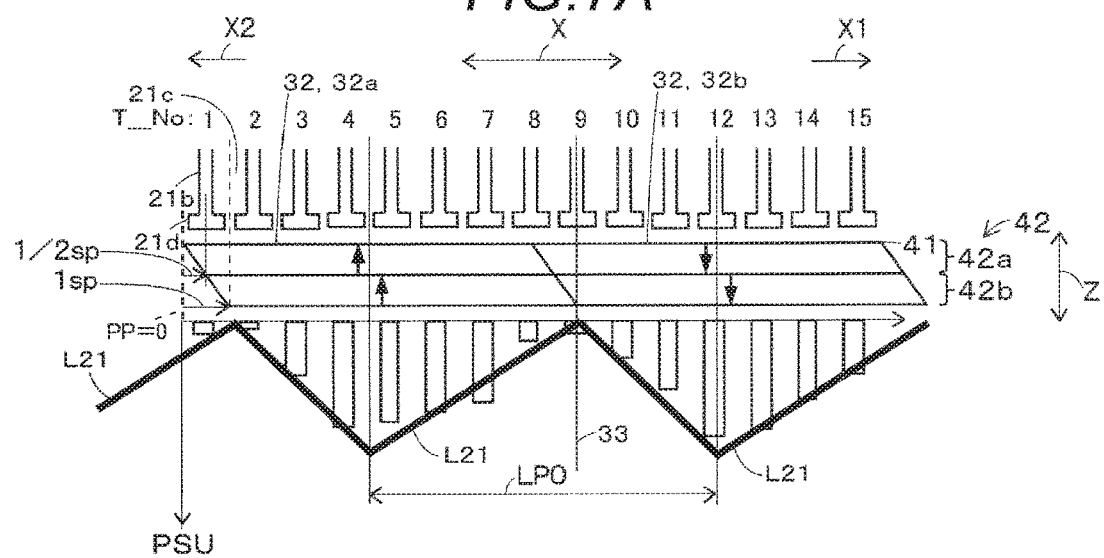
FIG. 7A is a schematic diagram illustrating an example of an electromagnetic attractive force distribution in a second direction applied to a plurality of tooth portions 21b (a direction of arrow Y) according to the embodiment.

FIG. 7A illustrates an example of an electromagnetic attractive force distribution in the second direction (the direction of arrow Y) applied to the plurality of tooth portions 21b according to this embodiment. A vertical axis indicates a magnitude PSU of attractive force and a horizontal axis indicates the first direction (the direction of arrow X). A solid line L21 indicates an approximate straight line obtained by approximating the attractive force distribution for each stator magnetic pole represented by a bar graph by a straight line. FIG. 7A represents that by the mixing, the averaging, and the equalization of the attractive force distributions, the peak value of the attractive force approaches the attractive force distribution which becomes equivalent at every pole (the attractive force distribution of the integer slot configuration). Further, attractive force pitch LP0 represents a gap of a peak value of the attractive force in the first direction (the direction of arrow X). Attractive force pitch LP0 is equal at every pole.

Figure 7B:
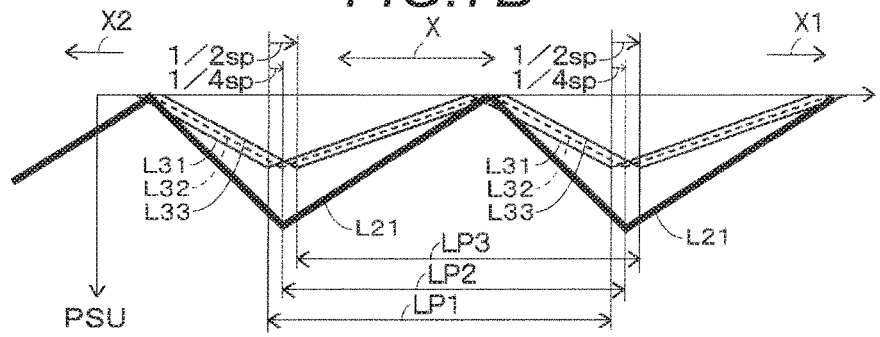
FIG. 7B is a schematic diagram for explaining mixing, averaging, and equalization of attraction force distributions for each spaced region.

FIG. 7B is a schematic diagram for explaining mixing, averaging, and equalization of attraction force distributions for each spaced region. A vertical axis indicates a magnitude PSU of attractive force and a horizontal axis indicates the first direction (the direction of arrow X). In the spacing between the spaced regions (indicated by circles) indicated by position PC1 (which has the location coordinate PP of 3.75) and position PC2 (which has the location coordinate PP of 4.25) of FIG. 6B, the mixing and the averaging of the attractive force distributions are performed. As a result, it is possible to facilitate equalization of the corresponding attractive force distribution at every pole and the component of the vibromotive force of the eighth-order spatial deformation mode is increased. A solid line L31 indicates an approximate straight line obtained by approximating a first attractive force distribution that is the attractive force distribution in this case by a straight line. Further, attractive force pitch LP1 represents a gap of a peak value of the attractive force in the first direction (the direction of arrow X) in the second attractive force distribution. Attractive force pitch LP1 is equal at every pole.

Similarly, in the spacing between the spaced regions indicated by position PD1 (which has the location coordinate PP of 4) and position PD2 (which has the location coordinate PP of 4.5) (indicated by square marks) of FIG. 6B, the mixing and the averaging of the attractive force distributions are performed. As a result, it is possible to facilitate equalization of the corresponding attractive force distribution at every pole and the component of the vibromotive force of the eighth-order spatial deformation mode is increased. A broken line L32 indicates an approximate straight line obtained by approximating a second attractive force distribution, that is, the attractive force distribution in this case by a straight line. Further, attractive force pitch LP2 represents a gap of a peak value of the attractive force in the first direction (the direction of arrow X) in the first attractive force distribution. The attractive force pitch LP2 is equal at every pole. Further, in the spacing between the spaced regions indicated by position PE1 (which has the location coordinate PP of 4.25) and position PE2 (which has the location coordinate PP of 4.75) (indicated by triangle marks) of FIG. 6B, the mixing and the averaging of the attractive force distributions are performed. As a result, it is possible to facilitate equalization of the corresponding attractive force distribution at every pole and the component of the vibromotive force of the eighth-order spatial deformation mode is increased. A solid line L33 indicates an approximate straight line obtained by approximating a third attractive force distribution that is the attractive force distribution in this case by a straight line. Further, attractive force pitch LP3 represents a gap of a peak value of the attractive force in the first direction (the direction of arrow X) in the first attractive force distribution. Attractive force pitch LP3 is equal at every pole.

For the second attractive force distribution, the peak value of the attractive force is misaligned by ¼ slot pitch (¼ sp) of the plurality of (60) slots $21c$ in one direction (the direction of arrow X1) in the first direction (the direction of arrow X) with respect to the first attractive force distribution. Further, for the third attractive force distribution, the peak value of the attractive force is misaligned by ½ slot pitch (½ sp) of the plurality of (60) slots $21c$ in one direction (the direction of arrow X1) in the first direction (the direction of arrow X) with respect to the first attractive force distribution. In the entirety of the mover 30, the high-ordered attractive force distributions are misaligned by the minimum of 0 slot pitch to the maximum of ½ slot pitch (½ sp) in the one direction (the direction of the arrow X1) in the first direction (the direction of arrow X) and are added, so that the high order of the attractive force distribution is maintained. That is, as illustrated in FIG. 7A, the attractive force pitch LP0 is equal at every pole in the entirety of the mover 30 as well.

Referring to FIG. 6A and the solid line L21 of FIG. 7A, the attractive force is the largest at the magnetic pole center position $32a3$ of the mover magnetic pole $32a$ and the magnetic pole center position $32b3$ of the mover magnetic pole $32b$, so that influence on noise and vibration becomes the largest. In the meantime, the attractive force is gradually decreased from the magnetic pole center position $32a3$ to the magnetic pole boundary of the mover magnetic pole $32a$ and the mover magnetic pole $32b$, so that influence on noise and vibration is decreased. The same is applied to the case where the attractive force is gradually decreased from the magnetic pole center position $32b3$ to the magnetic pole boundary of the mover magnetic pole $32a$ and the mover magnetic pole $32b$. In consideration of the situation, in this specification, the influence on noise and vibration is described representatively based on the spaced region located along the magnetic pole center position $32a3$ of the mover magnetic pole $32a$.

According to the rotary electric apparatus 10 of this embodiment, the mover 30 includes a first reference region 41 and a continuous skew region 42. Further, in the continuous skew region 42, the maximum value of the skew amount for the first reference region 41 (in this embodiment, one slot pitch (1 sp)) is set in such a manner that the maximum value of a relative skew amount between the stator 20 and the mover 30 is equal to one slot pitch (1 sp) of the plurality of (60) slots $21c$. Accordingly, the rotary electric apparatus 10 of this embodiment is capable of mixing the electromagnetic attractive force distributions in the first direction (the direction of arrow X) generated between the stator 20 and the mover 30 throughout the entirety in the third direction (the direction of arrow Z), thereby averaging the corresponding attractive force distributions. As a result, it is possible to facilitate equalization of the corresponding attractive force distribution at every pole. Accordingly, the rotary electric apparatus 10 of this embodiment makes the corresponding attractive force distribution be high-ordered to the same extent as that of the rotary electric apparatus having the integer slot configuration (in this embodiment, the eighth-order spatial deformation mode) and increases the number of rotations that matches the unique number of vibrations of the stator core 21, for example, so that it is possible to set the number of rotation to be out of a range of the number of driving rotation. That is, the rotary electric apparatus 10 of this embodiment is capable of reducing noise and vibration of the rotary electric apparatus 10 by avoiding a resonance opportunity of the stator 20 within the range of the number of driving rotation.

In the continuous skew region 42, an increasing rate or a decreasing rate of the skew amount for the first reference region 41 may be set to be constant from one end side to the other end side in the third direction (the direction of arrow Z). In this specification, when the continuous skew region 42 is misaligned in the one direction (the direction of arrow X1) of the first direction (the direction of arrow X) with respect to the first reference region 41, the skew amount of the continuous skew region 42 is increased. In contrast, when the continuous skew region 42 is misaligned in another direction (the direction of arrow X2) of the first direction (the direction of arrow X) with respect to the first reference region 41, the skew amount of the continuous skew region 42 is decreased.

As illustrated in FIG. 6A, one end portion $32a1$ of both end portions $32a1$ and $32a2$ of the mover magnetic pole 32 in the first direction (the direction of arrow X) on the end portion surface at the other end side in the third direction (the direction of arrow Z) is defined as position PA3 (which has a location coordinate PP of 1). The other end portion $32a2$ of both end portions $32a1$ and $32a2$ of the corresponding mover magnetic pole $32s$ in the first direction (the direction of arrow X) is defined as position PB3 (which has a location coordinate PP of 8.5). A magnetic pole center position $32a3$ of the corresponding mover magnetic pole $32a$ in this case is defined as position PC3 (which has a location coordinate PP of 4.75).

According to the rotary electric apparatus 10 of this embodiment, in the continuous skew region 42, an increasing rate of the skew amount for the first reference region 41 is constantly set from one end side to the other end side in the third direction (the direction of arrow Z). For example, the increased amount of the skew amount for position PC1 (which has the location coordinate PP of 3.75) is ½ slot pitch (½ sp) between position PC1 (which has a location coordinate PP of 3.75) and position PC2 (which has the location coordinate PP of 4.25). Further, the increased amount of the skew amount for position PC2 (which has the location coordinate PP of 4.25) is ½ slot pitch (½ sp) between position PC2 (which has a location coordinate of 4.25) and position PC3 (which has the location coordinate PP of 4.75). As described above, the skew amount is constantly increased at a constant rate from position PC1 (which has the location coordinate PP of 3.75) to position PC3 (which has the location coordinate PP of 4.75).

As described above, since in the continuous skew region 42, the increasing rate of the skew amount for the first reference region 41 is constantly set from one end side to the other end side in the third direction (the direction of arrow Z), a leakage magnetic flux in the third direction (the direction of arrow Z) may be mainly decreased compared to the case where the skew amount for the first reference region 41 is discontinuously changed. Further, it is also possible to simplify a manufacturing process. The same is also applicable to the case where the decreasing rate of the skew amount for the first reference region 41 is set to be constant. In this case, the continuous skew region 42 is gradually misaligned in another direction (the direction of arrow X2) in the first direction (the direction of arrow X) with respect to the first reference region 41 and is arranged in the third direction (the direction of arrow Z).

According to the rotary electric apparatus 10 of this embodiment, since the mover 30 includes the continuous skew region 42, it is possible to reduce noise and vibration of the rotary electric apparatus 10, and also decrease torque ripple. The torque ripple of the rotary electric apparatus 10 is pulsation generated in output torque of the rotary electric apparatus 10, and is generated due to variation of a change in a magnetic flux between the stator 20 and the mover 30 when the mover 30 moves. Examples of the torque ripple may include cogging torque, slot ripple, and pole ripple. The cogging torque is generated due to a discontinuous (stepwise) change in a magnetic pole facing state of the stator magnetic pole and the mover magnetic pole at the time of the non-electrical conduction. In the rotary electric apparatus 10 of this embodiment, the torque ripple tends to be increased and decreased in accordance with the increase and the decrease of the cogging torque, so that in this specification, the torque ripple is described based on the cogging torque as an example.

As described above, the continuous skew region 42 is gradually misaligned in the first direction (the direction of arrow X) with respect to the first reference region 41 and is arranged in the third direction (the direction of arrow Z). Further, in this embodiment, in the continuous skew region 42, the maximum value of the skew amount for the first reference region 41 is set to one slot pitch (1 sp). Accordingly, a predetermined position region in the first direction (the direction of arrow X) of the mover 30 is broadened with a width of one slot pitch (1 sp) of the plurality of (60) slots 21c and faces the stator 20 in the first direction (the direction of arrow X), so that a magnetic variation is gradually changed in an opening portion of the slot 21c of the stator 20 and the torque ripple (cogging torque) is decreased.

In the rotary electric apparatus 10 having the fractional slot configuration, the different magnetic pole facing states are repeated in the first direction (the direction of arrow X), so that the torque ripple (cogging torque) tends to be decreased compared to the rotary electric apparatus having the integer slot configuration. According to the rotary electric apparatus 10 of this embodiment, the mover 30 includes the continuous skew region 42, so that the torque ripple resulting from the magnetic facing state of the stator magnetic pole and the mover magnetic pole (cogging torque) is further decreased. Further, according to the rotary electric apparatus 10 of this embodiment, the mover 30 includes the continuous skew region 42, so that the magnetic flux is suppressed from being sharply changed and it is possible to reduce iron loss, magnet vortex loss, copper vortex loss, and the like.

As described in Non-Patent Reference 1, in order to decrease a harmonic component, the continuous skew of the amount of 1/c slot pitch of the plurality (60) of slots 21c of the stator 20 (the maximum value of the skew amount for the first reference region 41 is set to 1/c slot pitch) may be performed. The same effect is also obtained by the continuous skew of nq/c slot pitch (nq is a natural number) of the plurality of (60) slots 21c of the stator 20. However, as the natural number nq is increased, a decrease in torque of the rotary electric apparatus 10 is increased. Further, the manufacturing tends to be complex. Accordingly, 1 is commonly selected as the natural number nq. In the meantime, in this embodiment, in the rotary electric apparatus 10 having the fractional slot configuration, in the continuous skew region 42, the maximum value of the skew amount for the first reference region 41 (in this embodiment, one slot pitch (1 sp), that is, nq=c=2) is set in such a manner that the maximum value of the relative skew amount between the stator 20 and the mover 30 is equal to one slot pitch (1 sp) of the plurality of (60) slots 21c. That is, in this embodiment, 2 is selected as the natural number nq. Accordingly, it is possible to reduce noise and vibration of the rotary electric apparatus 10, and also decrease torque ripple (cogging torque) and a harmonic component included in an output waveform.

The method of reducing noise, vibrations, and torque ripple (cogging torque) of the rotary electric apparatus 10 may include a method of providing a notch on each tooth tip end portion 21d of the stator core 21 or a surface (external surface) of the mover core 31 that faces each tooth tip end portion 21d. However, in the method, an air gap is substantially expanded, so that the decrease in torque is increased compared to the skew. The rotary electric apparatus 10 of this embodiment may suppress the decrease in torque and reduce noise, vibrations, and torque ripple (cogging torque) of the rotary electric apparatus 10.

Figure 8A:
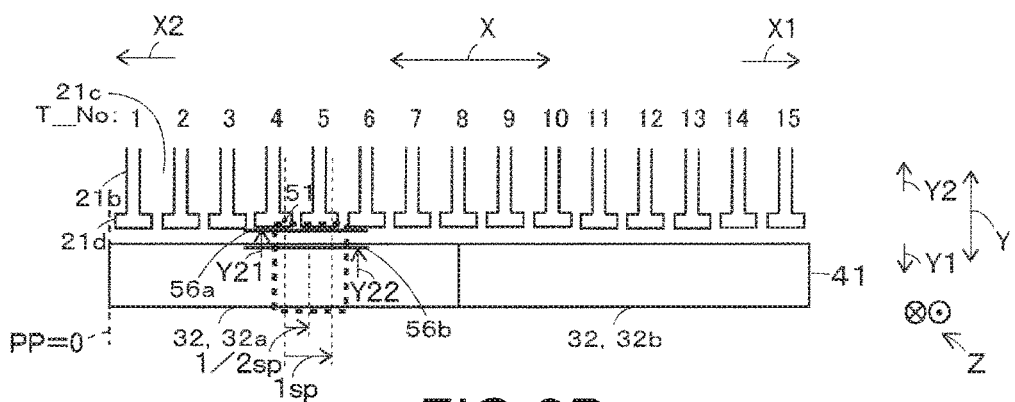
FIG. 8A is a schematic diagram illustrating an example of a magnetic pole facing state between a plurality of tooth portions 21b and a pair of mover magnetic poles 32a and 32b when viewed in the third direction (the direction of arrow Z) according to the embodiment.

FIG. 8A illustrates an example of a magnetic pole facing state between the plurality of tooth portions 21b and the pair of mover magnetic poles 32a and 32b when viewed in the third direction (the direction of arrow Z). A straight line 56a indicates a portion of an inner peripheral surface of the stator 20 in the rotary electric apparatus 10 in which the mover 30 is installed inside the stator 20 (the inner rotor-type rotary electric apparatus). Specifically, the inner circumference surface of the stator 20 corresponds to a facing surface that faces the mover 30 in the tooth tip end portion 21d. A straight line 56b indicates a portion in the vicinity of an external peripheral surface of the mover 30 in the rotary electric apparatus 10 in which the mover 30 is installed inside the stator 20. Specifically, the region in the vicinity of the external peripheral surface of the mover 30 corresponds to an end portion surface at the stator 20 side of both end surfaces of the pair of mover magnetic poles 32*a* and 32*b* in the second direction (the direction of arrow Y).

Figure 8B:
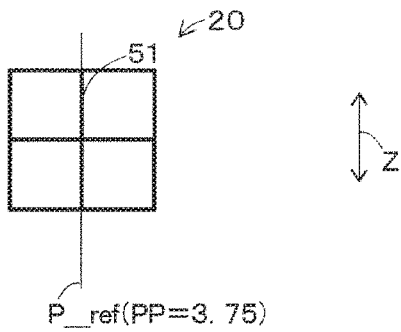
FIG. 8B is a schematic diagram illustrating an example of a state of skew of a stator 20 according to the embodiment.

FIG. 8B illustrates an example of a state of skew of the stator 20. FIG. 8B corresponds to a diagram in which a portion of the inner peripheral surface of the stator 20 in the vicinity of the straight line 56*a* illustrated in FIG. 8A is viewed at the stator side (the direction of arrow Y2) in the second direction that is a direction heading from the mover 30 side to the stator 20 side in the second direction (the direction of arrow Y). The inner peripheral surface of the stator 20 illustrated in FIG. 8B is partially illustrated in the first direction (the direction of arrow X), and is entirely illustrated in the third direction (the direction of arrow Z). Further, in FIG. 8A, the direction of the illustration in FIG. 8B is indicated by arrow Y21.

In this embodiment, the skew amount in the stator 20 is 0. Accordingly, a skew position of the stator 20 is formed in the third direction (the direction of arrow Z). A straight line 51 indicates a skew position of the stator 20 at a reference position P_ref (e.g., a location coordinate PP illustrated in FIG. 6A is 3.75), and one end side in the third direction (the direction of arrow Z) and the other end side in the third direction (the direction of arrow Z) are connected in the third direction (the direction of arrow Z).

Figure 8C:
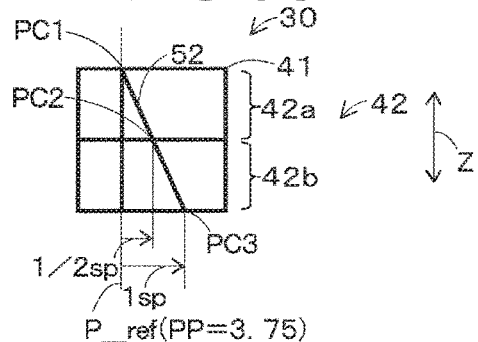
FIG. 8C is a schematic diagram illustrating an example of a state of skew of a mover 30 according to the embodiment.

FIG. 8C illustrates an example of the state of the skew of the mover 30. FIG. 8C corresponds to a diagram in which a portion in the vicinity of the outer peripheral surface of the mover 30 in the vicinity of the straight line 56*b* illustrated in FIG. 8A is viewed at the stator side (the direction of arrow Y2) in the second direction (the direction of arrow Y). The vicinity of the outer peripheral surface of the mover 30 illustrated in FIG. 8C is partially illustrated in the first direction (the direction of arrow X) and is entirely illustrated in the third direction (the direction of arrow Z). Further, in FIG. 8A, the direction of the illustration in FIG. 8C is indicated by arrow Y22.

In this embodiment, the mover 30 includes the first reference region 41 and the continuous skew region 42. Accordingly, the skew position of the mover 30 is varied according to the skew amount from one end side to the other end side in the third direction (the direction of arrow Z). Further, in the continuous skew region 42, the maximum value of the skew amount for the first reference region 41 is set to one slot pitch (1 sp) of the plurality of (60) slots 21*c*. A straight line 52 indicates the skew position of the mover 30, and a reference position P_ref (e.g., a location coordinate PP is 3.75) at one end side in the third direction (the direction of arrow Z) is connected with a position separated from the reference position P_ref at the other end side in the third direction (the direction of arrow Z) by one slot pitch (1 sp) (in this case, a location coordinate PP is 4.75).

The regions illustrated in FIGS. 8B and 8C correspond to the areas surrounded by the broken lines of FIGS. 6A and 8A. Further, the reference position P_ref of the stator 20 illustrated in FIG. 8B coincides with the reference position P_ref of the mover 30 illustrated in FIG. 8C. Further, modified embodiments described below are appropriately described based on the drawings corresponding to FIGS. 8B and 8C. In this case, the foregoing description about the method illustrated in FIGS. 8B and 8C may be equally applied to the drawings to be described below.

First Modified Embodiment

This modified embodiment is different from the embodiment in that a stator 20 includes a first reference region 41 and a continuous skew region 42, and a mover 30 does not include the first reference region 41 and the continuous skew region 42. In this specification, a different point from that of the embodiment will be mainly described.

Figure 9A:
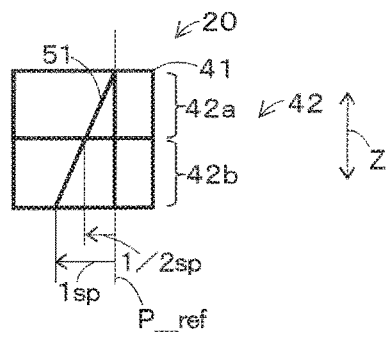
FIG. 9A is a schematic diagram illustrating an example of a state of skew of a stator 20 according to a first modified embodiment.

FIG. 9A illustrates an example of a state of skew of the stator 20. In this modified embodiment, the stator 20 includes the first reference region 41 and the continuous skew region 42. Accordingly, a skew position of the stator 20 is displaced according to the skew amount from one end side to the other end side in the third direction (the direction of arrow Z). Further, in the continuous skew region 42, the maximum value of the skew amount for the first reference region 41 is set to one slot pitch (1 sp) of a plurality of (60) slots 21*c*. A straight line 51 indicates a skew position of the stator 20, and a reference position P_ref at one end side in the third direction (the direction of arrow Z) and a position separated from a reference position P_ref at the other end side in the third direction (the direction of arrow Z) by one slot pitch (1 sp) are connected to each other.

In this modified embodiment, the continuous skew region 42 is gradually misaligned in another direction (the direction of arrow X2) of the first direction (the direction of arrow X) with respect to the first reference region 41 and is arranged in the third direction (the direction of arrow Z). Specifically, a plurality of electronic steel plates 21*x* that form a stator core 21 (the continuous skew region 42) is gradually misaligned in another direction (the direction of arrow X2) in the first direction (the direction of arrow X) with respect to one electronic steel plate 21*x* (the first reference region 41) that forms the stator core 21, and is arranged (stacked) in the third direction (the direction of arrow Z). Further, similarly to the embodiment, the continuous skew region 42 may also be misaligned in one direction (the direction of arrow X1) of the first direction (the direction of arrow X) with respect to the first reference region 41. In this case, the continuous skew region 42 is gradually misaligned in one direction (the direction of arrow X1) of the first direction (the direction of arrow X) with respect to the first reference region 41 and is arranged in the third direction (the direction of arrow Z).

Figure 9B:
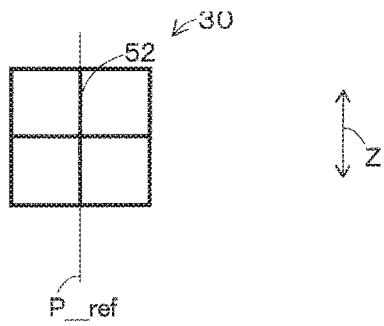
FIG. 9B is a schematic diagram illustrating an example of a state of skew of a mover 30 according to the first modified embodiment.

FIG. 9B illustrates an example of a state of skew of the mover 30. In this modified embodiment, the skew amount in the mover 30 is 0. Accordingly, a skew position of the mover 30 is formed in the third direction (the direction of arrow Z). A straight line 52 indicates a skew position of the stator 20 at a reference position P_ref, and one end side in the third direction (the direction of arrow Z) and the other end side in the third direction (the direction of arrow Z) are connected in the third direction (the direction of arrow Z).

According to the rotary electric apparatus 10 of this modified embodiment, the stator 20 includes the first reference region 41 and the continuous skew region 42. Further, in the continuous skew region 42, the maximum value of the skew amount for the first reference region 41 (one slot pitch (1 sp) in this modified embodiment) is set in such a manner that the maximum value of a relative skew amount between the stator 20 and the mover 30 is equal to one slot pitch (1 sp) of the plurality of (60) slots 21*c*. Accordingly, the rotary electric apparatus 10 of this modified embodiment may obtain the same effect as that described in the embodiment.

Second Modified Embodiment

This modified embodiment is different from the embodiment in that each of a stator 20 and a mover 30 includes a first reference region 41 and a continuous skew region 42. In this specification, a different point from that of the embodiment will be mainly described.

Figure 10A:
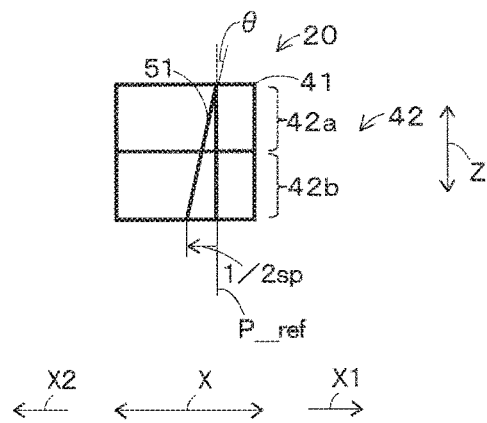
FIG. 10A is a schematic diagram illustrating an example of a state of skew of a stator 20 according to a second modified embodiment.

FIG. 10A illustrates an example of a state of skew of the stator 20. In this modified embodiment, the stator 20 includes the first reference region 41 and the continuous skew region 42. Accordingly, a skew position of the stator 20 is displaced according to the skew amount from one end side to the other end side in the third direction (the direction of arrow Z). Further, in the continuous skew region 42, the maximum value of the skew amount for the first reference region 41 is set to ½ slot pitch (½ sp) of a plurality of (60) slots 21c. A straight line 51 indicates a skew position of the stator 20, and a reference position P_ref at one end side in the third direction (the direction of arrow Z) and a position separated from a reference position P_ref at the other end side in the third direction (the direction of arrow Z) by ½ slot pitch (½ sp) are connected to each other.

Figure 10B:
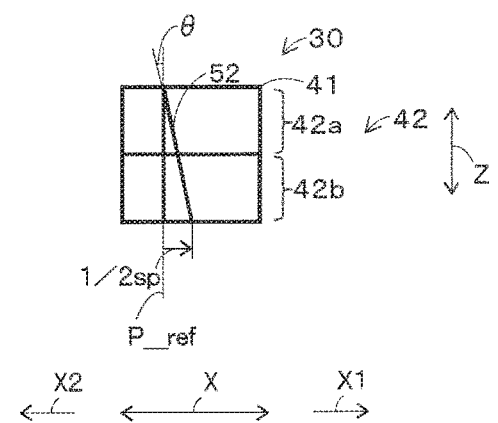
FIG. 10B is a schematic diagram illustrating an example of a state of skew of a mover 30 according to the second modified embodiment.

FIG. 10B illustrates an example of a state of skew of the mover 30. In this modified embodiment, the mover 30 includes the first reference region 41 and the continuous skew region 42. Accordingly, the skew position of the mover 30 is varied according to the skew amount from one end side to the other end side in the third direction (the direction of arrow Z). Further, in the continuous skew region 42, the maximum value of the skew amount for the first reference region 41 is set to ½ slot pitch (½ sp) of a plurality of (60) slots 21c. A straight line 52 indicates a skew position of the mover 30, and a reference position P_ref at one end side in the third direction (the direction of arrow Z) and a position separated from a reference position P_ref at the other end side in the third direction (the direction of arrow Z) by ½ slot pitch (½ sp) are connected to each other.

The continuous skew region 42 of the stator 20 is gradually misaligned in another direction (the direction of arrow X2) of the first direction (the direction of arrow X) with respect to the first reference region 41 and is arranged in the third direction (the direction of arrow Z). The maximum value of the skew amount for the first reference region 41 in this case is set to ½ slot pitch (½ sp) of the plurality of (60) slots 21c. In the meantime, the continuous skew region 42 of the mover 30 is gradually misaligned in one direction (the direction of arrow X1) of the first direction (the direction of arrow X) with respect to the first reference region 41 and is arranged in the third direction (the direction of arrow Z). The maximum value of the skew amount for the first reference region 41 in this case is set to ½ slot pitch (½ sp) of the plurality (60) of slots 21c. Accordingly, the relative skew amount between the stator 20 and the mover 30 is the largest at the other end side of the stator 20 and the mover 30 in the third direction (the direction of arrow Z), and the maximum value of the relative skew amount between the stator 20 and the mover 30 is one slot pitch (1 sp) of the plurality of (60) slots 21c.

As described above, when the continuous skew region 42 of one of the stator 20 and the mover 30 (in this modified embodiment, the mover 30) is misaligned in one direction (the direction of arrow X1) in the first direction (the direction of arrow X) with respect to the first reference region 41, the continuous skew region 42 of the other between the stator 20 and the mover 30 (in this modified embodiment, the stator 20) may be misaligned in another direction (the direction of arrow X2) in the first direction (the direction of arrow X) with respect to the first reference region 41. Further, the maximum value of the skew amount in the continuous skew region 42 of the stator 20 and the maximum value of the skew amount in the continuous skew region 42 of the mover 30 may be set to the same value (in this modified embodiment, ½ slot pitch (½ sp) of the plurality of (60) slots 21c).

Figure 11A:
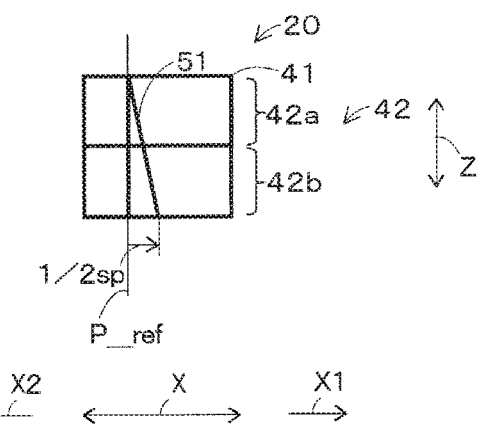
FIG. 11A is a schematic diagram illustrating an example of a state of skew of a stator 20 according to a first comparative embodiment.

FIG. 11A illustrates an example of a state of skew of a stator 20 in relation to a first comparative embodiment. In this comparative embodiment, a continuous skew region 42 of the stator 20 is gradually misaligned in one direction (the direction of arrow X1) of the first direction (the direction of arrow X) with respect to a first reference region 41 and is arranged in the third direction (the direction of arrow Z). The maximum value of the skew amount for the first reference region 41 in this case is set to ½ slot pitch (½ sp) of the plurality of (60) slots 21c. A straight line 51 indicates a skew position of the stator 20, and a reference position P_ref at one end side in the third direction (the direction of arrow Z) and a position separated from a reference position P_ref at the other end side in the third direction (the direction of arrow Z) by ½ slot pitch (½ sp) are connected to each other.

Figure 11B:
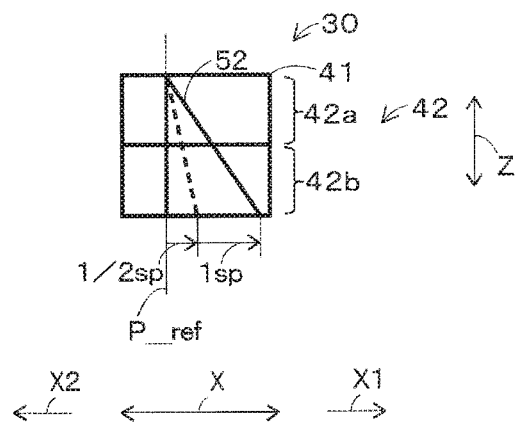
FIG. 11B is a schematic diagram illustrating an example of a state of skew of a mover 30 according to the first comparative embodiment.

FIG. 11B illustrates an example of a state of skew of a mover 30 in relation to the first comparative embodiment. In this comparative embodiment, a continuous skew region 42 of the mover 30 is gradually misaligned in one direction (the direction of arrow X1) of the first direction (the direction of arrow X) with respect to a first reference region 41 and is arranged in the third direction (the direction of arrow Z). The maximum value of the skew amount for the first reference region 41 in this case is set to 3/2 slot pitch (½ sp+1 sp) of the plurality of (60) slots 21c. A straight line 52 indicates a skew position of the mover 30, and a reference position P_ref at one end side in the third direction (the direction of arrow Z) and a position separated from a reference position P_ref at the other end side in the third direction (the direction of arrow Z) by 3/2 slot pitch (½ sp+1 sp) are connected to each other. Accordingly, the relative skew amount between the stator 20 and the mover 30 is the largest at the other end side of the stator 20 and the mover 30 in the third direction (the direction of arrow Z), and the maximum value of the relative skew amount between the stator 20 and the mover 30 is one slot pitch (1 sp) of the plurality of (60) slots 21c.

As described above, in the first comparative embodiment, in both the stator 20 and the mover 30, the continuous skew region 42 is misaligned in the same direction with respect to the first reference region 41 (in this case, one direction (the direction of arrow X1)) in the first direction (the direction of arrow X). Accordingly, the maximum value of the skew amount in the continuous skew region 42 of the mover 30 is set to 3/2 slot pitch (½ sp+1 sp) of the plurality of (60) slots 21c. That is, in the first comparative embodiment, the maximum value of the skew amount in the continuous skew region 42 of the mover 30 is increased compared to this modified embodiment and the embodiment.

According to the rotary electric apparatus 10 of this modified embodiment, each of the stator 20 and the mover 30 includes the first reference region 41 and the continuous skew region 42. Further, when the continuous skew region 42 of the mover 30 is misaligned in one direction (the direction of arrow X1) of the first direction (the direction of arrow X) with respect to the first reference region 41, the continuous skew region 42 of the stator 20 is misaligned in another direction (the direction of arrow X2) in the first direction (the direction of arrow X) with respect to the first reference region 41. Accordingly, the rotary electric apparatus 10 of this modified embodiment may decrease the skew amount compared to the case where the skew is performed on only one of the stator 20 and the mover 30. Further, in the rotary electric apparatus 10 of this modified embodiment, the continuous skew regions 42 and 42 of the stator 20 and the mover 30 are misaligned in a reverse direction in the first direction (the direction of arrow X), so that it is possible to suppress an increase of the skew amount compared to the case where the continuous skew regions 42 and 42 of the stator 20 and the mover 30 are misaligned in the same direction. Accordingly, the rotary electric apparatus 10 of this modified embodiment may suppress an increase in torque decrease due to an increase in the skew amount. Further, the rotary electric apparatus 10 of this modified embodiment may decrease a leakage magnetic flux by the decrease in skew amount. Further, the rotary electric apparatus 10 of this modified embodiment may also suppress deterioration of workability in a manufacturing process due to the increase in the skew amount.

The foregoing effect becomes conspicuous as the number of plurality of slots 21c of the stator 20 is decreased. As described above, in the rotary electric apparatus having a configuration of eight poles and 60 slots (the rotary electric apparatus having a basic configuration in which the number of magnetic poles of the mover 30 is two and the number of slots of the stator 20 is 15), one slot pitch (1 sp) corresponds to an electrical angle of 24° (=360°/15 slots). In the meantime, for example, in the rotary electric apparatus having a configuration of eight poles and 36 slots (the rotary electric apparatus having a basic configuration in which the number of magnetic poles of the mover 30 is two and the number of slots of the stator 20 is 9), one slot pitch (1 sp) corresponds to an electrical angle of 40° (=360°/9 slots). That is, in the rotary electric apparatus having the configuration of eight poles and 36 slots, the skew amount is increased compared to the rotary electric apparatus having the configuration of eight poles and 60 slots. The rotary electric apparatus 10 of this modified embodiment may decrease the skew amount compared to the case where the skew is performed on only one of the stator 20 and the mover 30, so that it is particularly appropriate to apply the rotary electric apparatus 10 of this modified embodiment to the rotary electric apparatus 10 having the less number of plurality of slots 21c of the stator 20.

The foregoing description may be equally applied to the case where when the continuous skew region 42 of the stator 20 is misaligned in one direction (the direction of arrow X1) of the first direction (the direction of arrow X) with respect to the first reference region 41, the continuous skew region 42 of the mover 30 is misaligned in another direction (the direction of arrow X2) of the first direction (the direction of arrow X) with respect to the first reference region 41. That is, when the continuous skew region 42 of one of the stator 20 and the mover 30 is misaligned in one direction (the direction of arrow X1) of the first direction (the direction of arrow X) with respect to the first reference region 41, the continuous skew region 42 of the other of the stator 20 and the mover 30 may be misaligned in another direction (the direction of arrow X2) of the first direction (the direction of arrow X) with respect to the first reference region 41.

Figure 12A:
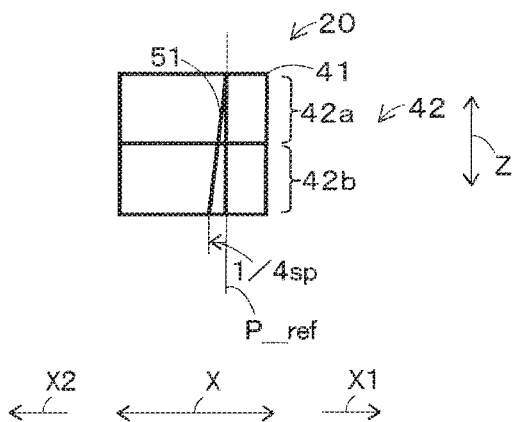
FIG. 12A is a schematic diagram illustrating an example of a state of skew of a stator 20 according to a second comparative embodiment.

FIG. 12A illustrates an example of a state of skew of a stator 20 according to a second comparative embodiment. In this comparative embodiment, a continuous skew region 42 of the stator 20 is gradually misaligned in another direction (the direction of arrow X2) of the first direction (the direction of arrow X) with respect to a first reference region 41 and is arranged in the third direction (the direction of arrow Z). The maximum value of the skew amount for the first reference region 41 in this case is set to ¼ slot pitch (¼ sp) of the plurality of (60) slots 21c. A straight line 51 indicates a skew position of the stator 20, and a reference position P_ref at one end side in the third direction (the direction of arrow Z) and a position separated from a reference position P_ref at the other end side in the third direction (the direction of arrow Z) by ¼ slot pitch (¼ sp) are connected to each other.

Figure 12B:
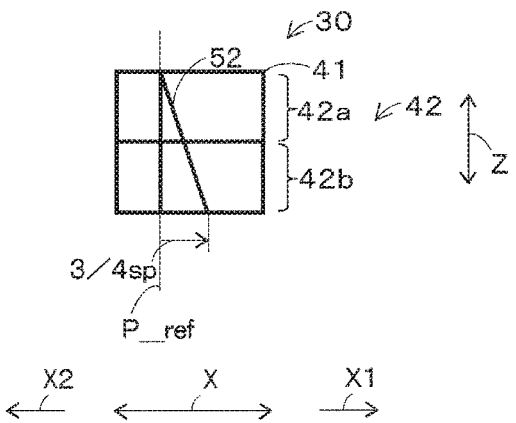
FIG. 12B is a schematic diagram illustrating an example of a state of skew of a mover 30 according to the second comparative embodiment.

FIG. 12B illustrates an example of a state of skew of a mover 30 according to the second comparative embodiment. In this comparative embodiment, a continuous skew region 42 of the mover 30 is gradually misaligned in one direction (the direction of arrow X1) of the first direction (the direction of arrow X) with respect to a first reference region 41 and is arranged in the third direction (the direction of arrow Z). The maximum value of the skew amount for the first reference region 41 in this case is set to ¾ slot pitch (¾ sp) of the plurality of (60) slots 21c. A straight line 52 indicates a skew position of the mover 30, and a reference position P_ref at one end side in the third direction (the direction of arrow Z) and a position separated from a reference position P_ref at the other end side in the third direction (the direction of arrow Z) by ¾ slot pitch (¾ sp) are connected to each other. Accordingly, the relative skew amount between the stator 20 and the mover 30 is the largest at the other end side of the stator 20 and the mover 30 in the third direction (the direction of arrow Z), and the maximum value of the relative skew amount between the stator 20 and the mover 30 is one slot pitch (1 sp) of the plurality of (60) slots 21c.

As described above, in the second comparative embodiment, the maximum value of the skew amount in the continuous skew region 42 of the stator 20 is different from the maximum value of the skew amount in the continuous skew region 42 of the mover 30. As a result, in this comparative embodiment, the skew amount in the continuous skew region 42 of the mover 30 is increased compared to this modified embodiment. When the skew amount in the continuous skew region 42 of the mover 30 is increased compared to the skew amount in the continuous skew region 42 of the stator 20, particularly, in the case where the permanent magnet (four sets of the pair of mover magnetic poles 32a and 32b) is a sintered magnet, there is a possibility in that workability deteriorates when the permanent magnet is mounted to the magnet accommodating portion of the mover core 31. Further, the skew amount in the continuous skew region 42 of the stator 20 may also be increased compared to the continuous skew region 42 of the mover 30. In this case, there is a possibility in that workability deteriorates when the stator winding 22 is assembled with the plurality of (60) slots 21c of the stator core 21.

According to the rotary electric apparatus 10 of this modified embodiment, the maximum value of the skew amount in the continuous skew region 42 of the stator 20 and the maximum value of the skew amount in the continuous skew region 42 of the mover 30 are set to ½ slot pitch (½ sp) having the same number of (the plural number, 60) slots 21c. Accordingly, the rotary electric apparatus 10 of this modified embodiment, it is possible to evenly distribute the skew amount in both of the stator 20 and the mover 30, so that it is possible to proportionally divide complication of the manufacturing of the stator 20 and the mover 30 accompanying the skew and improve workability in a manufacturing process.

As illustrated in FIG. 10A, an angle formed by the straight line along the third direction (the direction of arrow Z) and the straight line 51 is defined as a skew inclination angle θ. As illustrated in FIG. 10B, the same is applied to an angle formed by the straight line along the third direction (the direction of arrow Z) and the straight line 52. By a difference in the physique of the rotary electric apparatus 10, even when the skew amount is the same, the skew inclination angle θ is different. That is, even when the stator core 21 has the same inner diameter (the dimension in the second direction (the direction of arrow Y) is the same) and the mover core 31 has the same outer diameter (the dimension in the second direction (the direction of arrow Y) is the same), when an axial length (the dimension in the third direction (the direction of arrow Z)) is increased, the skew inclination angle θ is decreased and magnetic leakage in the axial direction (the third direction (the direction of arrow Z)) and manufacturing complexity are decreased. Further, even when the skew amount is the same, there is a case where manufacturing difficulty is different according to the configuration and the structure of each of the stator 20 and the mover 30. Considering the foregoing comprehensively, it is possible to increase the skew amount on the side having less complexity in manufacturing between the stator 20 and the mover 30 and reduce the skew amount on the side having more manufacturing complexity between the stator 20 and the mover 30. As described above, according to the physique, a desired specification, and the like of the rotary electric apparatus 10, the maximum value of the skew amount for the first reference region 41 of the continuous skew region 42 of the stator 20 and the maximum value of the skew amount for the first reference region 41 of the continuous skew region 42 of the mover 30 may be appropriately set in such a manner that the maximum value of the relative skew amount between the stator 20 and the mover 30 is one slot pitch (1 sp) of the plurality of (60) slots 21c.

Third Modified Embodiment

This modified embodiment is different from the embodiment in that a stator 20 includes a first reference region 41 and a continuous skew region 42, and a mover 30 includes a second reference region 43 and a step skew region 44. In this specification, a different point from that of the embodiment will be mainly described.

Figure 13A:
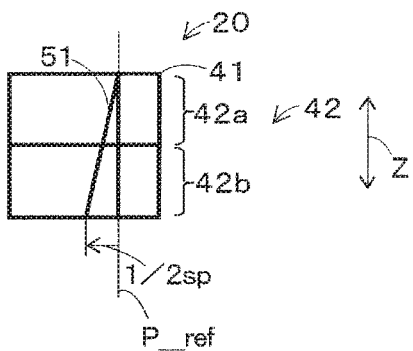
FIG. 13A is a schematic diagram illustrating an example of a state of skew of a stator 20 according to a third modified embodiment.

FIG. 13A illustrates an example of a state of skew of a stator 20. In this modified embodiment, the stator 20 includes a first reference region 41 and a continuous skew region 42. Accordingly, a skew position of the stator 20 is displaced according to the skew amount from one end side to the other end side in the third direction (the direction of arrow Z). The continuous skew region 42 is gradually misaligned in another direction (the direction of arrow X2) of the first direction (the direction of arrow X) with respect to the first reference region 41 and is arranged in the third direction (the direction of arrow Z). The maximum value of the skew amount for the first reference region 41 in this case is set to ½ slot pitch (½ sp) of the plurality of (60) slots 21c. A straight line 51 indicates a skew position of the stator 20, and a reference position P_ref at one end side in the third direction (the direction of arrow Z) and a position separated from a reference position P_ref at the other end side in the third direction (the direction of arrow Z) by ½ slot pitch (½ sp) are connected to each other.

Figure 13B:
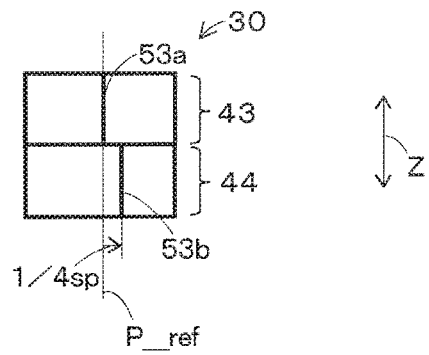
FIG. 13B is a schematic diagram illustrating an example of a state of skew of a mover 30 according to the third modified embodiment.

FIG. 13B illustrates an example of a state of skew of a mover 30. In this modified embodiment, the mover 30 has a second reference region 43 and a step skew region 44. The second reference region 43 is a reference region and refers to a region serving as a reference of the skew. The step skew region 44 is a skew region, and refers to a region which is misaligned in a step shape in the first direction (the direction of arrow X) with respect to the second reference region 43 and is arranged in the third direction (the direction of arrow Z). In this modified embodiment, the step skew region 44 is misaligned in a step shape (one step) in one direction (the direction of arrow X1) of the first direction (the direction of arrow X) with respect to the second reference region 43 and is arranged in the third direction (the direction of arrow Z). As described above, in the modified embodiment, the reference region includes the first reference region 41 and the second reference region 43, and the skew region includes the continuous skew region 42 and the step skew region 44. Further, in this modified embodiment as well, the reference position P_ref of the stator 20 (the reference position of the first reference region 41) coincides with the reference position P_ref of the mover 30 (the reference position of the second reference region 43).

The skew amount for the second reference region 43 in the step skew region 44 is set to be a half of the maximum value of the skew amount for the first reference region 41 in the continuous skew region 42. As described above, in this modified embodiment, the maximum value of the skew amount for the first reference region 41 in the continuous skew region 42 of the stator 20 is set to ½ slot pitch (½ sp) of the plurality of (60) slots 21c. Accordingly, the skew amount for the second reference region 43 in the step skew region 44 of the mover 30 is set to ¼ slot pitch (¼ sp) of the plurality of (60) slots 21c. Accordingly, the relative skew amount between the stator 20 and the mover 30 is the largest at the other end side of the stator 20 and the mover 30 in the third direction (the direction of arrow Z), and the maximum value of the relative skew amount between the stator 20 and the mover 30 (which is the substantial maximum value, the continuous skew conversion) is one slot pitch (1 sp) of the plurality of (60) slots 21c.

Figure 13C:
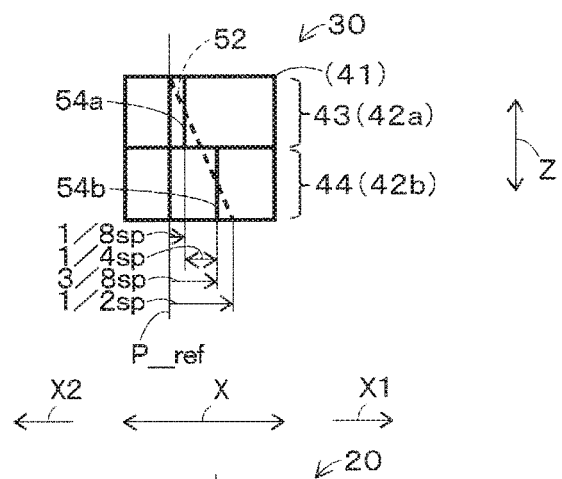
FIG. 13C is a schematic diagram illustrating a method of converting the amounts of skew of a continuous skew region 42 and a step skew region 44.

FIG. 13C illustrates a method of converting the amounts of skew of the continuous skew region 42 and the step skew region 44. In this modified embodiment, the continuous skew region 42 of the stator 20 is gradually misaligned in another direction (the direction of arrow X2) of the first direction (the direction of arrow X) with respect to the first reference region 41 and is arranged in the third direction (the direction of arrow Z). The maximum value of the skew amount for the first reference region 41 in this case is set to ½ slot pitch (½ sp) of the plurality (60) of slots 21c. Accordingly, when the mover 30 includes the first reference region 41 and the continuous skew region 42, the continuous skew region 42 of the mover 30 may be gradually misaligned in one direction (the direction of arrow X1) of the first direction (the direction of arrow X) with respect to the first reference region 41 and be arranged in the third direction (the direction of arrow Z) as already described in the second modified embodiment. Further, the maximum value of the skew amount for the first reference region 41 in this case may be set to ½ slot pitch (½ sp) of the plurality of (60) slots 21c. A straight line 52 illustrated in FIG. 13C indicates a virtual skew position in the case where the mover 30 includes the first reference region 41 and the continuous skew region 42.

The maximum value (in this case, ½ slot pitch (½ sp) of the plurality of (60) slots 21) of the skew amount for the first reference region 41 in the continuous skew region 42 is converted to the skew amount for the second reference region 43 in the step skew region 44. As illustrated in FIG. 13C, a center position 54a of the continuous skew in a first continuous skew region 42a (corresponding to the second reference region 43 of the step skew) corresponds to a position moved by ⅛ slot pitch (⅛ sp) of the plurality of (60) slots 21c in one direction (the direction of arrow X1) of the first direction (the direction of arrow X) from the reference position P_ref. Further, a center position 54b of the continuous skew in a second continuous skew region 42b (corresponding to the step skew region 44 of the step skew)

corresponds to a position shifted by ⅜ slot pitch (⅜ sp) of the plurality of (60) slots 21c in one direction (the direction of arrow X1) of the first direction (the direction of arrow X) from the reference position P_ref.

The difference between the center position 54a of the first continuous skew region 42a and the center position 54b of the second continuous skew region 42b (in this case, ¼ slot pitch (¼ sp) of the plurality of (60) slots 21c) becomes the skew amount for the second reference region 43 in the step skew region 44. Further, when the center position 54a of the first continuous skew region 42a is moved by ⅛ slot pitch (⅛ sp) of the plurality (60) of slots 21c in another direction (the direction of arrow X2) of the first direction (the direction of arrow X), the center position 54a coincides with the reference position P_ref which is illustrated as a center position 53a of the second reference region 43 in FIG. 13B. Further, when the center position 54b of the second continuous skew region 42b is moved by ⅛ slot pitch (⅛ sp) of the plurality (60) of slots 21c in another direction (the direction of arrow X2) of the first direction (the direction of arrow X), the center position 54b coincides with a center position 53b of the step skew region 44 in FIG. 13B.

According to the rotary electric apparatus 10 of this modified embodiment, the stator 20 includes the first reference region 41 and the continuous skew region 42, and the mover 30 includes the second reference region 43 and the step skew region 44. Further, the skew amount for the second reference region 43 in the step skew region 44 may be set to a half of the maximum value of the skew amount for the first reference region 41 in the continuous skew region 42 (in this modified embodiment, ¼ slot pitch (¼ sp) of the plurality of (60) slots 21c). Accordingly, the rotary electric apparatus 10 of this modified embodiment may decrease the complexity of the manufacturing process of the stator 20 and the mover 30 accompanying the skew, and improve workability in the manufacturing process. Specifically, in consideration of workability when the stator winding 22 is assembled with the plurality of (60) slots 21c of the stator core 21, the stator 20 may include the continuous skew region 42, instead of the step skew region 44. In the meantime, in the case where the permanent magnet (four sets of the pair of mover magnetic poles 32a and 32b) is a sintered magnet, in consideration of workability when the permanent magnet is mounted to the magnet accommodating portion of the mover core 31, the mover 30 may include the step skew region 44, instead of the continuous skew region 42. By the foregoing configuration, the rotary electric apparatus 10 of this modified embodiment may improve workability in the manufacturing process in both of the stator 20 and the mover 30.

The continuous skew region 42 of the stator 20 may be gradually misaligned in one direction (the direction of arrow X1) of the first direction (the direction of arrow X) with respect to the first reference region 41 and be arranged in the third direction (the direction of arrow Z). In this case, the step skew region 44 of the mover 30 may be misaligned in a step shape (one step) in another direction (the direction of arrow X2) of the first direction (the direction of arrow X) with respect to the second reference region 43 and be arranged in the third direction (the direction of arrow Z). That is, when the continuous skew region 42 of the stator 20 is misaligned in one direction (the direction of arrow X1) of the first direction (the direction of arrow X) with respect to the first reference region 41, the step skew region 44 of the mover 30 may be misaligned in another direction (the direction of arrow X2) of the first direction (the direction of arrow X) with respect to the second reference region 43. Accordingly, the same effect as the already described effect may be obtained in the second modified embodiment.

The step skew region 44 may be misaligned in a step shape (a plurality of steps) in the first direction (the direction of arrow X) with respect to the second reference region 43 and be arranged in the third direction (the direction of arrow Z). In this case as well, similarly to the case of one step illustrated in FIG. 13C, the skew amount for the second reference region 43 at each step of the step skew region 44 may be converted by making each center position of the continuous skew coincide with each center position of the step skew.

As illustrated in the embodiment and the modified embodiment, at least one of the stator 20 and the mover 30 includes the reference regions which serve as the reference of the skew (the first reference region 41 and the second reference region 43), and the skew regions which are misaligned in the first direction (the direction of arrow X) with respect to the reference regions (the first reference region 41 and the second reference region 43) and are arranged in the third direction (the direction of arrow Z) (the continuous skew region 42 and the step skew region 44). In the skew regions (the continuous skew region 42 and the step skew region 44), the maximum values of the skew amounts for the reference regions (the first reference region 41 and the second reference region 43) are set in such a manner than the maximum value of the relative skew amount between the stator 20 and the mover 30 is one slot pitch (1 sp) of the plurality of (60) slots 21c. Further, in any of the foregoing embodiments, in the continuous skew region 42, an increasing rate or a decreasing rate of the skew amount for the first reference region 41 may be set to be constant from one end side to the other end side in the third direction (the direction of arrow Z). Accordingly, the same effect as that described in the embodiment may be obtained. Further, at least one of the stator 20 and the mover 30 may have the form which includes the second reference region 43 and the step skew region 44, but does not include the first reference region 41 and the continuous skew region 42.

Fourth Modified Embodiment

This modified embodiment is different from the first modified embodiment in that a first reference region 41 includes a first reference region 41a at one end side in the third direction and a first reference region 41b at the other end side in the third direction, and a continuous skew region 42 includes a continuous skew region 45a at one end side in the third direction and a continuous skew region 45b at the other end side in the third direction. In this specification, a different point from that of the embodiment will be mainly described.

Figure 14A:
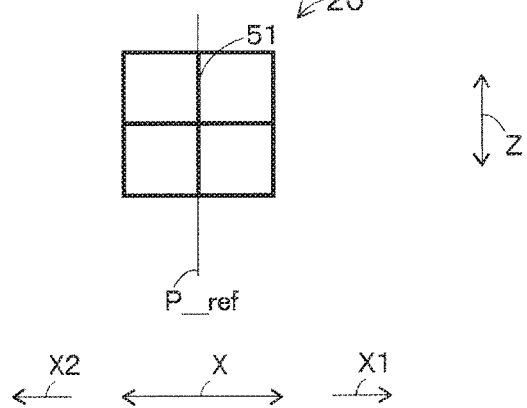
FIG. 14A is a schematic diagram illustrating an example of a state of skew of a stator 20 according to a fourth modified embodiment.

FIG. 14A illustrates an example of a state of skew of the stator 20. In this modified embodiment, the skew amount in the stator 20 is 0. Accordingly, a skew position of the stator 20 is formed along the third direction (the direction of arrow Z). A straight line 51 indicates a skew position of the stator 20 at a reference position P_ref, and one end side in the third direction (the direction of arrow Z) and the other end side in the third direction (the direction of arrow Z) are connected along the third direction (the direction of arrow Z).

Figure 14B:
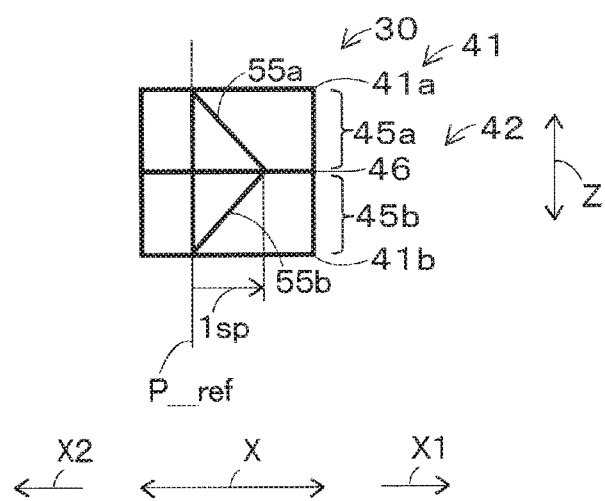
FIG. 14B is a schematic diagram illustrating an example of a state of skew of a mover 30 according to the fourth modified embodiment.

FIG. 14B illustrates an example of a state of skew of a mover 30. In this modified embodiment as well, the mover 30 includes a first reference region 41 and a continuous skew region 42. However, in this modified embodiment, the first reference region 41 includes a first reference region 41a at one end side in the third direction and a first reference region 41b at the other end side in the third direction. The first reference region 41a at one end side in the third direction refers to the first reference region 41 installed at one end side in the third direction (the direction of arrow Z). The first reference region 41b at the other end side in the third direction refers to the first reference region 41 installed at the other end side in the third direction (the direction of arrow Z).

The continuous skew region 42 includes a continuous skew region 45a at one end side in the third direction and a continuous skew region 45b at the other end side in the third direction. The continuous skew region 45a at one end side in the third direction refers to a region in which a region of a half of one end side in the third direction (the direction of arrow Z) is gradually misaligned in one direction (the direction of arrow X1) of the first direction (the direction of arrow X) from the first reference region 41a at one end side in the third direction and is arranged up to a center portion 46 in the third direction (the direction of arrow Z). The continuous skew region 45b at the other end side in the third direction refers to a region in which a region of a half of the other end side in the third direction (the direction of arrow Z) is gradually misaligned in another direction (the direction of arrow X2) of the first direction (the direction of arrow X) from the center portion 46 and is arranged up to the first reference region 41b at the other end side in the third direction (the direction of arrow Z). Further, in the modified embodiment as well, a reference position P_ref of the stator 20 and a reference position P_ref of the mover 30 (a reference position of the first reference region 41a at one end side in the third direction and a reference position of the first reference region 41b at the other end side in the third direction) coincide with each other.

In the continuous skew region 45a at one end side in the third direction, the maximum value of the skew amount for the first reference region 41a at one end side in the third direction is set to one slot pitch (1 sp) of a plurality of (60) slots 21c. A straight line 55a indicates a skew position of the mover 30, and a reference position P_ref at one end side in the third direction (the direction of arrow Z) and a position separated from a reference position P_ref of the center portion 46 in the third direction (the direction of arrow Z) by one slot pitch (1 sp) are connected to each other. Similarly, in the continuous skew region 45b at the other end side in the third direction, the maximum value of the skew amount for the first reference region 41b at the other end side in the third direction is set to one slot pitch (1 sp) of a plurality of (60) slots 21c. A straight line 55b indicates a skew position of the mover 30, and a position separated from a reference position P_ref of the center portion 46 in the third direction (the direction of arrow Z) by one slot pitch (1 sp) and a reference position P_ref at the other end side in the third direction (the direction of arrow Z) are connected to each other. Accordingly, the relative skew amount between the stator 20 and the mover 30 becomes the largest in the center portions 46 of the stator 20 and the mover 30 in the third direction (the direction of arrow Z), and the maximum value of the relative skew amount between the stator 20 and the mover 30 is one slot pitch (1 sp) of the plurality of (60) slots 21c.

According to the rotary electric apparatus 10 of this modified embodiment, the mover 30 includes the first reference region 41 and the continuous skew region 42. The first reference region 41 includes the first reference region 41a at one end side in the third direction and the first reference region 41b at the other end side in the third direction. The continuous skew region 42 includes the continuous skew region 45a at one end side in the third direction and the continuous skew region 45b at the other end side in the third direction. Further, the maximum value (in this modified embodiment, one slot pitch (1 sp) of the plurality of (60) slots) of the skew amount for the first reference region 41 (the first reference region 41a at one end side in the third direction and the first reference region 41b at the other end side in the third direction) is set in such a manner that the maximum value of the relative skew amount between the stator 20 and the mover 30 is one slot pitch (1 sp) of the plurality of (60) slots 21c. Accordingly, the rotary electric apparatus 10 of this modified embodiment may obtain the same effect as that described in the embodiment.

In the continuous skew region 45a at one end side in the third direction, an increasing rate of the skew amount for the first reference region 41a at one end side in the third direction may be set to be constant from one end side to the center portion 46 in the third direction (the direction of arrow Z), and in the continuous skew region 45b at the other end side in the third direction, a decreasing rate of the skew amount for the first reference region 41b at the other end side in the third direction may be set to be constant from the center portion 46 to the other end side in the third direction (the direction of arrow Z). Further, an absolute value of the increasing rate of the skew amount may be set to be the same as an absolute value of the decreasing rate of the skew amount. Accordingly, it is possible to decrease a leakage magnetic flux compared to the case where the skew amount for the first reference region 41 (the first reference region 41a at one end side in the third direction and the first reference region 41b at the other end side in the third direction) is discontinuously changed. Further, it is also possible to simplify a manufacturing process.

Since in the rotary electric apparatus 10 of this modified embodiment, the continuous skew region 42 includes the continuous skew region 45a at one end side in the third direction and the continuous skew region 45b at the other end side in the third direction, symmetry in the third direction (the direction of arrow Z) is secured, thereby decreasing torsional resonance. Further, in the case where a permanent magnet (four sets of the pair of mover magnetic poles 32a and 32b) is a sintered magnet, there is a possibility in that workability deteriorates when the permanent magnet is mounted to a magnet accommodating portion of a mover core 31. In this case, the permanent magnet may be bisectioned and divided along the first direction (the direction of arrow X) by a plane perpendicular to the third direction (the direction of arrow Z). The deterioration of the workability may be decreased by mounting one divided side of the permanent magnet from one end side in the third direction (the direction of arrow Z) and mounting the other divided side of the permanent magnet from the other end side in the third direction (the direction of arrow Z).

In this modified embodiment, a distance of the spaced region in the third direction (the direction of arrow Z) (the region spaced by ½ slot pitch (½ sp) in the first direction (the direction of arrow X)), which has been already described in the embodiment, is approximately halved compared to that of the embodiment. Accordingly, in this modified embodiment, the making of the attractive force distribution be high-ordered is more effectively achieved. Further, this modified embodiment is also appropriate to the case where axial lengths of the stator 20 and the mover 30 (the dimensions in the third direction (the direction of arrow Z)) are increased. Further, the configuration of this modified embodiment may be repeatedly used in the third direction (the direction of arrow Z). Further, in the continuous skew region 42, the region, which is gradually misaligned in one direction (the direction of arrow X1) of the first direction (the direction of arrow X), and the region, which is gradually misaligned in another direction (the direction of arrow X2) of the first direction (the direction of arrow X), do not need to have the same number. The number may be appropriately selected according to the size, a required specification, and the like of the rotary electric apparatus 10. Further, in the configuration of the embodiment, in order to obtain the same effect, multiple skew in which the configuration of the embodiment is repeated in the third direction (the direction of arrow Z) may be considered. However, in this case, a discontinuous portion is generated in the first direction (the direction of arrow X) between the skews of the multiple skew, so that magnetic leakage occurs and the deterioration of output torque and the like are generated, and thus the multiple skew is not preferable.

<Noise and Vibration of the Rotary Electric Apparatus 10 Caused by Phase Disposition of the Stator Winding 22>

Figure 15:
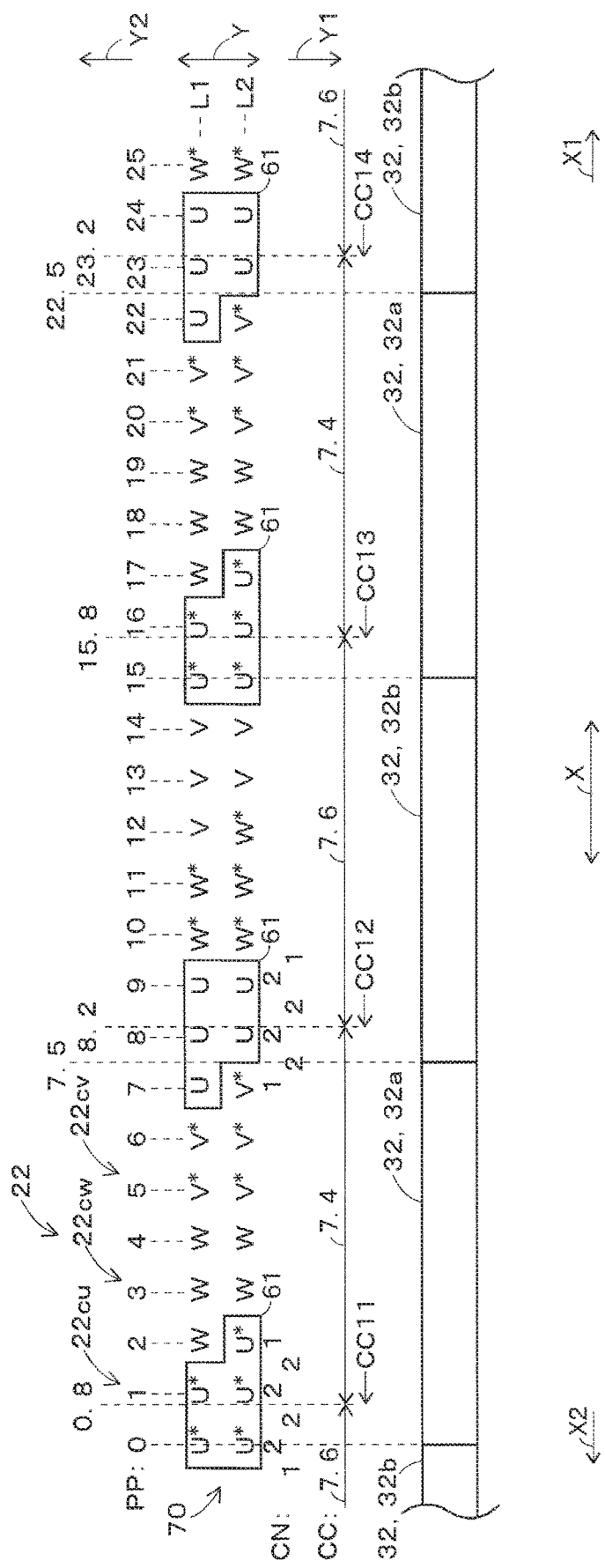
FIG. 15 is a schematic diagram illustrating an example of a phase disposition of a stator winding 22 according to the reference embodiment.

FIG. 15 illustrates an example of a phase disposition of a stator winding 22 according to the reference embodiment. The rotary electric apparatus 10 of the reference embodiment is the rotary electric apparatus having the configuration of eight poles and 60 slots (the rotary electric apparatus having a basic configuration in which the number of magnetic poles of the mover 30 is two and the number of slots of the stator 20 is 15), identically to the rotary electric apparatus 10 of this embodiment. Further, the rotary electric apparatus 10 of the reference embodiment is the three-phase apparatus identically to the rotary electric apparatus 10 of this embodiment, and the stator core 22 includes a plurality of (three) phase coils 22c. The plurality of (three) phase coils 22c include a U phase coil 22cu, a V phase coil 22cv, and a W phase coil 22cw. The U phase coil 22cu, the V phase coil 22cv, and the W phase coil 22cw are misaligned in phase by 120° in terms of an electrical angle, and it is assumed that the phases are delayed in the order of the U phase coil 22cu, the V phase coil 22cv, and the W phase coil 22cw.

FIG. 15 illustrates the phase (U phase, V phase, or W phase) of the plurality of (26 per one layer, a total of 52) coil sides 22a accommodated in the plurality of (26) slots 21c. Further, the number (a coil side number CN) of coil sides 22a is defined for convenience in order to explain the distribution of the coil side 22a for each phase (U phase, V phase, or W phase), and does not represent the number of actual coil sides 22a (the number of actual windings). Further, in FIG. 15, an electrical conduction direction of the coil side 22a is represented by the presence or the absence of an asterisk. Specifically, in the phase to which the asterisk is attached (e.g., U*), an electrical conduction direction of the coil side 22a is set to an inverse direction with respect to the phase to which the asterisk is not attached (e.g., U). In the rotary electric apparatus 10 of this reference embodiment, the number Nspp of slots per every pole and per every phase is 2.5, identically to the rotary electric apparatus 10 of this embodiment. Accordingly, the in-phase number adjacent in the first direction (the direction of arrow X) is alternately repeated between 2 and 3 in each layer of a first layer L1 and a second layer L2.

The location coordinate PP indicates the position of the plurality of (26) slots 21c in the first direction (the direction of arrow X). The location coordinate PP is set for convenience of the description, and it is possible to specify the position of the plurality of (26 per one layer, a total of 52) coil sides 22a in the first direction (the direction of arrow X). Further, in FIG. 15, the plurality of (three) mover magnetic poles 32 (mover magnetic poles 32a, 32b, and 32a) are also indicated.

Here, a set of the plurality of (in this reference embodiment, five) coil sides 22a in which the in-phase current direction accommodated in the plurality of (in this reference embodiment, three) slots 21c continuously adjacent in the first direction (the direction of arrow X) are the same as a one phase band 61. For example, a set of the plurality of (five) coil sides 22a (in FIG. 15, indicated by U*) of the U phase accommodated in the plurality of (three) slots 21c which have the location coordinates PP of 0, 1, and 2 is the one phase band 61. In FIG. 15, the plurality of (five) coil sides 22a configuring one phase band 61 of the U phase are surrounded and clearly indicated, but the one phase band 61 is equally configured in the V phase and the W phase.

A center of the one phase band 61 calculated by adding the disposition of the plurality of (in this reference embodiment, five) coil sides 22a configuring the one phase band 61 and both sides of the position of the plurality of (five) coil sides 22a in the first direction (the direction of arrow X) is a coil side center CC of the one phase band 61. For example, the plurality of (two) coil sides 22a (in FIG. 15, indicated by two U*s) of the U phase are accommodated in the slot 21c which has the location coordinate PP of 0. Further, the plurality of (two) coil sides 22a (in FIG. 15, indicated by two U*s) of the U phase are accommodated in the slot 21c which has the location coordinate PP of 1. Further, one coil side 22a (in FIG. 15, indicated by one U*) of the U phase is accommodated in the slot 21c which has the location coordinate PP of 2. Accordingly, a coil side center CC11 of the one phase band 61 of the U phase formed in the plurality of (three) slots 21c which have the location coordinates PP of 0, 1, and 2 may be calculated, for example, by Equation 1 below, and the coil side center CC11 is 0.8.

$$CC11=(0\times2+1\times2+2\times1)/(2+2+1)=0.8 \quad \text{(Equation 1)}$$

One coil side 22a (in FIG. 15, indicated by one U) of the U phase is accommodated in the slot 21c which has the location coordinate PP of 7. Further, the plurality of (two) coil sides 22a (in FIG. 15, indicated by two Us) of the U phase are accommodated in the slot 21c which has the location coordinate PP of 8. Further, the plurality of (two) coil sides 22a (in FIG. 15, indicated by two Us) of the U phase are accommodated in the slot 21c which has the location coordinate PP of 9. Accordingly, a coil side center CC12 of the one phase band 61 of the U phase formed in the plurality of (three) slots 21c which have the location coordinates PP of 7, 8, and 9 may be calculated, for example, by Equation 2 below, and the coil side center CC12 is 8.2.

$$CC12=(7\times1+8\times2+9\times2)/(1+2+2)=8.2 \quad \text{(Equation 2)}$$

The plurality of (two) coil sides 22a of the U phase (in FIG. 15, indicated by two U*s) are accommodated in the slot 21c which has the location coordinate PP of 15. Further, the plurality of (two) coil sides 22a of the U phase (in FIG. 15, indicated by two U*s) are accommodated in the slot 21c which has the location coordinate PP of 16. Further, one coil side 22a of the U phase (in FIG. 15, indicated by one U*) is accommodated in the slot 21c which has the location coordinate PP of 17. Accordingly, a coil side center CC13 of the one phase band 61 of the U phase formed in the plurality of (three) slots 21c which have the location coordinates PP of 15, 16, and 17 may be calculated, for example, by Equation 3 below, and the coil side center CC13 is 15.8.

$$CC13=(15\times2+16\times2+17\times1)/(2+2+1)=15.8 \quad \text{(Equation 3)}$$

One coil side 22a of the U phase (in FIG. 15, indicated by one U) is accommodated in the slot 21c which has the location coordinate PP of 22. Further, the plurality of (two)

coil sides 22a of the U phase (in FIG. 15, indicated by two Us) are accommodated in the slot 21c which has the location coordinate PP of 23. Further, the plurality of (two) coil sides 22a of the U phase (in FIG. 15, indicated by two Us) are accommodated in the slot 21c which has the location coordinate PP of 24. Accordingly, a coil side center CC14 of the one phase band 61 of the U phase formed in the plurality of (three) slots 21c which have the location coordinates PP of 22, 23, and 24 may be calculated, for example, by Equation 4 below, and the coil side center CC14 is 23.2.

$$CC14=(22\times1+23\times2+24\times2)/(1+2+2)=23.2 \quad \text{(Equation 4)}$$

From the calculation result, a distance between the coil side center CC11 of the one phase band 61 of the U phase and the coil side center CC12 is 7.4 (=8.2−0.8). Further, a distance between the coil side center CC12 of the one phase band 61 of the U phase and the coil side center CC13 is 7.6 (=15.8−8.2). Further, a distance between the coil side center CC13 of the one phase band 61 of the U phase and the coil side center CC14 is 7.4 (=23.2−15.8). As described above, the distance between the coil side centers CC of the one phase band 61 of the in-phase (U phase) adjacent in the first direction (the direction of arrow X) is alternately repeated between 7.4 and 7.6. Accordingly, the distance between the coil side centers CC of the one phase bands 61 of the in-phase (U phase) adjacent in the first direction (the direction of arrow X) is not equal at every pole of the plurality of (eight) mover magnetic poles 32, but is equal in every one magnetic pole pair.

In the meantime, the number of (the coil side number CN) plurality of coil sides 22a configuring the one phase band 61 of the U phase is a total of five, and a magnitude of magnetomotive force generated by the plurality of coil sides 22a configuring the one phase band 61 is equal at every pole of the plurality of (eight) mover magnetic poles 32. As described above, in this specification, a coil in which the magnitude of the magnetomotive force generated by the plurality of coil sides 22a configuring the one phase band 61 is equal at every pole of the plurality (eight) of mover magnetic poles 32 is defined as a basic coil 70. As illustrated in FIG. 3, the stator winding 22 of this reference embodiment includes one basic coil 70.

In this specification, a width of a distribution of the plurality of (in this reference embodiment, five) coil sides 22a configuring the one phase band 61 in the first direction (the direction of arrow X) is referred to as a coil side distribution width. As is apparent from FIG. 15, the coil side distribution width of this reference embodiment is three slots in each pole. Further, in this specification, a substantial coil side distribution width based on the plurality of (eight) mover magnetic poles 32 is defined as an effective coil side distribution width. For example, an equivalent position based on the plurality of (eight) mover magnetic poles 32 of the plurality of (two) coil sides 22a of the U phase accommodated in the slot 21c, which has the location coordinate PP of 0 (in FIG. 15, indicated by two U*s), is a position which has a location coordinate of 7.5. Further, an equivalent position based on the plurality of (eight) mover magnetic poles 32 of the plurality of (two) coil sides 22a of the U phase accommodated in the slot 21c, which has the location coordinate PP of 1 (in FIG. 15, indicated by two U*s), is a position which has a location coordinate of 8.5. Further, an equivalent position based on the plurality of (eight) mover magnetic poles 32 of one coil side 22a of the U phase accommodated in the slot 21c, which has the location coordinate PP of 2 (in FIG. 15, indicated by one U*), is a position which has a location coordinate of 9.5.

That is, the effective coil side distribution width is 3.5 slots from the location coordinate PP of 7 to the location coordinate PP of 9.5.

In contrast, an equivalent position based on the plurality of (eight) mover magnetic poles 32 of one coil side 22a of the U phase accommodated in the slot 21c, which has the location coordinate PP of 7 (in FIG. 15, indicated by two U*s), is a position which has a location coordinate of −0.5. Further, an equivalent position based on the plurality of (eight) mover magnetic poles 32 of the plurality of (two) coil sides 22a of the U phase accommodated in the slot 21c, which has the location coordinate PP of 8 (in FIG. 15, indicated by two Us), is a position which has a location coordinate of 0.5. Further, an equivalent position based on the plurality of (eight) mover magnetic poles 32 of the plurality of (two) coil sides 22a of the U phase accommodated in the slot 21c, which has the location coordinate PP of 9 (in FIG. 15, indicated by two Us), is a position which has a location coordinate of 1.5. That is, the effective coil side distribution width is 3.5 slot from the location coordinate PP of −0.5 to the location coordinate PP of 2. As described above, in the ½ series rotary electric apparatus 10, in the one phase bands 61 of the in-phase (U phase) adjacent in the first direction (the direction of arrow X), the equivalent position based on the plurality of (eight) mover magnetic poles 32 is misaligned by ½ slot. The number in the vicinity of the one phase band 61 of the U phase illustrated in FIG. 15 indicates the equivalent position describing the number of (the coil side number CN) the plurality of coil sides 22a configuring the one phase band 61 of the U phase.

The number of (the coil side number CN) the plurality of coil sides 22a configuring the one phase band 61 of the U phase is equal at every pole of the plurality of (eight) mover magnetic poles 32, so that a magnitude of the magnetomotive force generated when the stator winding 22 is electrically conducted is equal at every pole of the plurality of (eight) mover magnetic poles 32. However, the distance between the coil side centers CC of the one phase bands 61 of the in-phase (U phase) adjacent in the first direction (the direction of arrow X) is alternately repeated between 7.4 and 7.6, so that the magnetomotive force distribution is not equivalent at every one magnetic pole of the plurality of (eight) mover magnetic poles 32, but is equivalent at every other magnetic pole for every magnetic pole pair. That is, the ½ series rotary electric apparatus 10 has the two kinds of magnetomotive force distribution.

The two kinds of magnetomotive force distribution generates the magnetomotive force of a lower order than the order (in this reference embodiment, the fourth-order spatial deformation mode) based on the number of magnetic poles of the mover 30 (in this reference embodiment, eight), for the stator core 21. Accordingly, in the rotary electric apparatus 10 with a wide range of the number of driving rotation, the number of rotation that coincides with the unique number of vibrations of the stator core 21 is likely to occur within the range of the number of driving rotation. As a result, resonance of the stator 20 is generated, so that there is a probability in that noise and vibration of the rotary electric apparatus 10 are increased. Accordingly, in this embodiment, the state where the magnitude of the magnetomotive force is equal, but the magnetomotive force distribution is not equal (the state having no rotation symmetry) is improved, thereby reducing noise and vibration of the rotary electric apparatus 10 due to the phase disposition of the stator winding 22. Further, the foregoing description of the method illustrated in FIG. 15 may be equally applied to the drawings below that represent the phase disposition of the stator winding 22. Further, in this specification, the phase disposition of the stator winding 22 has been described based on the U phase as an example, but the description may also be equally applied to the V phase and the W phase.

(Configuration of the Stator Winding 22 of this Embodiment)

Figure 16A:
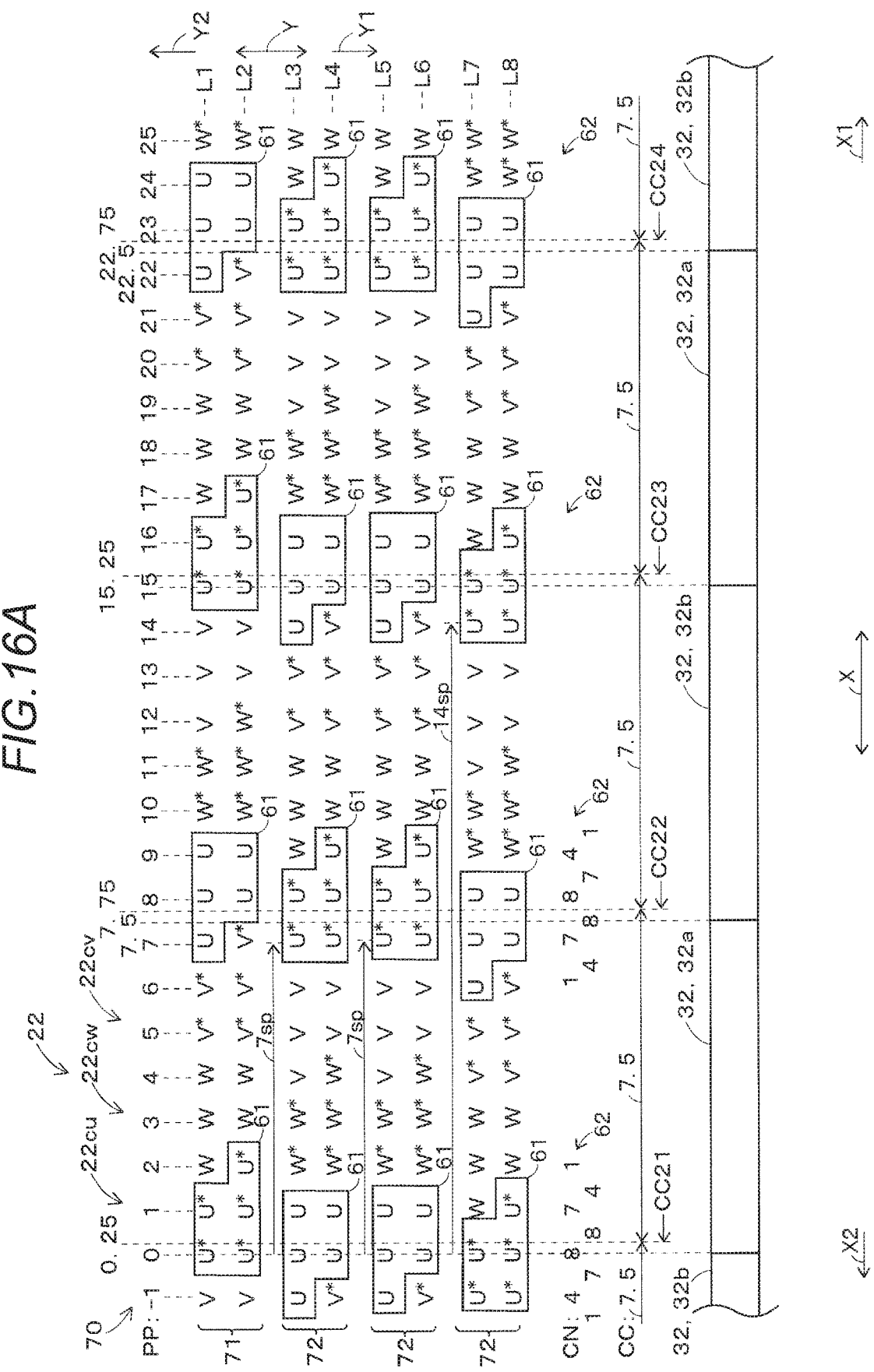
FIG. 16A is a schematic diagram illustrating an example of a phase disposition of a stator winding 22 according to the embodiment.

As illustrated in FIG. 16A, the stator winding 22 includes a plurality of (in this embodiment, four) basic coils 70. Each of the plurality of (four) basic coils 70 has the same configuration as that of the basic coil 70 described in the reference embodiment. Further, the plurality of (four) basic coils 70 include a first basic coil 71, and at least one second basic coil 72 (in this embodiment, three second basic coils 72). The first basic coil 71 refers to a coil that serves as a reference for a disposition of a one phase band 61 at every pole in the first direction (the direction of arrow X). The second basic coil 72 refers to a coil in which a disposition of a one phase band 61 at every pole in the first direction (the direction of arrow X) is different with respect to the first basic coil 71.

At least one second basic coil 72 (in this embodiment, three second basic coils 72) may be disposed at a position moved by predetermined slot pitch in the first direction (the direction of arrow X) with respect to the first basic coil 71. Further, the predetermined slot pitch may be represented by n times the movement unit amount (here, n is a natural number of 1 or more). Further, the movement unit amount is NI slot pitch, and NI may be the nearest integer of the number of (in this embodiment, 7.5) slots at every pole, or 1. Further, a first numerical progression that is a numerical progression of enumerating the predetermined slot pitch of each of at least one second basic coil 72 (in this embodiment, three second basic coils) may include all natural number times ranging from 1 time to n times the movement unit amount.

In this embodiment, the plurality of (three) second basic coils 72 are disposed at a position moved in one direction (a second pole coil side in the first direction, which will be described below (the direction of arrow X1)) of the first direction (the direction of arrow X) with respect to the first basic coil 71. Further, the movement unit amount is set to seven slot pitch that is the nearest integer smaller than the number of (in this embodiment, 7.5) slots per every pole. Further, in one second basic coil 72 among the plurality of (three) second basic coils 72 (e.g., the second basic coil 72 that form a third layer L3 and a fourth layer L4), the predetermined slot pitch is set to one time (seven slot pitch (7 sp)) seven slot pitch that is the movement unit amount. In another second basic coil 72 among the plurality of (three) second basic coils 72 (e.g., the second basic coil 72 that forms a fifth layer L5 and a sixth layer L6), the predetermined slot pitch is set to one time (seven slot pitch (7 sp)) seven slot pitch that is the movement unit amount. In another second basic coil 72 among the plurality of (three) second basic coils 72 (e.g., the second basic coil 72 that forms a seventh layer L7 and an eighth layer L8), the predetermined slot pitch is set to two times (14 slot pitch (14 sp)) seven slot pitch that is the movement unit amount. As described above, in this embodiment, n that regulates the predetermined slot pitch is 1 and 2. Further, the first numerical progression includes all of the natural number times from one time (seven slot pitch (7 sp)) to two times (14 slot pitch (14 sp)) seven slot pitch that is the movement unit amount.

For example, the one phase band 61 of the U phase formed in the plurality of (three) slots 21c, which have the location coordinates PP of 0, 1, and 2, in the first basic coil 71 is formed in the plurality of (three) slots 21c, which have the location coordinates PP of 7, 8, and 9, in the second basic coil 72 that forms the third layer L3 and the fourth layer L4. Further, the one phase band 61 of the U phase formed in the plurality of (three) slots 21c, which have the location coordinates PP of 0, 1, and 2, in the first basic coil 71 is formed in the plurality of (three) slots 21c, which have the location coordinates PP of 7, 8, and 9, in the second basic coil 72 that forms the fifth layer L5 and the sixth layer L6.

The one phase band 61 of the U phase formed in the plurality of (three) slots 21c, which have the location coordinates PP of 0, 1, and 2, in the first basic coil 71 is formed in the plurality of (three) slots 21c, which have the location coordinates PP of 14, 15, and 16, in the second basic coil 72 that forms the seventh layer L7 and the eighth layer L8. The foregoing may also be equally applied to another one phase band 61 of the U phase.

Figure 16B:
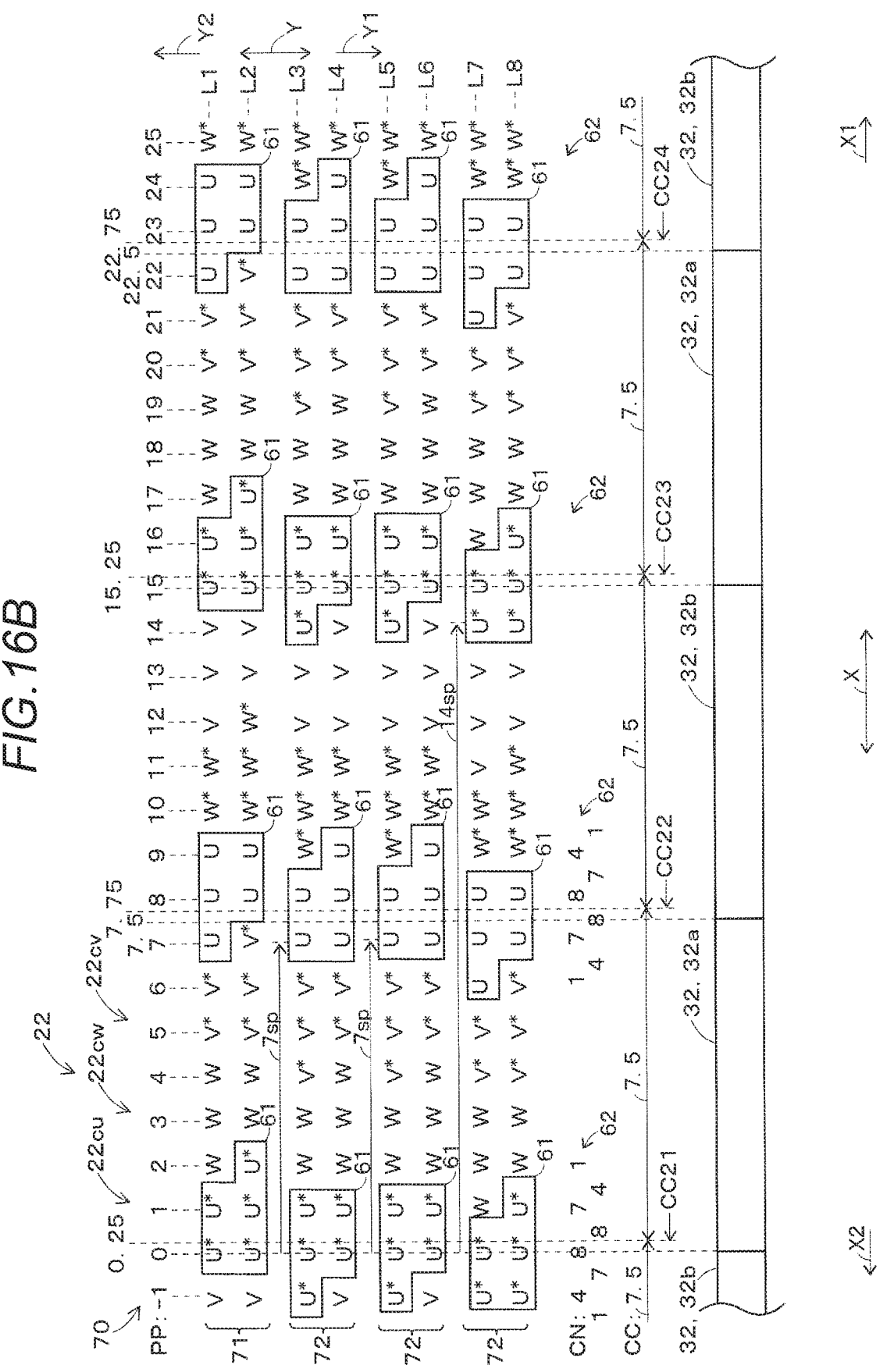
FIG. 16B is a schematic diagram illustrating an example of a phase disposition of a stator winding 22 in which an energizing direction of a plurality of coil sides 22a is corrected in FIG. 16A.

In the phase disposition illustrated in FIG. 16A, coil sides 22a having different electrical conduction directions coexist in the plurality of in-phase coil sides 22a accommodated in the same slot 21c. Accordingly, as illustrated in FIG. 16B, it is necessary to correct the electrical conduction direction of the plurality of coil sides 22a. For example, in the second basic coil 72 that forms the third layer L3 and the fourth layer L4 illustrated in FIG. 16B, the electrical conduction direction of the plurality of (five) coil sides 22a of the U phase accommodated in the plurality of (three) slots 21c, which have the location coordinates PP of 7, 8, and 9, is reverse to the electrical conduction direction illustrated in FIG. 16A.

In the second basic coil 72 that forms the fifth layer L5 and the sixth layer L6 illustrated in FIG. 16B, the electrical conduction direction of the plurality of (five) coil sides 22a of the U phase accommodated in the plurality of (three) slots 21c, which have the location coordinates PP of 7, 8, and 9, is reverse to the electrical conduction direction illustrated in FIG. 16A. The foregoing may also be equally applied to another one phase band 61 of the second basic coil 72 that forms the third layer L3 and the fourth layer L4 illustrated in FIG. 16B. Further, the foregoing may also be equally applied to another one phase band 61 of the second basic coil 72 that forms the fifth layer L5 and the sixth layer L6 illustrated in FIG. 16B. Further, in the second basic coil 72 that forms the seventh layer L7 and the eighth layer L8, the electrical conduction direction of the coil sides 22a is correct, so that it is not necessary to reverse the electrical conduction direction of the coil side 22a.

Here, a one phase band 61 newly formed by mixing the plurality of (in this embodiment, five) coil sides 22a constituting the single one phase band 61 of the first basic coil 71 and the plurality of (in this embodiment, five) coil sides 22a constituting the single one phase band 61 of each of at least one second basic coil 72 (in this embodiment, three second basic coils 72) is defined as a mixed one phase band 62. For example, the one phase band 61 of the U phase of the first basic coil 71 is formed in the plurality of (three) slots 21c which have the location coordinates PP of 0, 1, and 2. The one phase band 61 of the U phase of the second basic coil 72 that forms the third layer L3 and the fourth layer L4 is formed in the plurality of (three) slots 21c which have the location coordinates PP of −1, 0, and 1. The one phase band 61 of the U phase of the second basic coil 72 that forms the fifth layer L5 and the sixth layer L6 is formed in the plurality of (three) slots 21c which have the location coordinates PP of −1, 0, and 1.

The one phase band 61 of the U phase of the second basic coil 72 that forms the seventh layer L7 and the eighth layer L8 is formed in the plurality of (three) slots 21c which have the location coordinates PP of −1, 0, and 1. In this case, the mixed one phase band 62 of the U phase is formed in the plurality of (four) slots 21c which have the location coordinates PP of −1, 0, 1, and 2. Further, the number of (the coil side number CN) the plurality of coil sides 22a configuring the mixed one phase band 62 of the U phase is 20.

In the stator winding 22, the plurality of (in this embodiment, four) basic coils 70 are mixed in such a manner that a magnitude of magnetomotive force generated by the plurality of coil sides 22a configuring the mixed one phase band 62 is equal at every pole of the plurality of (in this embodiment, eight) mover magnetic poles 32. Specifically, the plurality of (three) second basic coils 72 are moved by the predetermined slot pitch (seven slot pitch (7 sp) or 14 slot pitch (14 sp)) in the first direction (the direction of arrow X) with respect to the first basic coil 71, so that the plurality of (four) basic coils 70 are stacked. Accordingly, the stator winding 22 of this embodiment is formed in the eight layers of the first layer L1 to the eighth layer L8.

A center of the mixed one phase band 62 calculated by adding the disposition of the plurality of (in this reference embodiment, 20) coil sides 22a configuring the mixed one phase band 62 and both sides of the position of the plurality of (20) coil sides 22a in the first direction (the direction of arrow X) is defined as a coil side center CC of the mixed one phase band 62. For example, the plurality of (four) coil sides 22a of the U phase is accommodated in the slot 21c which has the location coordinate PP of −1. Further, the plurality of (eight) coil sides 22a of the U phase are accommodated in the slot 21c which has the location coordinate PP of 0. Further, the plurality of (seven) coil sides 22a of the U phase are accommodated in the slot 21c which has the location coordinate PP of 1. Further, one coil side 22a of the U phase is accommodated in the slot 21c which has the location coordinate PP of 2. Accordingly, a coil side center CC21 of the mixed one phase band 62 of the U phase formed in the plurality of (four) slots 21c which have the location coordinates PP of −1, 0, 1, and 2 may be calculated, for example, by Equation 5 below, and the coil side center CC21 is 0.25.

$$CC21=(-1\times4+0\times8+1\times7+2\times1)/(4+8+7+1)=0.25 \quad \text{(Equation 5)}$$

Similarly, for example, the one phase band 61 of the U phase of the first basic coil 71 is formed in the plurality of (three) slots 21c which have the location coordinates PP of 7, 8, and 9. The one phase band 61 of the U phase of the second basic coil 72 that forms the third layer L3 and the fourth layer L4 is formed in the plurality of (three) slots 21c which have the location coordinates PP of 7, 8, and 9. The one phase band 61 of the U phase of the second basic coil 72 that forms the fifth layer L5 and the sixth layer L6 is formed in the plurality of (three) slots 21c which have the location coordinates PP of 7, 8, and 9.

The one phase band 61 of the U phase of the second basic coil 72 that forms the seventh layer L7 and the eighth layer L8 is formed in the plurality of (three) slots 21c which have the location coordinates PP of 6, 7, and 8. In this case, the mixed one phase band 62 of the U phase is formed in the plurality of (four) slots 21c which have the location coordinates PP of 6, 7, 8, and 9. Further, the number of (the coil side number CN) the plurality of coil sides 22a configuring the mixed one phase band 62 of the U phase is 20.

One coil side 22a of the U phase is accommodated in the slot 21c which has the location coordinate PP of 6. Further, the plurality of (seven) coil sides 22a of the U phase are accommodated in the slot 21c which has the location coordinate PP of 7. Further, the plurality of (eight) coil sides 22a of the U phase are accommodated in the slot 21c which has the location coordinate PP of 8. Further, the plurality of (four) coil sides 22a of the U phase are accommodated in the slot 21c which has the location coordinate PP of 9. Accordingly, a coil side center CC22 of the mixed one phase band 62 of the U phase formed in the plurality of (four) slots 21c which have the location coordinates PP of 6, 7, 8, and 9 may be calculated, for example, by Equation 6 below, and the coil side center CC22 is 7.75.

$$CC22=(6\times1+7\times7+8\times8+9\times4)/(1+7+8+4)=7.75 \quad \text{(Equation 6)}$$

For example, the mixed one phase band 62 of the U phase is formed in the plurality of (four) slots 21c which have the location coordinates PP of 14, 15, 16, and 17. The number of (the coil side number CN) the plurality of coil sides 22a configuring the mixed one phase band 62 of the U phase is 20. A coil side center CC23 of the mixed one phase band 62 may be calculated, for example, by Equation 7 below, and the coil side center CC23 is 15.25.

$$CC23=(14\times4+15\times8+16\times7+17\times1)/(4+8+7+1)=15.25 \quad \text{(Equation 7)}$$

For example, the mixed one phase band 62 of the U phase is formed in the plurality of (four) slots 21c which have the location coordinates PP of 21, 22, 23, and 24. The number of (the coil side number CN) the plurality of coil sides 22a configuring the mixed one phase band 62 of the U phase is 20. A coil side center CC24 of the mixed one phase band 62 may be calculated, for example, by Equation 8 below, and the coil side center CC24 is 22.75.

$$CC24=(21\times1+22\times7+23\times8+24\times4)/(1+7+8+4)=22.75 \quad \text{(Equation 8)}$$

From the calculation result, a distance between the coil side center CC21 of the mixed one phase band 62 of the U phase and the coil side center CC22 is 7.5 (=7.75−0.25). Further, a distance between the coil side center CC22 of the mixed one phase band 62 of the U phase and the coil side center CC23 is 7.5 (=15.25−7.75). Further, a distance between the coil side center CC23 of the mixed one phase band 62 of the U phase and the coil side center CC24 is 7.5 (=22.75−15.25). As described above, the distance between the coil side centers CC of the mixed one phase bands 62 of the in-phase (U phase) adjacent in the first direction (the direction of arrow X) is equally 7.5. Accordingly, the distance between the coil side centers CC of the mixed one phase bands 62 of the in-phase (U phase) adjacent in the first direction (the direction of arrow X) is equal at every pole of the plurality of (eight) mover magnetic poles 32.

Here, a ratio of the distance between the coil side centers CC of the mixed one phase bands 62 of the in-phase (U phase) adjacent in the first direction (the direction of arrow X) is defined as an adjacent coil side ratio. In the foregoing reference embodiment (the embodiment in which the stator winding 22 includes one basic coil 70), an adjacent coil side ratio is 0.974 (7.4/7.6). In the meantime, in this embodiment (the embodiment in which the stator winding 22 includes the plurality of (four) basic coils 70), an adjacent coil side ratio is 1 (7.5/7.5). As described above, as the adjacent coil side ratio approaches 1, it may be considered that the distance between the coil side centers CC of the mixed one phase bands 62 of the in-phase (U phase) adjacent in the first direction (the direction of arrow X) is equal.

The number of (the coil side number CN) plurality of coil sides 22a configuring the mixed one phase band 62 of the U phase is a total of 20, and is equal at every pole of the plurality of (eight) mover magnetic poles 32. Accordingly, a magnitude of the magnetomotive force generated when the stator winding 22 is electrically conducted is equal at every pole of the plurality of (eight) mover magnetic poles 32.

Further, the distance between the coil side centers CC of the mixed one phase bands 62 of the in-phase (U phase) adjacent in the first direction (the direction of arrow X) is equal at every pole of the plurality of (eight) mover magnetic poles 32. Accordingly, a magnetomotive force distribution is more equivalent at every pole of the plurality of (eight) mover magnetic poles 32, and the rotary electric apparatus 10 of this embodiment may be considered to have one kind of magnetomotive force distribution.

As described above, in this embodiment, rotational symmetry of the magnetomotive force distribution is improved. As a result, in the rotary electric apparatus 10 of this embodiment, the magnetomotive force of the low order (in this embodiment, the fourth-order spatial deformation mode) is decreased, compared to the order (in this embodiment, the eighth-order spatial deformation mode) based on the number of magnetic poles of the mover 30 (in this embodiment, eight). Accordingly, in the rotary electric apparatus 10 of this embodiment, the number of rotation coinciding with the unique number of vibrations of the stator core 21 is increased, so that the number of rotation may be set out of, for example, the range of the number of driving rotation. That is, the rotary electric apparatus 10 of this embodiment is capable of reducing noise and vibration of the rotary electric apparatus 10 by avoiding a resonance opportunity of the stator 20 within the range of the number of driving rotation.

According to the rotary electric apparatus 10 of this embodiment, it is also possible to decrease torque ripple, in addition to the reduction in the noise and the vibrations of the rotary electric apparatus 10. Further, the method of reducing noise and vibration of the rotary electric apparatus 10 may include a method of providing a notch on a surface (external surface) of the mover core 31 that faces each tooth tip end portion 21d or each tooth tip end portion 21d of the stator core 21. However, in the method, an air gap is substantially enlarged, so that a decrease in torque is increased. The rotary electric apparatus 10 of this embodiment may suppress the decrease in torque, and reduce noise and vibration of the rotary electric apparatus 10.

As illustrated in FIG. 16C, in this embodiment, the plurality of coil sides 22a accommodated in the same slot 21c are arranged such that the coil sides 22a of the in-phase are concentrated within the corresponding slot 21c. For example, in the second basic coil 72 that forms the fifth layer L5 and the sixth layer L6 illustrated in FIG. 16B, the coil side 22a of the U phase accommodated in the slot 21c, which has the location coordinate PP of −1, is moved from the fifth layer L5 to the sixth layer L6 in FIG. 16C. In the second basic coil 72 that forms the third layer L3 and the fourth layer L4 illustrated in FIG. 16B, the coil side 22a of the U phase accommodated in the slot 21c, which has the location coordinate PP of −1, is moved from the third layer L3 to the fifth layer L5 in FIG. 16C. As described above, in FIG. 16C, the plurality of (four) coil sides 22a of the U phase are concentrated and the plurality of (four) coil sides 22a of the V phase are concentrated in the slot 21c, which has the location coordinate PP of −1.

In the second basic coil 72 that forms the seventh layer L7 and the eight layer L8 illustrated in FIG. 16B, the coil side 22a of the U phase accommodated in the slot 21c, which has the location coordinate PP of 1, is moved from the eighth layer L8 to the seventh layer L7 in FIG. 16C. As described above, in FIG. 16C, the plurality of (seven) coil sides 22a of the U phase are concentrated in the slot 21c which has the location coordinate PP of 1. Further, in the first basic coil 71 illustrated in FIG. 16B, the coil side 22a of the U phase accommodated in the slot 21c, which has the location coordinate PP of 2, is moved from the second layer L2 to the first layer L1 in FIG. 16C. As described above, in FIG. 16C, the plurality of (seven) coil sides 22a of the W phase are concentrated in the slot 21c which has the location coordinate PP of 2. The foregoing may also be equally applied to another mixed one phase band 62.

In this embodiment, a boundary between the phases (between the predetermined phases of the U phase, the V phase, and the W phase) is simplified (the unevenness of the boundary between the phases is minimized), so that the insulation between the phases is facilitated. For example, a shape of insulation paper insulating the interphase is simplified, so that it is easy to dispose the insulation paper. As described above, the mixture of the plurality of (in this embodiment, four) basic coils 70 includes the form in which the disposition of at least one coil side 22a accommodated in the same slot 21c within the corresponding slot 21c is changed.

For example, a width of the coil side distribution of the mixed one phase band 62 of the U phase formed in the plurality of (four) slots 21c, which have the location coordinates PP of −1, 0, 1, and 2, is four slots. A width of the coil side distribution of the mixed one phase band 62 of the U phase formed in the plurality of (four) slots 21c, which have the location coordinates PP of 6, 7, 8, and 9, is four slots. Further, a width of the effective coil side distribution of the mixed one phase band 62 of the U phase formed in the plurality of (four) slots 21c, which have the location coordinates PP of −1, 0, 1, and 2, is 4.5 slots. A width of the effective coil side distribution of the mixed one phase band 62 of the U phase formed in the plurality of (four) slots 21c, which have the location coordinates PP of 6, 7, 8, and 9, is 4.5 slots.

As described above, the width (4.5 slots) of the effective coil side distribution of this embodiment is increased compared to the width (3.5 slots) of the effective coil side distribution of the foregoing reference embodiment (the embodiment in which the stator winding 22 includes one basic coil 70). Accordingly, the magnetomotive force distribution of this embodiment becomes gentler compared to the magnetomotive force distribution of this embodiment. Further, the magnetomotive force distribution is formed based on the coil side distribution, so that the foregoing magnetomotive force distribution may also be referred to from the coil side distribution.

Figure 17A:
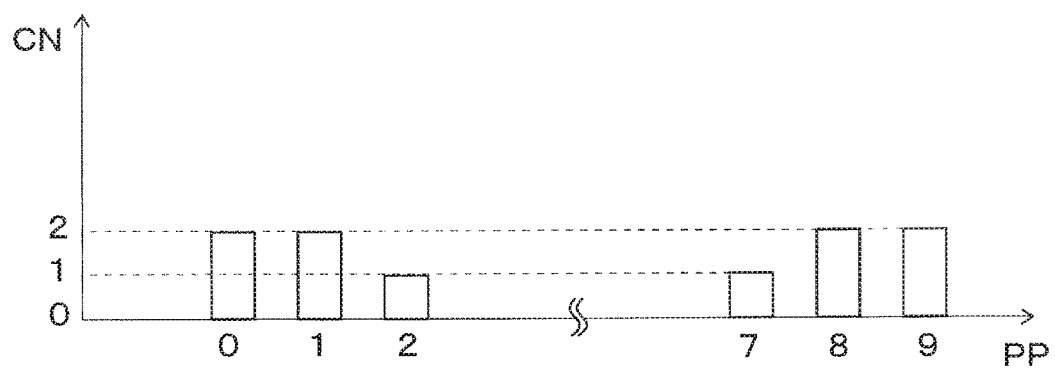
FIG. 17A is a schematic diagram illustrating an example of a coil side distribution according to the reference embodiment.

FIG. 17A illustrates an example of a coil side distribution of the reference embodiment (the embodiment in which the stator winding 22 includes one basic coil 70). The coil side distribution represents the number of (the coil side number CN) coil sides 22a configuring the one phase band 61 of the in-phase (U phase) for each location coordinate PP, and in FIG. 17A, the coil side distribution is represented by a bar graph. A horizontal axis indicates a location coordinate PP, and a vertical axis indicates the number of (the coil side number CN) coil sides 22a configuring the one phase band 61 of the U phase.

Figure 17B:
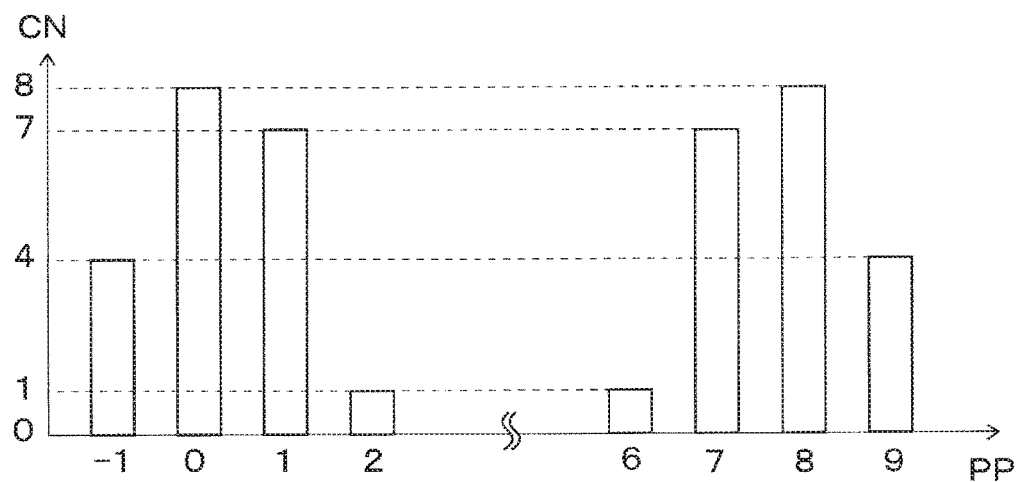
FIG. 17B is a schematic diagram illustrating an example of a coil side distribution according to the embodiment.

Since the slot size (the depth of the slot 21c) is not changed, the upper limit of the vertical axis needs to be constant including the drawing to be described below (e.g., FIG. 17B), which illustrates the coil side distribution. However, in the drawing illustrating the coil side distribution, for convenience of the description, the vertical axis indicates the number of (the coil side number CN) coil sides 22a, and the upper limit of the vertical axis is not necessarily constant. In the drawing illustrating the coil side distribution, a ratio of relative heights of the bar graph and the distribution of the bar graphs have meaning. For example, a ratio of the relative heights of the bar graphs having the location coordinates PP of 0, 1, and 2 as illustrated in FIG. 17A is 2:2:1, and a ratio of the relative heights of the bar graphs having the location coordinates PP of −1, 0, 1, and 2 as illustrated in FIG. 17B is 4:8:7:1.

For convenience of the description, the width of the bar graph in the horizontal axis is set to one slot, and a space corresponding to the width of the tooth portion 21b in the first direction (the direction of arrow X) is formed between the adjacent bar graphs. However, FIG. 17A does not regulate the width of the tooth portion 21b in the first direction (the direction of arrow X). Further, in FIG. 17A, the coil side distribution of one magnetic pole pair of the plurality of (eight) mover magnetic poles 32 is illustrated. The coil side distribution illustrated in FIG. 17A is repeated every one magnetic pole pair of the plurality of (eight) mover magnetic poles 32. The foregoing description of the method illustrated in FIG. 17A may also be equally applied to the drawing which illustrates a coil side distribution (to be described below). However, in the drawing to be described below, a vertical axis indicates the number of (the coil side number CN) coil sides 22a configuring the mixed one phase band 62.

As illustrated in FIG. 15, for example, the plurality of (two) coil sides 22a of the U phase are accommodated in the slot 21c which has the location coordinate PP of 0. Accordingly, as illustrated in FIG. 17A, the number of (the coil side number CN) coil sides 22a that configure the one phase band 61 of the U phase at the location coordinate PP of 0 is 2. Similarly, the plurality of (two) coil sides 22a of the U phase are accommodated in the slot 21c which has the location coordinate PP of 1, and the number of (the coil side number CN) coil sides 22a that configure the one phase band 61 of the U phase at the location coordinate PP of 1 is 2. Further, one coil side 22a of the U phase is accommodated in the slot 21c which has the location coordinate PP of 2, and the number of (the coil side number CN) coil sides 22a that configure the one phase band 61 of the U phase at the location coordinate PP of 2 is 1.

One coil side 22a of the U phase is accommodated in the slot 21c which includes the location coordinate PP of 7, and the number of (the coil side number CN) coil sides 22a that configure the one phase band 61 of the U phase at the location coordinate PP of 7 is 1. Further, the plurality of (two) coil sides 22a of the U phase are accommodated in the slot 21c which has the location coordinate PP of 8, and the number of (the coil side number CN) coil sides 22a that configure the one phase band 61 of the U phase at the location coordinate PP of 8 is 2. Further, the plurality of (two) coil sides 22a of the U phase are accommodated in the slot 21c which has the location coordinate PP of 9, and the number of (the coil side number CN) coil sides 22a that configure the one phase band 61 of the U phase at the location coordinate PP of 9 is 2.

FIG. 17B illustrates an example of a coil side distribution of this embodiment (in which the stator winding 22 includes the plurality of (four) basic coils 70). As illustrated in FIG. 16C, for example, the plurality of (four) coil sides 22a of the U phase are accommodated in the slot 21c which has the location coordinate PP of −1. Accordingly, as illustrated in FIG. 17B, the number of (the coil side number CN) coil sides 22a of the U phase at the location coordinate PP of −1 is 4. Similarly, the plurality of (eight) coil sides 22a of the U phase are accommodated in the slot 21c which has the location coordinate PP of 0, and the number of (the coil side number CN) coil sides 22a of the U phase at the location coordinate PP of 0 is 8. Further, the plurality of (seven) coil sides 22a of the U phase are accommodated in the slot 21c which has the location coordinate PP of 1, and the number of (the coil side number CN) coil sides 22a of the U phase at the location coordinate PP of 1 is 7. Further, one coil side 22a of the U phase is accommodated in the slot 21c which has the location coordinate PP of 2, and the number of (the coil side number CN) coil sides 22a of the U phase at the location coordinate PP of 2 is 1.

One coil side 22a of the U phase is accommodated in the slot 21c which has the location coordinate PP of 6, and the number of (the coil side number CN) coil sides 22a of the U phase at the location coordinate PP of 6 is 1. Further, the plurality of (seven) coil sides 22a of the U phase are accommodated in the slot 21c which has the location coordinate PP of 7, and the number of (the coil side number CN) coil sides 22a of the U phase at the location coordinate PP of 7 is 7. Further, the plurality of (eight) coil sides 22a of the U phase are accommodated in the slot 21c which has the location coordinate PP of 8, and the number of (the coil side number CN) coil sides 22a of the U phase in the slot which has the location coordinate PP of 8 is 8. Further, the plurality of (four) coil sides 22a of the U phase are accommodated in the slot 21c which has the location coordinate PP of 9, and the number of (the coil side number CN) coil sides 22a of the U phase at the location coordinate PP of 9 is 4.

The coil side distribution of this embodiment illustrated in FIG. 17B is expanded in the first direction (the direction of arrow X) compared to the coil side distribution of the reference embodiment illustrated in FIG. 17A, and has a gentle shape. In this embodiment, the plurality of (20) coil sides 22a that configure the mixed one phase band 62 are disposed in the plurality of slots 21c adjacent in a wide range compared to the plurality of (five) coil sides 22a that configure the one phase band 61 of the reference embodiment. As a result, the distribution of the magnetomotive force generated when the stator winding 22 is electrically conducted is distributed in the first direction (the direction of arrow X). Accordingly, the attractive force distribution between the stator 20 and the mover 30 also becomes gentler, so that a peak value of the attractive force (amplitude of a fundamental wave component in the attractive force distribution) and the variation of the attractive force in the first direction (the direction of arrow X) are decreased compared to those of the reference embodiment. Further, a pitch of the position at which the peak value of the attractive force is maximum in the first direction (the direction of arrow X) is also further equalized. Accordingly, the rotary electric apparatus 10 of this embodiment may reduce noise and vibration of the rotary electric apparatus 10 compared to the rotary electric apparatus 10 of the reference embodiment. Further, a magnetic flux waveform generated in an air gap between the stator 20 and the mover 30 is close to a sine wave compared to that of the reference embodiment. Further, in the rotary electric apparatus 10 of this embodiment, the harmonic wave component of the magnetomotive force (e.g., the fifth-order and seventh-order components) is decreased compared to that of the reference embodiment.

A magnitude of the magnetomotive force generated by the plurality of coil sides 22a that configure the one phase band 61 is a value obtained by multiplying a current value of a current flowing in the plurality of windings that forms the plurality of coil sides 2a and the number of turns (the number of conductors) of the plurality of windings that form the plurality of coil sides 22a. The plurality of windings that form the plurality of coil sides 22a may be electrically connected by at least one of a serial connection and a parallel connection. However, when there is a region connected in parallel to the plurality of windings, a current value is decreased in the corresponding region compared to the case where a region is serially connected to the plurality of windings, so that a magnitude of magnetomotive force is decreased. Accordingly, when the number of turns (the number of conductors) of the plurality of windings is considered, it is necessary to use the number of serially converted conductors obtained by converting the number of conductors in the region where the plurality of windings are connected in parallel into the number of conductors of the serial connection. For example, the number of conductors in each region where the plurality of (two) windings are serially connected is set to one. In this case, in the region where the plurality of (two) windings are connected in parallel (two parallel), the number of serially converted conductors is 1, and in order to make the number of serially converted conductors be equivalent to the case of the serial connection, the number of conductors in the corresponding region is set to 2.

Here, the number of serially converted conductors of the plurality of (in this embodiment, five) coil sides 22a that configure the single one phase band 61 of the first basic coil 71 is defined as the number of first coil side conductors. Further, the number of serially converted conductors of the plurality of (in this embodiment, five) coil sides 22a that configure the single one phase band 61 of each of at least one second basic coil 72 (in this embodiment, three second basic coils 72) disposed at the position moved by the predetermined slot pitch (in this embodiment, seven slot pitch or 14 slot pitch) in the first direction (the direction of arrow X) with respect to the single one phase band 61 of the first basic coil 71 is defined as the number of second coil side conductors.

For example, as illustrated in FIG. 16B, in the first basic coil 71, the one phase band 61 of the U phase formed in the plurality of (three) slots 21c, which have the location coordinates PP of 0, 1, and 2, occupies 2.5 slots. When the number of serially converted conductors of the coil side 22a that occupies one slot 21c is a reference conductor number t0, the number of first coil side conductors may be represented by 2.5×t0. The one phase band 61 of the U phase of the second basic coil 72 disposed at the position moved by seven slot pitch in the first direction (the direction of arrow X) with respect to the corresponding one phase band 61 of the first basic coil 71 is formed in the plurality of (three) slots 21c, which have the location coordinates PP of 7, 8, and 9, and occupies 5 (=2.5×2) slots. Further, the one phase band 61 of the U phase of the second basic coil 72 disposed at the position moved by 14 slot pitch in the first direction (the direction of arrow X) with respect to the corresponding one phase band 61 of the first basic coil 71 is formed in the plurality of (three) slots 21c, which have the location coordinates PP of 14, 15, and 16, and occupies 2.5 slots.

As described above, in this embodiment, one second coil side conductor number of the plurality of (two) second coil side conductor numbers (in this case, represented by 2.5×t0) is equal to the number of first coil side conductors. In contrast, the other second coil side conductor number of the plurality of (two) second coil side conductor numbers (in this case, represented by 5×t0) is two times the number of first coil side conductors, unlike the number of first coil side conductors. The foregoing may also be equally applied to another one phase band 61.

Here, a numerical progression in which the number of elements of the list of the coil side conductor numbers formed of the number of first coil side conductors and at least one second coil side conductor number listed for every predetermined slot pitch in ascending order of the predetermined slot pitch is m (m is a natural number of 3 or more) (in this embodiment, the plurality of (two) second coil side conductor numbers) is defined as a second numerical progression. In this embodiment, m is three and the number of elements of the second numerical progression is three. Further, when the elements of the second numerical progression are listed, the elements are 2.5×t0, 5×t0, and 2.5×t0, and a ratio of the respective elements of the second numerical progression is 1:2:1.

In this embodiment, in the second numerical progression, the coil side conductor number of the kth element (k is a natural number of m/2 or less) is equal to the coil side conductor number of the (m−k+1)th element. Specifically, in this embodiment, m is three, so that k is one. The coil side conductor number of the first element is 2.5×t0. The coil side conductor number of the third (=3−1+1) element is 2.5×t0. Accordingly, the coil side conductor number of the first element is equal to the coil side conductor number of the third element. Further, in the second numerical progression, the coil side conductor number of (5×t0) the second element is set to two times the coil side conductor number of the first element and the coil side conductor number of (2.5×t0) the third element.

In this embodiment, in the second numerical progression, the coil side conductor number increases from the first element to the jth element (j is m/2, and when m/2 is not a natural number, j is a natural number obtained by rounding off to the nearest whole number) and the coil side conductor number decreases from the jth element to the mth element. Specifically, in this embodiment, m is three, so that j is two. Further, the coil side conductor number of the first element is 2.5×t0 and the coil side conductor number of the second element is 5×t0. Accordingly, in the second numerical progression, the coil side conductor number increases from the first element to the second element. In the meantime, the coil side conductor number of the second element is 5×t0 and the coil side conductor number of the third element is 2.5×t0. Accordingly, in the second numerical progression, the coil side conductor number decreases from the second element to the third element.

The foregoing may also be equally applied to the case where m is a natural number of 4 or more. For example, it is assumed that m is 6. The first element to the sixth element of the second numerical progression are element EL1, element EL2, element EL3, element EL4, element EL5, and element EL6 in order. However, it is assumed that the coil side conductor numbers are the same in elements EL1 and EL6, the coil side conductor numbers are the same in elements EL2 and EL5, and the coil side conductor numbers are the same in elements EL3 and EL4. Further, it is assumed that the coil side conductor number increases from the first element EL1 to the third element EL3, and the coil side conductor number decreases from the fourth element EL4 to the sixth element EL6.

m is six, so that k is a natural number of 3 (=6/2) or less. As assumed above, the coil side conductor numbers are the same in the first element EL1 and the sixth (=6−1+1) element EL6. The coil side conductor numbers are the same in the second element EL2 and the fifth (=6−2+1) element. The coil side conductor numbers are the same in the third element EL3 and the fourth (=6−3+1) element. Further, m is six, so that j is three. As assumed above, the coil side conductor number increases from the first element EL1 to the third element EL3. In the meantime, the coil side conductor number decreases from the fourth element EL4 to the sixth element EL6.

As described above, in the second numerical progression, the coil side conductor number of the kth element (k is a natural number of m/2 or less) may be equal to the coil side conductor number of the (m−k+1)th element. Further, in the second numerical progression, the coil side conductor number may increase from the first element to the jth element (j is m/2, and when m/2 is not a natural number, j is a natural number obtained by rounding off to the nearest whole number) and the coil side conductor number may decrease from the jth element to the mth element. Further, in this embodiment, m is three. In this case, in the second numerical progression, the coil side conductor number of the second element may be set to two times, the coil side conductor number of the first element and the coil side conductor number of the third element.

(Example of the Configuration of the Stator Winding 22 by Concentric Winding)

As illustrated in FIG. 16C, the stator winding 22 in which the plurality of (in this embodiment, four) basic coils 70 are mixed includes a plurality of (in this embodiment, three) phase coils 22c (a U phase coil 22cu, a V phase coil 22cv, and a W phase coil 22cw). The plurality of (three) phase coils 22c include at least one (in this embodiment, four of each of the three phases, a total of 12) pole pair coil 80, and each pole pair coil 80 includes the plurality of (in this embodiment, four) unit coils 22d that are concentrically wound. Further, in FIG. 16C, for convenience of the illustration, the plurality of (four) unit coils 22d that configure one pole pair coil 80 of the coil 22cu of the U phase is illustrated.

Figure 18:
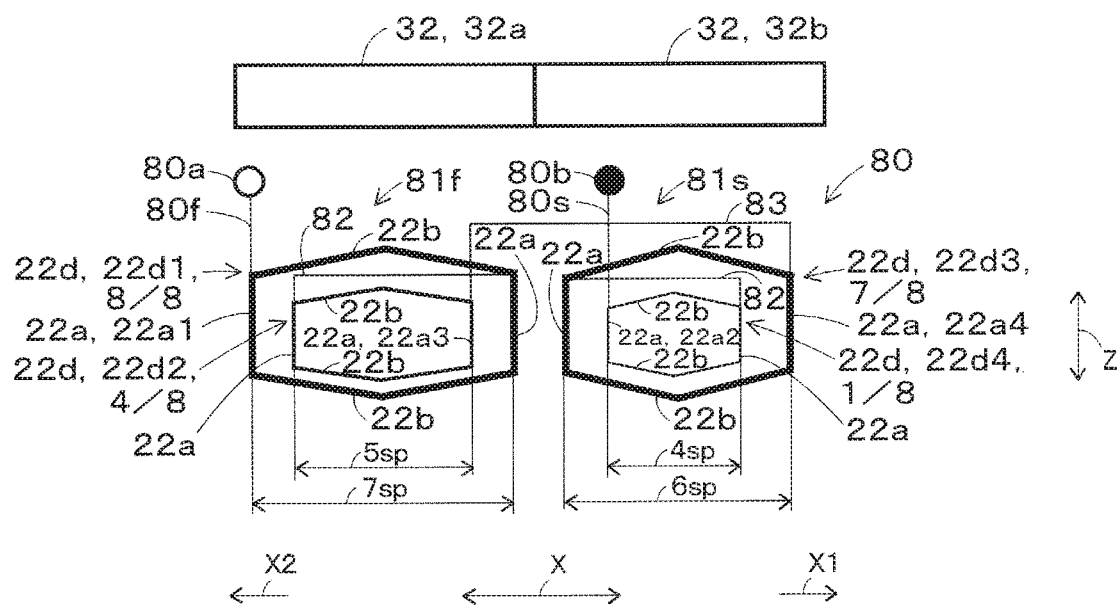
FIG. 18 is a schematic diagram illustrating a configuration example of a pole pair coil 80 according to the embodiment.

As illustrated in FIG. 18, the pole pair coil 80 of each of the plurality of (three) phase coils 22c include a first pole coil 81f and a second pole coil 81s, and the first pole coil 81f and the second pole coil 81s may be electrically serially connected. In this embodiment, the first pole coil 81f includes a plurality of (two) unit coils 22d having different coil pitch between the pair of coil sides 22a and 22a, and the plurality of (two) unit coils 22d are referred to as a first unit coil 22d1 and a second unit coil 22d2. The coil pitch between the pair of coil sides 22a and 22a of the first unit coil 22d1 is set to seven slot pitch (7 sp), and the coil pitch between the pair of coil sides 22a and 22a of the second unit coil 22d2 is set to five slot pitch (5 sp). The first unit coil 22d1 and the second unit coil 22d2 are concentrically wound, and are serially connected by an inter-unit coil connection portion 82, so that the first pole coil 81f is formed.

In this embodiment, the second pole coil 81s includes a plurality of (two) unit coils 22d having different coil pitch between the pair of coil sides 22a and 22a, and the plurality of (two) unit coils 22d are referred to as a third unit coil 22d3 and a forth unit coil 22d4. The coil pitch between the pair of coil sides 22a and 22a of the third unit coil 22d3 is set to six slot pitch (6 sp), and the coil pitch between the pair of coil sides 22a and 22a of the fourth unit coil 22d4 is set to four slot pitch (4 sp). The third unit coil 22d3 and the fourth unit coil 22d4 are concentrically wound, and are serially connected by the inter-unit coil connection portion 82, so that the second pole coil 81s is formed. In the second pole coil 81s, when the first pole coil 81f faces one mover magnetic pole 32 (in FIG. 16C, the mover magnetic pole 32a) among the plurality of (eight) mover magnetic poles 32, the second pole coil 81s faces one mover magnetic pole 32 (in FIG. 16C, the mover magnetic pole 32b) adjacent to the corresponding mover magnetic pole 32 (the mover magnetic pole 32a).

As described above, the plurality of (four) unit coils 22d that configure each pole pair coil 80 (the first unit coil 22d1, the second unit coil 22d2, the third unit coil 22d3, and the fourth unit coil 22d4) have different coil pitch between the pair of coil sides 22a and 22a accommodated in the pair of slots 21c and 21c. Further, the plurality of (four) unit coils 22d that configure each pole pair coil 80 (the first unit coil 22d1, the second unit coil 22d2, the third unit coil 22d3, and the fourth unit coil 22d4) have coil pitch between the pair of coil sides 22a and 22a, which is set to be smaller than the number of (in this embodiment, 7.5) slots per every pole. In this case, when the stator winding is configured by the double layer winding, the coil pitch between the pair of coil sides 22a and 22a of the unit coil is set to seven slot pitch (7 sp). Accordingly, in the rotary electric apparatus 10 of this embodiment, a length of the conductor of the stator winding 22 may be decreased compared to the stator winding having the double layer winding configuration, so that it is possible to decrease the amount of conductors used in the stator winding 22.

As illustrated in FIG. 16B, the second basic coil 72 that configures the third layer L3 and the fourth layer L4 and the second basic coil 72 that configures the fifth layer L5 and the sixth layer L6 are the same as each other in the disposition on the stator 20. Accordingly, the two second basic coils 72 are considered as one kind of basic coil 70. The two second basic coils 72, the first basic coil 71 that forms the first layer L1 and the second layer L2, and the second basic coil 72 that forms the seventh layer L7 and the eighth layer L8 have the different positions on the stator 20. Accordingly, the stator winding 22 of this embodiment includes the odd number of (in this embodiment, three) kinds of the plurality of (in this embodiment, four) basic coils 70 having the different dispositions on the stator 20.

As illustrated in FIG. 16C, in the plurality of (four) basic coils 70, the disposition of the in-phase coil side 22a accommodated in the same slot 21c within the corresponding slot 21c is concentrated for each phase (for each of the U phase, the V phase, and the W phase). Further, each of the plurality of (in this embodiment, three) phase coils 22c includes the pole pair coils 80 of the number of (in this embodiment, four) magnetic pole pairs of the plurality of (in this embodiment, eight) mover magnetic poles 32 in the entirety of the plurality of (four) basic coils 70. Accordingly, for example, in each of the plurality of (four) basic coils 70, compared to the case where the four pole pair coils 80 are included, the number of pole pair coils 80 may be decreased in the rotary electric apparatus 10 of this embodiment, thereby facilitating the simplification of the stator winding 22. As a result, in the rotary electric apparatus 10 of this embodiment, it is possible to facilitate the simplification of the wires between the pole pair coils 80 and the miniaturization of the stator winding 22 according to the simplification of the wires, and facilitate the improvement of workability in mounting work of the stator winding 22.

As illustrated in FIG. 18, the pole pair coil 80 of each of the plurality of (three) phase coils 22c may be continuously wound through an inter-pole coil connection portion 83 that extends from the first pole coil 81f at a winding start side to the second pole coil 81s at a winding end side. In this embodiment, the winding is continuously wound from a winding start portion 80a to a winding end portion 80b, so that the pole pair coil 80 is formed. Accordingly, the plurality of (two) unit coils 22d that configure the first pole coil 81f (the first unit coil 22d1 and the second unit coil 22d2), and the plurality of (two) unit coils 22d that configure the second pole coil 81s (the third unit coil 22d3 and the fourth unit coil 22d4) are connected with each other in series. In this embodiment, the first unit coil 22d1, the second unit coil 22d2, the third unit coil 22d3, and the fourth unit coil 22d4 are serially connected in this order. Further, it is also possible to form the pole pair coil 80 by individually winding each of the first pole coil 81f and the second coil 81s, and serially connecting the first pole coil 81f and the second pole coil 81s. Further, it is also possible to form the plurality of serially connected pole pair coils 80 by continuously winding the windings of the plurality of pole pair coils 80.

The pole pair coil 80 of each of the plurality of (three) phase coils 22c may include one pair of coil lead-out portions 80f and 80s that includes a first coil lead-out portion 80f and a second coil lead-out portion 80s. The first coil lead-out portion 80f is one unit coil 22d that configures the first pole coil 81f, and is lead out from one coil side 22a of the unit coil 22d of the winding start side (in this embodiment, the first unit coil 22d1). The corresponding coil side 22a is defined as a first coil side 22a1. The second coil lead-out portion 80s is one unit coil 22d that configures the second pole coil 81s, and is lead out from one coil side 22a of the unit coil 22d of the winding end side (in this embodiment, the fourth unit coil 22d4). The corresponding coil side 22a is defined as a second coil side 22a2. Further, in FIG. 18, a coil side 22a at the first pole coil 81f side connected by the inter-pole coil connection portion 83 is defined as a third coil side 22a3. Further, a coil side 22a at the second pole coil 81s side connected by the inter-pole coil connection portion 83 is defined as a fourth coil side 22a4.

In the coil 22cu of the U phase, the plurality of (four) pole pair coils 80 of the U phase may be electrically connected through the one pair of coil lead-out portions 80f and 80s. In this embodiment, the winding start portions 80a of each pole pair coil 80 are electrically connected, and are connected to a terminal 8TU of the U phase. Further, the winding end portions 80b of each pole pair coil 80 are electrically connected, and are connected to a neutral point 8N. Accordingly, the plurality of (four) pole pair coils 80 that configure the coil 22cu of the U phase is electrically connected in parallel.

The coil 22cu of the U phase may also be configured by the plurality of (four) serially connected pole pair coils 80. Further, the coil 22cu of the U phase may serially connect the plurality of (two) pole pair coils 80 adjacent in the first direction (the direction of arrow X) or existing at an interval of one magnetic pole pair among the plurality of (four) pole pair coils 80, may serially connect the plurality of (two) remaining pole pair coils 80 adjacent in the first direction (the direction of arrow X) or existing at the interval of one magnetic pole pair, and may also connect the plurality of (two) remaining pole pair coils 80 adjacent in the first direction (the direction of arrow X) or existing at the interval of one magnetic pole pair in parallel. The foregoing description about the coil 22cu of the U phase may also be equally applied to the coil 22cv of the V phase and the coil 22cw of the W phase. As described above, the plurality of (four) pole pair coils 80 included in each of the plurality of (three) phase coils 22c may be electrically connected by at least one of the serial connection and the parallel connection. Further, in each of the plurality of (three) phase coils 22c, the plurality of (four) in-phase pole pair coils 80 may be electrically connected through the pair of coil lead-out portions 80f and 80s.

As illustrated in FIG. 18, in this embodiment, the one direction (the direction of arrow X1) of the first direction (the direction of arrow X) is a direction (the first directional second pole coil side) that heads from the first pole coil 81f side to the second pole coil 81s side of the first direction (the direction of arrow X). Further, another direction (the direction of arrow X2) of the first direction (the direction of arrow X) is a direction (the first directional first pole coil side) that heads from the second pole coil 81s side to the first pole coil 81f side of the first direction (the direction of arrow X).

Fifth Modified Embodiment

This modified embodiment is different from the embodiment in that a stator winding 22 includes a plurality of (two) basic coils 70. In this modified embodiment, a different point from that of the embodiment will be mainly described.

Figure 19A:
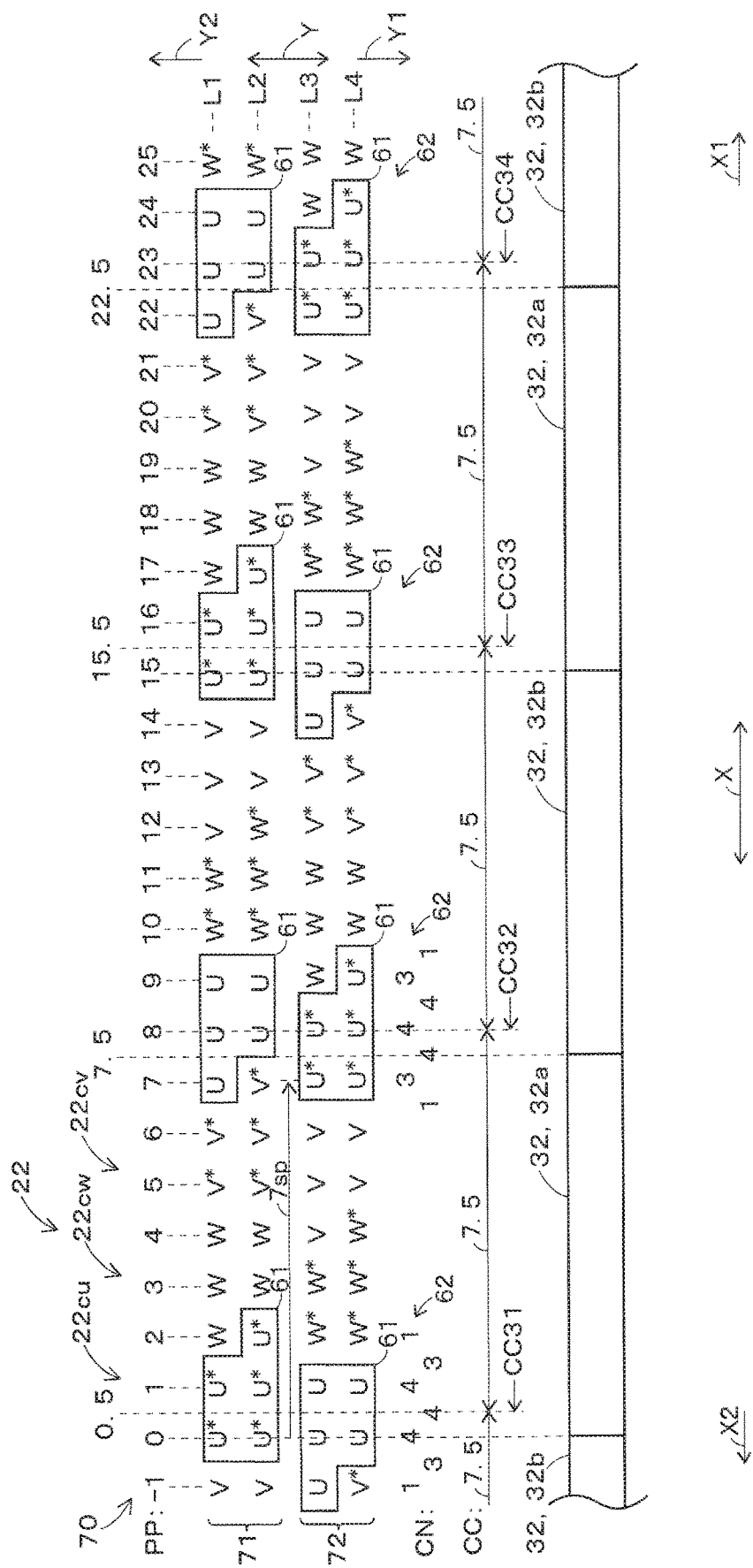
FIG. 19A is a schematic diagram illustrating an example of a phase disposition of a stator winding 22 according to a fifth modified embodiment.

As illustrated in FIG. 19A, the stator winding 22 includes the plurality of (two) basic coils 70. Each of the plurality of (two) basic coils 70 has the same configuration as that of the foregoing basic coil 70. Further, the plurality of (two) basic coils 70 includes a first basic coil 71 and a second basic coil 72. In this modified embodiment, one second basic coil 72 is disposed at a position moved by a predetermined slot pitch in the first direction (the direction of arrow X) with respect to the first basic coil 71. Further, one second basic coil 72 is disposed at a position moved in one direction (the direction of arrow X1) in the first direction (the direction of arrow X) with respect to the first basic coil 71. Accordingly, the stator winding 22 of this modified embodiment is formed in four layers including a first layer L1 to a fourth layer L4.

In this modified embodiment as well, a movement unit amount is set to seven slot pitch. Further, the predetermined slot pitch is set to one time (seven slot pitch (7 sp)) seven slot pitch that is the movement unit amount. As described above, in this modified embodiment, n regulating the predetermined slot pitch is 1. Further, a first numerical progression includes one time (seven slot pitch (7 sp)) seven slot pitch that is the movement unit amount.

For example, in the first basic coil 71, a one phase band 61 of a U phase formed in a plurality of (three) slots 21c, which have the location coordinates PP of 0, 1, and 2, is formed in a plurality of (three) slots 21c, which have the location coordinates PP of 7, 8, and 9, in one second basic coil 72. The foregoing may also be equally applied to another one phase band 61 of the U phase. Further, a mixed one phase band 62 of the U phase is formed, for example, in the plurality of (four) slots 21c which have the location coordinates PP of −1, 0, 1, and 2. The number of (the coil side number CN) a plurality of coil sides 22a that configure the mixed one phase band 62 is 10. Accordingly, a coil side center CC31 of the mixed one phase band 62 may be calculated, for example, by Equation 9 below, and the coil side center CC31 is 0.5.

$$CC31=(-1\times1+0\times4+1\times4+2\times1)/(1+4+4+1)=0.5 \quad \text{(Equation 9)}$$

For example, the mixed one phase band 62 of the U phase is formed in the plurality of (three) slots 21c which have the location coordinates PP of 7, 8, and 9. The number of (the coil side number CN) the plurality of coil sides 22a that configure the mixed one phase band 62 is 10. A coil side center CC32 of the mixed one phase band 62 may be calculated, for example, by Equation 10 below, and the coil side center CC32 is 8.

$$CC32=(7\times3+8\times4+9\times3)/(3+4+3)=8 \quad \text{(Equation 10)}$$

For example, the mixed one phase band 62 of the U phase is formed in the plurality of (four) slots 21c which have the location coordinates PP of 14, 15, 16, and 17. The number of (the coil side number CN) the plurality of coil sides 22a that configure the mixed one phase band 62 is 10. A coil side center CC33 of the mixed one phase band 62 may be calculated, for example, by Equation 11 below, and the coil side center C33 is 15.5.

$$CC33=(14\times1+15\times4+16\times4+17\times1)/(1+4+4+1)=15.5 \quad \text{(Equation 11)}$$

For example, the mixed one phase band 62 of the U phase is formed in the plurality of (three) slots 21c which have the location coordinates PP of 22, 23, and 24. The number of (the coil side number CN) the plurality of coil sides 22a that configure the mixed one phase band 62 is 10. A coil side center CC34 of the mixed one phase band 62 may be calculated, for example, by Equation 12 below, and the coil side center CC34 is 23.

$$CC34=(22\times3+23\times4+24\times3)/(3+4+3)=23 \quad \text{(Equation 12)}$$

From the calculation result, a distance between the coil side center CC31 of the mixed one phase band 62 of the U phase and the coil side center CC32 is 7.5 (=8−0.5). Further, a distance between the coil side center CC32 of the mixed one phase band 62 of the U phase and the coil side center CC33 is 7.5 (=15.5−8). Further, a distance between the coil side center CC33 of the mixed one phase band 62 of the U phase and the coil side center CC34 is 7.5 (=23−15.5). As described above, the distance between the coil side centers CC of the mixed one phase bands 62 of the in-phase (U phase) adjacent in the first direction (the direction of arrow X) is equally 7.5. Accordingly, the distance between the coil side centers CC of the mixed one phase bands 62 of the in-phase (U phase) adjacent in the first direction (the direction of arrow X) is equal at every pole of the plurality of (eight) mover magnetic poles 32. Further, an adjacent coil side ratio of this modified embodiment is 1 (=7.5/7.5).

Figure 19B:
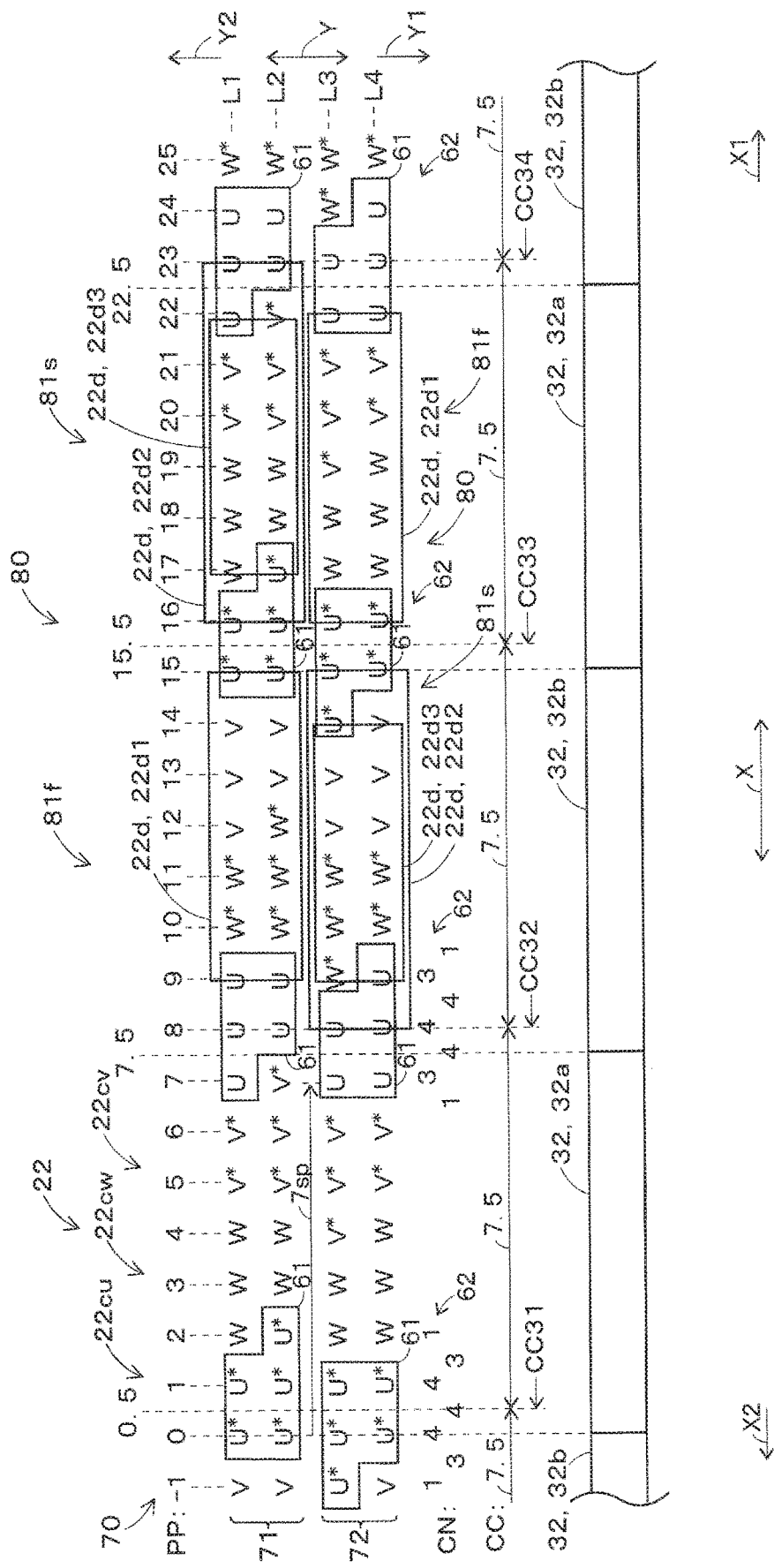
FIG. 19B is a schematic diagram illustrating an example of a phase disposition of a stator winding 22 in which an energizing direction of a plurality of coil sides 22a is corrected in FIG. 19A.

In the phase disposition illustrated in FIG. 19A, coil sides 22a having different electrical conduction directions coexist in the plurality of in-phase coil sides 22a accommodated in the same slot 21c. Accordingly, as illustrated in FIG. 19B, it is necessary to correct the electrical conduction direction of the plurality of coil sides 22a. For example, in the second basic coil 72 illustrated in FIG. 19B, the electrical conduction direction of the plurality of (five) coil sides 22a of the U phase accommodated in the plurality of (three) slots 21c, which have the location coordinates PP of 7, 8, and 9, is reverse to the electrical conduction direction illustrated in FIG. 19A. The foregoing may also be equally applied to another one phase band 61 of the second basic coil 72.

Figure 19C:
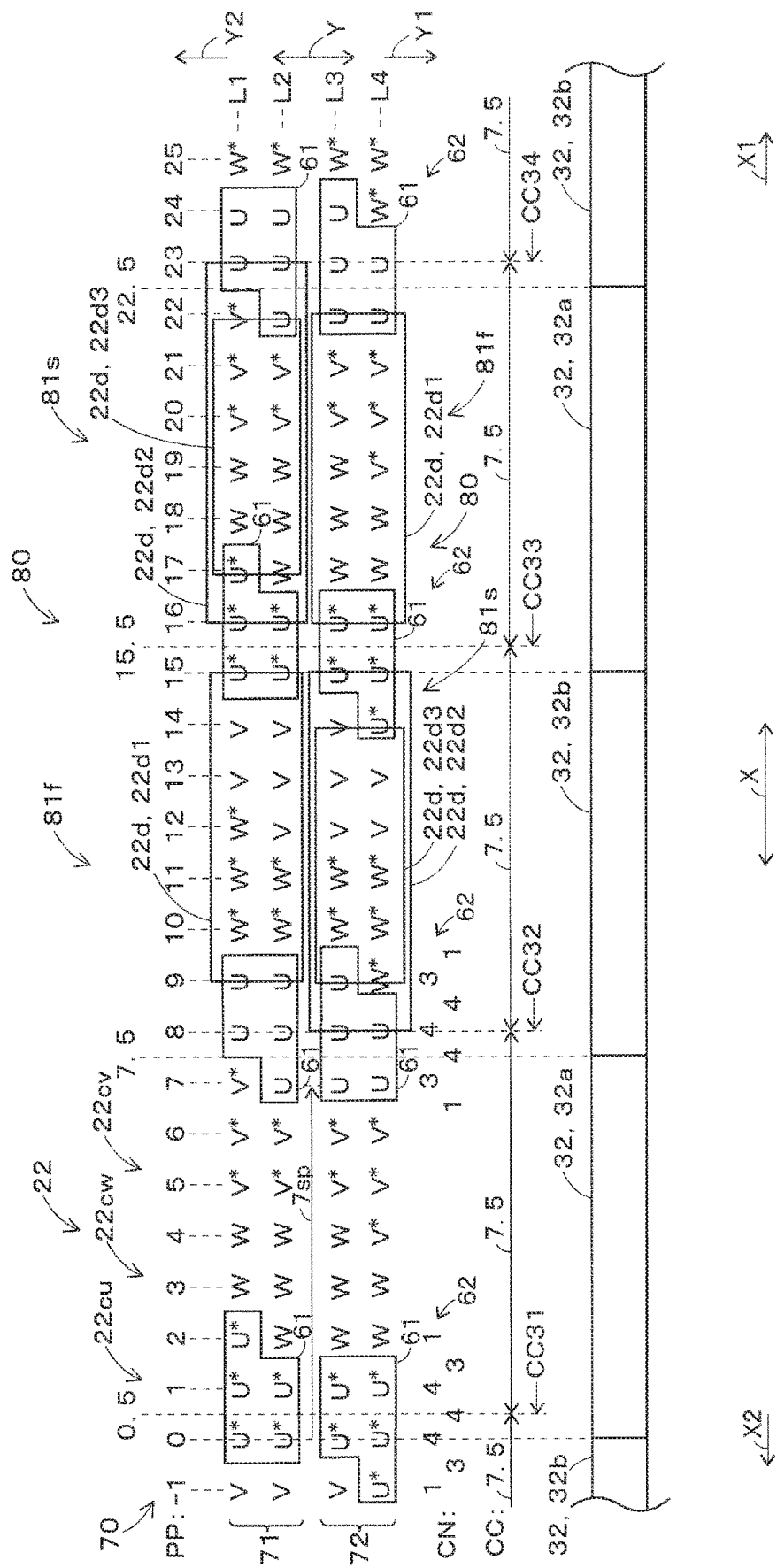
FIG. 19C is a schematic diagram illustrating an example of a phase disposition of the stator winding 22 in which the coil sides 22a having the same phase accommodated in the same slot 21c are concentrated within the corresponding slot 21c in FIG. 19B.

As illustrated in FIG. 19C, in this modified embodiment, the plurality of coil sides 22a accommodated in the same slot 21c are arranged such that the coil sides 22a of the in-phase are concentrated within the corresponding slot 21c. For example, in the second basic coil 72 illustrated in FIG. 19B, the coil side 22a of the U phase accommodated in the slot 21c, which has the location coordinate PP of −1, is moved from the third layer L3 to the fourth layer L4 in FIG. 19C. Further, in the first basic coil 71 illustrated in FIG. 19B, the coil side 22a of the U phase accommodated in the slot 21c, which has the location coordinate PP of 2, is moved from the second layer L2 to the first layer L1 in FIG. 19C. The foregoing may be equally applied to another mixed one phase band 62.

For example, a width of a coil side distribution of the mixed one phase band 62 of the U phase formed in the plurality of (four) slots 21c, which has the location coordinates of −1, 0, 1, and 2, is four slots. A width of the coil side distribution of the mixed one phase band 62 of the U phase formed in the plurality of (three) slots 21c, which have the location coordinates PP of 7, 8, and 9, is three slots. Further, a width of an effective coil side distribution of the mixed one phase band 62 of the U phase formed in the plurality of (four) slots 21c, which have the location coordinates PP of −1, 0, 1, and 2, is 4 slots. A width of the effective coil side distribution of the mixed one phase band 62 of the U phase formed in the plurality of (three) slots 21c, which have the location coordinates PP of 7, 8, and 9, is four slots.

As described above, the width (four slots) of the effective coil side distribution of this modified embodiment increases compared to the width (3.5 slots) of the effective coil side distribution of the foregoing reference embodiment (the embodiment in which the stator winding 22 includes one basic coil 70) already described in the embodiment. Accordingly, a magnetomotive force distribution of this modified embodiment becomes gentler compared to a magnetomotive force distribution of the reference embodiment.

Figure 20:
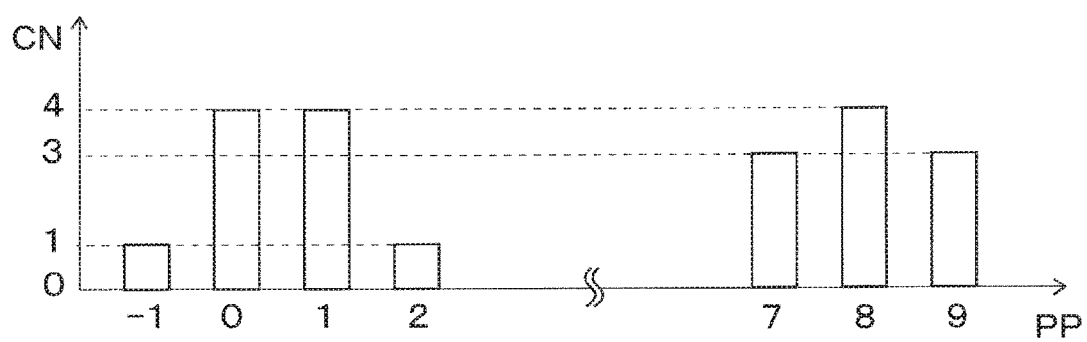
FIG. 20 is a schematic diagram illustrating an example of a coil side distribution according to the fifth modified embodiment.

FIG. 20 illustrates an example of a coil side distribution of this modified embodiment (in which the stator winding 22 includes a plurality of (two) basic coils 70). As illustrated in FIG. 19C, for example, one coil side 22a of the U phase is accommodated in the slot 21c which has the location coordinate PP of −1. Accordingly, as illustrated in FIG. 20, the number of (the coil side number CN) coil sides 22a of the U phase at the location coordinate PP of −1 is 1. Similarly, the plurality of (four) coil sides 22a of the U phase are accommodated in the slot 21c which has the location coordinate PP of 0, and the number of (the coil side number CN) coil sides 22a of the U phase at the location coordinate PP of 0 is 4. Further, the plurality of (four) coil sides 22a of the U phase are accommodated in the slot 21c which has the location coordinate PP of 1, and the number of (the coil side number CN) coil sides 22a of the U phase at the location coordinate PP of 1 is 4. Further, one coil side 22a of the U phase is accommodated in the slot 21c which has the location coordinate PP of 2, and the number of (the coil side number CN) coil sides 22a of the U phase at the location coordinate PP of 2 is 1.

The plurality of (three) coil sides 22a of the U phase are accommodated in the slot 21c which has the location coordinate PP of 7, and the number of (the coil side number CN) coil sides 22a of the U phase at the location coordinate PP of 7 is 3. Further, the plurality of (four) coil sides 22a of the U phase are accommodated in the slot 21c which has the location coordinate PP of 8, and the number of (the coil side number CN) coil sides 22a of the U phase at the location coordinate PP of 8 is 4. Further, the plurality of (three) coil sides 22a of the U phase are accommodated in the slot 21c which has the location coordinate PP of 9, and the number of (the coil side number CN) coil sides 22a of the U phase at the location coordinate PP of 9 is 3.

The coil side distribution of this modified embodiment illustrated in FIG. 20 is enlarged in the first direction (the direction of arrow X) compared to the coil side distribution of the reference embodiment illustrated in FIG. 17A so as to have a gentle shape. Further, the coil side distribution of this modified embodiment is close to a sine wave compared to the coil side distribution of the reference embodiment. Accordingly, the rotary electric apparatus 10 of this modified embodiment may obtain the same effect as that described in the embodiment.

For example, in the first basic coil 71, the one phase band 61 of the U phase formed in the plurality of (three) slots 21c, which have the location coordinates PP of 0, 1, and 2, occupies 2.5 slots. Similarly to the embodiment, when the number of serially converted conductors of the coil side 22a that occupies one slot 21c is a reference conductor number t0, the number of first coil side conductors may be represented by 2.5×t0.

The one phase band 61 of the U phase of the second basic coil 72 disposed at the position moved by seven slot pitch in the first direction (the direction of arrow X) with respect to the corresponding one phase band 61 of the first basic coil 71 is formed in the plurality of (three) slots 21c, which have the location coordinates PP of 7, 8, and 9, and occupies 2.5 slots. Accordingly, the number of second coil side conductors may be represented by 2.5×t0. That is, in this modified embodiment, the number of first coil side conductors is equal to the number of second coil side conductors. Further, the foregoing may also be equally applied to another one phase band 61.

As illustrated in FIGS. 19B and 19C, the stator winding 22 in which the plurality of (in this embodiment, two) basic coils 70 are mixed includes a plurality of (three) phase coils 22c (the U phase coil 22cu, the V phase coil 22cv, and the W phase coil 22cw). The plurality of (three) phase coils 22c include a plurality (eight phases of each of the three phases, a total of 24) pole pair coils 80, and each pole pair coil 80 includes the plurality of (three) unit coils 22d that are concentrically wound. Further, in FIGS. 19B and 19C, for convenience of the illustration, the plurality of (six) unit coils 22d that configure the two pole pair coils 80 of the coil 22cu of the U phase of one magnetic pole pair are illustrated.

Figure 21:
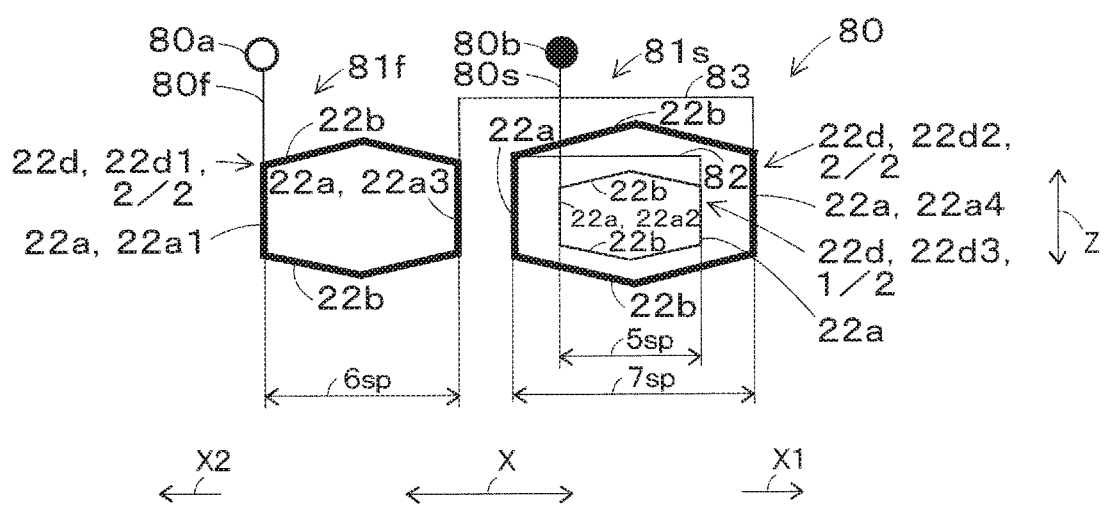
FIG. 21 is a schematic diagram illustrating a configuration example of a pole pair coil 80 according to the fifth modified embodiment.

As illustrated in FIGS. 19B, 19C, and 21, a first pole coil 81f of this modified embodiment includes one unit coil 22d, and the corresponding unit coil 22d is set to a first unit coil 22d1. A coil pitch between one pair of coil sides 22a and 22a of the first unit coil 22d1 is set to six slot pitch (6 sp). The first unit coil 22d1 is concentrically wound, and the first pole coil 81f is formed.

A second pole coil 81s includes a plurality of (two) unit coils 22d having different coil pitch between the pair of coil sides 22a and 22a, and the plurality of (two) corresponding unit coils 22d is set to a second unit coil 22d2 and a third unit coil 22d3. The coil pitch between the pair of coil sides 22a and 22a of the second unit coil 22d2 is set to seven slot pitch (7 sp), and the coil pitch between the pair of coil sides 22a and 22a of the third unit coil 22d3 is set to five slot pitch (5 sp). The second unit coil 22d2 and the third unit coil 22d3 are concentrically wound, and are serially connected by an inter-unit coil connection portion 82, so that the second pole coil 81s is formed.

As described above, in this modified embodiment as well, the plurality of (three) unit coils 22d that configure each pole pair coil 80 (the first unit coil 22d1, the second unit coil 22d2, and the third unit coil 22d3) has different coil pitch between the pair of coil sides 22a and 22a accommodated in the pair of slots 21c and 21c. Further, the plurality of (three) unit coils 22d that configure each pole pair coil 80 (the first unit coil 22d1, the second unit coil 22d2, and the third unit coil 22d3) have coil pitch between the pair of coil sides 22a and 22a, which is set to be smaller than the number of (in this modified embodiment, 7.5) slots per every pole. Accordingly, the foregoing in the embodiment may also be equally applied to this modified embodiment.

As illustrated in FIGS. 19B and 19C, the stator winding 22 of this modified embodiment includes the even-number kinds (in this modified embodiment, two kinds) of plurality of (in this modified embodiment, two) basic coils 70 in which the dispositions on the stator 20 are different. Further, each of the plurality of (in this embodiment, three) phase coils 22c includes the pole pair coils 80 of the number of (in this embodiment, four) magnetic pole pairs of the plurality (in this modified embodiment, eight) of mover magnetic poles 32 in each of the plurality of (two) basic coils 70. Specifically, each of the plurality of (three) phase coils 22c includes the pole pair coils 80 of the number of (four) magnetic pole pairs in the first basic coil 71, and includes the pole pair coils 80 of the number of (four) magnetic pole pairs in the second basic coil 72.

The plurality of (eight) pole pair coils 80 included in each of the plurality of (three) phase coils 22c may be electrically connected by at least the serial connection between the serial connection and the parallel connection. Further, in each of the plurality of (three) phase coils 22c, the plurality of (eighth) in-phase pole pair coils 80 may be electrically connected through the pair of coil lead-out portions 80f and 80s.

FIG. 22A illustrates an example of a connection of each pole pair coil 80 of the U phase coil 22cu. In FIG. 22A, for convenience of the illustration, two pole pair coils 80 of the U phase coil 22cu included in the first basic coil 71 and two pole pair coils 80 of the U phase coil 22cu included in the second basic coil 72 are illustrated. In the two pole pair coils 80 of the U phase coil 22cu included in the first basic coil 71, a winding start portion 80a of a first coil lead-out portion 80f of one pole pair coil 80 is connected with a U phase terminal 8TU. A winding end portion 80b of a second coil lead-out portion 80s of the corresponding pole pair coil 80 is connected with the winding start portion 80a of the first coil lead-out portion 80f of one pole pair coil 80 adjacent in the first direction (the direction of arrow X). In this manner, the two pole pair coils 80 are serially connected. Further, actually, four pole pair coils 80 of the U phase coil 22cu included in the first basic coil 71 are serially connected.

In the two pole pair coils 80 of the U phase coil 22cu included in the second basic coil 72, the winding start portion 80a of the first coil lead-out portion 80f of one pole pair coil 80 is connected to a neutral point 8N. A winding end portion 80b of a second coil lead-out portion 80s of the corresponding pole pair coil 80 is connected with the winding start portion 80a of the first coil lead-out portion 80f of one pole pair coil 80 adjacent in the first direction (the direction of arrow X). Accordingly, the two pole pair coils 80 are serially connected. Further, actually, four pole pair coils 80 of the U phase coil 22cu included in the second basic coil 72 are serially connected.

Here, an end portion opposite to an end portion that is connected with the U phase terminal 8TU in an end portion of the pole pair coil 80 of the serially connected U phase coil 22cu in the first basic coil 71 (the winding end portion 80b of the second coil lead-out portion 80s) is defined as a first end portion 80e1. Further, an end portion opposite to an end portion that is connected with the neutral point 8N in the end portion of the pole pair coil 80 of the serially connected U phase coil 22cu in the second basic coil 72 (the winding end portion 80b of the second coil lead-out portion 80s) is defined as a second end portion 80e2. In this embodiment, the first end portion 80e1 and the second end portion 80e2 are electrically connected. Accordingly, the plurality of (eight) pole pair coils 80 of the U phase coil 22cu are all serially connected. In this embodiment, the kind of pole pair coil 80 included in the U phase coil 22cu is one kind, and the number of kinds of the pole pair coil 80 may be minimized. The foregoing may also be equally applied to the V phase coil 22cv and the W phase coil 22cw.

Figure 22B:
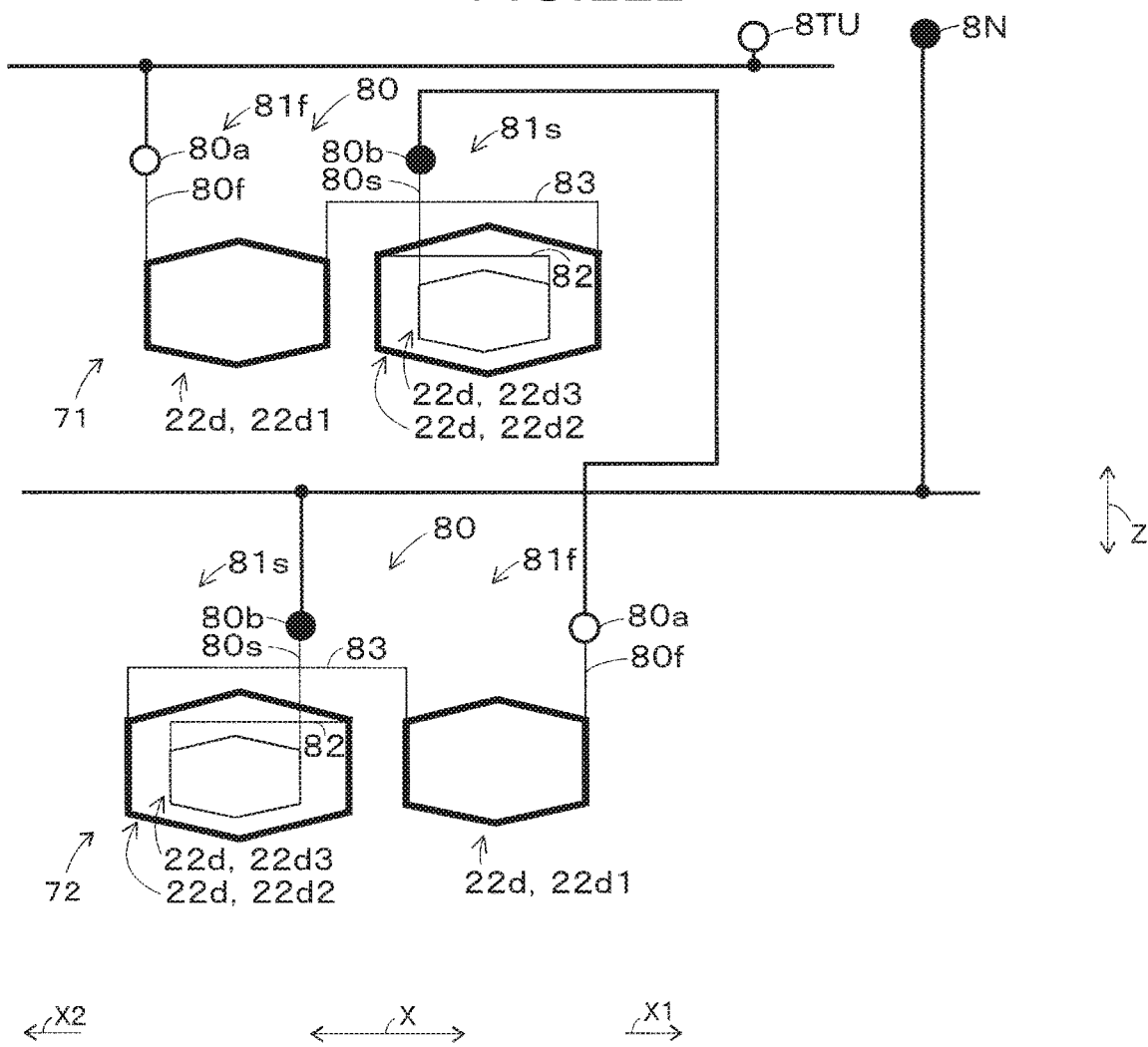
FIG. 22B is a connection diagram illustrating an example of another connection of each pole pair coil 80 of a U phase coil 22cu according to a modified embodiment.

FIG. 22B illustrates an example of another connection of each pole pair coil 80 of the U phase coil 22cu. In FIG. 22B, for convenience of the illustration, one pole pair coil 80 of the U phase coil 22cu included in the first basic coil 71 and one pole pair coil 80 of the U phase coil 22cu included in the second basic coil 72 are illustrated. In this embodiment, the pole pair coil 80 of the U phase coil 22cu included in the first basic coil 71 is the same as the foregoing pole pair coil 80, but a winding direction of the pole pair coil 80 of the U phase coil 22cu included in the second basic coil 72 is set to an inverse direction with respect to the pole pair coil 80 of the U phase coil 22cu included in the first basic coil 71. Specifically, the form of the pole pair coil 80 of the U phase coil 22cu included in the second basic coil 72 coincides with the form of the pole pair coil 80 of the U phase coil 22cu included in the first basic coil 71 rotated by 180° around a virtual straight line that extends in the third direction (the direction of arrow Z).

The first pole coil 81f of the pole pair coil 80 of the U phase coil 22cu included in the first basic coil 71 faces the second pole coil 81s of the pole pair coil 80 of the U phase coil 22cu included in the second basic coil 72. The second pole coil 81s of the pole pair coil 80 of the U phase coil 22cu included in the first basic coil 71 faces the first pole coil 81f of the pole pair coil 80 of the U phase coil 22cu included in the second basic coil 72.

The winding start portion 80a of the first coil lead-out portion 80f of the pole pair coil 80 of the U phase coil 22cu included in the first basic coil 71 is connected with the U phase terminal 8TU. Further, the winding end portion 80b of the second coil lead-out portion 80s of the pole pair coil 80 of the U phase coil 22cu included in the first basic coil 71 is connected with the winding start portion 80a of the first coil lead-out portion 80f of the pole pair coil 80 of the U phase coil 22cu included in the second basic coil 72. Further, the winding end portion 80b of the second coil lead-out portion 80s of the pole pair coil 80 of the U phase coil 22cu included in the second basic coil 72 is connected with the neutral point 8N. Accordingly, the plurality of (two) pole pair coils 80 of the U phase coil 22cu of one magnetic pole pair are all serially connected.

Similarly, for the plurality of (six) pole pair coils 80 of the remaining three magnetic pole pairs, the plurality of (two) pole pair coils 80 of one magnetic pole pair are all serially connected. Here, the plurality of (two) serially connected pole pair coils 80 of one magnetic pole pair are set to a serial pole pair coil. All of the total of four sets of serial pole pair coils may be serially connected. Further, the total of four sets of serial pole pair coils may also be connected in parallel. Further, two sets of serial pole pair coils among the total of four sets of serial pole pair coils may be serially connected, the remaining two sets of serial pole pair coils may be serially connected, and the two sets of serially connected serial pole pair coils and the two sets of serially connected serial pole pair coils may also be connected in parallel. In this embodiment, the number of kinds of pole pair coil 80 included in the U phase coil 22cu is 2, and the number of kinds of the pole pair coil 80 increases compared to the form illustrated in FIG. 22A. However, in this embodiment, when the number of second basic coils 72 increases, it is easy to equalize the wires connected between the pole pair coils 80. The foregoing may also be equally applied to the V phase coil 22cv and the W phase coil 22cw.

In the pole pair coil 80 of this modified embodiment, the number of unit coils 22d that configure the first pole coil 81f is smaller by one than that of the embodiment. Further, in the pole pair coil 80 of this modified embodiment, the configuration of the second pole coil 81s is the same as that of the embodiment. Accordingly, the pole pair coil 80 of this modified embodiment is simplified as the configuration of the pole pair coil 80 compared to the embodiment.

As illustrated in FIG. 16D, each of the plurality of in this embodiment, (three) phase coils 22c may include the pole pair coils 80 of the number of (four) magnetic pole pairs of the plurality of (eight) mover magnetic poles 32 in each of the plurality of (four) basic coils 70. Specifically, each of the plurality of (three) phase coil 22c may include the pole pair coils 80 of the number of (four) magnetic pole pairs in the first basic coil 71 that configures the first layer L1 and the second layer L2, and include the pole pair coils 80 of the number of (four) magnetic pole pairs in the second basic coil 72 that forms the third layer L3 and the fourth layer L4. Each of the plurality of (three) phase coil 22c may include the pole pair coils 80 of the number of (four) magnetic pole pairs in the second basic coil 72 that forms the fifth layer L5 and the sixth layer L6, and include the pole pair coils 80 of the number of (four) magnetic pole pairs in the second basic coil 72 that configures the seventh layer L7 and the eighth layer L8.

The disposition of the second basic coil 72 that configures the third layer L3 and the fourth layer L4 is the same as the disposition of the second basic coil 72 that configures the fifth layer L5 and the sixth layer L6 on the stator 20. Accordingly, for example, the number of turns of each unit coil 22d of each pole pair coil 80 included in the second basic coil 72 that configures the third layer L3 and the fourth layer L4 is doubled so that the unit coils 22d having the same disposition on the stator 20 may be integrated (be made be one coil).

Sixth Modified Embodiment

A stator winding 22 may also include a plurality of (three) basic coils 70 (the sixth modified embodiment). In this case as well, each of the plurality of (three) basic coils 70 has the same configuration as that of the foregoing basic coil 70. Further, the plurality of (three) basic coils 70 include a first basic coil 71 and a plurality of (two) second basic coils 72. In this modified embodiment as well, the plurality of (two) second basic coils 72 are disposed at a position moved by a predetermined slot pitch in the first direction (the direction of arrow X) with respect to the first basic coil 71. Further, each of the plurality of (two) second basic coils 72 is disposed at a position moved in one direction (the direction of arrow X1) in the first direction (the direction of arrow X) with respect to the first basic coil 71. Accordingly, the stator winding 22 of this modified embodiment is formed in six layers including a first layer L1 to a sixth layer L6.

In this modified embodiment as well, a unit movement amount is set to seven slot pitch. However, in one second basic coil 72 among the plurality of (two) second basic coils 72 (e.g., the second basic coil 72 that forms a third layer L3 and a fourth layer L4), the predetermined slot pitch is set to one time (7 slot pitch (7 sp)) 7 slot pitch that is the movement unit amount. In another second basic coil 72 among the plurality of (two) second basic coils 72 (e.g., the second basic coil 72 that forms a fifth layer L5 and a sixth layer L6), the predetermined slot pitch is set to two times (14 slot pitch (14 sp)) seven slot pitch that is the movement unit amount. Accordingly, in this modified embodiment as well, n that regulates the predetermined slot pitch is 1 and 2. Further, the first numerical progression includes all of the natural number times from one time (7 slot pitch (7 sp)) to two times (14 slot pitch (14 sp) 7 slot pitch that is the movement unit amount.

In this modified embodiment, the number of (the coil side number CN) plurality of coil sides 22a that configure a mixed one phase band 62 of a U phase is a total of 15, and is equal at every pole of a plurality of (eight) mover magnetic poles 32. Accordingly, a magnitude of the magnetomotive force generated when the stator winding 22 is electrically conducted is equal at every pole of the plurality of (eight) mover magnetic poles 32. Further, rotational symmetry of a magnetomotive force distribution is improved. Accordingly, in this modified embodiment as well, the same effect as the foregoing effect may be obtained.

In this modified embodiment, the stator winding 22 includes the odd number (three) kinds of plurality of (three) basic coils 70 having the different dispositions on the stator 20. Further, in the plurality of (three) basic coils 70, the disposition of the in-phase coil side 22a accommodated in the same slot 21c within the corresponding slot 21c may be concentrated for each phase (for each of the U phase, the V phase, and the W phase). Further, each of a plurality of (three) phase coils 22c may include pole pair coils 80 of the number of (four) magnetic pole pairs of the plurality of (eight) mover magnetic poles 32 in the entirety of the plurality of (three) basic coils 70. Each of the plurality of (three) phase coil 22c may also include pole pair coils 80 of the number of (four) magnetic pole pairs of the plurality of (eight) mover magnetic poles 32 in each of the plurality of (three) basic coils 70.

Seventh Modified Embodiment

A stator winding 22 may also include a plurality of (four) basic coils 70 (the seventh modified embodiment). In this case as well, each of the plurality of (four) basic coils 70 has the same configuration as that of the foregoing basic coil 70. Further, the plurality of (four) basic coils 70 include a first basic coil 71 and a plurality of (three) second basic coils 72. In this modified embodiment as well, the plurality of (three) second basic coils 72 are disposed at a position moved by a predetermined slot pitch in the first direction (the direction of arrow X) with respect to the first basic coil 71. Further, each of the plurality of (three) second basic coils 72 is disposed at a position moved in one direction (the direction of arrow X1) in the first direction (the direction of arrow X) with respect to the first basic coil 71. Accordingly, the stator winding 22 of this modified embodiment is formed in eight layers including a first layer L1 to an eighth layer L8.

In this modified embodiment as well, a unit movement amount is set to seven slot pitch. However, in one second basic coil 72 among the plurality of (three) second basic coils 72 (e.g., the second basic coil 72 that forms a third layer L3 and a fourth layer L4), the predetermined slot pitch is set to one time (7 slot pitch (7 sp)) of 7 slot pitch that is the movement unit amount. Another second basic coil 72 among the plurality of (three) second basic coils 72 (e.g., the second basic coil 72 forming a fifth layer L5 and a sixth layer L6), the predetermined slot pitch is set to two times (14 slot pitch (14 sp)) seven slot pitch that is the movement unit amount. In another second basic coil 72 among the plurality of (three) second basic coils 72 (e.g., the second basic coil 72 forming a seventh layer L7 and the eighth layer L8), the predetermined slot pitch is set to three times (21 slot pitch (21 sp)) 7 slot pitch that is the movement unit amount. As described above, in this embodiment, n that regulates the predetermined slot pitch is 1, 2 and 3. Further, a first numerical progression includes all of the natural number times from one time (7 slot pitch (7 sp)) to three times (21 slot pitch (21 sp) 7 slot pitch that is the movement unit amount.

In this modified embodiment, the number of (the coil side number CN) plurality of coil sides 22a that configure a mixed one phase band 62 of a U phase is a total of 20, and is equal at every pole of a plurality of (eight) mover magnetic poles 32. Accordingly, a magnitude of the magnetomotive force generated when the stator winding 22 is electrically conducted is equal at every pole of the plurality of (eight) mover magnetic poles 32. Further, rotational symmetry of a magnetomotive force distribution is improved. Accordingly, in this modified embodiment as well, the same effect as the foregoing effect may be obtained.

In this modified embodiment, the stator winding 22 includes the even number (four) kinds of plurality of (four) basic coils 70 having the different dispositions on the stator 20. Further, each of the plurality of (three) phase coil 22c may include pole pair coils 80 of the number of (four) magnetic pole pairs of the plurality of (eight) mover magnetic poles 32 in each of the plurality of (four) basic coils 70. Further, each of the plurality of (three) phase coil 22c may include may include pole pair coils 80 of the number of (four) magnetic pole pairs of the plurality of (eight) mover magnetic poles 32 in the entirety of the plurality of (two) basic coils 70 among the plurality of (four) basic coils 70, and may also include pole pair coils 80 of the number of (four) magnetic pole pairs of the plurality of (eight) mover magnetic poles 32 in the entirety of the remaining plurality of (two) basic coils 70.

Eighth Modified Embodiment

A stator winding 22 may include a plurality of (two) basic coils 70, and a movement unit amount may also be set to one slot pitch (the eighth modified embodiment). In this case as well, each of the plurality of (two) basic coils 70 has the same configuration as that of the foregoing basic coil 70. Further, the plurality of (two) basic coils 70 include one first basic coil 71 and one second basic coil 72. In this modified embodiment, one second basic coil 72 is disposed at a position moved by a predetermined slot pitch in the first direction (the direction of arrow X) with respect to the first basic coil 71. Further, one second basic coil 72 is disposed at a position moved in one direction (the direction of arrow X1) in the first direction (the direction of arrow X) with respect to the first basic coil 71. Accordingly, the stator winding 22 of this modified embodiment is formed in four layers including a first layer L1 to a fourth layer L4.

In this modified embodiment as well, the unit movement amount is set to one slot pitch. Further, the predetermined slot pitch is set to one time (one slot pitch (1 sp)) one slot pitch that is the movement unit amount. As described above, in this modified embodiment, n that regulates the predetermined slot pitch is 1. Further, a first numerical progression includes one time (one slot pitch (1 sp)) one slot pitch that is the movement unit amount.

In this modified embodiment, the number of (the coil side number CN) plurality of coil sides 22a that configure a mixed one phase band 62 of a U phase is a total of 10, and is equal at every pole of a plurality of (eight) mover magnetic poles 32. Accordingly, a magnitude of the magnetomotive force generated when the stator winding 22 is electrically conducted is equal at every pole of the plurality of (eight) mover magnetic poles 32. Further, rotational symmetry of a magnetomotive force distribution is improved. Accordingly, in this modified embodiment as well, the same effect as the foregoing effect may be obtained.

In this modified embodiment, in the plurality of (two) basic coils 70, the disposition of the in-phase coil side 22a accommodated in the same slot 21c within the corresponding slot 21c may be concentrated for each phase (for each of the U phase, the V phase, and the W phase). Further, each of a plurality of (three) phase coils 22c may include pole pair coils 80 of the number of (four) magnetic pole pairs of the plurality of (eight) mover magnetic poles 32 in the entirety of the plurality of (two) basic coils 70. Each of the plurality of (two) phase coil 22c may also include pole pair coils 80 of the number of (four) magnetic pole pairs of the plurality of (eight) mover magnetic poles 32 in each of the plurality of (two) basic coils 70.

Another Modified Embodiment

In the embodiment, the fifth modified embodiment, the sixth modified embodiment, and the seventh modified embodiment, the movement unit amount may also be set to eight slot pitch. Further, at least one second basic coil 72 may also be disposed at a position moved in another direction (the direction of arrow X2) in the first direction (the direction of arrow X) with respect to the first basic coil 71. Further, the stator winding 22 may also include five or more basic coils 70, and the number of basic coils 70 is not limited. However, as the number of basic coils 70 increases, a decrease in output torque of the rotary electric apparatus 10 increases. Accordingly, when one kind of basic coil 70 having the same disposition on the stator 20 is used, the number of kinds of the basic coil 70 may be up to two times the number Nspp (in the foregoing embodiment, 5=(2.5×2)) per every pole and per every pole.

<Rotational Order of Noise and Vibration>

The inventors of the present disclosure conducted harmonic analysis in order to recognize a rotational order of noise and vibration reducible by skew and a rotational order of noise and vibration reducible by mixing of the basic coil 70. Further, the inventors of the present disclosure found, from a result of the analysis, that noise and vibration of all of the rotational orders peculiar to a fractional slot configuration are reduced by the skew and the mixing of the basic coil 70. Further, from the result of the analysis, the inventors of the present disclosure derived a recurrence equation for the rotational order of noise and vibration. Further, the inventors of the present disclosure derived a theoretical equation for the rotation order of noise and vibration by investing a principle of the occurrence of noise and vibration. Then, the inventors of the present disclosure verified the validity of the theoretical equation by comparing the derived recurrence equation and with the derived theoretical equation.

(Harmonic Analysis)

Figure 23:
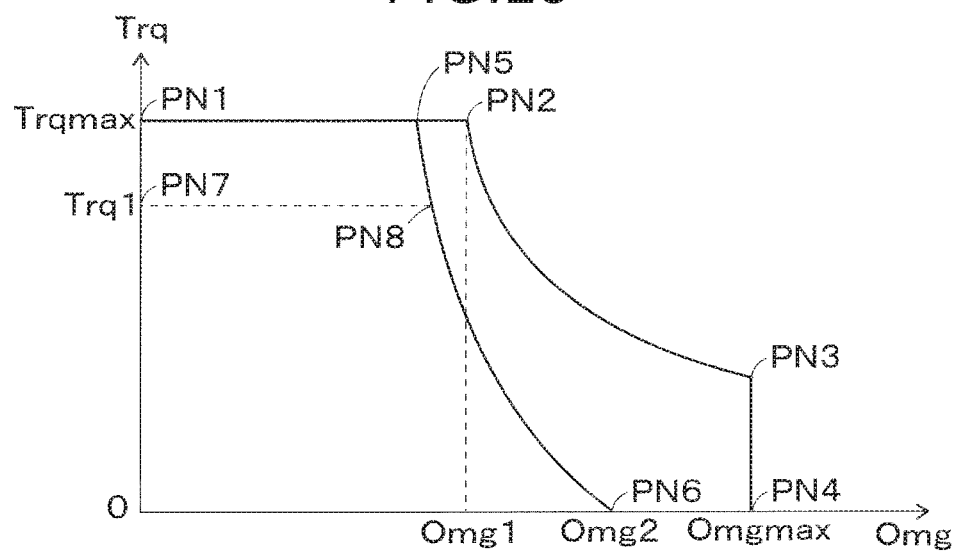
FIG. 23 is a diagram illustrating an example of a driving range of the rotary electric apparatus 10.

FIG. 23 illustrates an example of a driving range of the rotary electric apparatus 10. In FIG. 23, a horizontal axis indicates the number Omg of driving rotation of the rotary electric apparatus 10, and a vertical axis indicates output torque Trq of the rotary electric apparatus 10. A power driving range of the rotary electric apparatus 10 is indicated by an area surrounded by a point O, a point PN1, a point PN2, a point PN3, and a point PN4. Further, in the power driving range of the rotary electric apparatus 10, an area in which sinusoidal driving that changes an output current (phase current) of the rotary electric apparatus 10 with the passage of time to a sinusoidal shape is possible is indicated by an area surrounded by the point O, the point PN1, a point PN5, and a point PN6. An area in which it is possible to further increase the number Omg of driving rotation by square wave driving and the weak field control from the area in which the sinusoidal driving is possible is indicated by an area surrounded by the point PN5, the point PN2, the point PN3, the point PN4, and the point PN6. A maximum value of the number Omg of driving rotation is set to a maximum rotation number Omgmax and a maximum value of output torque Trq is set to maximum torque Trqmax.

A maximum value of the number Omg of driving rotation when output torque Trq is constant at the maximum torque Trqmax is set to a maximum rotation number Omg1. A maximum value of the number Omg of driving rotation drivable only by the sinusoidal driving without performing the square wave driving and the weak field control is set to a maximum rotation number Omg2. Further, an area in which an influence of magnetic saturation is little in the area in which the sinusoidal driving is possible is indicated by an area surrounded by the point O, the point PN7, a point PN8, and the point PN6. A maximum value of output torque Trq of the corresponding area is set to maximum torque Trq1.

The result of the analysis may be applied to the entire area of the power driving range of the rotary electric apparatus 10 in principle. Specifically, in the area in which the influence of magnetic saturation is little in the area in which the sinusoidal driving is possible, the superimposition of harmonic components due to a factor other than the configurations of the stator 20 and the mover 30 (i.e., the fractional slot configurations) is little in the electromagnetic attractive force distribution generated between the stator 20 and the mover 30. That is, in the corresponding region, the harmonic components due to the configurations of the stator 20 and the mover 30 (i.e., the fractional slot configurations) are superimposed in the attractive force distribution. Accordingly, the result of the analysis presented in the present specification is obtained in the corresponding area. The factor other than the configurations of the stator 20 and the mover 30 (i.e., the fractional slot configurations) may include, for example, nonlinearity of the magnetic characteristics of the constituting members that configure the stator 20 and the mover 30, a component other than a fundamental wave component of the output current (phase current) of the rotary electric apparatus 10, and the like. Further, when the result of the analysis is applied in an area other than the corresponding area, an additional response of decreasing the harmonic component due to the factor other than the configurations of the stator 20 and the mover 30 (i.e., the fractional slot configurations) may be appropriately performed.

A maximum output of the rotary electric apparatus 10 of the embodiment is 30 kW, and an external diameter (diameter) of the stator core 21 is 200 mm, and a thickness of the stator core 21 is 50 mm. Further, the maximum rotation number Omgmax is 16 krpm, and the maximum torque Trqmax is 50 Nm. The maximum rotation number Omg1 is about 6 krpm and the maximum rotation number Omg2 is about 10 krpm. Further, the maximum torque Trq1 is set to about 75% (37.5 Nm) of the maximum torque Trqmax. However, the rotary electric apparatus and the driving condition to which the result of the analysis is applicable are not limited to the rotary electric apparatus 10 and the driving condition as described above.

FIG. 24 illustrates an example of a main rotation order of noise and vibration generated by a fractional slot configuration obtained from the result of the analysis. In FIG. 24, for the ½ series rotary electric apparatus 10 having the fractional slot configuration, a main rotation order of noise and vibration generated by the fractional slot configuration is illustrated for each number of magnetic poles of the mover 30 and each number of slots of the stator 20. For example, the rotary electric apparatus 10 of this embodiment is the ½ series rotary electric apparatus 10 having the configuration of eight poles and 60 slots, and is the rotary electric apparatus having the basic configuration in which the number of magnetic poles of the mover 30 is two and the number of slots of the stator 20 is 15. In this case, as illustrated in FIG. 24, a rotation order of noise and vibration includes 64th (=4×16) order, 56th (=4×14) order, 40th (=4×10) order, 32nd (=4×8) order, 16th (=4×4) order, and 8th (=4×2) order.

In FIG. 24, main rotation orders of noise and vibration generated by the fractional slot configuration are illustrated in the same manner for the rotary electric apparatus 10 that has the configuration of eight poles and 84 slots having the basic configuration of two poles and 21 slots, the rotary electric apparatus 10 that has the configuration of eight poles and 36 slots having the basic configuration of two poles and nine slots, and the rotary electric apparatus 10 that has the configuration of eight poles and 12 slots having the basic configuration of two poles and 3 slots. Further, in the rotary electric apparatus 10 that has the configuration of eight poles and 12 slots having the basic configuration of two poles and 3 slots, the stator winding 22 is wound in a concentrated winding. In the concentrated winding, winding pitch of the stator winding 22 is set to one slot pitch, and the stator winding 22 is wound with one magnetic pole width of the magnetic pole of the stator. In the rotary electric apparatus 10 that has the configuration of eight poles and 12 slots having the basic configuration of two poles and 3 slots, since the stator winding 22 has the concentrated winding configuration, it is difficult to mix the plurality of basic coils 70 so that the magnitude of magnetomotive force generated by the plurality of coil sides 22a that configure the mixed one phase band 62 is equal at every pole of the plurality of mover magnetic poles 32. Accordingly, the rotary electric apparatus 10 that has the configuration of eight poles and 12 slots having the basic configuration of two poles and 3 slots is used as the reference embodiment. Similarly to the case where the number Nspp of slots per every pole and per every phase is 4.5 or more, it is possible to obtain a main rotation order of noise and vibration generated by the fractional slot configuration.

A main rotation order of noise and vibration generated by the fractional slot configuration may be obtained, for example, as described below. A magnetic flux density of the air gap between the stator 20 and the mover 30 is calculated by a field analysis and a spatiotemporal distribution of the electromagnetic attractive force generated between the stator 20 and the mover 30 is obtained. Then, the spatiotemporal distribution is Fourier expanded to obtain a space component (the spatial deformation mode order) and a time component (time order and rotation direction) of the attractive force. The rotation order of noise and vibration becomes the order obtained by multiplying the spatial deformation mode order and the time order. However, the time order is defined as the number of times of the rotation of the spatial deformation of the corresponding spatial deformation mode order per a mechanical angle of 360° of the mover 30 (one rotation of the mover 30 in the cylindrical rotary electric apparatus 10).

Specifically, in the rotary electric apparatus 10 in which a peak value of attractive force is not equivalent for every one magnetic pole, but is equivalent in every other pole for every one magnetic pole pair (every two magnetic poles) (e.g., the ½ series eight-pole rotary electric apparatus), strength and weakness of the magnetomotive force is repeated four times per one rotation of the stator core 21. As a result, an outer circumference of the stator core 21 is easily deformed in a shape indicated by the curved line 21s4 of FIG. 5B, so that the ½ series rotary electric apparatus 10 having the eight poles includes, for example, the fourth-order spatial deformation mode. In this case, for example, it is assumed that the spatial deformation of the fourth-order spatial deformation mode is 16 rotation per one rotation of the mover 30. That is, it is assumed that the spatial deformation of the fourth-order spatial deformation mode has a rotation speed 16 times that of the mover 30. In this case, the rotation order of noise and vibration is 64th (=4×16) order. Similarly, the rotation order of noise and vibration illustrated in FIG. 24 is obtained. Further, a time order of noise and vibration includes two kinds including normal rotation and reverse rotation (corresponding to a rotation direction). The normal rotation and the reverse rotation are obtained from a time component (time order and rotation direction) in the Fourier expansion, so that in FIG. 24, the orders at the normal rotation and the reverse rotation are described.

Figure 25A:
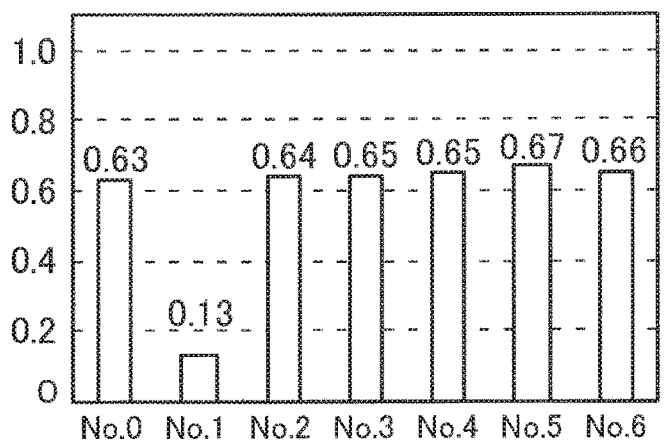
FIG. 25A is a diagram illustrating an example of an effect of reducing noise and vibration of 64th rotation order at the time of electrical conduction.
Figure 25B:
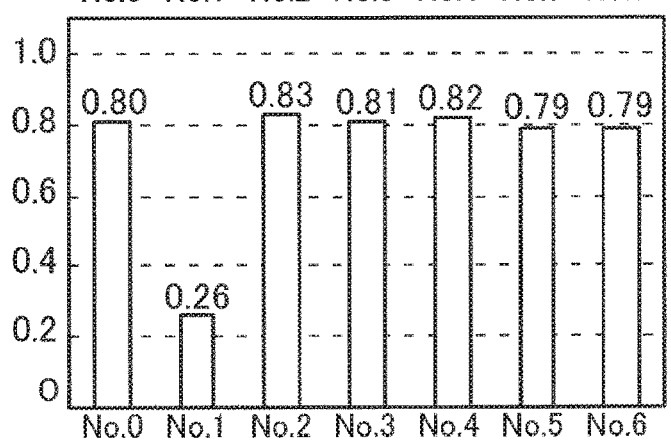
FIG. 25B is a diagram illustrating an example of an effect of reducing noise and vibration of 56th rotation order at the time of electrical conduction.
Figure 25C:
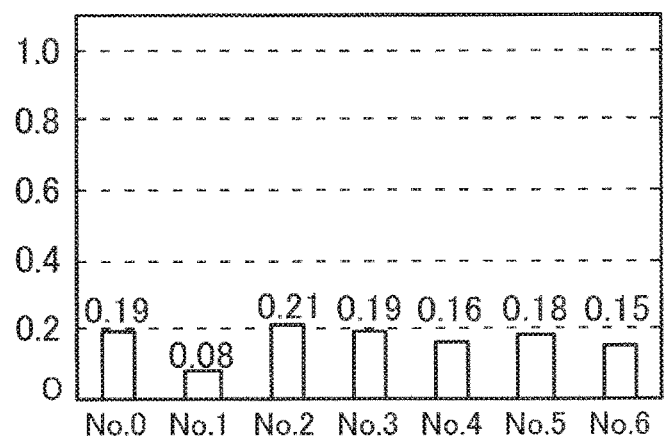
FIG. 25C is a diagram illustrating an example of an effect of reducing noise and vibration of 40th rotation order at the time of electrical conduction.
Figure 25D:
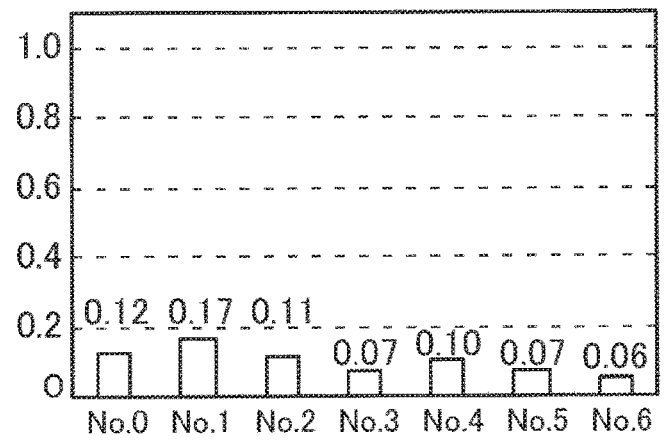
FIG. 25D is a diagram illustrating an example of an effect of reducing noise and vibration of 32nd rotation order at the time of electrical conduction.
Figure 25E:
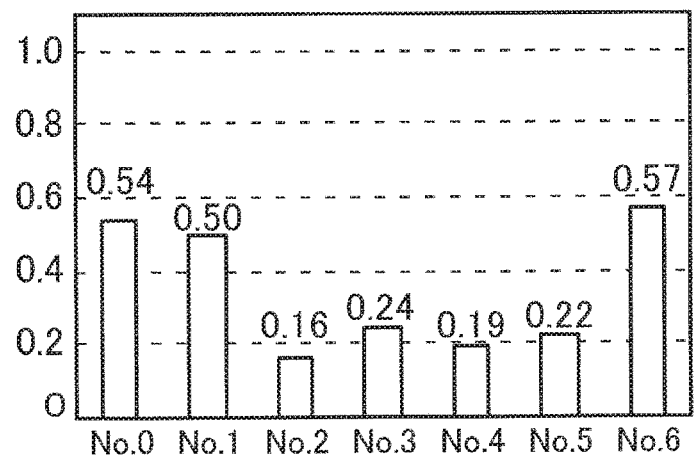
FIG. 25E is a diagram illustrating an example of an effect of reducing noise and vibration of 16th rotation order at the time of electrical conduction.
Figure 25F:
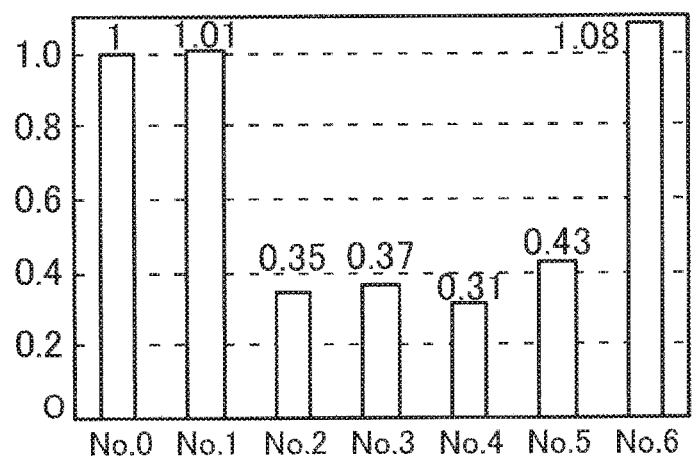
FIG. 25F is a diagram illustrating an example of an effect of reducing noise and vibration of the 8th rotation order at the time of electrical conduction.

FIGS. 25A to 25F illustrate examples of an effect of reducing noise and vibration at the time of electrical conduction. FIG. 25A illustrates the 64th rotation order of noise and vibration generated by the fractional slot configuration, and FIG. 25B illustrates the 56th rotation order of noise and vibration generated by the fractional slot configuration. FIG. 25C illustrates the 40th rotation order of noise and vibration generated by the fractional slot configuration, and FIG. 25D illustrates the 32nd rotation order of noise and vibration generated by the fractional slot configuration. FIG. 25E illustrates the 16th rotation order of noise and vibration generated by the fractional slot configuration, and FIG. 25F illustrates the 8th rotation order of noise and vibration generated by the fractional slot configuration.

In FIGS. 25A to 25F, No. 0 represents the analysis result of the rotary electric apparatus 10 according to the reference embodiment. In the reference embodiment, both the skew and the mixing of the basic coil 70 are not performed. In FIGS. 25A to 25F, the amplitude of electromagnetic attractive force generated in the second direction (the direction of arrow Y) is indicated by using a ratio when the amplitude of attractive force of No. 0 illustrated in FIG. 25F is 1. Further, No. 1 represents the analysis result of the rotary electric apparatus 10 according to the embodiment. In No. 1, the skew is performed on the mover 30 so that the maximum value of the relative skew amount between the stator 20 and the mover 30 is one slot pitch of the plurality of slots 21c. Further, in the embodiment, as described above, the plurality of (four) basic coils 70 are mixed, but for easy understanding of the effect of reducing noise and vibration, only the effect by the skew is indicated in No. 1. That is, in No. 1, the mixing of the plurality of (four) basic coils 70 is not performed.

No. 2 represents the analysis result of the rotary electric apparatus 10 according to the fifth modified embodiment. In No. 2, the mixing of the plurality of (two) basic coils 70 is performed. Further, No. 3 represents the analysis result of the rotary electric apparatus 10 according to the sixth modified embodiment. In No. 3, the mixing of the plurality of (three) basic coils 70 is performed. Further, No. 4 represents the analysis result of the rotary electric apparatus 10 according to the embodiment. In No. 4, the mixing of the plurality of (four) basic coils 70 is performed. Further, No. 5 represents the analysis result of the rotary electric apparatus 10 according to the seventh modified embodiment. In No. 5, the mixing of the plurality of (four) basic coils 70 is performed. Further, No. 6 represents the analysis result of the rotary electric apparatus 10 according to the eighth modified embodiment. In No. 6, the mixing of the plurality of (two) basic coils 70 is performed. Further, in the embodiment and the fifth to eighth modified embodiments, the foregoing skew is performed, but for easy understanding of the effect of reducing noise and vibration, in No. 2 to No. 6, only the effect obtained by the mixing of the basic coils 70 is indicated. That is, in No. 2 to No. 6, the skew is not performed. The descriptions about the configurations of No. 0 to No. 6 may also be equally applied to FIG. 25G, FIG. 25H, and FIGS. 26A to 26H.

As illustrated in No. 1 of FIGS. 25A to 25C, noise and vibration of the rotation order on the high-order side may be reduced by the skew in which the maximum value of the relative skew amount between the stator 20 and the mover 30 is set to one slot pitch of the plurality of slots 21c. Particularly, in the two orders on the highest order side illustrated in FIGS. 25A and 25B (64th order and 56th order), the effect is prominent. In the meantime, as illustrated in No. 2 to No. 6 of FIGS. 25A to 25C, even when the basic coils 70 are mixed, it is difficult to reduce noise and vibration of the rotation order on the high-order side.

As illustrated in No. 2 to No. 5 of FIGS. 25D to 25F, noise and vibration of the rotation order on the low-order side may be reduced by the mixing of the basic coils 70. Particularly, in the two orders on the lowest order side illustrated in FIGS. 25E and 25F (16th order and 8th order), the effect is prominent. In the meantime, as illustrated in No. 1 of FIG. 25D to FIG. 25F, even when the skew is performed, it is difficult to reduce noise and vibration of the rotation order on the low-order side. Further, noise and vibration of the two intermediate orders (40th order and 32nd order) may be reduced by both the skew and the mixing of the basic coils 70. Further, as illustrated in No. 6 of FIG. 25C and FIG. 25D, the rotary electric apparatus 10 according to the eighth modified embodiment has the prominent effect in the two intermediate orders (40th order and 32nd order).

As described above, effective measures that reduce noise and vibration are different according to the rotation order of noise and vibration. Further, a size of the amplitude of the electromagnetic attractive force generated in the second direction (the direction of arrow Y) is different according to the rotation order. Specifically, an average of the sizes of the amplitude of the 64th order and the 56th order of No. 0, an average of the sizes of the amplitude of the 40th order and the 32nd order of No. 0, and an average of the sizes of the amplitude of the 16th order and the 8th order of No. 0 are 0.715 (=(0.63+0.80)/2), 0.155 (=(0.19+0.12)/2), and 0.77(=(0.54+1.00)/2), respectively, which are about 1:0.2:1.

Figure 25G:
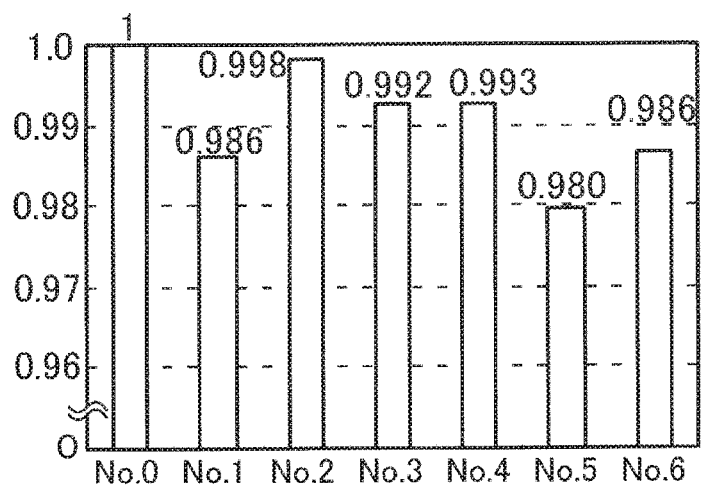
FIG. 25G is a diagram illustrating an example of an effect of suppressing a decrease in output torque at the time of electrical conduction.
Figure 25H:
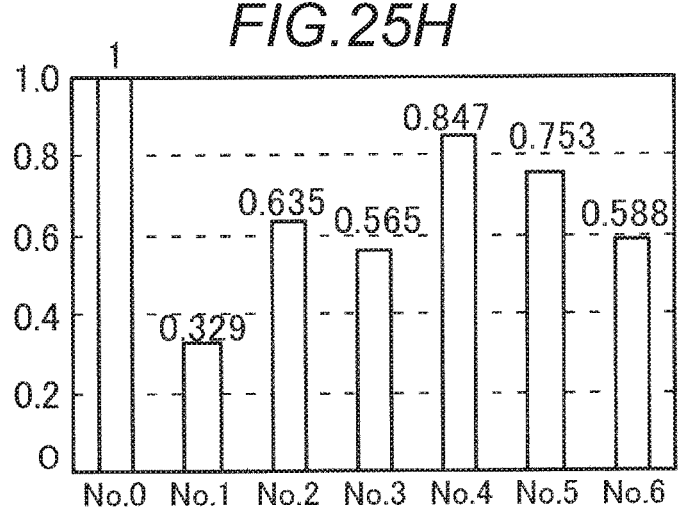
FIG. 25H is a diagram illustrating an example of an effect of reducing torque ripple at the time of electrical conduction.

FIG. 25G illustrates an example of an effect of suppressing a decrease in output torque at the time of electrical conduction. In FIG. 25G, each output torque at the time of electrical conduction is indicated by using a ratio when output torque of the rotary electric apparatus 10 according to the reference embodiment indicated in No. 0 is 1. Further, FIG. 25H illustrates an example of an effect of reducing torque ripple at the time of electrical conduction. In FIG. 25H, each torque ripple at the time of electrical conduction is indicated by using a ratio when torque ripple of the rotary electric apparatus 10 according to the reference embodiment indicated in No. 0 is 1.

As illustrated in No. 1 of FIG. 25G, the decrease in output torque at the time of electrical conduction by the skew is relatively large, but as illustrated in No. 1 of FIG. 25H, the effect of reducing torque ripple at the time of electrical conduction is prominent. Further, as illustrated in No. 2 to No. 6 of FIG. 25G, the decrease in output torque at the time of electrical conduction by the mixing of the basic coils 70 is relatively small in the fifth modified embodiment (No. 2), the sixth modified embodiment (No. 3), and the embodiment (No. 4). As illustrated in No. 2 to No. 6 of FIG. 25H, the effect of reducing torque ripple at the time of electrical conduction by the mixing of the basic coils 70 is prominent in the fifth modified embodiment (No. 2) and the sixth modified embodiment (No. 3). As described above, the effect of suppressing the decrease in output torque and the effect of reducing torque ripple may be considered for the skew and the mixing of the basic coils 70.

Figure 26A:
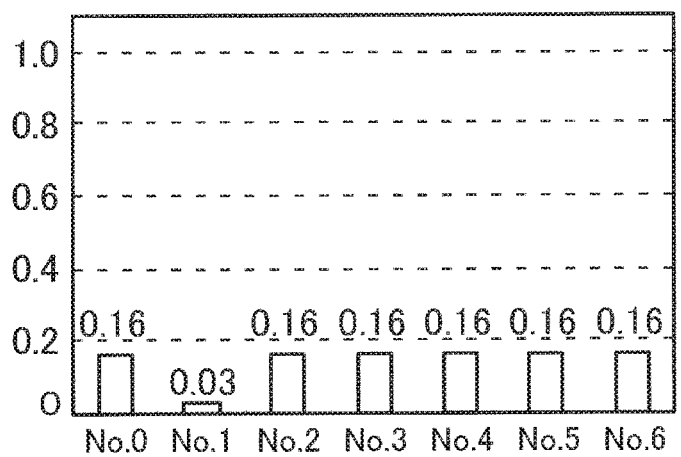
FIG. 26A is a diagram illustrating an example of an effect of reducing noise and vibration of 64th rotation order at the time of non-electrical conduction.
Figure 26B:
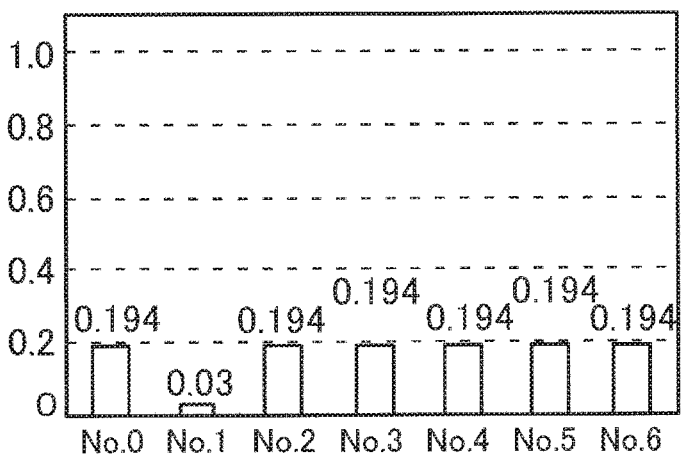
FIG. 26B is a diagram illustrating an example of an effect of reducing noise and vibration of 56th rotation order at the time of non-electrical conduction.
Figure 26C:
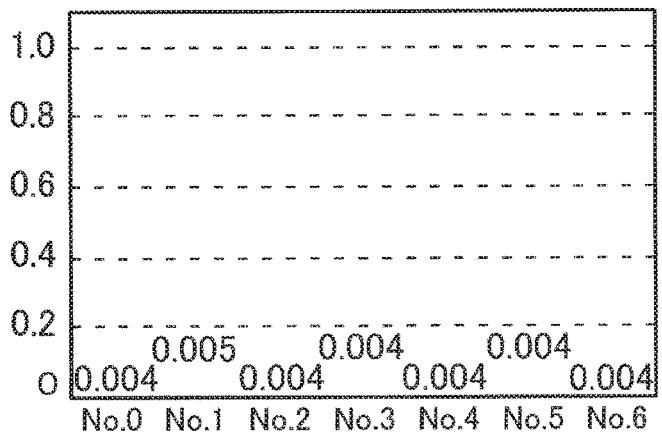
FIG. 26C is a diagram illustrating an example of an effect of reducing noise and vibration of 40th rotation order at the time of non-electrical conduction.
Figure 26D:
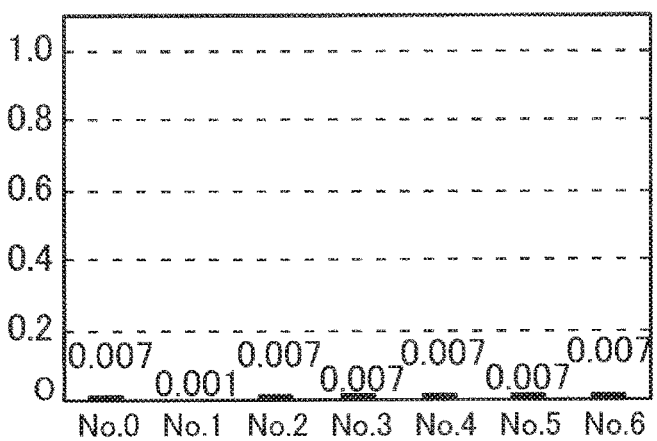
FIG. 26D is a diagram illustrating an example of an effect of reducing noise and vibration of 32nd rotation order at the time of non-electrical conduction.
Figure 26E:
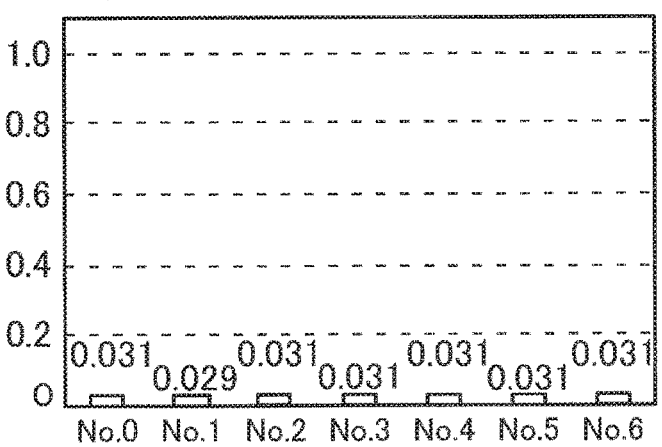
FIG. 26E is a diagram illustrating an example of an effect of reducing noise and vibration of 16th rotation order at the time of non-electrical conduction.
Figure 26F:
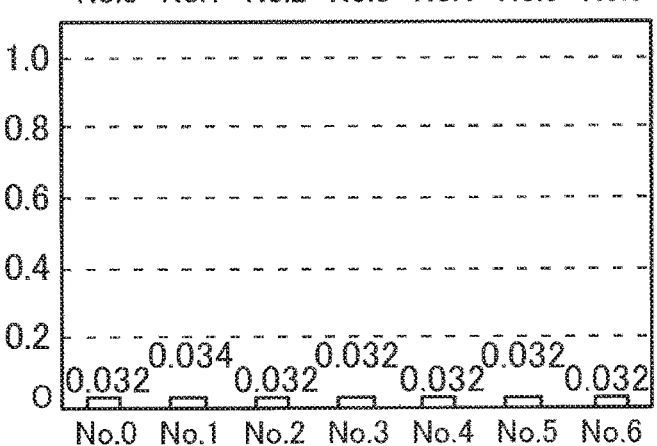
FIG. 26F is a diagram illustrating an example of an effect of reducing noise and vibration of the 8th rotation order at the time of non-electrical conduction.

FIGS. 26A to 26F illustrate examples of the effect of reducing noise and vibration at the time of the non-electrical conduction. FIG. 26A illustrates the 64th rotation order of noise and vibration generated by the fractional slot configuration, and FIG. 26B illustrates the 56th rotation order of noise and vibration generated by the fractional slot configuration. FIG. 26C illustrates the 40th rotation order of noise and vibration generated by the fractional slot configuration, and FIG. 26D illustrates the 32nd rotation order of noise and vibration generated by the fractional slot configuration. FIG. 26E illustrates the 16th rotation order of noise and vibration generated by the fractional slot configuration, and FIG. 26F illustrates the 8th rotation order of noise and vibration generated by the fractional slot configuration.

As illustrated in FIGS. 26A to 26F, the rotation order of noise and vibration at the time of the non-electrical conduction is about two orders on the highest order side illustrated in FIGS. 26A and 26B (64th order and 56th order), and other orders may be ignored. Noise and vibration of the two orders on the highest order side (64th order and 56th order) may be reduced by the skew in which the maximum value of the relative skew amount between the stator 20 and the mover 30 is set to one slot pitch of the plurality of slots 21c. Further, the amplitude of attractive force in No. 2 to No. 6 of FIGS. 26A to 26F is equivalent to that of No. 0 because of the non-electrical conduction. That is, FIGS. 26A to 26F illustrate that the effect of reducing noise and vibration by the mixing of the basic coils 70 is exhibited at the time of the electrical conduction, but is not exhibited at the time of the non-electrical conduction. The foregoing may also be equally applied to FIGS. 26G and 26H.

Figure 26G:
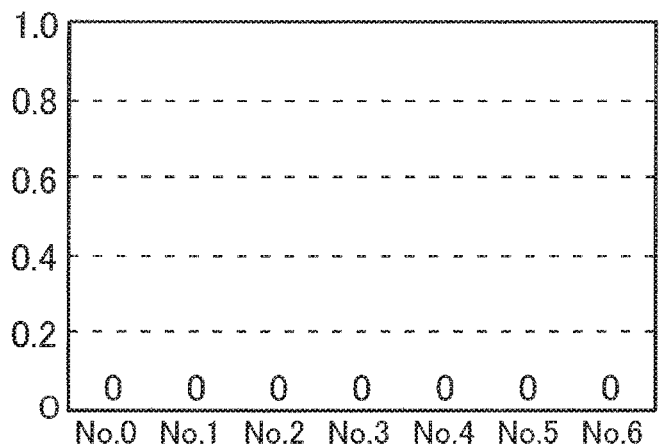
FIG. 26G is a diagram illustrating output torque at the time of non-electrical conduction.
Figure 26H:
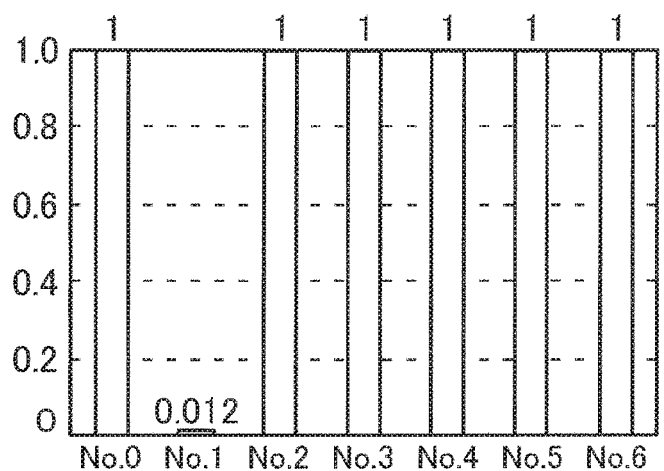
FIG. 26H is a diagram illustrating an example of an effect of reducing torque ripple at the time of non-electrical conduction.

FIG. 26G illustrates output torque at the time of the non-electrical conduction. As illustrated in FIG. 26G, at the time of the non-electrical conduction, output torque of the rotary electric apparatus 10 is zero (0). FIG. 26H illustrates an example of an effect of reducing torque ripple at the time of non-electrical conduction (i.e., cogging torque). In FIG. 26H, torque ripple at the time of non-electrical conduction is indicated by using a ratio when torque ripple of the rotary electric apparatus 10 according to the reference embodiment indicated in No. 0 is 1. As illustrated in FIG. 26H, the torque ripple of the rotary electric apparatus 10 may be decreased by the skew.

<Recurrence Equation of Rotation Order of Noise and Vibration>

For the rotation order of noise and vibration obtained from the analysis result illustrated in FIG. 24, a recurrence equation of the rotation order of noise and vibration is derived. For example, in the rotary electric apparatus 10 that has the configuration of eight poles and 60 slots having the basic configuration of two poles and 15 slots illustrated in FIG. 24, the rotation order of noise and vibration includes 64th (=4×16) order and 56th (=4×14) order. As described above, the 64th order represents the order obtained by multiplying the spatial deformation mode order (4th order) and the time order (16th order), and the 56th order represents the order obtained by multiplying the spatial deformation mode order (4th order) and the time order (14th order). In this case, the number Nspp of slots per every pole and per every phase is 2.5, and the number of slots per every pole is 7.5 (=2.5×3). When 1(=(½)×2) is added to 15 that is two times the number of slots per every pole of 7.5, the time order (16th order) may be obtained. When $1(=(\frac{1}{2})\times 2)$ is subtracted from 15 that is two times the number of slots per every pole of 7.5, the time order (14th order) may be obtained. Accordingly, the two orders NVH on the high-order side (64th order and 56th order) may be represented by Equation 13 below.

$$NVH=4\times\{(15/2)\times 2\pm 1\} \quad \text{(Equation 13)}$$

In the rotary electric apparatus 10 that has the configuration of eight poles and 60 slots having the basic configuration of two poles and 15 slots, the rotation order of noise and vibration includes 40th (=4×10) order and 32nd (=4×8) order. The 40th order represents the order obtained by multiplying the spatial deformation mode order (fourth order) and the time order (tenth order), and the 32nd order represents the order obtained by multiplying the spatial deformation mode order (fourth order) and the time order (eighth order). In this case, as indicated by an arrow of FIG. 24, 9 (=4.5×2) obtained by subtracting 6 (=3×1×2) from 15 that is two times the number 7.5 of slots per every pole is considered. When $1(=(\frac{1}{2})\times 2)$ is added to 9 (=4.5×2), the time order (10th order) may be obtained. When $1(=(\frac{1}{2})\times 2)$ is subtracted from 9 (=4.5×2), the time order (8th order) may be obtained. Accordingly, the two intermediate orders NVM (40th order and 32nd order) may be represented by Equation 14 below.

$$NVM=4\times\{[(15/2)-3\times 1]\times 2\pm 1\} \quad \text{(Equation 14)}$$

In the rotary electric apparatus 10 that has the configuration of eight poles and 60 slots having the basic configuration of two poles and 15 slots, the rotation order of noise and vibration includes 16th (=4×4) order and 8th (=4×2) order. The 16th order represents the order obtained by multiplying the spatial deformation mode order (fourth order) and the time order (fourth order), and the 8th order represents the order obtained by multiplying the spatial deformation mode order (fourth order) and the time order (second order). In this case, as indicated by an arrow of FIG. 24, 3 (=1.5×2) obtained by subtracting 12 (=3×2×2) from 15 that is two times the number 7.5 of slots per every pole is considered. When $1(=(\frac{1}{2})\times 2)$ is added to 3 (=1.5×2), the time order (4th order) may be obtained. When $1 (=\frac{1}{2}\times 2)$ is subtracted from 3(=1.5×2), the time order (2nd order) may be obtained. Accordingly, the two orders NVL on the low-order side (16th order and eighth order) may be represented by Equation 15 below.

$$NVL=4\times\{[(15/2)-3\times 2]\times 2\pm 1\} \quad \text{(Equation 15)}$$

When it is assumed that the number of pole pairs of the mover magnetic pole 32 is a pole pair number mp, in the ½ series rotary electric apparatus 10 having the basic configuration in which the number of magnetic poles of the mover 30 is Np, the spatial deformation mode order may be expressed by (mp×Np/2)th order. For example, in the rotary electric apparatus 10 that has the configuration of eight poles and 60 slots, the number mp of pole pairs is four, and the spatial deformation mode order is 4th (=4×2/2) order. Further, when the rotary electric apparatus 10 has the three-phase apparatus, the number of (Ns/Np) slots per every pole is three times the number Nspp of slots per every pole and per every phase. Accordingly, the rotation number NV of noise and vibration may be represented by Equation 16 below.

$$NV=(mp\times Np/2)\times\{[(Ns/Np)-3\times h]\times 2\pm 1\}=(mp\times Np/2)\times\{3\times(Nspp-h)\times 2\pm 1\} \quad \text{(Equation 16)}$$

As described above, at the time of the electrical conduction, all of the orders of the rotation orders of the noise and vibration illustrated in FIG. 24 are included, and at the time of the non-electrical conduction, two orders on the high-order side among the rotation orders of the noise and vibration illustrated in FIG. 24 are included. Accordingly, an integer h in Equation 16 is an integer from 0 to a at the time of the electrical conduction, and an integer h in Equation 16 is 0 at the time of the non-electrical conduction. However, "a" is the foregoing integer portion a, and refers to an integer portion when the number Nspp of slots per every pole and per every phase is represented by a mixed fraction.

For example, in the rotary electric apparatus 10 that has the configuration of eight poles and 60 slots having the basic configuration of two poles and 15 slots, "a" is 2 and an integer h in Equation 16 at the time of the electrical conduction is 0, 1, and 2. In Equation 16, when the integer h is set to zero (0), the rotation order coincides with the rotation order represented by Equation 13. In Equation 16, when the integer h is set to one, the rotation order coincides with the rotation order represented by Equation 14. In Equation 16, when the integer h is set to two, the rotation order coincides with the rotation order represented by Equation 15. In FIG. 24, the integer h in Equation 16 is also written. The rotation order of noise and vibration may also be reproduced by Equation 16 in the same manner for the rotary electric apparatus 10 that has the configuration of eight poles and 84 slots having the basic configuration of two poles and 21 slots, the rotary electric apparatus 10 that has the configuration of eight poles and 36 slots having the basic configuration of two poles and nine slots, and the rotary electric apparatus 10 that has the configuration of eight poles and 12 slots having the basic configuration of two poles and 3 slots. Specifically, in the rotary electric apparatus 10 that has the configuration of eight poles and 84 slots having the basic configuration of two poles and 21 slots, a is 3, and the integer h is 0, 1, 2, and 3. In the rotary electric apparatus 10 that has the configuration of eight poles and 36 slots having the basic configuration of two poles and nine slots, a is 1, and the integer h is 0 and 1. In the rotary electric apparatus 10 that has the configuration of eight poles and 12 slots having the basic configuration of two poles and three slots, a is 0, and the integer h is 0.

The total number of rotation orders of noise and vibration may be represented by 2×(a+1). For example, in the rotary electric apparatus 10 that has the configuration of eight poles and 60 slots having the basic configuration of two poles and 15 slots, a is 2, and the rotary electric apparatus 10 has 6 (=2×(2+1)) rotation orders including the 64th order, the 56th order, the 40th order, the 32nd order, the 16th order, and the 8th order. Further, any rotary electric apparatus 10 illustrated in FIG. 24 has the rotation orders of the four kinds of basic modes of the two orders (the integer h is 0) on the high-order side and the two orders (the integer h is a) on the low-order side. Further, the rotary electric apparatus 10 in which the integer portion a is 2 or more has the rotation orders of the {2×(a−1)} kinds of intermediate modes between the two orders (the integer h is 0) on the high-order side and the two orders (the integer h is a) on the low-order side.

As illustrated in FIG. 24, when the integer portion a is increased, the number of kinds of the rotation order of noise and vibration is increased. This is considered to be due to superimposition of pulsatory motion according to the increase in the number of slots in a base portion of the attractive force distribution. Further, an attractive force quasi-equivalent point is generated at an intermediate position of an attractive force equivalent point that reflects inequality at every pole in the magnetic configuration configured by the stator 20 and the mover 30 and the disposition of the stator winding 22. When the integer portion a is increased, it is considered that the number of quasi-equivalent points is increased. Further, FIG. 24 illustrates the state where as the integer portion a is increased, the number of kinds of the rotation order is increased by using the arrow.

<Theoretical Equation of Rotation Order of Noise and Vibration>

Figure 27:
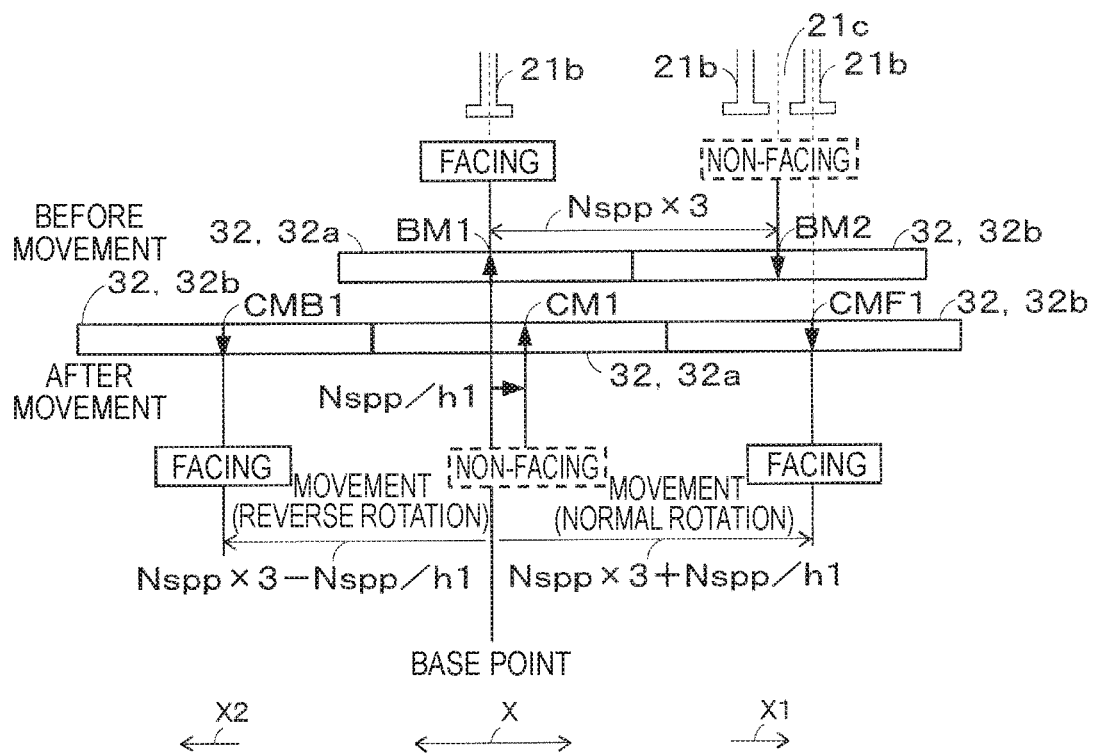
FIG. 27 is a schematic diagram illustrating an example of a relation between a magnetic pole facing state of a mover magnetic pole 32 and a stator magnetic pole (tooth portion 21b) and a movement amount of the mover 30.

FIG. 27 is a theoretical model illustrating an example of a relation between a magnetic pole facing state of the mover magnetic pole 32 and the stator magnetic pole (tooth portion 21*b*), and the movement amount of the mover 30. In FIG. 27, for convenience of the description, one pair of mover magnetic poles 32*a* and 32*b* before the mover 30 moves and one pair of mover magnetic poles 32*a* and 32*b* after the mover 30 moves are illustrated together.

A reference magnetic pole center BM1 indicates a magnetic pole center position of the mover magnetic pole 32*a* before the mover 30 moves and an adjacent magnetic pole center BM2 indicates a magnetic pole center position of the mover magnetic pole 32*b* adjacent to the mover magnetic pole 32*a* before the mover 30 moves. Further, a corresponding reference magnetic pole center CM1 indicates a magnetic pole center position of the mover magnetic pole 32*a* after the mover 30 moves by a base point movement amount (Nspp/h1) (to be described below). A first corresponding magnetic pole center CMF1 represents a magnetic pole center position of the mover magnetic pole 32*b* at the normal rotation side adjacent to the mover magnetic pole 32*a* after the mover 30 moves by the base point movement amount (Nspp/h1). A second corresponding magnetic pole center CMB1 represents a magnetic pole center position of the mover magnetic pole 32*b* at the reverse rotation side adjacent to the mover magnetic pole 32*a* after the mover 30 moves by the base point movement amount (Nspp/h1).

The normal rotation side is set to the side in the same direction as the movement direction of the mover 30, and the reverse rotation side is set to the side in the opposite direction to the movement direction of the mover 30. In FIG. 27, the movement direction of the mover 30 is illustrated based on one direction (the direction of arrow X1) of the first direction (the direction of arrow X) as an example. The foregoing in the specification may also be equally applied to the case where the movement direction of the mover 30 is another direction (the direction of arrow X2) of the first direction (the direction of arrow X). Further, the arrows within one pair of mover magnetic poles 32*a* and 32*b* are illustrated in the same manner as that of FIG. 3.

As described above, the ½ series rotary electric apparatus 10 includes the two kinds of magnetic pole facing states in the first direction (the direction of arrow X) and includes the two kinds of attractive force distribution in the first direction (the direction of arrow X). For example, when the reference magnetic pole center BM1 faces the stator magnetic pole (the tooth portion 21*b*) (in FIG. 27, written as "facing"), the adjacent magnetic pole center BM2 does not face the stator magnetic pole (the tooth portion 21*b*), but faces the slot 21*c* (in FIG. 27, written as "non-facing"). When the mover 30 moves from the base point to the normal rotation side, the reference magnetic pole center BM1 has the state of facing the slot 21*c* (non-facing state) in the state of facing the stator magnetic pole (tooth portion 21*b*) (facing state) to coincide with the corresponding reference magnetic pole center CM1. In this case, the first corresponding magnetic pole center CMF1 and the second corresponding magnetic pole center CMB1 have the states of facing the stator magnetic pole (tooth portion 21*b*) (facing states) in the state of facing the slot 21*c* (non-facing state). That is, it may be said that the center equivalent point of attractive force moves from the reference magnetic pole center BM1 to the first corresponding magnetic pole center CMF1 or the second corresponding magnetic pole center CMB1 as the mover 30 moves from the base point.

Since the periodicity of the magnetic configuration configured by the stator 20 and the mover 30 is reflected to the number Nspp of per every pole and per every phase, the movement amount of the mover 30 may be expressed by the base point movement amount (Nspp/h1) in which one slot pitch is the unit amount by using the integer h1. A distance from the base point to the first corresponding magnetic pole center CMF1 is obtained by adding the base point movement amount (Nspp/h1) of the mover 30 to the number of slots per every pole (in the three-phase apparatus, three times the number Nspp of slots per every pole and per every phase), and is a normal rotation-side movement amount (Nspp×3+Nspp/h1). A distance from the base point to the second corresponding magnetic pole center CMB1 is obtained by subtracting the base point movement amount (Nspp/h1) of the mover 30 from the number of (in the three-phase apparatus, three times the number Nspp of slots per every pole and per every phase) slots per every pole, and is a reverse rotation-side movement amount (Nspp×3−Nspp/h1).

As illustrated in FIG. 27, both the sizes of the normal rotation-side movement amount (Nspp×3+Nspp/h1) and the reverse rotation-side movement amount (Nspp×3−Nspp/h1) (absolute values) are larger than the base point movement amount (Nspp/h1) of the mover 30. That is, there is a mechanism in which attractive force, which is a spatial deformation source generating noise and vibration, moves faster than the movement speed of the mover 30 (i.e., the time order handled by the mechanical angle becomes larger than 1). When a ratio of the normal rotation side movement amount (Nspp×3+Nspp/h1) to the base point movement amount (Nspp/h1) of the mover 30 is set to a movement magnification of the center equivalent point of attractive force, the movement magnification MM may be represented by Equation 17 below. Similarly, for a ratio of the reverse rotation-side movement amount (Nspp×3−Nspp/h1) to the base point movement amount (Nspp/h1) of the mover 30, it is possible to calculate a movement magnification of the center equivalent point of attractive force. Accordingly, in Equation 17 below, a movement magnification MM of the center equivalent point of attractive force is written in both the normal rotation side and the reverse rotation side.

$$MM=(Nspp\times3\pm Nspp/h1)/(Nspp/h1)=3\times h1\pm 1 \quad \text{(Equation 17)}$$

A movement magnification MM of the center equivalent point of attractive force corresponds to the time order of noise and vibrations, and a movement ratio MM is a positive integer. Further, a basic period of the magnetic configuration configured by the stator 20 and the mover 30 is the number Nspp of slots per every pole and per every phase, so that the base point movement amount (Nspp/h1) of the mover 30 is the number Nspp of slots per every pole and per every phase or less. That is, a low limit value of the integer h1 is 1. That is, in this embodiment, "misalignment" of the magnetic configuration configured by the stator 20 and the mover 30 in the ½ series rotary electric apparatus 10 is ½ slot pitch (minimum value) in one magnetic pole of the mover 30. Accordingly, a minimum value of the base point movement amount (Nspp/h1) of the mover 30 is ½ slot pitch. That is, an upper limit value of the integer h1 is (Nspp×2). Accordingly, the integer h1 is an integer from 1 to (Nspp×2). A movement amount larger than (Nspp×2) may be handled as a multiple of the integer h1, so that it is possible to cover all of the base point movement amount (Nspp/h1) of the mover 30 by the integer h1.

From the above, in the ½ series rotary electric apparatus 10 having the basic configuration in which the number of magnetic poles of the mover 30 is Np, the rotation order NV of noise and vibration may be represented by Equation 18 below by using the pole pair number mp and the number Np of magnetic poles of the mover magnetic pole 32 and the integer h1 from 1 to (Nspp×2). Further, in the ½ series rotary electric apparatus 10 in which the number of magnetic poles of the mover 30 is NMP (=mp×Np), the rotation order NV of noise and vibration may be represented by Equation 19 below by using the number NMP of magnetic poles of the mover magnetic pole 32 and the integer h1 from 1 to (Nspp×2). Further, when the recurrence equation of the rotation order of noise and vibration represented by Equation 16 is compared with the theoretical equation of the rotation order of noise and vibration represented by Equation 18, when a relation represented by Equation 20 below is established, the recurrence equation coincides with the theoretical equation.

$$NV = (mp \times Np/2) \times (3 \times h1 \pm 1) \qquad \text{(Equation 18)}$$

$$NV = (NMP/2) \times (3 \times h1 \pm 1) \qquad \text{(Equation 19)}$$

$$(Nspp - h) \times 2 = h1 \qquad \text{(Equation 20)}$$

A change in the attractive force of the number NMP of magnetic poles times of the mover magnetic pole 32 per one rotation of the mover 30 occurs. Accordingly, the rotation order of noise and vibration becomes a multiple of the number NMP of magnetic poles of the mover magnetic pole 32 (e.g., a multiple of 8 in the rotary electric apparatus 10 having eight poles), and (3×h1±1)/2 needs to be an integer. Since a denominator "2" is an even number, 3×h1 needs to be an odd number and the integer h1 needs to be an odd number. Further, as described above, at the time of the non-electrical conduction, every-pole inequality due to the phase disposition of the stator winding 22 is not a problem, but only every-pole inequality due to the magnetic configuration configured by the stator 20 and the mover 30 becomes a problem. Accordingly, at the time of the non-electrical conduction, the integer h1 is only Nspp×2. Further, as described above, the number Nspp of slots per every pole and per every phase may be represented by a+b/c by using the integer portion 1, the numerator portion b, and the denominator portion c, and in the ½ series rotary electric apparatus 10, the number Nspp of slots per every pole and per every phase may be represented by a+b/2. Accordingly, Nspp×2 may be represented by a×2+b.

Figures 28, 29A:
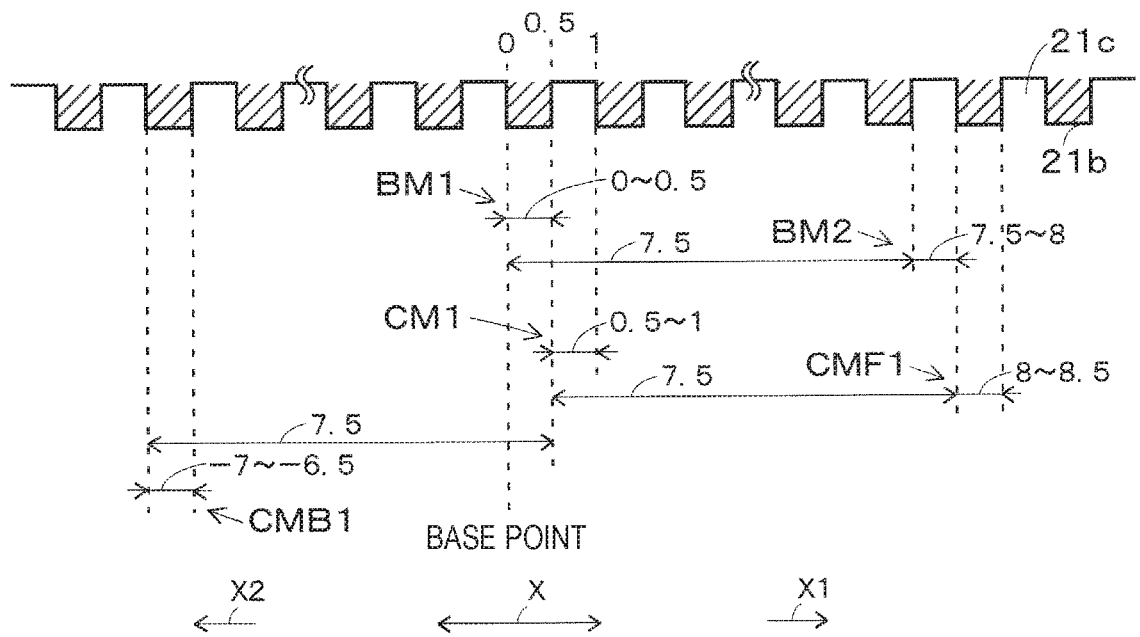
FIG. 28 is a diagram illustrating an example of an existence range of a magnetic pole center.
FIG. 29A is a diagram illustrating an example of requirements for establishing a movement of an attractive force equivalent point of the magnetic pole center.

Next, a movement establishment requirement by which the movement of the center equivalent point of attractive force from the reference magnetic pole center BM1 to the first corresponding magnetic pole center CMF1 or the second corresponding magnetic pole center CMB1 is possible will be reviewed. FIG. 28 illustrates an example of an existence range of a magnetic pole center. In FIG. 28, a hatched portion schematically illustrates the existence range of the tooth portion 21b, and a space between the hatched portions adjacent to the first direction (the direction of arrow X) schematically illustrates the existence range of the slot 21c (a space between the tooth portion 21b and the tooth portion 21b). In FIG. 28, a tooth width that is the width of each of the plurality of (in this embodiment, 60) tooth portions 21b in the first direction (the direction of arrow X), and a slot width that is the width of each of the plurality of (in this embodiment, 60) slots 21c in the first direction (the direction of arrow X) are equally set. Further, FIG. 28 is a schematic diagram for describing the mechanism by which the attractive force equivalent point moves and it is considered that the tooth tip end portion 21d illustrated in FIG. 1 is not included. The important thing in the mechanism by which the attractive force equivalent point moves is the attractive force distribution, so that the tooth width and the slot width in a facing portion of the stator 20 and the mover 30 which exert the largest influence on the attractive force distribution (a surface portion of the stator 20 facing the mover 30 through the air gap) are considered. The foregoing is also equally applied to the case where the tooth width and the slot width are unequally set.

Here, in a location coordinate in the first direction (the direction of arrow X) having a location coordinate 0 as a base point, a location coordinate indicating a range in which the reference magnetic pole BM1 may face the stator magnetic pole (tooth portion 21b) ("facing" illustrated in FIG. 27) is set to a base point location coordinate x0. In order for the reference magnetic pole center BM1 to face the stator magnetic pole (tooth portion 21b) ("facing" illustrated in FIG. 27), the reference magnetic pole center BM1 needs to exist in the range in which the base point position coordinate x0 is from 0 to 0.5 (0+(0 to 0.5)). However, (0+(0 to 0.5)) represents the range obtained by adding a predetermined number from 0 to 0.5 to the integer 0, and hereinafter, a number obtained by adding a predetermined number within a predetermined range to the integer is equally described. In this embodiment, the number Nspp of slots per every pole and per every phase is 2.5, and the number of slots per every pole that is the distance between the reference magnetic pole center BM1 and the adjacent magnetic pole center BM2 is 7.5 (=2.5×3). Accordingly, in order for the adjacent magnetic pole center BM2 to face the slot 21c ("non-facing" illustrated in FIG. 27), the adjacent magnetic pole center BM2 needs to exist in the range (7+(0.5 to 1)) in which the location coordinate is from 7.5 to 8.

For example, when the integer h1 is 5, the base point movement amount (Nspp/h1) of the mover 30 is 0.5 (=2.5/5). In this case, in order for the corresponding reference magnetic pole center CM1 to face the slot 21c ("non-facing" illustrated in FIG. 27), the corresponding reference magnetic pole center CM1 needs to exist in the range in which the location coordinate is from 0.5 to 1 (0+(0.5 to 1)). A distance between the corresponding reference magnetic pole center CM1 and the first corresponding magnetic pole center CMF1 is 7.5 (=2.5×3) that is the number of slots per every pole. Accordingly, in order for the first corresponding magnetic pole center CMF1 to face the stator magnetic pole (tooth portion 21b) ("facing" illustrated in FIG. 27), the first corresponding magnetic pole center CMF1 needs to exist in the range (8+(0 to 0.5)) in which the location coordinate is from 8 to 8.5. Similarly, a distance between the corresponding reference magnetic pole center CM1 and the second corresponding magnetic pole center CMB1 is 7.5 (=2.5×3) that is the number of slots per every pole. Accordingly, in order for the second corresponding magnetic pole center CMB1 to face the stator magnetic pole (tooth portion 21b) ("facing" illustrated in FIG. 27), the second corresponding magnetic pole center CMB1 needs to exist in the range (−7+(0 to 0.5)) in which the location coordinate is from −7 to −6.5. An existence range of the magnetic pole center may be derived in the same manner for the case where the integer h1 is 1, 2, 3, and 4.

FIG. 29A illustrates an example of requirements for establishing a movement of an attractive force equivalent point of the magnetic pole center. FIG. 29B illustrates an example of requirements for establishing a movement of an attractive force equivalent point of the magnetic pole center when the number Nspp of slots per every pole and per every phase is 2.5. Based on the existence range of the magnetic pole center, the reference magnetic pole center BM1 needs to exist in the range in which the base point location coordinate x0 is from 0 to −0.5. For the adjacent magnetic pole center BM2, the base point location coordinate x0 obtained by adding three times the number Nspp of slots per every pole and per every phase needs to be an integer+(0.5 to 1). Further, for the corresponding reference magnetic pole center CM1, the base point location coordinate x0 obtained by adding the base point movement amount (Nspp/h1) of the mover 30 needs to be an integer+(0.5 to 1).

For the first corresponding magnetic pole center CMF1, the base point location coordinate x0 obtained by adding three times (Nspp×3) the number Nspp of slots per every pole and per every phase and the base point movement amount (Nspp/h1) of the mover 30 needs to be an integer+(0 to 0.5). In the ½ series rotary electric apparatus 10, three times (Nspp×3) the number Nspp of slots per every pole and per every phase is an integer+0.5. Accordingly, the base point location coordinate x0 obtained by adding the base point movement amount (Nspp/h1) of the mover 30 needs to be an integer+(0.5 to 1). The requirement for establishing the movement for the magnetic pole center at the normal rotation side including the requirement for establishing the movement for the corresponding reference magnetic pole center CM1 is that the base point location coordinate x0 obtained by adding the base point movement amount (Nspp/h1) of the mover 30 is an integer+(0.5 to 1).

For the second corresponding magnetic pole center CMB1, the base point location coordinate x0 obtained by adding the base point movement amount (Nspp/h1) of the mover 30 and subtracting three times (Nspp×3) the number Nspp of slots per every pole and per every phase needs to be an integer+(0 to 0.5). As described above, in the ½ series rotary electric apparatus 10, three times (Nspp×3) the number Nspp of slots per every pole and per every phase is an integer+0.5. Accordingly, the base point location coordinate x0 obtained by adding the base point movement amount (Nspp/h1) of the mover 30 needs to be an integer+(0.5 to 1). The requirement for establishing the movement for the magnetic pole center at the reverse rotation side including the requirement for establishing the movement for the corresponding reference magnetic pole center CM is that the base point location coordinate x0 obtained by adding the base point movement amount (Nspp/h1) of the mover 30 is an integer+(0.5 to 1). As described above, the requirement for establishing the movement for the magnetic pole center at the normal rotation side is the same as the requirement for establishing the movement for the magnetic pole center at the reverse rotation side.

FIG. 30 illustrates an existence range of the base point position coordinate x0 and the whether the integer h1 exists when the number Nspp of slots per every pole and per every phase is 2.5. When the integer h1 is 1, the base point movement amount (Nspp/h1) of the mover 30 is 2.5 (=2.5/1). When the base point position coordinate x0 adopts the range from 0 to 0.5, x0+2.5/h1(=x0+2.5) adopts the range (2+(0.5 to 1)) from 2.5 to 3 to satisfy the requirement for establishing the movement for the magnetic pole center. Accordingly, the base point location coordinate x0 exists in the entire range from 0 to 0.5. Similarly, when the integer h1 is 5, the base point movement amount (Nspp/h1) of the mover 30 is 0.5 (=2.5/5). When the base point position coordinate x0 adopts the range from 0 to 0.5, x0+2.5/h1 (=x0+0.5) adopts the range (0+(0.5 to 1)) from 0.5 to 1 to satisfy the requirement for establishing the movement for the magnetic pole center. Accordingly, the base point location coordinate x0 exists in the entire range from 0 to 0.5.

When the integer h1 is 3, the base point movement amount (Nspp/h1) of the mover 30 is 0.833 (=2.5/3). When the base point position coordinate x0 adopts the range from 0 to 0.5, x0+2.5/h1 (=x0+0.833) adopts the range (0+(0.833 to 1.333)) from 0.833 to 1.333, so that there is the range which does not satisfy the requirement for establishing the movement for the magnetic pole center. Accordingly, the base point location coordinate x0 exists in the partial range of 0 to 0.167 in the range from 0 to 0.5.

When the integer h1 is 2, the base point movement amount (Nspp/h1) of the mover 30 is 1.25 (=2.5/2). When the base point position coordinate x0 adopts the range from 0 to 0.5, x0+2.5/h1 (=x0+1.25) adopts the range (1+(0.25 to 0.75)) from 1.25 to 1.75, so that there is the range which does not satisfy the requirement for establishing the movement for the magnetic pole center. Accordingly, the base point position coordinate x0 exists in the partial range of 0.25 to 0.5 in the range from 0 to 0.5.

When the integer h1 is 4, the base point movement amount (Nspp/h1) of the mover 30 is 0.625 (=2.5/4). When the base point position coordinate x0 adopts the range from 0 to 0.5, x0+2.5/h1 (=x0+0.625) adopts the range (0+(0.625 to 1.125)) from 0.625 to 1.125, so that there is the range which does not satisfy the requirement for establishing the movement for the magnetic pole center. Accordingly, the base point location coordinate x0 exists in the partial range of 0 to 0.375 in the range from 0 to 0.5.

As described above, the integer h1 needs to be an odd number. Accordingly, the base point position coordinate x0 when the integer h1 is 1, 3, and 5 is "suitable" and the base point position coordinate x0 when the integer h1 is 2 and 4 is "unsuitable". Further, at the time of the non-electrical conduction, the integer h1 is only Nspp×2, and the integer h1 corresponds to only 5 (=2.5×2). At the time of the electrical conduction, the integer h1 may be the odd number as described above. A circle illustrated in FIG. 30 indicates that the integer h1 may exist, and x indicates that the integer h1 does not exist.

Figure 31:
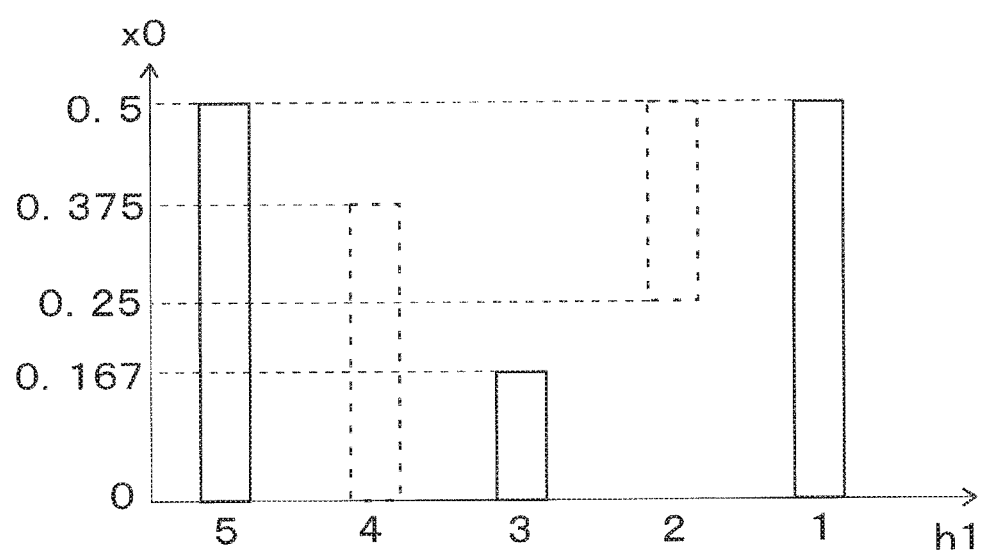
FIG. 31 is a diagram illustrating an existence range of a base point location coordinate x0 when the number Nspp of slots per every pole and per every phase is 2.5.

FIG. 31 illustrates an existence range of a base point position coordinate x0 when the number Nspp of slots per every pole and per every phase is 2.5. In FIG. 31, the existence range of the base point location coordinate x0 that satisfies the requirement for establishing the movement for the magnetic pole center is represented by bar graphs. In FIG. 31, the existence range of the base point location coordinate x0 when the integer h1 is 1, 3, and 5 is indicated by bar graphs with solid lines. As described above, the base point location coordinates x0 when the integer h1 is 2 and 4 are "unsuitable", so that the existence ranges of the base point location coordinate x0 when the integer h1 is 2 and 4 are indicated by bar graphs with broken lines.

(Validity of the Theoretical Equation)

As represented in Equation 20, when the integer h1 coincides with (Nspp−h)×2, the recurrence equation of the rotation order of noise and vibration coincides with the theoretical equation of the rotation order of noise and vibration. Further, at the time of the electrical conduction, the integer h of the recurrence equation is an integer from 0 to a, and at the time of the non-electrical conduction, the integer h of the recurrence equation is 0. In the rotary electric apparatus 10 of this embodiment, the number Nspp of slots per every pole and per every phase is 2.5, at the time of the electrical conduction, the integer h of the recurrence equation is 0, 1, and 2, and at the time of the non-electrical conduction, the integer h of the recurrence equation is 0.

As described above, the integer h of the recurrence equation is 0, Equation 16 represents two orders on the high order side among the rotation orders of noise and vibration (64th order and 56th order). The noise and vibration in the rotation order on the high order side may be reduced by the skew in which the maximum value of the relative skew amount between the stator 20 and the mover 30 is set to one slot pitch of the plurality of slots 21c (see FIGS. 25A and 25B). When the integer h of the recurrence equation is 0, the integer h1 of the theoretical equation is 5, so that the base point movement amount that satisfies the requirement for establishing the movement is 0.5 slot pitch. 0.5 slot pitch reflects "misalignment" of the magnetic configuration configured by the stator 20 and the mover 30 in the ½ series rotary electric apparatus 10 (in one magnetic pole of the mover 30, misaligned by ½ slot pitch). Accordingly, the noise and vibration generated in the range of the base point position coordinate x0 represented by the bar graph when the integer h1 of the theoretical equation h1 illustrated in FIG. 31 is 5 may be reduced by the skew, which is also supported by the theoretical model illustrated in FIG. 27.

When the integer h of the recurrence equation is 2, Equation 16 represents two orders on the low order side among the rotation orders of noise and vibration (16th order and 8th order). The noise and vibration in the rotation order on the low order side may be reduced by mixing the basic coils 70 (see FIGS. 25E and 25F). When the integer h of the recurrence equation is 2, the integer h1 of the theoretical equation is 1, so that the base point movement amount that satisfies the requirement for establishing the movement is 2.5 (=Nspp) slot pitch. 2.5 (=Nspp) slot pitch reflects 5(=2.5×2=Nspp×2) slot pitch that is a repetition cycle of the coil side distribution of one phase band 61. Accordingly, the noise and vibration generated in the range of the base point position coordinate x0 represented by the bar graph when the integer h1 of the theoretical equation h1 illustrated in FIG. 31 is 1 may be reduced by mixing the basic coils 70, which is also supported by the theoretical model illustrated in FIG. 27.

When the integer h of the recurrence equation is 1, Equation 16 represents the intermediate orders between the high order side and the low order side among the rotation orders of noise and vibration (40th order and 32nd order). The noise and vibration in the intermediate orders (40th order and 32nd order) may be decreased by both the skew and the mixing of the basic coils 70 (see FIGS. 25C and 25D). When the integer h of the recurrence equation is 1, the integer h1 of the theoretical equation is 3, so that the base point movement amount that satisfies the requirement for establishing the movement is 0.833 slot pitch. 0.833 slot pitch does not directly reflect "misalignment" of the magnetic configuration configured by the stator 20 and the mover 30 or the repeated period of the coil side distribution of one phase band 61, so that the location of the mover 30 that satisfies the requirement for establishing the movement is limited to a partial range. This reflects that the opportunity of satisfying the requirement for establishing the movement is increased because of "misalignment" of the magnetic configuration configured by the stator 20 and the mover 30 (in one magnetic pole of the mover 30, misaligned by ½ slot pitch), the repeated period of the coil side distribution of one phase band 61 (five slot pitch), and the increase in the number of tooth portions 21b by the increase in the integer portion a. Accordingly, the noise and vibration generated in the range of the base point position coordinate x0 represented by the bar graph when the integer h1 of the theoretical equation illustrated in FIG. 31 is 3 may be reduced by both the skew and the mixing of the basic coils 70, which is also supported by the theoretical model illustrated in FIG. 27. As described above, when the integer h1 of the theoretical equation and the integer h of the recurrence equation have the relation represented by Equation 20, the recurrence equation of the rotation order of the noise and vibration coincides with the theoretical equation of the rotation order of the noise and vibration, so that the analysis result may be qualitatively explained.

The range of the base point location coordinate x0 indicated by the bar graph when the integer h1 of the theoretical equation illustrated in FIG. 31 is 5, the range of the base point location coordinate x0 indicated by the bar graph when the integer h1 of the theoretical equation illustrated in FIG. 31 is 3, and the range of the base point location coordinate x0 indicated by the bar graph when the integer h1 of the theoretical equation illustrated in FIG. 31 is 1 are 0.5:0.167:0.5, which are about 1:0.33:1. In the meantime, as described above based on FIGS. 25A to 25F, in the analysis result, the average of the sizes of the amplitude of the 64th order and the 56th order of No. 0, the average of the sizes of the amplitude of the 40th order and the 32nd order of No. 0, and the average of the sizes of the amplitude of the 16th order and the 8th order of No. 0 are about 1:0.2:1. As described above, the range of the base point location coordinate x0 derived from the theoretical equation and the size of the amplitude of the attractive force derived from the analysis result exhibit the same tendency. This reflects that as the range of the base point location coordinate x0 becomes broader, the corresponding deformation (the spatial deformation of the corresponding spatial deformation mode order) is accumulated, so that the amplitude of the attractive force of the corresponding deformation is increased. From the result, the theoretical equation may be considered to be valid.

The foregoing may also be equally applied to the case where the number Nspp of slots per every pole and per every phase is 3.5. As described above, the integer h1 of the theoretical equation is 1 to (Nspp×2) at the time of the electrical conduction, and the integer h1 of the theoretical equation is only Nspp×2 at the time of the non-electrical conduction. However, the integer h1 of the theoretical equation is the odd number. When the number Nspp of slots per every pole and per every phase is 3.5, the integer h1 of the theoretical equation is 1, 3, 5, and 7 (=3.5×2) at the time of the electrical conduction, and the integer h1 of the theoretical equation is only 7 (3.5×2) at the time of the non-electrical conduction. Further, the requirement for establishing the movement of the magnetic pole center is that the base point location coordinate x0 obtained by adding the base point movement amount (Nspp/h1) of the mover 30 is an integer+(0.5 to 1). When the number Nspp of slots per every pole and per every phase is 3.5, the base point location coordinate x0 obtained by adding the base point movement amount (3.5/h1) of the mover 30 to the integer h1 may be an integer+(0.5 to 1).

Figures 32B, 33:
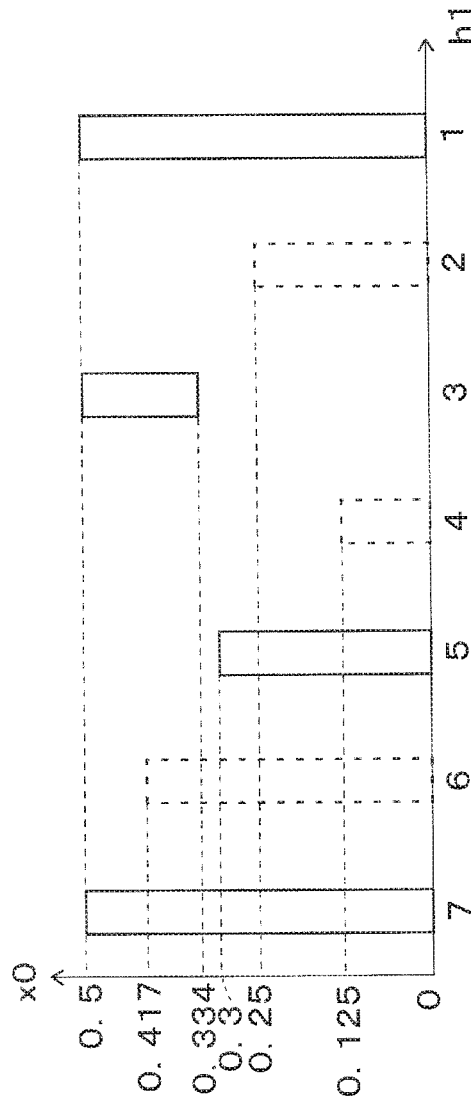
FIG. 32B is a diagram illustrating an existence range of a base point location coordinate x0 and whether an integer h1 exists when the number Nspp of slots per every pole and per every phase is 3.5.
FIG. 33 is a diagram illustrating an existence range of a base point location coordinate x0 when the number Nspp of slots per every pole and per every phase is 3.5.

FIGS. 32A and 32B illustrate an existence range of the base point position coordinate x0 and whether the integer h1 exists when the number Nspp of slots per every pole and per every phase is 3.5. FIGS. 32A and 32B illustrate calculation results obtained by calculating the ranges of the base point location coordinates x0 that satisfy the requirement for establishing the movement of the magnetic pole center for the case where the number Nspp of slots per every pole and per every phase is 3.5, similarly to the case where the number Nspp of slots per every pole and per every phase is 2.5. Further, in FIGS. 32A and 32B, whether the integer h1 is an odd number and whether the integer h1 exists are illustrated together.

Specifically, when the integer h1 is 1, the base point movement amount (Nspp/h1) of the mover 30 is 3.5 (=3.5/1). The base point location coordinate x0 that satisfies the requirement for establishing the movement of the magnetic pole center exists in the entire range from 0 to 0.5. Similarly, when the integer h1 is 7, the base point movement amount (Nspp/h1) of the mover 30 is 0.5 (=3.5/7). The base point location coordinate x0 that satisfies the requirement for establishing the movement of the magnetic pole center exists in the entire range from 0 to 0.5.

When the integer h1 is 3, the base point movement amount (Nspp/h1) of the mover 30 is 1.166 (=3.5/3). The base point location coordinate x0 that satisfies the requirement for establishing the movement of the magnetic pole center exists in the partial range from 0.334 to 0.5 in the range from 0 to 0.5. Similarly, when the integer h1 is 5, the base point movement amount (Nspp/h1) of the mover 30 is 0.7 (=3.5/5). The base point location coordinate x0 that satisfies the requirement for establishing the movement of the magnetic pole center exists in the partial range of 0 to 0.3 in the range from 0 to 0.5.

When the integer h1 is 2, the base point movement amount (Nspp/h1) of the mover 30 is 1.75 (=3.5/2). The base point location coordinate x0 that satisfies the requirement for establishing the movement of the magnetic pole center exists in the partial range of 0 to 0.025 in the range from 0 to 0.5. Further, when the integer h1 is 4, the base point movement amount (Nspp/h1) of the mover 30 is 0.875 (=3.5/4). The base point location coordinate x0 that satisfies the requirement for establishing the movement of the magnetic pole center exists in the partial range of 0 to 0.125 in the range from 0 to 0.5. Further, when the integer h1 is 6, the base point movement amount (Nspp/h1) of the mover 30 is 0.583 (=3.5/6). The base point location coordinate x0 that satisfies the requirement for establishing the movement of the magnetic pole center exists in the partial range of 0 to 0.417 in the range from 0 to 0.5.

FIG. 33 illustrates an existence range of the base point position coordinate x0 when the number Nspp of slots per every pole and per every phase is 3.5. FIG. 33 illustrates an existence range of the base point position coordinate x0 that satisfies the requirement for establishing the movement of the magnetic pole center by bar graphs for the case where the number Nspp of slots per every pole and per every phase is 3.5, similarly to the case where the number Nspp of slots per every pole and per every phase is 2.5. When the number Nspp of slots per every pole and per every phase is 3.5, the integer h of the recurrence equation is 0, 1, 2, and 3 at the time of the electrical conduction and the integer h of the recurrence equation is 0 at the time of the non-electrical conduction.

As illustrated in FIG. 24, when the integer h of the recurrence equation is 0, Equation 16 represents two orders on the high order side among the rotation orders of noise and vibration (88th order and 80th order). The noise and vibration in the rotation order on the high order side may be reduced by the skew in which the maximum value of the relative skew amount between the stator 20 and the mover 30 is set to one slot pitch of the plurality of slots 21c. When the integer h of the recurrence equation is 0, the integer h1 of the theoretical equation is 7, so that the base point movement amount that satisfies the requirement for establishing the movement is 0.5 slot pitch. The noise and vibration generated in the range of the base point location coordinate x0 represented by the bar graph when the integer h1 of the theoretical equation illustrated in FIG. 33 is 7 may be reduced by the skew.

When the integer h of the recurrence equation is 3, Equation 16 represents two orders on the low order side among the rotation orders of noise and vibration (16th order and 8th order). The noise and vibration in the rotation order on the low order side may be reduced by mixing the basic coils 70. When the integer h of the recurrence equation is 3, the integer h1 of the theoretical equation is 1, so that the base point movement amount that satisfies the requirement for establishing the movement is 3.5 slot pitch. The noise and vibration generated in the range of the base point location coordinate x0 represented by the bar graph when the integer h1 of the theoretical equation illustrated in FIG. 33 is 1 may be reduced by mixing the basic coils 70.

When the integer h of the recurrence equation is 1, Equation 16 represents the intermediate orders between the high order side and the low order side among the rotation orders of noise and vibration (64th order and 56th order). Further, when the integer h of the recurrence equation is 2, Equation 16 represents the intermediate orders between the high order side and the low order side among the rotation orders of noise and vibration (40th order and 32nd order). The noise and vibration of the two intermediate orders may be reduced by both the skew and the mixing of the basic coils 70 (64th order and 56th order, and 40th order and 32nd order).

When the integer h of the recurrence equation is 1, the integer h1 of the theoretical equation is 5, so that the base point movement amount that satisfies the requirement for establishing the movement is 0.7 slot pitch. The noise and vibration generated in the range of the base point location coordinate x0 represented by the bar graph when the integer h1 of the theoretical equation illustrated in FIG. 33 is 5 may be reduced by both the skew and mixing the basic coils 70. Further, when the integer h of the recurrence equation is 2, the integer h1 of the theoretical equation is 3, so that the base point movement amount that satisfies the requirement for establishing the movement is 1.166 slot pitch. The noise and vibration generated in the range of the base point location coordinate x0 represented by the bar graph when the integer h1 of the theoretical equation illustrated in FIG. 33 is 3 may be reduced by both the skew and mixing the basic coils 70. As described above, the foregoing description for the case where the number Nspp of slots per every pole and per every phase is 2.5 may also be equally applied to the case where the number Nspp of slots per every pole and per every phase is 3.5.

The foregoing may also be equally applied to the case where the number Nspp of slots per every pole and per every phase is 1.5. When the number Nspp of slots per every pole and per every phase is 1.5, the integer h1 of the theoretical equation is 1 and 3 (=1.5×2) at the time of the electrical conduction, and the integer h1 of the theoretical equation is only 3 (=1.5×2) at the time of the non-electrical conduction. Further, when the number Nspp of slots per every pole and per every phase is 1.5, the requirement for establishing the movement of the magnetic pole center is that the base point location coordinate x0 obtained by adding the base point movement amount (1.5/h1) of the mover 30 to the integer h1 is an integer+(0.5 to 1).

FIG. 34 illustrates an existence range of the base point position coordinate x0 and whether the integer h1 exists when the number Nspp of slots per every pole and per every phase is 1.5. FIG. 34 illustrates a calculation result obtained by calculating the range of the base point location coordinate x0 that satisfies the requirement for establishing the movement of the magnetic pole center for the case where the number Nspp of slots per every pole and per every phase is 1.5, similarly to the case where the number Nspp of slots per every pole and per every phase is 2.5. Further, in FIG. 34, whether the integer h1 is an odd number and whether the integer h1 exists are illustrated together.

Specifically, when the integer h1 is 1, the base point movement amount (Nspp/h1) of the mover 30 is 1.5 (=1.5/1). The base point location coordinate x0 that satisfies the requirement for establishing the movement of the magnetic pole center exists in the entire range from 0 to 0.5. Similarly, when the integer h1 is 3, the base point movement amount (Nspp/h1) of the mover 30 is 0.5 (=1.5/3). The base point location coordinate x0 that satisfies the requirement for establishing the movement of the magnetic pole center exists in the entire range from 0 to 0.5. In the meantime, when the integer h1 is 2, the base point movement amount (Nspp/h1) of the mover 30 is 0.75 (=1.5/2). The base point location coordinate x0 that satisfies the requirement for establishing the movement of the magnetic pole center exists in the partial range of 0 to 0.25 in the range from 0 to 0.5.

FIG. 35 illustrates an existence range of the base point position coordinate x0 when the number Nspp of slots per every pole and per every phase is 1.5. FIG. 35 illustrates an existence range of the base point position coordinate x0 that satisfies the requirement for establishing the movement of the magnetic pole center by bar graphs for the case where the number Nspp of slots per every pole and per every phase is 1.5, similarly to the case where the number Nspp of slots per every pole and per every phase is 2.5. When the number Nspp of slots per every pole and per every phase is 1.5, the integer h of the recurrence equation is 0 and 1 at the time of the electrical conduction and the integer h of the recurrence equation is 0 at the time of the non-electrical conduction.

As illustrated in FIG. 24, when the integer h of the recurrence equation is 0, Equation 16 represents two orders on the high order side among the rotation orders of noise and vibration (40th order and 32nd order). The noise and vibration in the rotation order on the high order side may be reduced by the skew in which the maximum value of the relative skew amount between the stator 20 and the mover 30 is set to one slot pitch of the plurality of slots 21c. When the integer h of the recurrence equation is 0, the integer h1 of the theoretical equation is 3, so that the base point movement amount that satisfies the requirement for establishing the movement is 0.5 slot pitch. The noise and vibration generated in the range of the base point location coordinate x0 represented by the bar graph when the integer h1 of the theoretical equation illustrated in FIG. 35 is 3 may be reduced by the skew.

When the integer h of the recurrence equation is 1, Equation 16 represents two orders on the low order side among the rotation orders of noise and vibration (16th order and 8th order). The noise and vibration in the rotation order on the low order side may be reduced by mixing the basic coils 70. When the integer h of the recurrence equation is 1, the integer h1 of the theoretical equation is 1, so that the base point movement amount that satisfies the requirement for establishing the movement is 1.5 slot pitch. The noise and vibration generated in the range of the base point location coordinate x0 represented by the bar graph when the integer h1 of the theoretical equation illustrated in FIG. 35 is 1 may be reduced by mixing the basic coils 70. As described above, the foregoing description for the case where the number Nspp of slots per every pole and per every phase is 2.5 may also be equally applied to the case where the number Nspp of slots per every pole and per every phase is 1.5. Further, as illustrated in FIG. 24, when the number Nspp of slots per every pole and per every phase is 1.5, there is no intermediate rotation order between the high order side and the low order side.

The foregoing may also be equally applied to the case where the number Nspp of slots per every pole and per every phase is 0.5. When the number Nspp of slots per every pole and per every phase is 0.5, the integer h1 of the theoretical equation is only 1 (=1.5×2) at the time of the electrical conduction, and the integer h1 of the theoretical equation is only 1 (0.5×2) at the time of the non-electrical conduction. Further, when the number Nspp of slots per every pole and per every phase is 0.5, the requirement for establishing the movement of the magnetic pole center is that the base point location coordinate x0 obtained by adding the base point movement amount (0.5/h1) of the mover 30 to the integer h1 is an integer+(0.5 to 1).

FIG. 36 illustrates an existence range of the base point position coordinate x0 and whether the integer h1 exists when the number Nspp of slots per every pole and per every phase is 0.5. FIG. 36 illustrates a calculation result obtained by calculating the range of the base point location coordinate x0 that satisfies the requirement for establishing the movement of the magnetic pole center for the case where the number Nspp of slots per every pole and per every phase is 0.5, similarly to the case where the number Nspp of slots per every pole and per every phase is 2.5. Specifically, when the integer h1 is 1, the base point movement amount (Nspp/h1) of the mover 30 is 0.5 (=0.5/1). The base point location coordinate x0 that satisfies the requirement for establishing the movement of the magnetic pole center exists in the entire range from 0 to 0.5. Further, in FIG. 36, whether the integer h1 is an odd number and whether the integer h1 exists are illustrated together.

FIG. 37 illustrates an existence range of the base point position coordinate x0 when the number Nspp of slots per every pole and per every phase is 0.5. FIG. 37 illustrates an existence range of the base point position coordinate x0 that satisfies the requirement for establishing the movement of the magnetic pole center by bar graphs for the case where the number Nspp of slots per every pole and per every phase is 0.5, similarly to the case where the number Nspp of slots per every pole and per every phase is 2.5. When the number Nspp of slots per every pole and per every phase is 0.5, the integer h of the recurrence equation is 0 at any time of the electrical conduction and the non-electrical conduction.

As illustrated in FIG. 24, when the integer h of the recurrence equation is 0, Equation 16 represents two orders (16th order and 8th order) for the rotation order of noise and vibration. The noise and vibration in the rotation orders may be reduced by the skew in which the maximum value of the relative skew amount between the stator 20 and the mover 30 is set to one slot pitch of the plurality of slots 21c. When the integer h of the recurrence equation is 0, the integer h1 of the theoretical equation is 1, so that the base point movement amount that satisfies the requirement for establishing the movement is 0.5 slot pitch. The noise and vibration generated in the range of the base point location coordinate x0 represented by the bar graph when the integer h1 of the theoretical equation illustrated in FIG. 37 is 1 may be reduced by the skew. As described above, the foregoing description for the case where the number Nspp of slots per every pole and per every phase is 2.5 may also be equally applied to the case where the number Nspp of slots per every pole and per every phase is 0.5. Further, as illustrated in FIG. 24, when the number Nspp of slots per every pole and per every phase is 0.5, the rotation order on the high order side coincides with the rotation order on the low order side. Further, the intermediate rotation order between the high order side and the low order side does not exist.

From the foregoing, the analysis result may be qualitatively explained for all of the rotary electric apparatus 10 that has the configuration of eight poles and 84 slots having the basic configuration of two poles and 21 slots (Nspp=3.5), the rotary electric apparatus 10 that has the configuration of eight poles and 60 slots having the basic configuration of two poles and 15 slots (Nspp=2.5), the rotary electric apparatus 10 that has the configuration of eight poles and 36 slots having the basic configuration of two poles and nine slots (Nspp=1.5), and the rotary electric apparatus 10 that has the configuration of eight poles and 12 slots having the basic configuration of two poles and three slots (Nspp=0.5). Further, for each of the recurrence equation and the theoretical equation of the rotation order of noise and vibration, when the sum of the time orders when the rotation directions of the spatial deformation are the normal rotation and the reverse rotation is calculated, the sums of the time orders are the same for the order on the high order side, the order on the low order side, and the intermediate order between the high order side and the low order side. From the point as well, it may be seen that the theoretical equation of the rotation order of noise and vibration is valid.

(Tooth Width and Slot Width)

In the foregoing embodiment, the tooth width and the slot width are equally set, but the tooth width and the slot width may also be inequally set. For example, it is assumed that in the rotary electric apparatus 10 that has the configuration of eight poles and 60 slots having the basic configuration of two poles and 15 slots (Nspp=2.5), the tooth width is increased by a variation Δs (i.e., when the slot width is decreased by the variation Δs). In this case, the variation Δs is set to a predetermined number larger than 0 and smaller than 0.5.

FIG. 38 illustrates an example of an existence range of a magnetic pole center when the tooth width is larger than the slot width. FIG. 38 corresponds to FIG. 28, and is similarly illustrated to FIG. 28 except that the tooth width is set to be larger than the slot width. FIG. 39A illustrates an example of the requirement for establishing the movement of the attractive force equivalent point of the magnetic pole center when the tooth width is larger than the slot width. FIG. 39A corresponds to FIG. 29A, and FIG. 39A is similarly illustrated to FIG. 29A. FIG. 39B illustrates an example of the requirement for establishing the movement of the attractive force equivalent point of the magnetic pole center when the tooth width is larger than the slot width and the number Nspp of slots per every pole and per every phase is 2.5. FIG. 39B corresponds to FIG. 29B, and is similarly illustrated to FIG. 29B.

In order for the reference magnetic pole center BM1 to face the stator magnetic pole (tooth portion 21b), the reference magnetic pole center BM1 needs to exist in the range (0+(0 to 0.5+Δs)) in which the base point position coordinate x0 is from 0 to (0.5+Δs). The variation Δs of the tooth width is a plus value, and the existence range of the reference magnetic pole center BM1 becomes broader compared to the case where the tooth width and the slot width are equally set. In the meantime, in order for the adjacent magnetic pole center BM2 to face the slot 21c, the adjacent magnetic pole center BM2 needs to exist in the range (7+(0.5+Δs to 1)) in which the location coordinate is from (7.5+Δs) to 8. The variation Δs of the tooth width is a plus value, and the existence range of the adjacent magnetic pole center BM2 becomes narrower compared to the case where the tooth width and the slot width are equally set.

For example, when the integer h1 is 5, the base point movement amount (Nspp/h1) of the mover 30 is 0.5 (=2.5/5). In this case, in order for the corresponding reference magnetic pole center CM1 to face the slot 21c, the corresponding reference magnetic pole center CM1 needs to exist in the range (0+(0.5+Δs to 1)) in which the location coordinate is from (0.5+Δs) to 1. The variation Δs of the tooth width is a plus value, and the existence range of the corresponding reference magnetic pole center CM1 becomes narrower compared to the case where the tooth width and the slot width are equally set.

In order for the first corresponding magnetic pole center CMF1 to face the stator magnetic pole (tooth portion 21b), the first corresponding magnetic pole center CMF1 needs to exist in the range (8+(0 to 0.5+Δs)) in which the location coordinate is 8 to (8.5+Δs). The variation Δs of the tooth width is a plus value, and the existence range of the first corresponding magnetic pole center CMF1 becomes broader compared to the case where the tooth width and the slot width are equally set. Further, in order for the second corresponding magnetic pole center CMB1 to face the stator magnetic pole (tooth portion 21b), the second corresponding magnetic pole center CMB1 needs to exist in the range (−7+(0 to 0.5+Δ)) in which the location coordinate is from −7 to (−6.5+Δ). The variation Δs of the tooth width is a plus value, and the existence range of the second corresponding magnetic pole center CMB1 becomes broader compared to the case where the tooth width and the slot width are equally set. An existence range of the magnetic pole center may be derived in the same manner for the case where the integer h1 is 1, 2, 3, and 4.

As described above, the existence range of the reference magnetic pole center BM1 becomes broader compared to the case where the tooth width and the slot width are equally set. In the meantime, the existence range of the adjacent magnetic pole center BM2 becomes narrower compared to the case where the tooth width and the slot width are equally set. Accordingly, the requirement for establishing the movement for the base point side (the reference magnetic pole center BM1 and the adjacent magnetic pole center BM2) is the requirement for satisfying the existence range of the adjacent magnetic pole center BM2, and the base point location coordinate x0 needs to exist in the range from Δs to 0.5.

The existence range of the corresponding reference magnetic pole center CM1 becomes narrower compared to the case where the tooth width and the slot width are equally set. In the meantime, the existence ranges of the first corresponding magnetic pole center CMF1 and the second corresponding magnetic pole center CMB1 become broader compared to the case where the tooth width and the slot width are equally set. Accordingly, the requirement for establishing the movement for the corresponding point side (the corresponding reference magnetic pole center CM1, the first corresponding magnetic pole center CMF1, and the second corresponding magnetic pole center CMB1) is the requirement for satisfying the existence range of the corresponding reference magnetic pole center CM1. Specifically, the base point location coordinate x0 obtained by adding the base point movement amount (Nspp/h1) of the mover 30 needs to be an integer+(0.5+Δs to 1). Further, the requirement for establishing the movement for the magnetic pole center at the normal rotation side becomes the same as the requirement for establishing the movement for the magnetic pole center at the reverse rotation side.

FIG. 40 illustrates an existence range of the base point position coordinate x0 and whether the integer h1 exists when the tooth width is larger than the slot width and the number Nspp of slots per every pole and per every phase is 2.5. FIG. 40 corresponds to FIG. 30, and is similarly illustrated to FIG. 30. When the integer h1 is 1, the base point movement amount (Nspp/h1) of the mover 30 is 2.5 (=2.5/1). When the base point position coordinate x0 adopts the range from Δs to 0.5, x0+2.5/h1(=x0+2.5) adopts the range (2+(0.5+Δs to 1)) from (2.5+Δs) to 3. The base point location coordinate x0 that satisfies the requirement for establishing the movement of the magnetic pole center exists in the partial range of Δs to 0.5 in the range from 0 to 0.5. Similarly, when the integer h1 is 5, the base point movement amount (Nspp/h1) of the mover 30 is 0.5 (=2.5/5). When the base point position coordinate x0 adopts the range from Δs to 0.5, x0+2.5/h1(=x0+0.5) adopts the range (0+(0.5+Δs to 1)) from (0.5+Δs) to 1. The base point location coordinate x0 that satisfies the requirement for establishing the movement of the magnetic pole center exists in the partial range of Δs to 0.5 in the range from 0 to 0.5.

When the integer h1 is 3, the base point movement amount (Nspp/h1) of the mover 30 is 0.833 (=2.5/3). When the base point position coordinate x0 adopts the range from Δs to 0.5, x0+2.5/h1(=x0+0.833) adopts the range (0+(0.833+Δs to 1.333)) from (0.833+Δs) to 1.333. The base point location coordinate x0 that satisfies the requirement for establishing the movement of the magnetic pole center exists in the partial range of Δs to 0.167 in the range from 0 to 0.5.

When the integer h1 is 2, the base point movement amount (Nspp/h1) of the mover 30 is 1.25 (=2.5/2). When the base point position coordinate x0 adopts the range from Δs to 0.5, x0+2.5/h1(=x0+1.25) adopts the range (1+(0.25+Δs to 0.75)) from (1.25+Δs) to 1.75. The base point location coordinate x0 that satisfies the requirement for establishing the movement of the magnetic pole center exists in the partial range of 0.25+Δs to 0.5 in the range from 0 to 0.5.

When the integer h1 is 4, the base point movement amount (Nspp/h1) of the mover 30 is 0.625 (=2.5/4). When the base point position coordinate x0 adopts the range from Δs to 0.5, x0+2.5/h1(=x0+0.625) adopts the range (0+(0.625+Δs to 1.125)) from (0.625+Δs) to 1.125. The base point location coordinate x0 that satisfies the requirement for establishing the movement of the magnetic pole center exists in the partial range of Δs to 0.375 in the range from 0 to 0.5. Further, whether the integer h1 is an odd number, and whether the integer h1 exists at the time of the electrical conduction and the non-electrical conduction are the same as that when the tooth width and the slot width are equally set (FIG. 30).

Figure 41:
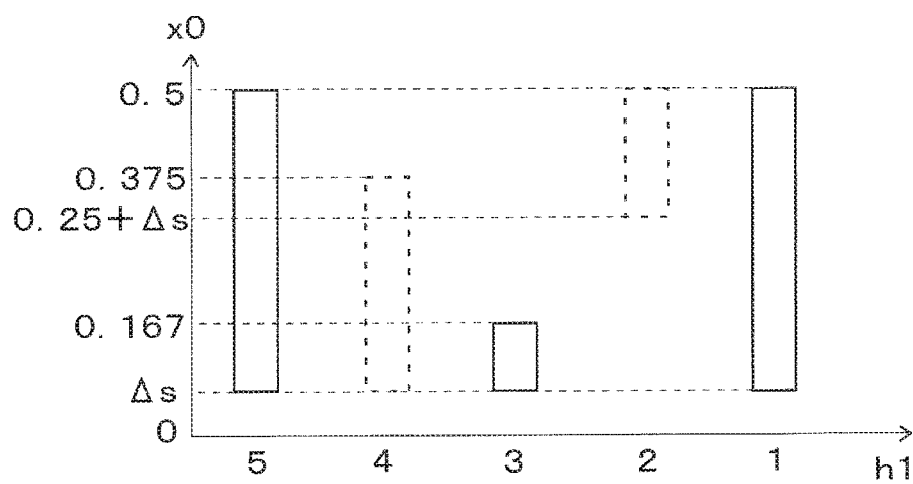
FIG. 41 is a diagram illustrating an existence range of a base point location coordinate x0 when a tooth width is larger than a slot width and the number Nspp of slots per every pole and per every phase is 2.5.

FIG. 41 illustrates an existence range of the base point position coordinate x0 when the tooth width is larger than the slot width and the number Nspp of slots per every pole and per every phase is 2.5. FIG. 41 is similarly illustrated to FIG. 31. As illustrated in FIG. 41, a lower limit value of the existence range of the base point location coordinate x0 is increased compared to the case where the tooth width and the slot width are equally set (FIG. 31). An upper limit value of the existence range of the base point location coordinate x0 is not changed. That is, the tooth width is set to be larger than the slot width, so that an area of the location of the mover 30 in which noise and vibration are generated may be decreased.

Figure 42:
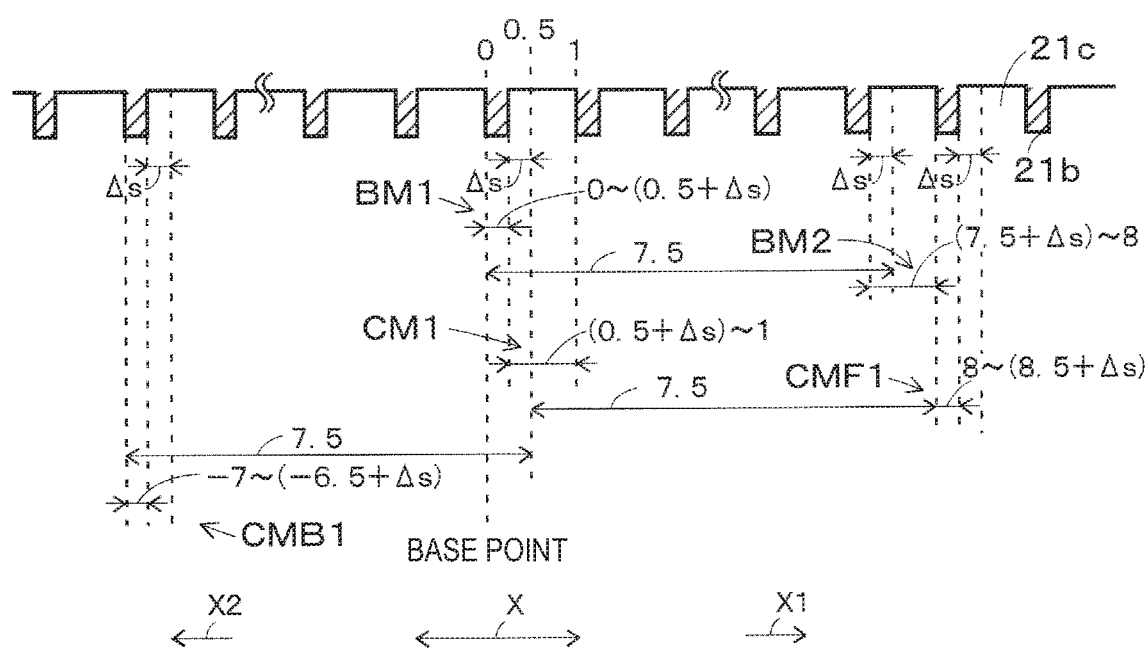
FIG. 42 is a diagram illustrating an example of an existence range of a magnetic pole center when a tooth width is smaller than a slot width.

Next, it is assumed that in the rotary electric apparatus 10 that has the configuration of eight poles and 60 slots having the basic configuration of two poles and 15 slots (Nspp=2.5), the tooth width is decreased by a variation Δs (i.e., when the slot width is increased by the variation Δs). In this case, the variation Δs is set to a predetermined number larger than −0.5 and smaller than 0. FIG. 42 illustrates an example of an existence range of a magnetic pole center when the tooth width is smaller than the slot width. FIG. 42 corresponds to FIG. 28, and is similarly illustrated to FIG. 28 except that the tooth width is set to be smaller than the slot width.

In order for the reference magnetic pole center BM1 to face the stator magnetic pole (tooth portion 21b), the reference magnetic pole center BM1 needs to exist in the range (0+(0 to 0.5+Δs)) in which the base point position coordinate x0 is from 0 to (0.5+Δs). The variation Δs of the tooth width is a minus value, and the existence range of the reference magnetic pole center BM1 becomes narrower compared to the case where the tooth width and the slot width are equally set. In the meantime, in order for the adjacent magnetic pole center BM2 to face the slot 21c, the adjacent magnetic pole center BM2 needs to exist in the range (7+(0.5+Δs to 1)), in which the location coordinate is from (7.5+Δs) to 8. The variation Δs of the tooth width is a minus value, and the existence range of the adjacent magnetic pole center BM2 becomes broader compared to the case where the tooth width and the slot width are equally set.

For example, when the integer h1 is 5, the base point movement amount (Nspp/h1) of the mover 30 is 0.5 (=2.5/5). In this case, in order for the corresponding reference magnetic pole center CM1 to face the slot 21c, the corresponding reference magnetic pole center CM1 needs to exist in the range (0+(0.5+Δs to 1)) in which the location coordinate is from (0.5+Δs) to 1. The variation Δs of the tooth width is a minus value, and the existence range of the corresponding reference magnetic pole center CM1 becomes broader compared to the case where the tooth width and the slot width are equally set.

In order for the first corresponding magnetic pole center CMF1 to face the stator magnetic pole (tooth portion 21b), the first corresponding magnetic pole center CMF1 needs to exist in the range (8+(0 to 0.5+Δs)) in which the location coordinate is 8 to (8.5+Δs). The variation Δs of the tooth width is a minus value, and the existence range of the first corresponding magnetic pole center CMF1 becomes narrower compared to the case where the tooth width and the slot width are equally set. Further, in order for the second corresponding magnetic pole center CMB1 to face the stator magnetic pole (tooth portion 21b), the second corresponding magnetic pole center CMB1 needs to exist in the range (−7+(0 to 0.5+Δ)) in which the location coordinate is from −7 to (−6.5+Δ). The variation Δs of the tooth width is a minus value, and the existence range of the second corresponding magnetic pole center CMB1 becomes narrower compared to the case where the tooth width and the slot width are equally set. An existence range of the magnetic pole center may be derived in the same manner for the case where the integer h1 is 1, 2, 3, and 4.

As described above, the reference magnetic pole center BM1, the adjacent magnetic pole center BM2, the corresponding reference magnetic pole center CM1, the first corresponding magnetic pole center CMF1, and the second corresponding magnetic pole center CMB1 may be described in the same manner as that of the case where the tooth width is set to be larger than the slot width. However, the existence range of the reference magnetic pole center BM1 becomes narrower compared to the case where the tooth width and the slot width are equally set. In the meantime, the existence range of the adjacent magnetic pole center BM2 becomes broader compared to the case where the tooth width and the slot width are equally set. Accordingly, the requirement for establishing the movement for the base point side (the reference magnetic pole center BM1 and the adjacent magnetic pole center BM2) is the requirement for satisfying the existence range of the reference magnetic pole center BM1, and the base point location coordinate x0 needs to exist in the range from 0 to (0.5+Δs).

The existence range of the corresponding reference magnetic pole center CM1 becomes broader compared to the case where the tooth width and the slot width are equally set. In the meantime, the existence ranges of the first corresponding magnetic pole center CMF1 and the second corresponding magnetic pole center CMB1 become narrower compared to the case where the tooth width and the slot width are equally set. Accordingly, the requirement for establishing the movement for the corresponding point side (the corresponding reference magnetic pole center CM1, the first corresponding magnetic pole center CMF1, and the second corresponding magnetic pole center CMB2) is the requirements for satisfying the existence range of the first corresponding magnetic pole center CMF1 and the second corresponding magnetic pole center CMB1. Specifically, the base point location coordinate x0 obtained by adding the base point movement amount (Nspp/h1) of the mover 30 needs to be an integer+(0.5 to 1+Δs). Further, the requirement for establishing the movement for the magnetic pole center at the normal rotation side becomes the same as the requirement for establishing the movement for the magnetic pole center at the reverse rotation side.

Figure 44:
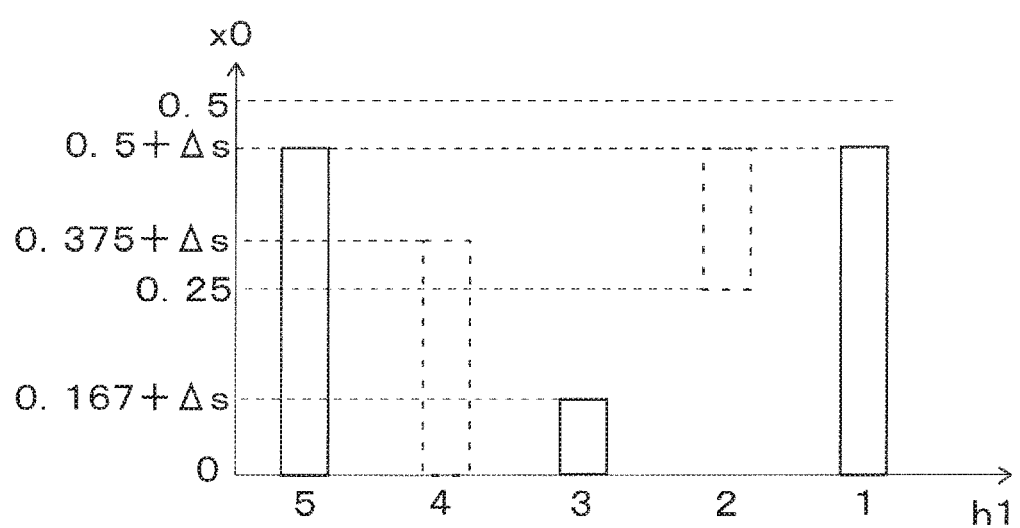
FIG. 44 is a diagram illustrating an existence range of a base point location coordinate x0 when a tooth width is smaller than a slot width and the number Nspp of slots per every pole and per every phase is 2.5.

FIG. 43 illustrates an existence range of the base point position coordinate x0 and whether the integer h1 exists when the tooth width is smaller than the slot width and the number Nspp of slots per every pole and per every phase is 2.5. FIG. 43 corresponds to FIGS. 30 and 40, and is similarly illustrated to FIGS. 30 and 40. FIG. 44 illustrates an existence range of the base point position coordinate x0 when the tooth width is smaller than the slot width and the number Nspp of slots per every pole and per every phase is 2.5. FIG. 44 corresponds to FIGS. 31 and 41, and is similarly illustrated to FIGS. 31 and 41. As illustrated in FIG. 44, an upper limit value of the existence range of the base point position coordinate x0 is decreased compared to the case where the tooth width and the slot width are equally set (FIG. 31). A lower limit value of the existence range of the base point location coordinate x0 is not changed. That is, the tooth width is set to be smaller than the slot width, so that an area of the location of the mover 30 in which noise and vibration are generated may be decreased.

As described above, it is possible to decrease the area of the location of the mover 30 in which noise and vibration are generated, compared to the case where the tooth width and the slot width are equally set, by inequally setting the tooth width and the slot width, thereby decreasing noise and vibration. For example, as may be seen from FIG. 41, when the variation Δs of the tooth width is 0.167, noise and vibration generated in the range of the base point location coordinate x0 indicated by the bar graph when the integer h1 of the theoretical equation is 3 are removed. That is, it is possible to remove noise and vibration generated in the range of the base point location coordinate x0 indicated by the bar graph when the integer h1 of the theoretical equation is 3 by setting the tooth width (the stator magnetic pole width) to 67% or more of the stator magnetic pole pitch (the slot width is 33% or less of the slot pitch).

As may be seen from FIG. 44, when the variation Δs is −0.167, noise and vibration generated in the range of the base point location coordinate x0 indicated by the bar graph when the integer h1 of the theoretical equation is 3 are removed. That is, it is possible to remove noise and vibration generated in the range of the base point location coordinate x0 indicated by the bar graph when the integer h1 of the theoretical equation is 3 by setting the tooth width (the stator magnetic pole width) to 33% or less of the stator magnetic pole pitch (the slot width is 67% or more of the slot pitch).

For the case where the tooth width and the slot width are equally set, it is possible to expect the effect of simulating the effect of removal of noise and vibration by adjusting (increasing and decreasing) the width of the tooth tip end portion 21d in the first direction (the direction of arrow X) illustrated in FIG. 1 or narrowing the slot opening portion illustrated in FIG. 1. The foregoing description for the case where the tooth width and the slot width are inequally set and the number Nspp of slots per every pole and per every phase is 2.5 may also be equally applied to the case where the number Nspp of slots per every pole and per every phase is different.

<Others>

The embodiment is not limited to the foregoing embodiments and the embodiments illustrated in the drawings, but may be appropriately changed and carried out within the range of the main principle. For example, in the case of the rotary electric apparatus 10 having the fractional slot configuration, the number of slots of the stator 20 and the number of magnetic poles of the mover 30 are not limited. Further, in the foregoing embodiment, the mover 30 is installed inside the stator 20 (the inner-rotor type rotary electric apparatus). However, the mover 30 may also be installed outside the stator 20 (the outer-rotor type rotary electric apparatus). Further, the rotary electric apparatus 10 is not limited to a radial gap type or axial rotary electric apparatus in which the stator 20 and the mover 30 are coaxially arranged. In the rotary electric apparatus 10, the stator 20 and the mover 30 are arranged on a straight line, and the mover 30 may also be applied to a linear motor or a linear generator moving on a straight line with respect to the stator 20. Further, the rotary electric apparatus 10 may be used in various rotary electric apparatuses, for example, a motor and a generator for driving a vehicle, a motor and a generator for industry or household, all having fractional slot configurations.

Example of the Effect

According to the rotary electric apparatus 10 according to aspect 1, in the skew region, the maximum value of the skew amount for the reference region is set so that the maximum value of the relative skew amount between the stator 20 and the mover 30 is one slot pitch of the plurality of slots. Accordingly, the rotary electric apparatus 10 according to aspect 1 is capable of mixing the electromagnetic attractive force distributions in the first direction (the direction of arrow X) generated between the stator 20 and the mover 30 throughout the entirety in the third direction (the direction of arrow Z), thereby averaging the corresponding attractive force distributions. As a result, in the rotary electric apparatus 10 according to aspect 1, it is possible to facilitate equalization of the corresponding attractive force distribution at every pole, thereby reducing noise and vibration.

According to the rotary electric apparatus 10 according to aspect 1, in the stator winding 22, the plurality of basic coils 70 are mixed so that the magnitude of magnetomotive force generated by the plurality of coil sides 22a that configure the mixed one phase band 62 is equal at every pole of the plurality of mover magnetic poles 32. Accordingly, the magnitude of magnetomotive force generated when the stator winding 22 is electrically conducted and equality of the magnetomotive force distribution at every pole are increased. As a result, vibromotive force of the low-order spatial deformation mode is decreased compared to the number of magnetic poles of the mover 30, so that the rotary electric apparatus 10 according to aspect 1 is capable of suppressing noise and vibration of the low-order spatial deformation mode compared to the number of magnetic poles of the mover 30.

According to the rotary electric apparatus 10 according to aspect 1, noise and vibration of the rotation order on the high order side are decreased by the skew, so that it is possible to reduce noise and vibration of the rotation order on the low order side by mixing the basic coils 70. When noise and vibration of the intermediate rotation order between the high order side and the low order side are generated, it is possible to reduce noise and vibration of the intermediate rotation order between the high order side and the low order side by both the skew and the mixing of the basic coils 70. As described above, the rotary electric apparatus 10 according to aspect 1 is capable of reducing noise and vibration of all of the rotation orders generated due to the fractional slot configuration.

The rotary electric apparatus 10 according to aspect 2 is the three-phase rotary electric apparatus 10 (the ½ series three phase rotary electric apparatus 10) in which the number below a decimal point of the number Nspp of slots per every pole and per every phase is 0.5, in the rotary electric apparatus 10 according to aspect 1. The rotary electric apparatus 10 according to aspect 2 reduces noise and vibration of the rotation order obtained by multiplying the spatial deformation mode order of the (NMP/2)th and the time order of $(3 \times h1 \pm 1)$th. The order is represented by using the number NMP of magnetic poles of the plurality of mover magnetic poles 32 and the integer from 1 to two times the number Nspp of slots per every pole and per every phase or the integer h1 that is the integer two times the number Nspp of slots per every pole and per every phase.

In the rotary electric apparatus 10 according to aspect 2, it is easy to recognize the rotation order of noise and vibration, and it is easy to perform the comparison with the rotation order of noise and vibration obtained from the analysis result (e.g., the recurrence equation represented in the embodiment). Accordingly, in the rotary electric apparatus 10 according to aspect 2, it is easy to recognize validity (the rotation order in which noise and vibration are reduced) of the measures that reduce noise and vibration (the skew and the mixing of the basic coils 70).

According to the rotary electric apparatus 10 according to aspect 3, the tooth width that is the width of each of the plurality of tooth portions 21b in the first direction (the direction of arrow X) and the slot width that is the width of each of the plurality of slot s 21c in the first direction (the direction of arrow X) are inequally set in the rotary electric apparatus 10 according to aspect 1 or aspect 2.

In the rotary electric apparatus 10 according to aspect 3, it is possible to decrease the area of the location of the mover 30 in which noise and vibration are generated compared to the case where the tooth width and the slot width are equally set, thereby reducing noise and vibration.

According to the rotary electric apparatus 10 according to aspect 4, the reference region includes the first reference region 41 and the second reference region 43 in the rotary electric apparatus 10 according to any one of aspect 1 to aspect 3. The skew region includes the continuous skew region 42 that is gradually misaligned in the first direction (the direction of arrow X) with respect to the first reference region 41 and arranged in the third direction (the direction of arrow Z), and the step skew region 44 that is misaligned in a step shape in the first direction (the direction of arrow X) with respect to the second reference region 43 and arranged in the third direction (the direction of arrow Z). The stator 20 includes the first reference region 41 and the continuous skew region 42, and the mover 30 includes the second reference region 43 and the step skew region 44. The skew amount for the second reference region 43 in the step skew region 44 is set to be a half of the maximum value of the skew amount for the first reference region 41 in the continuous skew region 42.

The rotary electric apparatus 10 according to aspect 4 is capable of decreasing the skew amount compared to the case where the skew is performed on only to one of the stator 20 and the mover 30. Further, in consideration of workability when the stator winding 22 is assembled with the plurality of slots 21c of the stator core 21, the stator 20 may include the continuous skew region 42, instead of the step skew region 44. In the meantime, in the case where the permanent magnet (the plurality of mover magnetic poles 32) is a sintered magnet, in consideration of workability when the permanent magnet is mounted to the magnet accommodating portion of the mover core 31, the mover 30 may include the step skew region 44, instead of the continuous skew region 42. In the rotary electric apparatus 10 according to aspect 4, by the foregoing configuration, complexity of the manufacturing process of the stator 20 and the mover 30 accompanying the skew may be decreased, thereby improving workability in the manufacturing process.

According to the rotary electric apparatus 10 according to aspect 5, when the continuous skew region 42 of the stator 20 is misaligned in one direction (the direction of arrow X1) of the first direction (the direction of arrow X) with respect to the first reference region 41, the step skew region 44 of the mover 30 is misaligned in another direction (the direction of arrow X2) in the first direction (the direction of arrow X) with respect to the second reference region 43 in the rotary electric apparatus 10 according to aspect 4.

The rotary electric apparatus 10 according to aspect 5 may suppress the increase in the skew amount compared to the case where the continuous skew region 42 of the stator 20 and the step skew region 44 of the mover 30 are misaligned in the same direction. Accordingly, the rotary electric apparatus 10 according to aspect 5 is capable of suppressing the increase in torque decrease according to the increase in the skew amount, thereby decreasing a leakage magnetic flux.

According to the rotary electric apparatus 10 according to aspect 6, in the continuous skew region 42, an increasing rate or a decreasing rate of the skew amount with respect to the first reference region 41 is constantly set from one end side to the other end side in the third direction (the direction of arrow Z) in the rotary electric apparatus 10 according to aspect 4 or aspect 5.

The rotary electric apparatus 10 according to aspect 6 is capable of mainly decreasing a leakage magnetic flux in the third direction (the direction of arrow Z) compared to the case where the skew amount with respect to the first reference region 41 is discontinuously changed, thereby facilitating the simplification of the manufacturing process.

According to the rotary electric apparatus 10 according to aspect 7, at least one second basic coil 72 is disposed at a location moved by a predetermined slot pitch in the first direction (the direction of arrow X) with respect to the first basic coil 71 in the rotary electric apparatus 10 according to any one of aspect 1 to aspect 6.

In the rotary electric apparatus 10 according to aspect 7, at least one second basic coil 72 is disposed at the location moved by the predetermined slot pitch in the first direction (the direction of arrow X) with respect to the first basic coil 71, so that it is easy to mix the plurality of basic coils 70.

According to the rotary electric apparatus 10 according to aspect 8, the predetermined slot pitch is indicated by n times (here, n is a natural number of 1 or more) the movement unit amount in the rotary electric apparatus 10 according to aspect 7. However, the NI slot pitch (here, NI is an integer nearest to the number of slots per every pole or 1) is defined as the movement unit amount.

The rotary electric apparatus 10 according to aspect 8 may suppress an excessive increase (the excessive broadness of the coil side distribution) in an effective coil side distribution width. Accordingly, the rotary electric apparatus 10 according to aspect 8 may suppress the decrease in output torque. Specifically, when the NI is an integer nearest to the number of slots per every pole, the foregoing effect is prominent.

According to the rotary electric apparatus 10 according to aspect 9, the first numerical progression in which each of the predetermined slot pitches of at least one second basic coil 72 is listed includes all of the natural number times from one time to n times the movement unit amount in the rotary electric apparatus 10 according to aspect 8.

According to the rotary electric apparatus 10 according to aspect 9, the first numerical progression includes all of the natural number times from one time to n times the movement unit amount, so that it is easy to equalize every pole of magnetomotive force.

This disclosure discloses a rotary electric apparatus having a fractional slot configuration in which the number of slots per every pole and per every phase is not an integer, the rotary electric apparatus including: a stator including a stator core formed with a plurality of slots, and a stator winding having a plurality of coil sides accommodated in the plurality of slots and a plurality of coil ends connecting the same side end portions of the plurality of coil sides; and a mover, which is movably supported with respect to the stator, and includes a mover core and a plurality of mover magnetic poles installed in the mover core. It is assumed that a movement direction of the mover with respect to the stator is a first direction, a facing direction of the stator and the mover is a second direction, and a direction orthogonal to any one of the first direction and the second direction is a third direction. In this case, at least one of the stator and the mover has a reference region serving as a reference of skew and a skew region, which is misaligned in the first direction with respect to the reference region and is arranged in the third direction. In the skew region, a maximum value of a skew amount for the reference region is set so that a maximum value of a relative skew amount between the stator and the mover is one slot pitch of the plurality of slots. A set of the plurality of coil sides having the same in-phase current direction accommodated in the plurality of slots continuously adjacent in the first direction is set to a one phase band. In this case, the stator winding includes a plurality of basic coils in which a magnitude of magnetomotive force generated by the plurality of coil sides that configure the one phase band is equal at every pole of the plurality of mover magnetic poles. The plurality of basic coils include a first basic coil serving as a reference for a disposition of the one phase band at every pole in the first direction, and at least one second basic coil in which a disposition of the one phase band at every pole in the first direction is different with respect to the first basic coil. The one phase band newly formed by mixing the plurality of coil sides that configure the one phase band of the one first basic coil and the plurality of coil sides that configure the single one phase band of each of at least one second basic coil is set to a mixed one phase band. In the stator winding, the plurality of basic coils are mixed so that the magnitude of magnetomotive force generated by the plurality of coil sides that configure the mixed one phase band is equal at every pole of the plurality of mover magnetic poles.

According to the rotary electric apparatus, in the skew region, a maximum value of a skew amount for the reference region is set so that a maximum value of a relative skew amount between the stator and the mover is one slot pitch of the plurality of slots. Accordingly, in the rotary electric apparatus, the electromagnetic attractive force distributions in the first direction generated between the stator and the mover may be mixed in an entire third direction, so that it is possible to average the corresponding attractive force distribution. As a result, the rotary electric apparatus may facilitate equalization of the corresponding attractive force distribution at every pole, thereby reducing noise and vibration.

According to the rotary electric apparatus, in the stator winding, the plurality of basic coils are mixed so that the magnitude of magnetomotive force generated by the plurality of coil sides configuring a mixed one phase band is equal at every pole of the plurality of mover magnetic poles. Accordingly, the magnitude of magnetomotive force generated when the stator winding is electrically conducted and equality of the magnetomotive force distribution at every pole are increased. As a result, vibromotive force of a spatial deformation mode of the low order is decreased compared to the number of magnetic poles of the mover, and the rotary electric apparatus may suppress noise and vibration of the spatial deformation mode of the low order compared to the number of magnetic poles of the mover.

According to the rotary electric apparatus, it is possible to reduce noise and vibration of the rotation order on the high order side by the skew and it is possible to reduce noise and vibration of the rotation order on the low order side by mixing the basic coils. When noise and vibration of the intermediate rotation order between the high order side and the low order side are generated, it is possible to reduce noise and vibration of the intermediate rotation order between the high order side and the low order side by both the skew and the mixing of the basic coils. As described above, the rotary electric apparatus may reduce noise and vibration of all of the rotation orders generated due to the fractional slot configuration.

The rotary electric apparatus may be configured such that the rotary electric apparatus is a three-phase rotary electric apparatus in which a number below a decimal point of the number of slots per every pole and per every phase is 0.5, and a rotation order is represented by using a number NMP of magnetic poles of the plurality of mover magnetic poles and an integer from 1 to two times the number of slots per every pole and per every phase or an integer h1 that is an integer two times the number of slots per every pole and per every slot, and noise and vibration of a rotation order obtained by multiplying a spatial deformation mode order of a (NMP/2)th and a time order of a $(3 \times h1 \pm 1)$th are reduced.

The rotary electric apparatus may be configured such that the stator core includes a yoke portion formed along the first direction and a plurality of tooth portions integrally formed with the yoke portion so as to protrude from the yoke portion in the second direction, and the plurality of slots are formed by the tooth portions adjacent in the first direction, and a tooth width that is a width of each of the plurality of tooth portions in the first direction and a slot width that is a width of each of the plurality of slots in the first direction are inequally set.

The rotary electric apparatus may be configured such that the reference region includes a first reference region and a second reference region, the skew region includes a continuous skew region which is gradually misaligned in the first direction with respect to the first reference region and is arranged in the third direction, and a step skew region which is misaligned in a step shape in the first direction with respect to the second reference region and is arranged in the third direction, the stator includes the first reference region and the continuous skew region, the mover includes the second reference region and the step skew region, and the skew amount for the second reference region in the step skew region is set to a half of a maximum value of the skew amount for the first reference region in the continuous skew region.

The rotary electric apparatus may be configured such that, when the continuous skew region of the stator is misaligned in one direction in the first direction with respect to the first reference region, the step skew region of the mover is misaligned in another direction in the first direction with respect to the second reference region.

The rotary electric apparatus may be configured such that, in the continuous skew region, an increasing rate or a decreasing rate of the skew amount for the first reference region is set to be constant from one end side to the other end side in the third direction.

The rotary electric apparatus may be configured such that the at least one second basic coil is disposed at a position moved by a predetermined slot pitch in the first direction with respect to the first basic coil.

The rotary electric apparatus may be configured such that, when an NI slot pitch (here, NI is an integer nearest to the number of slots per every pole or 1) is set to a movement unit amount, the predetermined slot pitch is represented by n times (here, n is a natural number of 1 or more) the movement unit amount.

The rotary electric apparatus may be configured such that a first numerical progression in which the predetermined slot pitch of each of the at least one second basic coil is listed includes all of natural number times from one time to the n times the movement unit amount.

APPENDIXES

Appendix 1

In the rotary electric apparatus, the reference region is a first reference region, the skew region is a continuous skew region which is gradually misaligned in the first direction with respect to the first reference region and is arranged in the third direction, each of the stator and the mover includes the first reference region and the continuous skew region, and when the continuous skew region of one of the stator and the mover is misaligned in one direction of the first direction with respect to the first reference region, the continuous skew region of the other of the stator and the mover is misaligned in another direction of the first direction with respect to the first reference region.

Appendix 2

In the rotary electric apparatus according to appendix 1, a maximum value of a skew amount in the continuous skew region of the stator and a maximum value of a skew amount in the continuous skew region of the mover are set with the same value.

Appendix 3

In the rotary electric apparatus according to appendix 1 or 2, in the continuous skew region, an increasing rate or a decreasing rate of a skew amount for the first reference region is set to be constant from one end side to the other end side in the third direction.

Appendix 4

In the rotary electric apparatus, the NI is an integer nearest to the number of slots per every pole, and when a center of the mixed one phase band calculated by adding a disposition of the plurality of coil sides that configure the mixed one phase band and both sides of the position of the plurality of corresponding coil sides in the first direction is defined as a coil side center, a distance between the coil side centers adjacent in the first direction is equal at every pole of the plurality of mover magnetic poles.

Appendix 5

In the rotary electric apparatus according to appendix 4, the stator winding in which the plurality of basic coils are mixed includes a plurality of phase coils including at least one pole pair coil, and each pole pair coil includes a plurality of unit coils that are concentrically wound, and the plurality of unit coils that configure each pole pair coil has different coil pitch between one pair of coil sides accommodated in one pair of slots, and the coil pitch between the one pair of coil sides is set to be smaller than the number of slots per every pole.

Appendix 6

In the rotary electric apparatus according to appendix 5, each pole pair coil includes: a first pole coil, which includes one unit coil or the plurality of unit coils having the different coil pitch between the one pair of coil sides, and in which at least one unit coil is concentrically wound and is electrically serially connected; and a second pole coil, which includes one unit coil or the plurality of unit coils having the different coil pitch between the one pair of coil sides, in which at least one unit coil is concentrically wound and is electrically serially connected, and which faces one mover magnetic pole adjacent to a corresponding mover magnetic pole when the first pole coil faces one mover magnetic pole among the plurality of mover magnetic poles, and the first pole coil and the second pole coil are electrically serially connected.

Appendix 7

In the rotary electric apparatus according to appendix 5 or 6, each of the plurality of phase coils includes the pole pair coil of the number of magnetic pole pairs of the plurality of mover magnetic poles for each of the plurality of basic coils.

Appendix 8

In the rotary electric apparatus according to appendix 5 or 6, in the plurality of basic coils, the disposition of an in-phase coil side accommodated in the same slot within the corresponding slot is concentrated for each phase, and each of the plurality of phase coils includes the pole pair coils of the number of magnetic pole pairs of the plurality of mover magnetic poles in the entirety of the plurality of basic coils.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotary electric apparatus having a fractional slot configuration in which a number of slots per every pole and per every phase is not an integer, the rotary electric apparatus comprising:
    a stator which includes a stator core formed with a plurality of slots, and a stator winding having a plurality of coil sides accommodated in the plurality of slots and a plurality of coil ends connecting each of same side end portions of the plurality of coil sides; and
    a mover which is movably supported with respect to the stator, and includes a mover core and a plurality of mover magnetic poles installed in the mover core,
    wherein when it is assumed that a movement direction of the mover with respect to the stator is a first direction, a facing direction of the stator and the mover is a second direction, and a direction orthogonal to any one of the first direction and the second direction is a third direction,
    at least one of the stator and the mover includes a reference region serving as a reference of skew and a skew region, which is misaligned in the first direction with respect to the reference region and is arranged in the third direction,
    in the skew region, a maximum value of a skew amount for the reference region is set so that a maximum value of a relative skew amount between the stator and the mover is one slot pitch of the plurality of slots,
    when a set of the plurality of coil sides having a same in-phase current direction accommodated in the plurality of slots continuously adjacent in the first direction is set to a one phase band,
    the stator winding includes a plurality of basic coils in which a magnitude of magnetomotive force generated by the plurality of coil sides that configure the one phase band is equal at every pole of the plurality of mover magnetic poles,
    the plurality of basic coils include a first basic coil serving as a reference for a disposition of the one phase band at every pole in the first direction, and at least one second basic coil in which a disposition of the one phase band at every pole in the first direction is different with respect to the first basic coil, and
    when the one phase band newly formed by mixing the plurality of coil sides that configure the one phase band of the one first basic coil and the plurality of coil sides that configure a single one phase band of each of at least one second basic coil is set to a mixed one phase band,
    in the stator winding, the plurality of basic coils are mixed so that the magnitude of magnetomotive force generated by the plurality of coil sides that configure the mixed one phase band is equal at every pole of the plurality of mover magnetic poles.

2. The rotary electric apparatus according to claim 1, wherein the rotary electric apparatus is a three-phase rotary electric apparatus in which a number below a decimal point of the number of slots per every pole and per every phase is 0.5, and
a rotation order is represented by using a number NMP of magnetic poles of the plurality of mover magnetic poles and an integer from 1 to two times the number of slots per every pole and per every phase or an integer h1 that is an integer two times the number of slots per every pole and per every slot, and noise and vibration of a rotation order obtained by multiplying a spatial deformation mode order of a (NMP/2)th and a time order of a (3×h1±1)th are reduced.

3. The rotary electric apparatus according to claim 1, wherein the stator core includes a yoke portion formed along the first direction and a plurality of tooth portions integrally formed with the yoke portion so as to protrude from the yoke portion in the second direction, and the plurality of slots is formed by the tooth portions adjacent in the first direction, and
a tooth width that is a width of each of the plurality of tooth portions in the first direction and a slot width that is a width of each of the plurality of slots in the first direction are inequally set.

4. The rotary electric apparatus according to claim 1, wherein the reference region includes a first reference region and a second reference region,
the skew region includes a continuous skew region which is gradually misaligned in the first direction with respect to the first reference region and is arranged in the third direction, and a step skew region which is misaligned in a step shape in the first direction with respect to the second reference region and is arranged in the third direction,
the stator includes the first reference region and the continuous skew region,
the mover includes the second reference region and the step skew region, and
the skew amount for the second reference region in the step skew region is set to a half of a maximum value of the skew amount for the first reference region in the continuous skew region.

5. The rotary electric apparatus according to claim 4, wherein when the continuous skew region of the stator is misaligned in one direction in the first direction with respect to the first reference region, the step skew region of the mover is misaligned in another direction in the first direction with respect to the second reference region.

6. The rotary electric apparatus according to claim 4, wherein in the continuous skew region, an increasing rate or a decreasing rate of the skew amount for the first reference region is set to be constant from one end side to the other end side in the third direction.

7. The rotary electric apparatus according to claim 1, wherein the at least one second basic coil is disposed at a position moved by a predetermined slot pitch in the first direction with respect to the first basic coil.

8. The rotary electric apparatus according to claim 7, wherein when an NI slot pitch (here, NI is an integer nearest to the number of slots per every pole or 1) is set to a movement unit amount, the predetermined slot pitch is represented by n times (here, n is a natural number of 1 or more) the movement unit amount.

9. The rotary electric apparatus according to claim 8, wherein a first numerical progression in which the predetermined slot pitch of each of the at least one second basic coil is listed includes all of natural number times from one time to the n times the movement unit amount.

* * * * *